United States Patent [19]
Maeda et al.

[11] Patent Number: 5,796,618
[45] Date of Patent: Aug. 18, 1998

[54] CAD SYSTEM, METHOD AND MEDIUM FOR CREATING AND ENCODING NC DATA BASED BEFORE AND AFTER WORKPIECE MODELS

[75] Inventors: Tadasu Maeda; Koji Ota; Masaki Arao; Taiji Sogou; Hiroshi Nakajima; Norichika Miyamoto; Susumu Ishiguro; Motoji Hayashi, all of Kyoto, Japan

[73] Assignee: Omron Corporation, Kyoto, Japan

[21] Appl. No.: 416,683

[22] PCT Filed: Oct. 12, 1993

[86] PCT No.: PCT/JP93/01461

§ 371 Date: Apr. 7, 1995

§ 102(e) Date: Apr. 7, 1995

[87] PCT Pub. No.: WO94/08751

PCT Pub. Date: Apr. 28, 1994

[30] Foreign Application Priority Data

| Oct. 9, 1992 | [JP] | Japan | 4-272057 |
| Jan. 19, 1993 | [JP] | Japan | 5-7013 |

[51] Int. Cl.$^6$ ............... G06F 19/00
[52] U.S. Cl. ............... 364/474.24; 364/191; 364/468.1; 364/474.17
[58] Field of Search ............... 364/191, 468.03, 364/468.04, 468.1, 468.24, 474.24, 474.16, 474.17, 474.01, 434.23

[56] References Cited

U.S. PATENT DOCUMENTS

| 4,918,627 | 4/1990 | Garcia et al. | 364/552 |
| 4,967,365 | 10/1990 | Hampl et al. | 364/474.15 |
| 4,998,206 | 3/1991 | Jones et al. | 364/468.03 |
| 5,121,334 | 6/1992 | Riley et al. | 364/474.05 |
| 5,208,765 | 5/1993 | Turnbull | 364/552 |
| 5,249,135 | 9/1993 | Fujita | 364/474.21 |
| 5,377,116 | 12/1994 | Wayne et al. | 364/474.17 |

FOREIGN PATENT DOCUMENTS

| 0 213 531 A2 | 11/1987 | European Pat. Off. |
| 0 337 122 A2 | 10/1989 | European Pat. Off. |
| 0 467 297 A2 | 1/1992 | European Pat. Off. |
| 0 503 642 A3 | 10/1993 | European Pat. Off. |
| 2 620 958 | 8/1988 | France |

(List continued on next page.)

OTHER PUBLICATIONS

Patent abstracts of Japan, vol. 15, No. 437, Publication date: Dec. 8, 1991.

Genetic algorithms in process planning, Nov. 17, 1991, Nos. 2/3, Amsterdam, NE, Jozsef Vancza and Andras Markus, Computers in Industry.

(List continued on next page.)

*Primary Examiner*—Paul P. Gordon
*Attorney, Agent, or Firm*—Dickstein Shapiro Morin & Oshinsky, LLP

[57] ABSTRACT

A machining information determination system and method for operating the same in which control data and optimum machining information of a machine tool can be determined automatically from the comparison of a model having the shape of a workpiece before machining and a model having the shape of the workpiece after machining. A CAD apparatus creates before- and after-machining workpiece shape information based on before- and after-machining models of the workpiece. Information regarding the material of the workpiece and stage of machining to be applied to the workpiece is entered via an input unit. Based on the information from the CAD apparatus and the input unit, a machining determination apparatus determines the optimum machining information for machining the workpiece. The optimum machining information and the information from the CAD apparatus is inputted into a CAM apparatus, which creates NC data, applied to the workpiece via a machine tool.

56 Claims, 126 Drawing Sheets

FOREIGN PATENT DOCUMENTS

| | | |
|---|---|---|
| 0 311 703 A1 | 4/1989 | Germany . |
| 58-82648 | 5/1983 | Japan . |
| 62-57852 | of 1987 | Japan . |
| 62-127907 | 6/1987 | Japan . |
| 62-140744 | 6/1987 | Japan . |
| 62-140745 | 6/1987 | Japan . |
| 62-140747 | 6/1987 | Japan . |
| 62-208859 | 9/1987 | Japan . |
| 62-218050 | 9/1987 | Japan . |
| 62-241008 | 10/1987 | Japan . |
| 1-205954 | 8/1989 | Japan . |
| 1-234135 | 9/1989 | Japan . |
| 1-316805 | 12/1989 | Japan . |
| 2-59252 | 2/1990 | Japan . |
| 2-72413 | 3/1990 | Japan . |
| 2-116449 | 5/1990 | Japan . |
| 2-293904 | 12/1990 | Japan . |
| 3-294147 | 12/1991 | Japan . |
| 4-75108 | 3/1992 | Japan . |
| 4-114207 | 4/1992 | Japan . |
| 4-135140 | 5/1992 | Japan . |
| 4-135204 | 5/1992 | Japan . |
| 4-138504 | 5/1992 | Japan . |
| 5-197412 | 8/1993 | Japan . |

OTHER PUBLICATIONS

IEEE International Conference on Fuzzy Systems, Mar. 8–12, 1992, Town & Country Hotel, SanDiego, California, Cat. No. 92CH3073–4, Library of Congress Catalog No. 91–58130.

Process Planning in an Automated Manufacturing Environment, M. Kanumury, T.C. Chang, Purdue University, West Lafayette, In., Journal of Manufacturing System, 10(1991) No., Dearborn, MI, US.

$15 \geqq Z > 10$ $10 \geqq Z > 8$ $8 \geqq Z > 5$ $5 \geqq Z > 0$

Fig. 11a

| 0 | 1 | 1 |
|---|---|---|
| 0 | 1 | 1 |
| 0 | 1 | 1 |

Fig. 11b

| 1 | 1 | 0 |
|---|---|---|
| 1 | 1 | 0 |
| 1 | 1 | 0 |

Fig. 11c

| 0 | 0 | 0 |
|---|---|---|
| 1 | 1 | 1 |
| 1 | 1 | 1 |

Fig. 11d

| 1 | 1 | 1 |
|---|---|---|
| 1 | 1 | 1 |
| 0 | 0 | 0 |

Fig. 11e

| 0 | 0 | 1 |
|---|---|---|
| 0 | 1 | 1 |
| 1 | 1 | 1 |

Fig. 11f

| 1 | 1 | 1 |
|---|---|---|
| 0 | 1 | 1 |
| 0 | 0 | 1 |

Fig. 11g

| 1 | 1 | 1 |
|---|---|---|
| 1 | 1 | 0 |
| 1 | 0 | 0 |

Fig. 11h

| 1 | 0 | 0 |
|---|---|---|
| 1 | 1 | 0 |
| 1 | 1 | 1 |

Fig. 12

BEFORE-MACHINING SHAPE INFORMATION

| CUTTING AREA S0 [mm$^2$] | 400 |
|---|---|
| MACHINING SHAPE Fr | FULL SURFACE CUTTING |
| CUTTING WIDTH m0 [mm] | 5 |
| CUTTING DEPTH h [mm] | 5 |

Fig. 13

AFTER-MACHINING SHAPE INFORMATION

| SURFACE PRECISION | (SMOOTH, 3.8) |
|---|---|
| AFTER-MACHINING SHAPE COMPLEXITY nd | 50 |
| CONVEXITY D0 | 30 |
| CORNER RADIUS R [mm] | 0 |

Fig. 14

MATERIAL INFORMATION

| MATERIAL | IRON |
|---|---|

Fig. 15

MACHINING-STAGE INFORMATION

| MACHINING STAGE | ROUGH MACHINING |
|---|---|

Fig. 18

MATERIAL DATA FILE

| MATERIAL NAME | HARDNESS |
|---|---|
| SKD | 80 |
| IRON | 50 |
| BAKELITE | 20 |
| ⋮ | ⋮ |

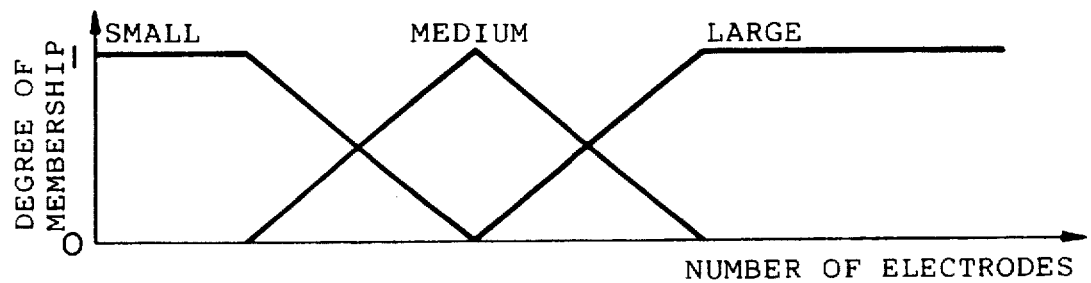
Fig. 19k
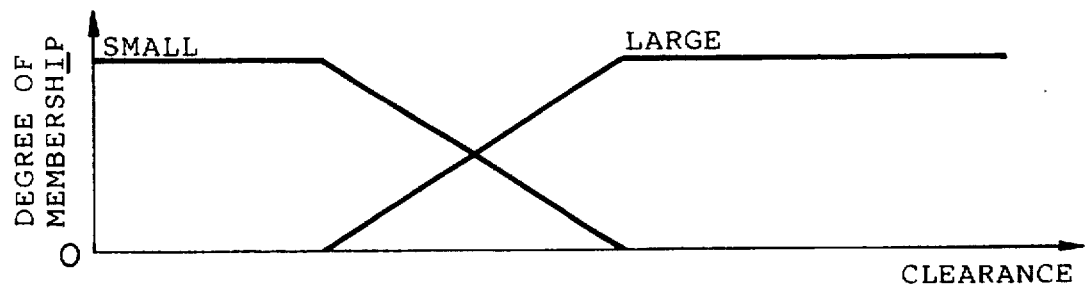
Fig. 19ℓ
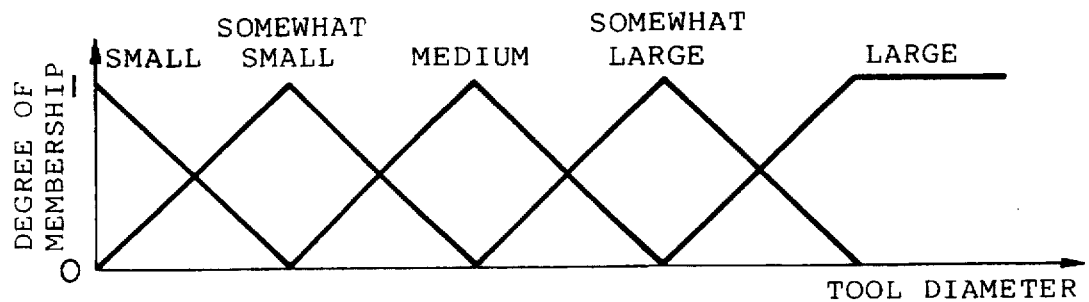
Fig. 19m

Fig. 20

NC MACHINE TOOL-USE DATA FILE

| END MILL | | | | | |
|---|---|---|---|---|---|
| TOOL NAME | TOOL NUMBER | TOOL DIAMETER [mm] | TOOL LENGTH [cm] | TOOL LIFE [HOUR] | TOOL PRICE [YEN] |
| END MILL A | 1 | 4 | 18 | 1500 | 6000 |
| | 2 | 4 | 12 | 200 | 4000 |
| | 3 | 4.1 | 18 | 550 | 9000 |
| | 4 | 4.2 | 22 | 850 | 15000 |
| END MILL B | 1 | 4 | 19 | 500 | 8000 |
| | 2 | 6 | 21 | 1000 | 4000 |
| | 3 | 8 | 30 | 1200 | 3000 |
| | 4 | 9 | 32 | 3000 | 1000 |
| ⋮ | ⋮ | ⋮ | ⋮ | ⋮ | ⋮ |

Fig. 23

| DEGREE OF MEMBERSHIP PER RETRIEVAL CONDITION | | | | | DEGREE OF MEMBERSHIP |
|---|---|---|---|---|---|
| TOOL NAME | TOOL NUMBER | TOOL DIAMETER | TOOL LIFE | TOOL PRICE | |
| END MILL A | 1 | 1.0 | 0.9 | 0.8 | 0.9 |
|  | 2 | 1.0 | 0.0 | 1.0 | 0.0 |
|  | 3 | 0.75 | 0.2 | 0.5 | 0.48 |
|  | 4 | 0.5 | 0.5 | 0.1 | 0.37 |
| END MILL B | 1 | 1.0 | 0.0 | 0.4 | 0.0 |
|  | 2 | 0.0 | 0.6 | 1.0 | 0.0 |
|  | 3 | 0.0 | 0.8 | 1.0 | 0.0 |
|  | 4 | 0.0 | 1.0 | 1.0 | 0.0 |

Fig.26

OPTIMUM MACHINING INFORMATION

| TOOL -USE INFORMATION | TOOL NAME | END MILL A1 |
|---|---|---|
| | TOOL DIAMETER [mm] | 4 |
| | TOOL LENGTH [cm] | 18 |
| TOOL-PATH MODE INFORMATION | ONE-WAY TRAVEL | |
| MACHINING CONDITION INFORMATION | FEED RATE [mm/sec] | 10 |
| | ROTATIONAL SPEED [rpm] | 3000 |

Fig.28

MACHINE TOOL PARAMETERS

| INITIAL TOOL POSITION | X = 0, Y = 0, Z = 100 |
|---|---|
| TOOL TRAVELING HEIGHT (RELIEF) | Z = 90 |
| TOOL TRAVELING DISTANCE | $\Delta x = 5$, $\Delta y = 5$, $\Delta z = 5$ |
| BEFORE-MACHINING SHAPE MODEL | bk. dat |
| AFTER-MACHINING SHAPE MODEL | ak. dat |
| MACHINE NAME | OM1 |

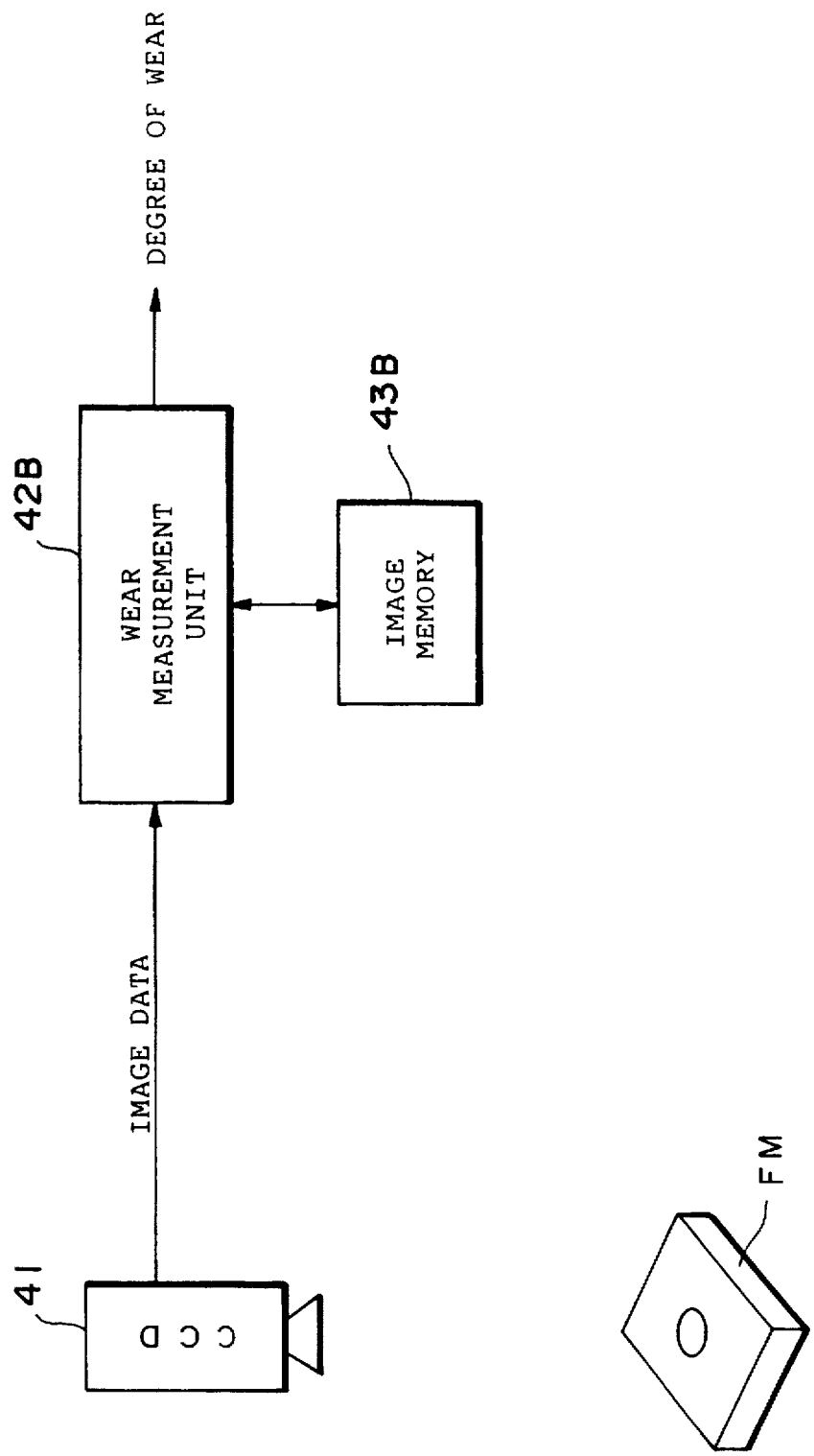
Fig. 38
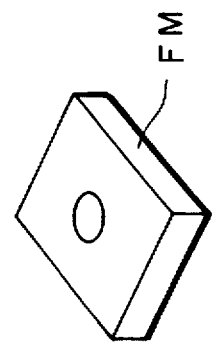

Fig. 53a

STANDARD MACHINING CONDITION INFORMATION

| TOOL DIAMETER [mm] | MATERIAL | MACHINING STAGE | FEED RATE STANDARD VALUE [mm/sec] | ROTATIONAL SPEED STANDARD VALUE [rpm] |
|---|---|---|---|---|
| 4 | IRON | ROUGH MACHINING | 10 | 3000 |
| 1.5 | ALUMINUM | SEMI-FINISHING | 8 | 3000 |
| 6 | BAKELITE | SEMI-FINISHING | 20 | 6000 |
| 8 | IRON | ROUGH MACHINING | 10 | 3000 |
| ⋮ | ⋮ | ⋮ | ⋮ | ⋮ |

Fig. 53b

STANDARD MACHINING CONDITION INFORMATION

| TOOL DIAMETER [mm] | MATERIAL | SURFACE PRECISION | FEED RATE STANDARD VALUE [mm/sec] | ROTATIONAL SPEED STANDARD VALUE [rpm] |
|---|---|---|---|---|
| 4 | IRON | COARSE | 5 | 1000 |
| 1.5 | ALUMINUM | SMOOTH | 8 | 3000 |
| 6 | BAKELITE | COARSE | 20 | 6000 |
| 8 | IRON | SMOOTH | 10 | 3000 |
| ⋮ | ⋮ | ⋮ | ⋮ | ⋮ |

Fig.57a

PROPER MACHINING-CONDITION RANGE INFORMATION

| TOOL DIAMETER [mm] | MATERIAL | MACHINING STAGE | FEED RATE [mm/sec] | | ROTATIONAL SPEED [rpm] | |
|---|---|---|---|---|---|---|
| | | | MINIMUM VALUE | MAXIMUM VALUE | MINIMUM VALUE | MAXIMUM VALUE |
| 4 | IRON | ROUGH MACHINING | 8 | 13 | 2500 | 3500 |
| 1.5 | ALUMINUM | SEMI-FINISHING | 5 | 11 | 2500 | 3500 |
| 6 | BAKELITE | SEMI-FINISHING | 15 | 25 | 5000 | 7000 |
| 8 | IRON | ROUGH MACHINING | 8 | 13 | 2500 | 3500 |
| ..... | ..... | ..... | ..... | ..... | ..... | ..... |

Fig.57b

PROPER MACHINING-CONDITION RANGE INFORMATION

| TOOL DIAMETER [mm] | MATERIAL | SURFACE PRECISION | FEED RATE [mm/sec] | | ROTATIONAL SPEED [rpm] | |
|---|---|---|---|---|---|---|
| | | | MINIMUM VALUE | MAXIMUM VALUE | MINIMUM VALUE | MAXIMUM VALUE |
| 1 | IRON | COARSE | 3 | 7 | 700 | 1300 |
| 1.5 | ALUMINUM | SMOOTH | 5 | 11 | 2500 | 3500 |
| 6 | BAKELITE | COARSE | 15 | 25 | 5000 | 7000 |
| 8 | IRON | SMOOTH | 8 | 13 | 2500 | 3500 |
| ..... | ..... | ..... | ..... | ..... | ..... | ..... |

| TOOL DIAMETER [mm] | TOOL LENGTH [mm] | TOOL HARDNESS | FEED RATE [mm/sec] | ROTATIONAL SPEED [rpm] |
|---|---|---|---|---|
| SMALL | LARGE | LOW | LOW | HIGH |
| ORDINARY | SMALL | HIGH | HIGH | MEDIUM |
| LARGE | ORDINARY | HIGH | HIGH | LOW |
| LARGE | LARGE | ORDINARY | MEDIUM | LOW |
| ⋮ | ⋮ | ⋮ | ⋮ | ⋮ |

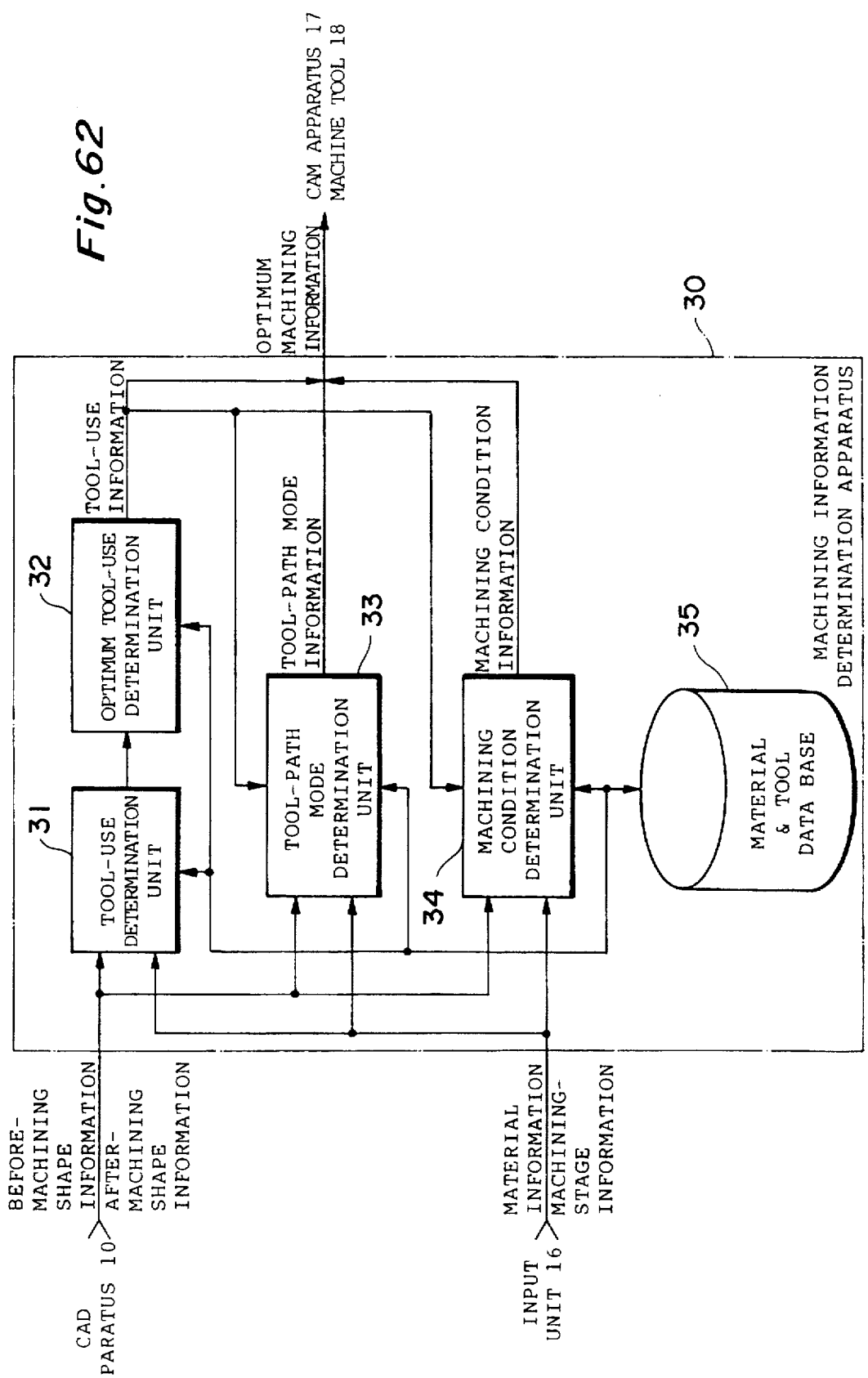

*Fig. 65*

TOOL-USE DATA FILE FOR ROUGH/SEMI-FINISHING MACHINING; NC MACHINE

| MATERIAL | MACHINING STAGE | CUTTING WIDTH [mm] | CUTTING DEPTH [mm] | TOOL NAME | TOOL DIAMETER [mm] |
|---|---|---|---|---|---|
| IRON | ROUGH MACHINING | 10 OR GREATER | 30 OR LESS | END MILL A | 10 - 30 |
| | SEMI-FINISHING | 5 OR GREATER | 5 OR LESS | END MILL A | 4 - 8 |
| ALUMINUM | ROUGH MACHINING | 20 OR GREATER | 30 OR LESS | DRILL B | 20 - 30 |
| | SEMI-FINISHING | 5 OR GREATER | 3 OR LESS | DRILL B | 8 - 10 |
| BAKELITE | ROUGH MACHINING | 15 OR GREATER | 40 OR LESS | DRILL C | 14 - 35 |
| | SEMI-FINISHING | 7 OR GREATER | 5 OR LESS | END MILL C | 7 - 14 |
| ..... | ..... | ..... | ..... | ..... | ..... |

Fig. 66

TOOL-USE DATA FILE FOR FINISHING MACHINING; NC MACHINE

| MATERIAL | SURFACE PRECISION | CUTTING WIDTH [mm] | CUTTING DEPTH [mm] | TOOL NAME | TOOL DIAMETER [mm] |
|---|---|---|---|---|---|
| IRON | COARSE | 10 OR GREATER | 30 OR LESS | END MILL A | 5 - 8 |
|  | SMOOTH | 5 OR GREATER | 5 OR LESS | END MILL A | 1 - 3 |
| ALUMINUM | COARSE | 20 OR GREATER | 30 OR LESS | DRILL B | 19 - 19.5 |
|  | SMOOTH | 5 OR GREATER | 3 OR LESS | DRILL B | 4.5 - 4.8 |
| BAKELITE | COARSE | 15 OR GREATER | 40 OR LESS | DRILL C | 13 - 14.5 |
|  | SMOOTH | 7 OR GREATER | 5 OR LESS | END MILL C | 2 - 4 |
| ..... | ..... | ..... | ..... | ..... | ..... |

Fig.67

TOOL-USE DATA FILE FOR WIRE-CUT MACHINE

| MATERIAL | MACHINING STAGE | CUTTING WIDTH [mm] | MACHINING SHAPE | TOOL DIAMETER [mm] |
|---|---|---|---|---|
| IRON | ROUGH MACHINING | 10 OR GREATER | FULL SURFACE CUTTING | 0.5 |
| | SEMI-FINISHING | 5 OR GREATER | FULL SURFACE CUTTING | 1 |
| ALUMINUM | ROUGH MACHINING | 20 OR GREATER | FULL SURFACE CUTTING | 0.3 |
| | SEMI-FINISING | 5 OR GREATER | FULL SURFACE CUTTING | 0.25 |
| ⋮ | ⋮ | ⋮ | ⋮ | ⋮ |

Fig.68

TOOL-USE DATA FILE FOR ELECTRICAL DISCHARGE MACHINE

| MATERIAL | SURFACE PRECISION | CUTTING WIDTH [mm] | CUTTING DEPTH [mm] | NUMBER OF ELECTRODES |
|---|---|---|---|---|
| IRON | COARSE | 1 OR GREATER | 25 OR LESS | 1 |
| | SMOOTH | 2 OR GREATER | 30 OR LESS | 2 |
| ALUMINUM | COARSE | 3 OR GREATER | 25 OR LESS | 1 |
| | SMOOTH | 3 OR GREATER | 30 OR LESS | 2 |
| ⋮ | ⋮ | ⋮ | ⋮ | ⋮ |

Fig.71

TOOL-PATH MODE DATA FILE FOR ROUGH/SEMI-FINISHING MACHINING; NC MACHINE

| TOOL PATH MODE | MACHINING STAGE | CUTTING AREA [mm²] | CUTTING WIDTH [mm] | CUTTING DEPTH [mm] | CONVEXITY |
|---|---|---|---|---|---|
| ONE-WAY TRAVEL | ROUGH MACHINING | 400 OR GREATER | 40 OR LESS | 5 OR LESS | 25 OR GREATER |
| | SEMI-FINISHING | 100 OR GREATER | 10 OR LESS | 10 OR LESS | 25 OR GREATER |
| TWO-WAY TRAVEL | ROUGH MACHINING | 300 OR GREATER | 30 OR LESS | 3 OR LESS | LESS THAN 25 |
| | SEMI-FINISHING | 50 OR GREATER | 5 OR LESS | 6 OR LESS | LESS THAN 25 |
| CIRCUITOUS TRAVEL | ROUGH MACHINING | 400 OR GREATER | 40 OR LESS | 20 OR LESS | LESS THAN 25 |
| | SEMI-FINISHING | 200 OR GREATER | 20 OR LESS | 15 OR LESS | LESS THAN 25 |
| ... | ... | ... | ... | ... | ... |

Fig.72

TOOL-PATH MODE DATA FILE FOR FINISHING MACHINING; NC MACHINE

| TOOL PATH MODE | SURFACE PRECISION | CUTTING AREA [mm²] | CUTTING WIDTH [mm] | CUTTING DEPTH [mm] | CONVEXITY |
|---|---|---|---|---|---|
| ONE-WAY TRAVEL | COARSE | 400 OR GREATER | 40 OR LESS | 5 OR LESS | 25 OR GREATER |
| | SMOOTH | 100 OR GREATER | 10 OR LESS | 10 OR LESS | 25 OR GREATER |
| TWO-WAY TRAVEL | COARSE | 300 OR GREATER | 30 OR LESS | 3 OR LESS | LESS THAN 25 |
| | SMOOTH | 50 OR GREATER | 5 OR LESS | 6 OR LESS | LESS THAN 25 |
| CIRCUITOUS TRAVEL | COARSE | 400 OR GREATER | 40 OR LESS | 10 OR LESS | LESS THAN 25 |
| | SMOOTH | 200 OR GREATER | 20 OR LESS | 15 OR LESS | LESS THAN 25 |
| ... | ... | ... | ... | ... | ... |

Fig. 74

MACHINING CONDITION DATA FILE
FOR ROUGH/SEMI-FINISHING MACHINING; NC MACHINE

| TOOL DIAMETER [mm] | MATERIAL | MACHINING STAGE | FEED RATE [mm/sec] | ROTATIONAL SPEED [rpm] |
|---|---|---|---|---|
| 4 | IRON | ROUGH MACHINING | 10 | 3000 |
| 1.5 | ALUMINUM | SEMI-FINISHING | 8 | 3000 |
| 6 | BAKELITE | SEMI-FINISHING | 20 | 6000 |
| 8 | IRON | ROUGH MACHINING | 10 | 3000 |
| ⋮ | ⋮ | ⋮ | ⋮ | ⋮ |

Fig. 75

MACHINING CONDITION DATA FILE
FOR FINISHING MACHINING; NC MACHINE

| TOOL DIAMETER [mm] | MATERIAL | SURFACE PRECISION | FEED RATE [mm/sec] | ROTATIONAL SPEED [rpm] |
|---|---|---|---|---|
| 4 | IRON | COARSE | 5 | 1000 |
| 1.5 | ALUMINUM | SMOOTH | 8 | 3000 |
| 6 | BAKELITE | COARSE | 20 | 6000 |
| 8 | IRON | SMOOTH | 10 | 3000 |
| ⋮ | ⋮ | ⋮ | ⋮ | ⋮ |

Fig.76

MACHINING CONDITION DATA FILE FOR WIRE-CUT MACHINE

| TOOL DIAMETER [mm] | MATERIAL | MACHINING STAGE | FEED RATE [mm/sec] | OUTPUT |
|---|---|---|---|---|
| 0.5 | IRON | ROUGH MACHINING | 5 | 5 |
| 1.0 | ALUMINUM | SEMI-FINISHING | 8 | 8 |
| 0.5 | ALUMINUM | SEMI-FINISHING | 20 | 10 |
| 1.0 | IRON | ROUGH MACHINING | 10 | 5 |
| ⋮ | ⋮ | ⋮ | ⋮ | ⋮ |

Fig. 77

MACHINING CONDITION DATA FILE
FOR ELECTRICAL DISCHARGE MACHINE

| NUMBER OF ELECTRODES | MATERIAL | SURFACE PRECISION | FEED RATE [mm/sec] | OUTPUT |
|---|---|---|---|---|
| 1 | IRON | COARSE | 10 | 6 |
| 2 | IRON | SMOOTH | 6 | 3 |
| 1 | ALUMINUM | COARSE | 20 | 10 |
| 3 | ALUMINUM | SMOOTH | 15 | 8 |
| ⋮ | ⋮ | ⋮ | ⋮ | ⋮ |

Fig. 82a

DRAWING ELEMENT INFORMATION

| DRAWING ELEMENT | TYPE | STARTING-POINT COORDINATES (X, Y) | END-POINT COORDINATES (X, Y) | CENTER COORDINATES (X, Y) | RADIUS R | MACHINING DEPTH ΔZ |
|---|---|---|---|---|---|---|
| 1 | LINE SEGMENT | (0, 0) | (100, 0) | — | — | 0 |
| 2 | LINE SEGMENT | (0, 40) | (100, 40) | — | — | 0 |
| 3 | LINE SEGMENT | (100, 0) | (100, 40) | — | — | 0 |
| 4 | LINE SEGMENT | (0, 0) | (0, 40) | — | — | 0 |
| 5 | LINE SEGMENT | (35, 0) | (35, 5) | — | — | 15 |
| 6 | LINE SEGMENT | (45, 0) | (45, 5) | — | — | 15 |
| 7 | LINE SEGMENT | (70, 0) | (70, 5) | — | — | 10 |
| 8 | LINE SEGMENT | (80, 0) | (80, 5) | — | — | 10 |
| 9 | LINE SEGMENT | (70, 2.5) | (80, 2.5) | — | — | 10 |
| 10 | LINE SEGMENT | (0, 5) | (35, 5) | — | — | 0 |

Fig. 82b

DRAWING ELEMENT INFORMATION

| DRAWING ELEMENT | TYPE | STARTING-POINT COORDINATES (X, Y) | END-POINT COORDINATES (X, Y) | CENTER COORDINATES (X, Y) | RADIUS R | MACHINING DEPTH ΔZ |
|---|---|---|---|---|---|---|
| 11 | LINE SEGMENT | (45, 5) | (70, 5) | — | — | 0 |
| 12 | LINE SEGMENT | (80, 5) | (100, 5) | — | — | 0 |
| 13 | LINE SEGMENT | (0, 15) | (60, 15) | — | — | 0 |
| 14 | LINE SEGMENT | (60, 15) | (100, 15) | — | — | 0 |
| 15 | LINE SEGMENT | (60, 15) | (58, 20) | — | — | 15 |
| 16 | LINE SEGMENT | (65, 15) | (67, 20) | — | — | 15 |
| 17 | LINE SEGMENT | (0, 20) | (58, 20) | — | — | 0 |
| 18 | LINE SEGMENT | (67, 20) | (100, 20) | — | — | 0 |
| 19 | CIRCLE | — | — | (25, 30) | 7 | 5 |
| 20 | CIRCLE | — | — | (25, 30) | 3 | 5 |
| 21 | CIRCLE | — | — | (85, 30) | 4 | 5 |

Fig. 84

DRAWING ELEMENT INFORMATION

| DRAWING ELEMENT | TYPE | STARTING-POINT COORDINATES (X, Y) | END-POINT COORDINATES (X, Y) | CENTER COORDINATES (X, Y) | RADIUS R |
|---|---|---|---|---|---|
| 51 | LINE SEGMENT | (0, 0) | (100, 0) | — | — |
| 52 | LINE SEGMENT | (0, 5) | (100, 5) | — | — |
| 53 | LINE SEGMENT | (0, 15) | (100, 15) | — | — |
| 54 | LINE SEGMENT | (0, 20) | (100, 20) | — | — |
| 55 | LINE SEGMENT | (0, 40) | (100, 40) | — | — |
| 56 | LINE SEGMENT | (0, 0) | (0, 40) | — | — |
| 57 | LINE SEGMENT | (100, 0) | (100, 40) | — | — |

Fig.86a

DRAWING ELEMENT INFORMATION

| DRAWING ELEMENT | TYPE | STARTING-POINT COORDINATES (Z, Y) | END-POINT COORDINATES (Z, Y) | CENTER COORDINATES (Z, Y) | RADIUS R |
|---|---|---|---|---|---|
| 101 | LINE SEGMENT | (0, 0) | (40, 0) | — | — |
| 102 | LINE SEGMENT | (40, 0) | (40, 5) | — | — |
| 103 | LINE SEGMENT | (40, 5) | (35, 5) | — | — |
| 104 | LINE SEGMENT | (35, 5) | (35, 2.5) | — | — |
| 105 | LINE SEGMENT | (35, 2.5) | (25, 2.5) | — | — |
| 106 | LINE SEGMENT | (25, 2.5) | (25, 15) | — | — |
| 107 | LINE SEGMENT | (25, 15) | (40, 15) | — | — |
| 108 | LINE SEGMENT | (40, 15) | (40, 20) | — | — |
| 109 | LINE SEGMENT | (40, 20) | (35, 20) | — | — |
| 110 | LINE SEGMENT | (35, 20) | (35, 7.5) | — | — |

Fig. 86b

DRAWING ELEMENT INFORMATION

| DRAWING ELEMENT | TYPE | STARTING-POINT COORDINATES (Z, Y) | END-POINT COORDINATES (Z, Y) | CENTER COORDINATES (Z, Y) | RADIUS R |
|---|---|---|---|---|---|
| 111 | LINE SEGMENT | (35, 7.5) | (25, 17.5) | — | — |
| 112 | LINE SEGMENT | (25, 17.5) | (25, 40) | — | — |
| 113 | LINE SEGMENT | (25, 40) | (0, 40) | — | — |
| 114 | LINE SEGMENT | (0, 40) | (0, 0) | — | — |
| 115 | LINE SEGMENT | (5, 8) | (20, 8) | — | — |
| 116 | LINE SEGMENT | (20, 8) | (20, 35) | — | — |
| 117 | LINE SEGMENT | (20, 35) | (5, 35) | — | — |
| 118 | LINE SEGMENT | (5, 35) | (5, 8) | — | — |

Fig. 87a

| No. | MACHINING MACRO PATTERN | PARAMETERS | | MACHINING PROCESS | MACHINING TOOL |
|---|---|---|---|---|---|
| 1 | (circle with a, ra) | a (ra) | r11 | HOLE MACHINING | CENTER DRILL, DRILL |
| | | | r12 | HOLE MACHINING | CENTER DRILL, DRILL 1, DRILL 2 |
| 2 | (circle with b, rb, c, rc) | b (rb), c (ra)<br>(ra > rc) | r21 | HOLE MACHINING → MILLING | CENTER DRILL, DRILL, END MILL |
| | | | r22 | MILLING | END MILL 1, END MILL 2 |
| | | | r23 | MILLING | END MILL |
| 3 | (rectangle a,b,c,d) | a → b → c, d | r31 | MILLING | END MILL |
| | | | r32 | MILLING | END MILL |
| 4 | (trapezoid a,b,c,d) | a → b → c → d → a | r41 | MILLING | END MILL |
| | | | r42 | MILLING | END MILL |
| | | | r42 | MILLING | END MILL 1, END MILL 2 |

*Fig. 87b*

| No. | | MACHINING METHODS |
|---|---|---|
| 1 | r11 | ra IS SMALL ⇒ CENTER DRILL → DRILL (TOOL RADIUS ra) |
| | r12 | ra IS LARGE ⇒ CENTER DRILL → DRILL (TOOL RADIUS ABOUT ra/2) → DRILL (TOOL RADIUS ra) |
| 2 | r21 | ra IS LARGE ⇒ CENTER DRILL → DRILL (TOOL RADIUS ra) → MILLING (TOOL RADIUS LARGE) |
| | r22 | rc IS SMALL AND rb IS LARGE ⇒ MILLING (TOOL RADIUS LARGE → SMALL) |
| | r23 | rc IS SMALL AND rb IS SMALL ⇒ MILLING (TOOL RADIS SMALL) |
| 3 | r31 | AREA OF RECTANGLE BOUNDED BY a, b, c AND d IS SMALL ⇒ MILLING (TOOL RADIS SMALL) |
| | r32 | AREA OF RECTANGLE BOUNDED BY a, b, c AND d IS LARGE ⇒ MILLING (TOOL RADIUS LARGE) |
| 4 | r41 | d IS LARGE ⇒ MILLING (TOOL RADIUS LARGE) |
| | r42 | d IS SMALL AND b IS SMALL ⇒ MILLING (TOOL RADIS SMALL) |
| | r43 | d IS SMALL AND b IS LARGE ⇒ MILLING (TOOL RADIUS LARGE → SMALL) |

Fig. 87c

| No. | MACHINING MACRO PATTERN | PARAMETERS | | MACHINING PROCESS | MACHINING TOOL |
|---|---|---|---|---|---|
| 5 | ⌐c⌐<br>a  b | ⌐ ⌐<br>a → b → c | r51 | CUTTING-OFF MACHINING | — |
|   |   |   | r52 | CUTTING-OFF MACHINING | — |
|   |   |   | r53 | MILLING | END MILL |
| 6 | a‖b | a, b | r61 | CUTTING-OFF MACHINING → MILLING | END MILL |
| 7 | ⌐c⌐<br>d    a<br>  b | ⌐ ⌐<br>a→b→c→d→a | r71 | MILLING | END MILL |
|   |   |   | r72 | MILLING | END MILL 1, END MILL 2 |
| ... | ... | ... | | ... | ... |

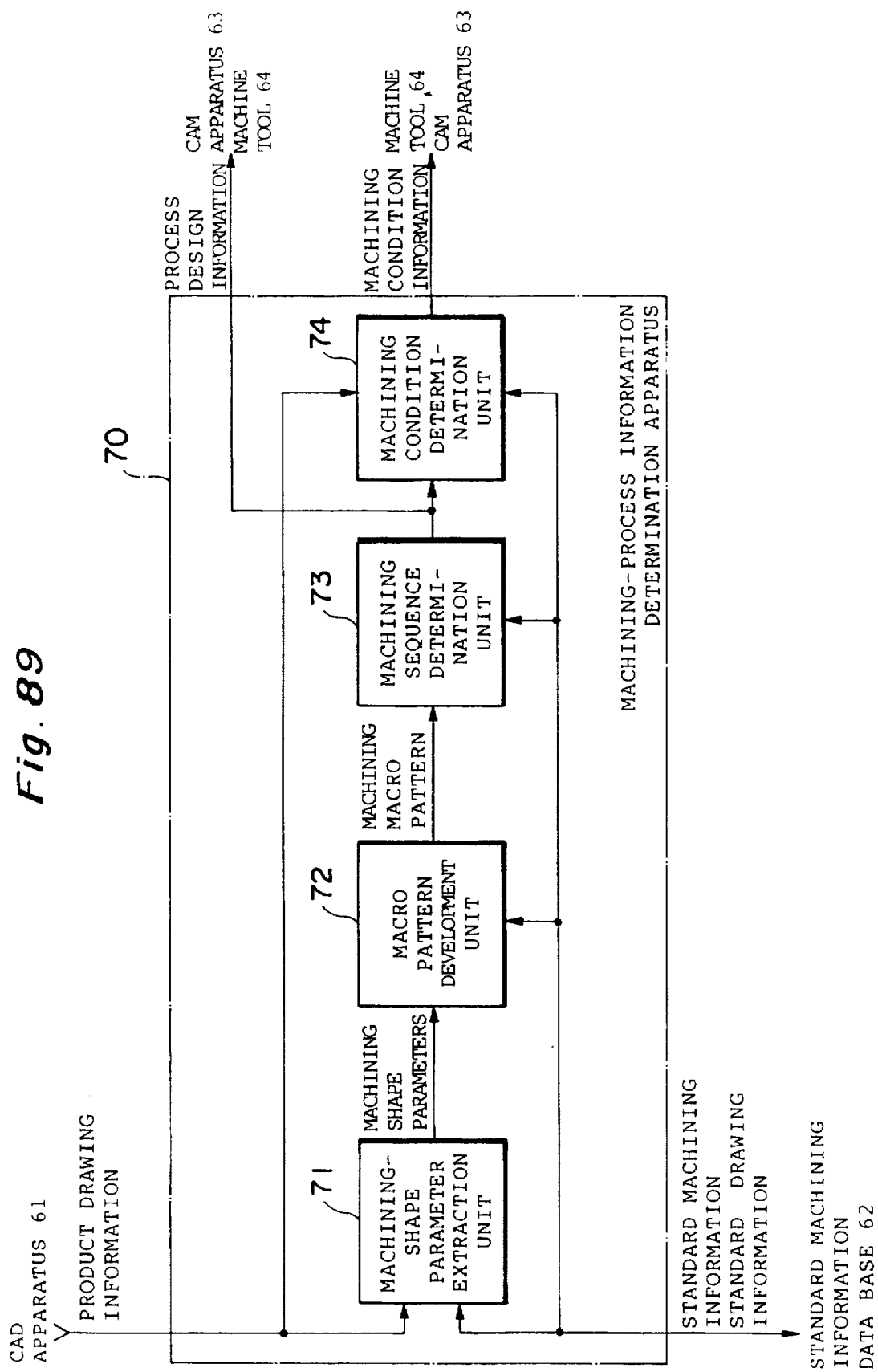

Fig. 93

DRAWING ELEMENT INFORMATION

| DRAWING ELEMENT | TYPE | STARTING-POINT COORDINATES (X, Y) | END-POINT COORDINATES (X, Y) | CENTER COORDINATES (X, Y) | RADIUS R | MACHINING DEPTH ΔZ |
|---|---|---|---|---|---|---|
| 5  | LINE SEGMENT | (35, 0)    | (35, 5)    | —        | — | 15 |
| 6  | LINE SEGMENT | (45, 0)    | (45, 5)    | —        | — | 15 |
| 7  | LINE SEGMENT | (70, 0)    | (70, 5)    | —        | — | 10 |
| 8  | LINE SEGMENT | (80, 0)    | (80, 5)    | —        | — | 10 |
| 9  | LINE SEGMENT | (70, 2.5)  | (80, 2.5)  | —        | — | 10 |
| 15 | LINE SEGMENT | (60, 15)   | (58, 20)   | —        | — | 15 |
| 16 | LINE SEGMENT | (65, 15)   | (67, 20)   | —        | — | 15 |
| 19 | CIRCLE       | —          | —          | (25, 30) | 7 | 5  |
| 20 | CIRCLE       | —          | —          | (25, 30) | 3 | 5  |
| 21 | CIRCLE       | —          | —          | (85, 30) | 4 | 5  |
| 22 | LINE SEGMENT | (35, 5)    | (45, 5)    | —        | — | 15 |
| 23 | LINE SEGMENT | (70, 5)    | (80, 5)    | —        | — | 10 |
| 24 | LINE SEGMENT | (60, 15)   | (65, 15)   | —        | — | 15 |
| 25 | LINE SEGMENT | (58, 20)   | (67, 20)   | —        | — | 15 |

Fig. 95
| SHAPE ELEMENT | PARAMETERS | MACHINING MACRO PATTERN |
|---|---|---|
| 1 | 5 → 22 → 6 |  |
| 2 | 7 → 23 → 8, 9 | 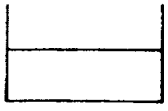 |
| 3 | 15 → 25 → 16 → 24 → 15 |  |
| 4 | 19 (7), 20 (3) | 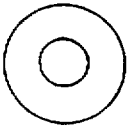 |
| 5 | 21 (4) | 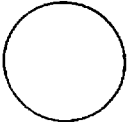 |

Fig. 97

| SHAPE ELEMENT | MACHINING METHOD |
|---|---|
| 1 | CUTTING-OFF MACHINING |
| 2 | MILLING (TOOL RADIUS LARGE) |
| 3 | MILLING (TOOL RADIUS LARGE →SMALL) |
| 4 | CENTER DRILL → DRILL (TOOL RADIUS rc) → MILLING (TOOL RADIUS LARGE) |
| 5 | CENTER DRILL → DRILL (TOOL RADIUS ra) |

Fig. 98

| MACHINING SEQUENCE | MACHINING PROCESS | SHAPE ELEMENT |
|---|---|---|
| 1 | CUTTING-OFF MACHINING | 1 |
| 2 | HOLE MACHINING | 4, 5 |
| 3 | MILLING (TOOL RADIUS LARGE) | 4, 3, 2 |
| 4 | MILLING (TOOL RADIUS SMALL) | 3 |

Fig. 100

DESIGN PROCESS INFORMATION

| MACHINING SEQUENCE | MACHINING PROCESS | SHAPE ELEMENT |
|---|---|---|
| 1 | CUTTING-OFF MACHINING | 1 |
| 2 | MILLING (TOOL RADIUS LARGE) | 2, 3 |
| 3 | MILLING (TOOL RADIUS SMALL) | 3 |
| 4 | HOLE MACHINING | 4, 5 |
| 5 | MILLING (TOOL RADIUS LARGE) | 4 |

Fig. 104

MACHINING CONDITION INFORMATION

| TOOL-DIAMETER MODIFICATION INFORMATION | 0.9 |
|---|---|
| TOOL-LENGTH MODIFICATION INFORMATION | 1.4 |

CAD SYSTEM, METHOD AND MEDIUM FOR CREATING AND ENCODING NC DATA BASED BEFORE AND AFTER WORKPIECE MODELS

TECHNICAL FIELD

This invention relates to a machining information determination system and method of operating the same, a machining information determination apparatus and method, a CAD apparatus and method of operating the same, a machining-process information determination system and method, as well as a machining-process information apparatus and method.

Background Art

The following method has been disclosed in Japanese Patent Application Laid-Open Nos. 2-72413 and 2-293904 as a machining information determination method in a CAD (computer aided design)/CAM (computer aided manufacture) system or machine tool:

On the basis of drawing information representing a workpiece, an operator designates the shape that is eventually desired (i.e., the shape after machining). Next, with regard to the tool used by the machine tool, the operator designates the shape of the machining tool, the tool diameter, the rotational speed and the feed rate, etc. The operator designates the shape of the workpiece (i.e., the shape before machining) as well as the initial position, final position and traveling direction of the machining tool. By then designating a machining method conforming to the surface precision of the workpiece, the tool path of the machining tool and NC (numerical control) data are created.

In the conventional method of this kind, however, the operator must designate numerous parameters of the machine tool. Making these designations requires considerable time and the task is a troublesome one. Further, the parameters of the machine tool include some that are interrelated, such as the type of material to be machined, and the feed rate of the machining tool and the rotational speed thereof. It is required that such parameters be set on the basis of special knowledge, and the settings cannot be made unless the operator is skilled. Furthermore, the operator must set the machine tool parameters for each stage of machining, such as rough machining, semi-finishing and finishing. The result is poor operating efficiency.

Further, the following method has been disclosed in Japanese Patent Application Laid-Open No. 4-114207:

A machining method file and a tool information file are prepared in advance. Machining methods corresponding to shape after machining are stored in the machining method file in accordance with machining order of priority. Tool information corresponding to each machining method is stored in the tool information file in accordance with order of priority of use. When drawing information that has been created in a CAD apparatus is entered, machining method and machining tools are decided by referring to the machining method file and tool file, and the desired machining information is then created.

In the conventional method of this kind, however, the information that has been stored in the machining method file and tool information file is limited in nature and therefore machining methods and machining tools that have not been stored in these files cannot be accommodated. In addition, if the machine tool or machining tool, etc., is modified, the information that has been stored in the machining method file and tool information file must be modified in succession. This is a troublesome task.

Furthermore, in a system comprising a CAD/CAM apparatus and a machine tool, there are occasions where process design information and machining information is created, while referring to standard machining information created in advance, on the basis of workpiece product drawing information created by the CAD apparatus. The standard machining information is information relating to machining processes and corresponds to a standard pattern (referred to as a "macro pattern") of a machined shape. A skilled operator adapts the standard machined-shape pattern to a portion having a similar shape in the workpiece product drawing, revises the machining processes of the machined-shape pattern and decides process design information and machining condition information.

However, in a situation in which a wide variety of articles are produced in small amounts, a limited number of operators must apply machined-shape patterns to the product drawings of a large quantity of workpieces and must then make the revision of the machining processes. It is required that an operator have a high level of special knowledge in order to apply machined-shape patterns to the shapes in workpiece product drawings. Accordingly, this is a task that cannot be performed by a novice operator. In addition, when the special knowledge of a skilled operator is implemented by an expert system, the combinations of machined-shape patterns become so numerous that the resulting system is impractical.

DISCLOSURE OF THE INVENTION

An object of the present invention is to provide a machining information determination system and method in which control data of a machine tool can be decided automatically from a model having the shape of a workpiece before machining and a model having the shape of the workpiece after machining.

Another object of the present invention is to provide a machining information determination system and method in which optimum machining information can be decided automatically from a model having the shape of a workpiece before machining and a model having the shape of the workpiece after machining.

Another object of the present invention is to provide a machining information determination system and method in which control data of a machine tool can be decided automatically from information regarding the shape of a workpiece before machining and information regarding the shape of the workpiece after machining.

Another object of the present invention is to provide a machining information determination apparatus and method in which optimum machining information can be decided automatically from information regarding the shape of a workpiece before machining and information regarding the shape of the workpiece after machining.

Another object of the present invention is to provide a CAD apparatus and method of operating the same, in which information regarding the shape of a workpiece before machining and information regarding the shape of the workpiece after machining can be created automatically from a model having the shape of the workpiece before machining and a model having the shape of the workpiece after machining.

Another object of the present invention is to provide a machining-process information determination system and method in which control data of a machine tool can be created automatically from standard drawing information of a workpiece before machining and product drawing information of the workpiece after machining.

Another object of the present invention is to provide a machining-process information determination apparatus and method in which process design information can be created automatically from standard drawing information of a workpiece before machining and product drawing information of the workpiece after machining.

Another object of the present invention is to provide a machining-process information determination apparatus and method in which machining condition information can be created automatically from standard drawing information of a workpiece before machining and product drawing information of the workpiece after machining.

A first invention provides a machining information determination system and method in which control data of a machine tool is decided automatically from a model having the shape of a workpiece before machining and a model having the shape of the workpiece after machining.

The machining information determination system according to the first invention comprises a CAD apparatus which, on the basis of a before-machining shape model representing the shape of a workpiece before machining is applied thereto and an after-machining shape model representing the shape of the workpiece after machining is applied thereto, creates before-machining shape information relating to the shape of the workpiece before machining and after-machining shape information relating to the shape of the workpiece after machining; an input unit for entering material information representing material of the workpiece and machining-stage information representing stage of machining applied to the workpiece; a machining information determination apparatus which, on the basis of the before-machining shape information and after-machining shape information created by the CAD apparatus and the material information and machining-stage information entered from the input unit, decides optimum machining information for machining the workpiece, before machining has been applied thereto, to the shape after machining and up to the machining stage entered; and a control-data creation unit which, on the basis of the optimum machining information decided by the machining information determination apparatus, the before-machining shape model and the after-machining shape model, generates control data according to which a machine tool applies machining to the workpiece.

The machining information determination method according to the first invention comprises the steps of creating, on the basis of a before-machining shape model representing the shape of a workpiece before machining is applied thereto and an after-machining shape model representing the shape of the workpiece after machining is applied thereto, before-machining shape information relating to the shape of the workpiece before machining and after-machining shape information relating to the shape of the workpiece after machining; accepting entered material information representing material of the workpiece and machining-stage information representing stage of machining applied to the workpiece; deciding, on the basis of the created before-machining shape information and after-machining shape information and the entered material information and machining-stage information, optimum machining information for machining the workpiece, before machining has been applied thereto, to the shape after machining and up to the machining stage entered; and generating control data, in accordance with which a machine tool applies machining to the workpiece, on the basis of the optimum machining information decided, the before-machining shape model and the after-machining shape model.

In accordance with the first invention, before-machining shape information and after-machining shape information relating to a workpiece is created by a CAD apparatus on the basis of a before-machining shape model and after-machining shape model of the workpiece. Material information and machining-stage information is entered from an input unit. Optimum machining information is decided by a machining information determination apparatus on the basis of the before-machining shape information and after-machining shape information created by the CAD apparatus, and the material information and machining-stage information entered from the input unit. Machine tool control data is created by a control-data creation unit on the basis of the before-machining shape model and after-machining shape model and the optimum machining information decided by the machining information determination apparatus.

Accordingly, machine tool control data can be created automatically merely by having the operator create the before-machining shape model and after-machining shape model of the workpiece and enter the material information and machining-stage information. This means that it is no longer necessary to enter numerous machine tool parameters. As a result, the operating burden upon the operator can be alleviated and optimum control data can be created for the machine tool.

In a preferred embodiment of the first invention, the CAD apparatus has before-machining shape model creating means for creating the before-machining shape model representing the shape of the workpiece before machining is applied thereto; after-machining shape model creating means for creating the after-machining shape model representing the shape of the workpiece after machining is applied thereto; CAD input means for entering surface precision, which represents surface smoothness of the workpiece after machining, and corner radius, which represents corner shape of the workpiece after machining; cutting zone creating means which, on the basis of the before-machining shape model created by the before-machining shape model creating means and the after-machining shape model created by the after-machining shape model creating means, creates data representing a cutting zone in which the workpiece is to be cut; and before-machining/after-machining shape information creating means for creating the before-machining shape information on the basis of the cutting zone data created by the cutting zone creating means, creating part of the information of the after-machining shape information, and creating the after-machining shape information by combining the created information with the surface precision and corner radius entered from the CAD input means.

Accordingly, the before-machining shape information and after-machining shape information can be created on the basis of the before-machining shape model and after-machining shape model.

In a preferred embodiment of the first invention, the machining information determination apparatus has a data base in which machine-tool tool-use data relating to plural types of tools prepared in advance is registered with regard to a machine tool which applies machining to the workpiece using a plurality of interchangeable tools; tool-use determination means which, on the basis of the before-machining shape information and after-machining shape information created by the CAD apparatus as well as the material information and machining-stage information entered from the input unit, and in accordance with tool-use decision rules and membership functions established in advance, decides upon an optimum machine tool for machining the workpiece and decides upon a tool used by the machine tool decided upon; optimum-tool determination means which, in a case where the machine tool decided upon by the tool-use determination means is a machine tool that uses tools registered in the data base, refers to the data base to decide, with regard to the tool used decided upon by the tool-use determination means, an optimum tool used employed by the machine tool from among the tools registered in the data base; tool-path mode determination means which, in a case where the machine tool decided upon by the tool-use determination means is a machine tool that uses tools registered in the data base and the tool used employed by the machine tool is a specific tool used, decides a path mode of the specific tool used on the basis of the before-machining shape information and after-machining shape information created by the CAD apparatus as well as the material information and machining-stage information entered from the input unit, and in accordance with tool-path mode decision rules and membership functions established in advance; and machining condition determination means which, on the basis of the before-machining shape information and after-machining shape information created by the CAD apparatus, the material information and machining-stage information entered from the input unit and the tool used, and in accordance with machining-condition decision rules and membership functions established in advance, decides machining conditions relating to the tool used; wherein the tool used, tool path mode and machining conditions are adopted as optimum machining information.

Accordingly, optimum machining information can be decided based upon the before-machining shape information, the after-machining shape information, the material information and machining-stage information.

In a preferred embodiment of the first invention, the machining information determination apparatus has continuous-use prearranged-time input means for entering continuous-use prearranged time during which the machine tool uses a tool continuously; wear measurement means for detecting degree of wear of the tool used by the machine tool; and machining condition determination means which, on the basis of the before-machining shape information and after-machining shape information created by the CAD apparatus, the material information and machining-stage information entered from the input unit, the degree of wear detected by the wear detecting means and the continuous-use prearranged time entered from the continuous-use prearranged-time input means, decides machining conditions relating to the tool in accordance with machining-condition decision rules and membership functions established in advance; wherein the machining conditions are adopted as optimum machining information.

Accordingly, it is possible to decide optimum machining conditions which take into consideration the degree of wear of the tool used by the machine tool.

In a preferred embodiment of the first invention, the wear measurement means has memory means for storing before-use image data representing shape of a tool before use and use-limit image data representing shape of the tool at limit of its usefulness; photographic means for photographing a tool used by a machine tool and generating image data representing the tool; and degree-of-wear calculation means for calculating degree of wear of the tool on the basis of the before-use image data and use-limit image data stored in the memory means and the image data generated by the photographic means.

Accordingly, the degree of wear of the tool used by the machine tool can be measured.

In a preferred embodiment of the first invention, the wear measurement means has memory means for storing before-use image data of machining marks obtained when a standard workpiece material is machined by a machine tool employing an unused tool, and use-limit image data of machining marks obtained when the standard workpiece material is machined by the machine tool employing a tool at limit of its usefulness; photographic means for photographing the machining marks obtained when the standard workpiece material is machined by a tool employed by the machine tool and generating image data representing these machining marks; and degree-of-wear calculation means for calculating degree of wear of the tool on the basis of the before-use image data and use-limit image data stored in the memory means and the image data generated by the photographic means.

Accordingly, the degree of wear of the tool used by he machine tool can be measured.

In a preferred embodiment of the first invention, he wear measurement means has memory means for storing before-use image data of an impression of an unused tool taken using a standard templating material, and use-limit image data of an impression of the tool at limit of its usefulness taken using the standard templating material; photographic means for photographing an impression of a tool in use taken using the standard templating material, and generating image data of this impression; and degree-of-wear calculation means for calculating degree of wear of the tool on the basis of the before-use image data and use-limit image data stored in the memory means and the image data generated by the photographic means.

Accordingly, the degree of wear of the tool used by the machine tool can be measured.

In a preferred embodiment of the first invention, the wear measurement means has memory means for storing before-use characteristic data of a machine tool obtained when a standard workpiece material is machined by an unused tool, and use-limit characteristic data of the machine tool obtained when the standard workpiece material is machined by a tool at limit of its usefulness; measurement means for measuring characteristic data when the standard workpiece material is machined by a tool employed by the machine tool; and degree-of-wear calculation means for calculating degree of wear of the tool on the basis of the before-use characteristic data and use-limit characteristic data stored in the memory means and the characteristic data generated by the measurement means.

Accordingly, the degree of wear of the tool used by the machine tool can be measured.

In a preferred embodiment of the first invention, the machining information determination apparatus has teaching information input means for entering parameters, which relate to a machine tool, as teaching information; and membership function learning means for calculating a correction coefficient, which is for correcting the membership functions established in advance in the machining condition determination means, on the basis of the parameters of the machine tool entered from the teaching information input means and parameters of the machine tool that have been set in advance, and correcting the membership functions on the basis of the correction coefficient calculated.

Accordingly, the machining condition determination means is capable of deciding optimum machining conditions conforming to the machine tool.

In a preferred embodiment of the first invention, the machining information determination apparatus has teaching information input means for entering machining conditions, which relate to the tool used, as teaching information; and membership function learning means for calculating a correction coefficient, which is for correcting the membership functions established in advance in the machining condition determination means, on the basis of the machining conditions entered from the teaching information input means and the machining conditions decided by the machining condition determination means, and correcting the membership functions on the basis of the correction coefficient calculated.

Accordingly, the machining condition determination means is capable of deciding optimum machining conditions on the basis of teaching information.

In a preferred embodiment of the first invention, the machining information determination apparatus has teaching information input means for allowing entry of machining conditions, which relate to the tool used, as teaching information a plurality of times; and membership function learning means for calculating deviations between the respective machining conditions entered from the teaching information input means and the machining conditions decided by the machining condition determination means, and correcting the membership functions, which have been established in advance in the machining condition determination the means, on the basis of an average of the deviations calculated.

Accordingly, the machining condition determination means is capable of deciding optimum machining conditions on the basis of teaching information.

In a preferred embodiment of the first invention, the machining information determination apparatus has a data base in which, with regard to a machine tool which applies machining to the workpiece using a plurality of interchangeable tools, there are registered a machine-tool tool-use data file relating to plural types of tools prepared in advance, and standard machining condition information possessing, on a tool-by-tool basis, standard values of machining conditions relating to the tools; tool-use determination means which, on the basis of the before-machining shape information and after-machining shape information created by the CAD apparatus as well as the material information and machining-stage information entered from the input unit, and in accordance with tool-use decision rules and membership functions established in advance, decides upon an optimum machine tool for machining the workpiece and decides upon tools used by the machine tool decided upon; optimum-tool determination means which, in a case where the machine tool decided upon by the tool-use determination means is a machine tool that uses tools in the machine-tool tool-use data file, refers to the machine-tool tool-use data file to decide, with regard to the tools used decided upon by the tool-use determination means, an optimum tool used employed by the machine tool from among the tools of the machine-tool tool-use data file; tool-path mode determination means which, in a case where the machine tool decided upon by the tool-use determination means is a machine tool that uses the machine-tool tool-use data file and the tool used employed by the machine tool is a specific tool used, decides a path mode of the specific tool used on the basis of the before-machining shape information and after-machining shape information created by the CAD apparatus as well as the material information and machining-stage information entered from the input unit, and in accordance with tool-path mode decision rules and membership functions established in advance; and machining condition determination means which, on the basis of the before-machining shape information and after-machining shape information created by the CAD apparatus as well as the material information and machining-stage information entered from the input unit, and in accordance with machining-condition decision rules and membership functions established in advance, decides a relative value of a machining condition relating to the tool used, reads a standard value of the machining condition relating to the tool used from the standard machining condition information registered in the data base, corrects the read standard value of the machining condition using the relative value of the machining condition and adopts the corrected value as a machining condition; wherein the tool used, tool path mode and machining conditions are adopted as optimum machining information.

Accordingly, the machining condition determination means is capable of deciding optimum machining conditions.

In a preferred embodiment of the first invention, the data base of the machining information determination apparatus stores the standard machining condition information as fuzzy information.

Accordingly, the data base can be utilized effectively.

In a preferred embodiment of the first invention, the machining information determination apparatus has a data base in which, with regard to a machine tool which applies machining to the workpiece using a plurality of interchangeable tools, there are registered a machine-tool tool-use data file relating to plural types of tools prepared in advance, and proper machining condition range information possessing, on a tool-by-tool basis, a proper range of machining conditions relating to the tools; tool-use determination means which, on the basis of the before-machining shape information and after-machining shape information created by the CAD apparatus as well as the material information and machining-stage information entered from the input unit, and in accordance with tool-use decision rules and membership functions established in advance, decides upon an optimum machine tool for machining the workpiece and decides upon tools used by the machine tool decided upon; optimum-tool determination means which, in a case where the machine tool decided upon by the tool-use determination means is a machine tool that uses tools in the machine-tool tool-use data file, refers to the machine-tool tool-use data file to decide, with regard to the tool used decided upon by the tool-use determination means, an optimum tool used employed by the machine tool from among the tools registered in the machine-tool tool-use data file; tool-path mode determination means which, in a case where the machine tool decided upon by the tool-use determination means is a machine tool that uses the tool in the machine-tool tool-use data file and the tool used employed by the machine tool is a specific tool used, decides a path mode of the specific tool used on the basis of the before-machining shape information and after-machining shape information created by the CAD apparatus as well as the material information and machining-stage information entered from the input unit, and in accordance with tool-path mode decision rules and membership functions established in advance; and machining condition determination means which, on the basis of the tool used, reads the proper range of machining conditions of the tool used from the proper machining condition information registered in the data base, creates membership functions of machining-condition decision rules established in advance based upon the read proper range of machining conditions, and on the basis of the before-machining shape information and after-machining shape information created by the CAD apparatus as well as the material information and machining-stage information entered from the input unit, and in accordance with the machining-condition decision rules and created membership functions, decides machining conditions of the tool used; wherein the tool used, tool path mode and machining conditions are adopted as optimum machining information.

Accordingly, the machining condition determination means is capable of deciding optimum machining conditions.

In a preferred embodiment of the first invention, the machining information determination apparatus has selection information input means which enters selection information for selecting data relating to a desired tool; and reconstruction means which, in accordance with input information entered from the selection-information input means, reconstructs a data base which comprises solely data of tools selected from the machine-tool tool-use data registered in the above-mentioned data base.

Accordingly, the data base can be used effectively.

In a preferred embodiment of the first invention, the machining information determination apparatus has a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to the specific tool; and a machining-condition data file relating to machining conditions, this with regard to a tool; tool-use determination means which, on the basis of the before-machining shape information and after-machining shape information created by the CAD apparatus as well as the material information and machining-stage information entered from the input unit, decides upon an optimum machine tool for machining the workpiece and, by referring to the tool-use data file registered in the data base, decides upon tools used employed by the machine tool decided upon; optimum-tool determination means which, in a case where the machine tool decided upon by the tool-use determination means is a machine tool that uses tools registered in the data base, refers to the machine-tool tool-use data file registered in the data base to decide, with regard to the tool used decided upon by the tool-use determination means, an optimum tool used employed by the machine tool from among the tools registered in the machine-tool tool-use data file; tool-path mode determination means which, in a case where the machine tool decided upon by the tool-use determination means is a machine tool that uses tools registered in the data base and the tool used employed by the machine tool is a specific tool used, decides a path mode of the specific tool used by referring to the tool-path mode data file, registered in the data base, on the basis of the before-machining shape information and after-machining shape information created by the CAD apparatus as well as the material information and machining-stage information entered from the input unit; and machining condition determination means which, on the basis of the before-machining shape information and after-machining shape information created by the CAD apparatus, the material information and machining-stage information entered from the input unit and the tool used, refers to the machining-condition data file, registered in the data base, to decide machining conditions relating to the tool used; wherein the tool used, tool path mode and machining conditions are adopted as optimum machining information.

Accordingly, optimum machining information can be decided on the basis of the before-machining shape information, the after-machining shape information, the material information and machining-stage information.

A second invention provides a machining information determination system and method in which optimum machining information is decided automatically from a model having the shape of a workpiece before machining and a model having the shape of the workpiece after machining.

The machining information determination system according to the second invention comprises a CAD apparatus which, on the basis of a before-machining shape model representing the shape of a workpiece before machining is applied thereto and an after-machining shape model representing the shape of the workpiece after machining is applied thereto, creates before-machining shape information relating to the shape of the workpiece before machining and after-machining shape information relating to the shape of the workpiece after machining; an input unit for entering material information representing material of the workpiece and machining-stage information representing stage of machining applied to the workpiece; and a machining information determination apparatus which, on the basis of the before-machining shape information and after-machining shape information created by the CAD apparatus and the material information and machining-stage information entered from the input unit, decides optimum machining information for machining the workpiece, before machining has been applied thereto, to the shape after machining and up to the machining stage entered.

The machining information determination method according to the second invention comprises the steps of creating, on the basis of a before-machining shape model representing the shape of a workpiece before machining is applied thereto and an after-machining shape model representing the shape of the workpiece after machining is applied thereto, before-machining shape information relating to the shape of the workpiece before machining and after-machining shape information relating to the shape of the workpiece after machining; accepting entered material information representing material of the workpiece and entered machining-stage information representing stage of machining applied to the workpiece; and deciding, on the basis of the created before-machining shape information and after-machining shape information and the entered material information and machining-stage information, optimum machining information for machining the workpiece, before machining has been applied thereto, to the shape after machining and up to the machining stage entered.

In accordance with the second invention, before-machining shape information and after-machining shape information relating to a workpiece is created by a CAD apparatus on the basis of a before-machining shape model and after-machining shape model of the workpiece. Material information and machining-stage information is entered from an input unit. Optimum machining information is decided by a machining information determination apparatus on the basis of the before-machining shape information and after-machining shape information entered from the input unit.

Accordingly, machine tool control data can be created automatically merely by having the operator create the before-machining shape model and after-machining shape model of the workpiece and enter the material information and machining-stage information. This means that it is no longer necessary to enter numerous machine tool parameters. As a result, the operating burden upon the operator can be alleviated and optimum machining information can be created for the machine tool.

In a preferred embodiment of the second invention, the CAD apparatus has before-machining shape model creating means for creating the before-machining shape model representing the shape of the workpiece before machining is applied thereto; after-machining shape model creating means for creating the after-machining shape model representing the shape of the workpiece after machining is applied thereto; CAD input means for entering surface precision, which represents surface smoothness of the workpiece after machining, and corner radius, which represents corner shape of the workpiece after machining; cutting zone creating means which, on the basis of the before-machining shape model created by the before-machining shape model creating means and the after-machining shape model created by the after-machining shape model creating means, creates data representing a cutting zone in which the workpiece is to be cut; and before-machining/after-machining shape information creating means for creating the before-machining shape information on the basis of the cutting zone data created by the cutting zone creating means, creating part of the information of the after-machining shape information, and creating the after-machining shape information by combining the created information with the surface precision and corner radius entered from the CAD input means.

Accordingly, the before-machining shape information and after-machining shape information can be created on the basis of the before-machining shape model and after-machining shape model.

In a preferred embodiment of the second invention, the machining information determination apparatus has a data base in which machine-tool tool-use data relating to plural types of tools prepared in advance is registered with regard to a machine tool which applies machining to the workpiece using a plurality of interchangeable tools; tool-use determination means which, on the basis of the before-machining shape information and after-machining shape information created by the CAD apparatus as well as the material information and machining-stage information entered from the input unit, and in accordance with tool-use decision rules and membership functions established in advance, decides upon an optimum machine tool for machining the workpiece and decides upon a tool used by the machine tool decided upon; optimum-tool determination means which, in a case where the machine tool decided upon by the tool-use determination means is a machine tool that uses tools registered in the data base, refers to the data base to decide, with regard to the tool used decided upon by the tool-use determination means, an optimum tool used employed by the machine tool from among the tools registered in the data base; tool-path mode determination means which, in a case where the machine tool decided upon by the tool-use determination means is a machine tool that uses tools registered in the data base and the tool used employed by the machine tool is a specific tool used, decides a path mode of the specific tool used on the basis of the before-machining shape information and after-machining shape information created by the CAD apparatus as well as the material information and machining-stage information entered from the input unit, and in accordance with tool-path mode decision rules and membership functions established in advance; and machining condition determination means which, on the basis of the before-machining shape information and after-machining shape information created by the CAD apparatus, the material information and machining-stage information entered from the input unit and the tool used, and in accordance with machining-condition decision rules and membership functions established in advance, decides machining conditions relating to the tool used; wherein the tool used, tool path mode and machining conditions are adopted as optimum machining information.

Accordingly, optimum machining information can be decided based upon the before-machining shape information, the after-machining shape information, the material information and the machining-stage information.

In a preferred embodiment of the second invention, the machining information determination apparatus has a data base in which there are registered a tool-use data file relating to a tool used by a machine tool; a machine-tool tool-use data file relating to plural types of tools prepared in advance, this with regard to a machine tool which applies machining to the workpiece using a plurality of interchangeable tools; a tool-path mode data file relating to a path mode of a specific tool, this with regard to the specific tool; and a machining-condition data file relating to machining conditions, this with regard to a tool; tool-use determination means which, on the basis of the before-machining shape information and after-machining shape information created by the CAD apparatus as well as the material information and machining-stage information entered from the input unit, decides upon an optimum machine tool for machining the workpiece and, by referring to the tool-use data file registered in the data base, decides upon a tool used employed by the machine tool decided upon; optimum-tool determination means which, in a case where the machine tool decided upon by the tool-use determination means is a machine tool that uses tools registered in the data base, refers to the machine-tool tool-use data file registered in the data base to decide, with regard to the tool used decided upon by the tool-use determination means, an optimum tool used employed by the machine tool from among the tools registered in the machine-tool tool-use data file; tool-path mode determination means which, in a case where the machine tool decided upon by the tool-use determination means is a machine tool that uses tools registered in the data base and the tool used employed by the machine tool is a specific tool used, decides a path mode of the specific tool used by referring to the tool-path mode data file, registered in the data base, on the basis of the before-machining shape information and after-machining shape information created by the CAD apparatus as well as the material information and machining-stage information entered from the input unit; and machining condition determination means which, on the basis of the before-machining shape information and after-machining shape information created by the CAD apparatus, the material information and machining-stage information entered from the input unit and the tool used, refers to the machining-condition data file, registered in the data base, to decide machining conditions relating to the tool used; wherein the tool used, tool path mode and machining conditions are adopted as optimum machining information.

Accordingly, optimum machining information can be decided on the basis of the before-machining shape information, the after-machining shape information, the material information and machining-stage information.

A third invention provides a machining information determination system and method in which control data of a machine tool is created automatically from information regarding the shape of a workpiece before machining and information regarding the shape of the workpiece after machining.

The machining information determination system according to the third invention comprises an input unit for entering before-machining shape information relating to the shape of a workpiece before machining, after-machining shape information relating to the shape of the workpiece after machining, material information representing material of the workpiece and machining-stage information representing stage of machining applied to the workpiece; a machining information determination apparatus which, on the basis of the before-machining shape information, the after-machining shape information, the material information and the machining-stage information entered from the input unit, decides optimum machining information for machining the workpiece, before machining has been applied thereto, to the shape after machining and up to the machining stage entered; and a control-data creation unit which, on the basis of a given after-machining shape model representing the shape of the workpiece after machining is applied thereto, and the optimum machining information decided by the machining information determination apparatus, generates control data according to which a machine tool applies machining to the workpiece.

The machining information determination method according to the third invention comprises the steps of accepting entered before-machining shape information relating to the shape of a workpiece before machining, after-machining shape information relating to the shape of the workpiece after machining, material information representing material of the workpiece and machining-stage information representing stage of machining applied to the workpiece; deciding, on the basis of the entered before-machining shape information, after-machining shape information, material information and machining-stage information, optimum machining information for machining the workpiece, before machining has been applied thereto, to the shape after machining and up to the machining stage entered; and generating control data, in accordance with which a machine tool applies machining to the workpiece, on the basis of a given after-machining shape model representing the shape of the workpiece after machining is applied thereto, and the optimum machining information decided.

In accordance with the third invention, before-machining shape information, after-machining shape information, material information and machining-stage information is entered from an input unit. Optimum machining information is decided by a machining information determination apparatus on the basis of the before-machining shape information, after-machining shape information, material information and machining-stage information. Machine tool control data is created by a control-data creation unit on the basis of a before-machining shape model, an after-machining shape model and the optimum machining information decided by the machining information determination apparatus.

Accordingly, machine tool control data can be created automatically merely by having the operator enter the before-machining shape information, the after-machining shape information, the material information and the machining-stage information of the workpiece. This means that it is no longer necessary to enter numerous machine tool parameters. As a result, the operating burden upon the operator can be alleviated and optimum control data can be created for the machine tool.

In a preferred embodiment of the third invention, the machining information determination apparatus has a data base in which machine-tool tool-use data relating to plural types of tools prepared in advance is registered with regard to a machine tool which applies machining to the workpiece using a plurality of interchangeable tools; tool-use determination means which, on the basis of the before-machining shape information, after-machining shape information, material information and machining-stage information entered from the input unit, and in accordance with tool-use decision rules and membership functions established in advance, decides upon an optimum machine tool for machining the workpiece and decides upon tools used by the machine tool decided upon; optimum-tool determination means which, in a case where the machine tool decided upon by the tool-use determination means is a machine tool that uses tools registered in the data base, refers to the data base to decide, with regard to the tools used decided upon by the tool-use determination means, an optimum tool used employed by the machine tool from among the tools registered in the data base; tool-path mode determination means which, in a case where the machine tool decided upon by the tool-use determination means is a machine tool that uses tools registered in the data base and the tool used employed by the machine tool is a specific tool used, decides a path mode of the specific tool used on the basis of the before-machining shape information, after-machining shape information, material information and machining-stage information entered from the input unit, and in accordance with tool-path mode decision rules and membership functions established in advance; and machining condition determination means which, on the basis of the before-machining shape information, after-machining shape information, material information and machining-stage information entered from the input unit as well as the tool used, and in accordance with machining-condition decision rules and membership functions established in advance, decides machining conditions relating to the tool used; wherein the tool used, tool path mode and machining conditions are adopted as optimum machining information.

Accordingly, optimum machining information can be decided based upon the before-machining shape information, the after-machining shape information, the material information and machining-stage information.

In a preferred embodiment of the third invention, the machining information determination apparatus has a data base in which there are registered a tool-use data file relating to a tool used by a machine tool; a machine-tool tool-use data file relating to plural types of tools prepared in advance, this with regard to a machine tool which applies machining to the workpiece using a plurality of interchangeable tools; a tool-path mode data file relating to a path mode of a specific tool, this with regard to the specific tool; and a machining-condition data file relating to machining conditions, this with regard to a tool; tool-use determination means which, on the basis of the before-machining shape information, after-machining shape information, material information and machining-stage information entered from the input unit, decides upon an optimum machine tool for machining the workpiece and, by referring to the tool-use data file registered in the data base, decides upon a tool used employed by the machine tool decided upon; optimum-tool determination means which, in a case where the machine tool decided upon by the tool-use determination means is a machine tool that uses tools registered in the data base, refers to the machine-tool tool-use data file registered in the data base to decide, with regard to the tool used decided upon by the tool-use determination means, an optimum tool used employed by the machine tool from among the tools registered in the machine-tool tool-use data file; tool-path mode determination means which, in a case where the machine tool decided upon by the tool-use determination means is a machine tool that uses tools registered in the data base and the tool used employed by the machine tool is a specific tool used, decides a path mode of the specific tool used by referring to the tool-path mode data file, registered in the data base, on the basis of the before-machining shape information, after-machining shape information, material information and machining-stage information entered from the input unit; and machining condition determination means which, on the basis of the before-machining shape information, after-machining shape information, material information and machining-stage information entered from the input unit as well as the tool used, refers to the machining-condition data file, registered in the data base, to decide machining conditions relating to the tool used; wherein the tool used, tool path mode and machining conditions are adopted as optimum machining information.

Accordingly, optimum machining information can be decided on the basis of the before-machining shape information, the after-machining shape information, the material information and machining-stage information.

A fourth invention provides a machining information determination apparatus and method in which optimum machining information is decided automatically from information regarding the shape of a workpiece before machining and information regarding the shape of the workpiece after machining.

The machining information determination apparatus according to the fourth invention comprises a data base in which machine-tool tool-use data relating to plural types of tools prepared in advance is registered with regard to a machine tool which applies machining to the workpiece using a plurality of interchangeable tools; input means for entering before-machining shape information relating to the shape of a workpiece before machining, after-machining shape information relating to the shape of the workpiece after machining, material information representing material of the workpiece and machining-stage information representing stage of machining applied to the workpiece; tool use determination means which, on the basis of the before-machining shape information, after-machining shape information, material information and machining-stage information entered from the input means, and in accordance with tool-use decision rules and membership functions established in advance, decides upon an optimum machine tool for machining the workpiece and decides upon tools used by the machine tool decided upon; optimum-tool determination means which, in a case where the machine tool decided upon by the tool-use determination means is a machine tool that uses tools registered in the data base, refers to the data base to decide, with regard to the tool used decided upon by the tool-use determination means, an optimum tool used employed by the machine tool from among the tools registered in the data base; tool-path mode determination means which, in a case where the machine tool decided upon by the tool-use determination means is a machine tool that uses tools registered in the data base and the tool used employed by the machine tool is a specific tool used, decides a path mode of the specific tool used on the basis of the before-machining shape information, after-machining shape information, material information and machining-stage information entered from the input unit as well as the tool used, and in accordance with tool-path mode decision rules and membership functions established in advance; and machining condition determination means which, on the basis of the before-machining shape information, after-machining shape information, material information and machining-stage information entered from the input unit as well as the tool used, and in accordance with machining-condition decision rules and membership functions established in advance, decides machining conditions relating to the tool used.

The machining information determination method according to the fourth invention comprises the steps of providing a data base in which machine-tool tool-use data relating to plural types of tools prepared in advance is registered with regard to a machine tool which applies machining to the workpiece using a plurality of interchangeable tools; accepting entered before-machining shape information relating to the shape of a workpiece before machining, after-machining shape information relating to the shape of the workpiece after machining, material information representing material of the workpiece and machining-stage information representing stage of machining applied to the workpiece; deciding, on the basis of the entered before-machining shape information, after-machining shape information, material information and machining-stage information, and in accordance with tool-use decision rules and membership functions established in advance, an optimum machine tool for machining the workpiece as well as tools used by the machine tool decided upon; in a case where the machine tool decided upon is a machine tool that uses tools registered in the data base, referring to the data base to decide, with regard to the tools used decided upon, an optimum tool used employed by the machine tool from among the tools registered in the data base; in a case where the machine tool decided upon is a machine tool that uses tools registered in the data base and the tool used employed by the machine tool is a specific tool used, deciding a path mode of the specific tool used on the basis of the entered before-machining shape information, after-machining shape information, material information and machining-stage information, and in accordance with tool-path mode decision rules and membership functions established in advance; and deciding machining conditions relating to the tool used on the basis of the entered before-machining shape information, after-machining shape information, material information and machining-stage information, and the tool used, and in accordance with machining-condition decision rules and membership functions established in advance.

In accordance with the fourth invention, the optimum machine tool is decided upon by tool-use determination means, and the tool used by this machine tool is decided upon, based upon before-machining shape information, after-machining shape information, material information and machining-stage information. In a case where the machine tool decided upon is a specific machine tool, optimum tool determination means decides upon the optimum tool used by referring to a data base. In a case where the machine tool decided upon is a specific machine tool and the tool used is a specific tool, a path mode of the specific tool used is decided by tool-path mode determination means. With regard to the tool used decided upon, machining conditions relating to this tool used are decided by machining condition determination means. The tool used, the tool path mode and the machining conditions that have been decided serve as optimum machining information.

Accordingly, optimum machining information of a machine tool can be obtained merely by having the operator enter before-machining shape information, after-machining shape information, material information and machining-stage information.

A fifth invention provides a machining information determination apparatus and method in which optimum machining information is decided automatically from information regarding the shape of a workpiece before machining and information regarding the shape of the workpiece after machining.

The machining information determination apparatus according to the fifth invention comprises a data base in which there are registered a tool-use data file relating to a tool used by a machine tool; a machine-tool tool-use data file relating to plural types of tools prepared in advance, this with regard to a machine tool which applies machining to the workpiece using a plurality of interchangeable tools; a tool-path mode data file relating to a path mode of a specific tool, this with regard to the specific tool; and a machining-condition data file relating to machining conditions, this with regard to a tool; input means for entering before-machining shape information relating to the shape of the workpiece before machining, after-machining shape information relating to the shape of the workpiece after machining, material information representing material of the workpiece and machining-stage information representing stage of machining applied to the workpiece; tool-use determination means which, on the basis of the before-machining shape information, after-machining shape information, material information and machining-stage information entered from the input means, decides upon an optimum machine tool for machining the workpiece and, by referring to the tool-use data file registered in the data base, decides upon a tool used employed by the machine tool decided upon; optimum-tool determination means which, in a case where the machine tool decided upon by the tool-use determination means is a machine tool that uses tools registered in the data base, refers to the machine-tool tool-use data file registered in the data base to decide, with regard to the tool used decided upon by the tool-use determination means, an optimum tool used employed by the machine tool from among the tools registered in the machine-tool tool-use data file; tool-path mode determination means which, in a case where the machine tool decided upon by the tool-use determination means is a machine tool that uses a tool registered in the data base and the tool used employed by the machine tool is a specific tool used, decides a path mode of the specific tool used by referring to the tool-path mode data file, registered in the data base, on the basis of the before-machining shape information, after-machining shape information, material information and machining-stage information entered from the input means; and machining condition determination means which, on the basis of the before-machining shape information, after-machining shape information, material information and machining-stage information entered from the input means as well as the tool used, refers to the machining-condition data file, registered in the data base, to decide machining conditions relating to the tool used.

The machining information determination method according to the fifth invention comprises the steps of providing a data base in which there are registered a tool-use data file relating to a tool used by a machine tool; a machine-tool tool-use data file relating to plural types of tools prepared in advance, this with regard to a machine tool which applies machining to the workpiece using a plurality of interchangeable tools; a tool-path mode data file relating to a path mode of a specific tool, this with regard to the specific tool; and a machining-condition data file relating to machining conditions, this with regard to a tool; accepting entered before-machining shape information relating to the shape of the workpiece before machining, after-machining shape information relating to the shape of the workpiece after machining, material information representing material of the workpiece and machining-stage information representing stage of machining applied to the workpiece; deciding, on the basis of the entered before-machining shape information, after-machining shape information, material information and machining-stage information, an optimum machine tool for machining the workpiece and, by referring to the tool-use data file registered in the data base, deciding upon tools used employed by the machine tool decided upon; in a case where the machine tool decided is a machine tool that uses tools registered in the data base, referring to the machine-tool tool-use data file registered in the data base to decide, with regard to the tools used decided upon, an optimum tool used employed by the machine tool from among the tools registered in the machine-tool tool-use data file; in a case where the machine tool decided upon is a machine tool that uses tools registered in the data base and the tool used employed by the machine tool is a specific tool used, deciding a path mode of the specific tool used by referring to the tool-path mode data file, registered in the data base, on the basis of the entered before-machining shape information, after-machining shape information, material information and machining-stage information; and deciding machining conditions relating to the tool used by referring to the machining-condition data file, registered in the data base, on the basis of the entered before-machining shape information, after-machining shape information, material information and machining-stage information.

In accordance with the fifth invention, the optimum machine tool is decided upon by tool-use determination means, and the tool used by this machining tool is decided upon, based upon before-machining shape information, after-machining shape information, material information and machining-stage information. In a case where the machine tool decided upon is a specific machine tool, optimum tool determination means decides upon the optimum tool used by referring to a data base. In a case where the machine tool decided upon is a specific machine tool and the tool used is a specific tool, a path mode of the specific tool used is decided by tool-path mode determination means. With regard to the tool used decided upon, machining conditions relating to this tool used are decided by machining condition determination means. The tool used, the tool path mode and the machining conditions that have been decided serve as optimum machining information.

Accordingly, optimum machining information of a machine tool can be obtained merely by having the operator enter before-machining shape information, after-machining shape information, material information and machining-stage information.

A sixth invention provides a CAD apparatus and method of operating the same, in which information regarding the shape of a workpiece before machining and information regarding the shape of the workpiece after machining is created automatically from a model having the shape of the workpiece before machining and a model having the shape of the workpiece after machining.

The CAD apparatus according to the sixth invention comprises before-machining shape model creating means for creating a before-machining shape model representing the shape of a workpiece before machining is applied thereto; after-machining shape model creating means for creating an after-machining shape model representing the shape of the workpiece after machining is applied thereto; CAD input means for entering surface precision, which represents surface smoothness of the workpiece after machining, and corner radius, which represents corner shape of the workpiece after machining; cutting zone creating means which, on the basis of the before-machining shape model created by the before-machining shape model creating means and the after-machining shape model created by the after-machining shape model creating means, creates data representing a cutting zone in which the workpiece is to be cut; and before-machining/after-machining shape information creating means for creating the before-machining shape information on the basis of the cutting zone data created by the cutting zone creating means, creating part of the information of the after-machining shape information, and creating the after-machining shape information by combining the created information with the surface precision and corner radius entered from the CAD input means.

The method of operating a CAD apparatus according to the sixth invention comprises the steps of creating a before-machining shape model representing the shape of a workpiece before machining is applied thereto; creating an after-machining shape model representing the shape of the workpiece after machining is applied thereto; accepting entered surface precision, which represents surface smoothness of the workpiece after machining, and entered corner radius, which represents corner shape of the workpiece after machining; creating, on the basis of the created before-machining shape model and the created after-machining shape model, data representing a cutting zone in which the workpiece is to be cut; and creating the before-machining shape information on the basis of the created cutting zone data, creating part of the information of the after-machining shape information, and creating the after-machining shape information by combining the created information with the entered surface precision and corner radius.

In accordance with the sixth embodiment, a before-machining shape model is created by before-machining shape model creating means and an after-machining shape model are created by after-machining shape model creating means. Data representing a cutting zone is created by cutting zone creating means on the basis of the created before-machining shape model and after-machining shape model. Further, surface precision and corner radius are entered from CAD input means. Before-machining shape information and after-machining shape information is created by before-machining/after-machining shape information creating means on the basis of the created data representing the cutting zone.

Accordingly, the operator is capable of obtaining before-machining shape information and after-machining shape information merely by creating the before-machining shape model and after-machining shape model and entering the surface precision and corner radius.

A seventh invention provides a machining-process information determination system and method in which control data of a machine tool is created automatically from standard drawing information of a workpiece before machining and product drawing information of the workpiece after machining.

The machining-process information determination system according to the seventh invention comprises a data base in which there are stored standard drawing information representing the shape of a workpiece before machining is applied thereto, and standard machining information, in correspondence with standard macro patterns, relating to parameters thereof, machining processes, machining tools and machining method; product drawing information creating means for creating product drawing information relating to shape of the workpiece after machining is applied thereto; difference-information extraction means for extracting difference information between the standard drawing information stored in the data base and the product drawing information created by the product drawing information creating means; macro pattern development means which, on the basis of the difference information extracted by the difference-information extraction means, creates a machining macro pattern representing a contour of the shape to be formed on the workpiece by machining and extracts parameters of the machining macro pattern; machining sequence determination means for reading a machining method and machining processes of the standard macro pattern, which corresponds to the machining macro pattern created by the macro pattern development means, from the standard machining information stored in the data base, deciding machining processes for machining the workpiece, as well as the sequence of the processes, on the basis of the parameters of the macro pattern extracted by the macro pattern development means and in accordance with the machining method read, and creating the decided machining processes and its sequence as design process information; machining condition determination means for reading a machining tool of the standard macro pattern, which corresponds to the machining macro pattern created by the macro pattern development means, from the standard machining information stored in the data base, and deciding optimum machining condition information relating to the machining tool read; and control-data creating means for generating control data, in accordance with which a machine tool applies machining to the workpiece, on the basis of the product drawing information created by the product drawing information creating means, the standard drawing information stored in the standard machining information data base, the process design information decided by the machining sequence determination means and the machining condition information decided by the machining condition determination means.

The machining-process information determination method according to the seventh invention comprises the steps of providing a data base in which there are stored standard drawing information representing the shape of a workpiece before machining is applied thereto, and standard machining information, in correspondence with standard macro patterns, relating to parameters of the standard macro patterns, machining processes, machining tools and machining method; creating product drawing information relating to shape of the workpiece after machining is applied thereto; extracting difference information between the standard drawing information stored in the data base and the product drawing information created; creating, on the basis of the difference information extracted, a machining macro pattern representing a contour of the shape to be formed on the workpiece by machining, and extracting parameters of the machining macro pattern; reading a machining method and machining processes of the standard macro pattern, which corresponds to the machining macro pattern created, from the standard machining information stored in the data base, deciding machining processes for machining the workpiece, as well as the sequence of the processes, on the basis of the extracted parameters of the macro pattern and in accordance with the machining method read, and creating the decided machining processes and it sequence as design process information; reading a machining tool of the standard macro pattern, which corresponds to the machining macro pattern created, from the standard machining information stored in the data base, and deciding optimum machining condition information relating to the machining tool read; and generating control data, in accordance with which a machine tool applies machining to the workpiece, on the basis of the created product drawing information, standard drawing information stored in the data base, the process design information decided and the machining condition information decided.

In accordance with the seventh invention, difference information between product drawing information created by product drawing information creating means and standard drawing information stored in a data base is extracted by difference-information extraction means. A machining macro pattern is created based upon the extracted difference information, and the parameters of the macro pattern are extracted by macro pattern development means. A machining method and machining processes of a standard macro pattern, which corresponds to the machining macro pattern, are read out of the data base, and process design information is decided by machining sequence determination means. A machining tool of the standard macro pattern corresponding to the machining macro pattern is read out of the data base and machining condition information is decided by machining condition determination means.

Machine tool control data is created by control-data creating means on the basis of the process design information and machining condition information decided, the product drawing information and the standard drawing information.

Accordingly, the operator is capable of obtaining machine tool control data merely by creating the standard drawing information in advance and creating the product drawing information. As a result, the operator need not perform troublesome tasks and production efficiency can be improved. Furthermore, operation can be performed easily even by a novice operator.

An eighth invention provides a machining-process information determination apparatus and method in which process design information is created automatically from standard drawing information of a workpiece before machining and product drawing information of the workpiece after machining.

The machining-process information determination apparatus according to the eighth invention comprises a data base in which there is stored standard machining information, in correspondence with standard macro patterns, relating to parameters, machining processes, machining tools and machining method; difference-information extraction means for extracting difference information between given product drawing information relating to shape of a workpiece after machining is applied thereto and given standard drawing information representing shape of the workpiece before machining is applied thereto; macro pattern development means which, on the basis of the difference information extracted by the difference-information extraction means, creates a machining macro pattern representing a contour of the shape to be formed on the workpiece by machining and extracts parameters of the machining macro pattern; and machining sequence determination means for reading a machining method and machining processes of the standard macro pattern, which corresponds to the machining macro pattern created by the macro pattern development means, from the standard machining information stored in the data base, deciding machining processes for machining the workpiece, as well as the sequence of the processes, on the basis of the parameters of the macro pattern extracted by the macro pattern development means and in accordance with the machining method read, and creating the decided machining processes and its sequence as design process information.

The machining-process information determination method according to the eighth invention comprises the steps of providing a data base in which there is stored standard machining information, in correspondence with standard macro patterns, relating to parameters, machining processes, machining tools and machining method of the standard macro patterns; extracting difference information between given product drawing information relating to shape of a workpiece after machining is applied thereto and given standard drawing information representing shape of the workpiece before machining is applied thereto; creating, on the basis of the difference information extracted, a machining macro pattern representing a contour of the shape to be formed on the workpiece by machining, and extracting parameters of the machining macro pattern; and reading a machining method and machining processes of the standard macro pattern, which corresponds to the machining macro pattern created, from the standard machining information stored in the data base, deciding machining processes for machining the workpiece, as well as the sequence of the process, on the basis of the extracted parameters of the macro pattern and in accordance with the machining method read, and creating the decided machining processes and its sequence as design process information.

In accordance with the eighth invention, difference information between created product drawing information and standard drawing information stored in a data base is extracted by difference-information extraction means. A machining macro pattern is created based upon the extracted difference information, and the parameters of the macro pattern are extracted by macro pattern development means. A machining method and machining processes of a standard macro pattern, which corresponds to the machining macro pattern, are read out of the data base, and process design information is decided by machining sequence determination means.

Accordingly, the operator is capable of obtaining process design information merely by creating the standard drawing information in advance and creating the product drawing information. As a result, the operator need not perform troublesome tasks and production efficiency can be improved. Furthermore, operation can be performed easily even by a novice operator.

A ninth invention provides a machining-process information determination apparatus and method in which machining condition information is created automatically from standard drawing information of a workpiece before machining and product drawing information of the workpiece after machining.

The machining-process information determination apparatus according to the ninth invention comprises a data base in which there is stored standard machining information, in correspondence with standard macro patterns, relating to parameters, machining processes, machining tools and machining method of the standard macro patterns; difference-information extraction means for extracting difference information between given product drawing information relating to shape of a workpiece after machining is applied thereto and given standard drawing information representing shape of the workpiece before machining is applied thereto; macro pattern development means which, on the basis of the difference information extracted by the difference-information extraction means, creates a machining macro pattern representing a contour of the shape to be formed on the workpiece by machining and extracts parameters of the machining macro pattern; and machining condition determination means for reading a machining tool of the standard macro pattern, which corresponds to the machining macro pattern created by the macro pattern development means, from the standard machining information stored in the data base, and deciding optimum machining condition information relating to the machining tool read.

The machining-process information determination method according to the eighth invention comprises the steps of providing a data base in which there is stored standard machining information, in correspondence with standard macro patterns, relating to parameters, machining processes, machining tools and machining method of the standard macro patterns; extracting difference information between given product drawing information relating to shape of a workpiece after machining is applied thereto and given standard drawing information representing shape of the workpiece before machining is applied thereto; creating, on the basis of the difference information extracted, a machining macro pattern representing a contour of the shape to be formed on the workpiece by machining, and extracting parameters of the machining macro pattern; and reading a machining tool of the standard macro pattern, which corresponds to the machining macro pattern created, from the standard machining information stored in the data base, and deciding optimum machining condition information relating to the machining tool read.

In accordance with the ninth invention, difference information between created product drawing information and standard drawing information stored in a data base is extracted by difference-information extraction means.

A machining macro pattern is created based upon the extracted difference information, and the parameters of the macro pattern are extracted by macro pattern development means. A machining tool of a standard macro pattern, which corresponds to the machining macro pattern, is read out of the data base, and machining condition information is decided by machining condition determination means.

Accordingly, the operator is capable of obtaining machining condition information of a machine tool merely by creating the standard drawing information in advance and creating the product drawing information. As a result, the operator need not perform troublesome tasks and production efficiency can be improved. Furthermore, operation can be performed easily even by a novice operator.

BRIEF DESCRIPTION OF THE DRAWINGS

FIGS. 11a, 11b, 11c, 11d, 11e, 11f, 11g and 11h illustrate examples of edge pattern filters;

FIG. 12 illustrates an example of before-machining shape information;

FIG. 13 illustrates an example of after-machining shape information;

FIG. 14 illustrates an example of material information;

FIG. 15 illustrates an example of machining-stage information;

FIG. 18 illustrates an example of a material data file;

FIGS. 19a, 19b, 19c, 19d, 19e, 19f, 19g, 19h, 19i, 19j, 19k, 19l and 19m illustrate examples of membership functions and singletons with regard to antecedent variables and consequent variables of tool-use decision rules;

FIG. 20 illustrates an example of a tool-use data file of an NC machine;

FIG. 23 is a diagram illustrating the result of fuzzy retrieval of a tool-use data file of an NC machine;

FIG. 26 illustrates an example of optimum machining information;

FIG. 28 illustrates an example of the parameters of a machine tool;

FIG. 38 is a block diagram in which an impression of a tool used by an NC machine is taken using a standard templating material, the resulting impression is photographed by a CCD camera and the degree of wear of the tool is detected;

FIGS. 53a and 53b illustrate examples of standard machining condition information;

FIGS. 57a and 57b illustrate examples of proper machining condition range information;

FIGS. 61b, 61c, 61d, 61e and 61f illustrate membership functions representing linguistic information regarding each of various items in FIG. 61a;

FIG. 62 is a functional block diagram illustrating the detailed construction of a machining information determination apparatus;

FIG. 65 illustrates an example of a tool-use data file for rough machining and semi-finishing;

FIG. 66 illustrates an example of a tool-use data file for finishing;

FIG. 67 illustrates an example of a tool-use data file for a wire-cut machine;

FIG. 68 illustrates an example of a tool-use data file for an electrical discharge machine;

FIG. 71 illustrates an example of a data file of tool path modes for rough machining and semi-finishing;

FIG. 72 illustrates an example of a data file of tool path modes for finishing;

FIG. 74 illustrates an example of a data file of machining conditions for rough machining and semi-finishing;

FIG. 75 illustrates an example of a data file of machining conditions for finishing;

FIG. 76 illustrates an example of a data file of machining conditions for a wire-cut machine;

FIG. 77 illustrates an example of a data file of machining conditions for an electrical discharge machine;

FIGS. 82a and 82b illustrate an example of drawing element information relating to the product drawing of the product drawing information shown in FIG. 81;

FIG. 84 illustrates an example of drawing element information relating to the standard drawing information shown in FIG. 83;

FIGS. 86a and 86b illustrate an example of drawing element information relating to the standard drawing information shown in FIG. 85;

FIGS. 87a, 87b, 87c, and 87d illustrates an example of standard machining information;

FIG. 89 is a functional block diagram showing the detailed construction of a machining-process information determination apparatus;

FIGS. 91a, 91b and 91c are flowcharts illustrating a processing procedure in a machining-shape parameter determination unit;

FIG. 93 is the drawing element information in FIG. 92;

FIG. 95 illustrates an example of machining macro patterns;

FIG. 97 illustrates an example of machining methods;

FIG. 98 illustrates a machining sequence decided with regard to the machining methods of FIG. 97;

FIG. 100 shows process design information decided with regard to shape elements of the machining sequence of FIG. 98;

FIG. 104 illustrates an example of machining process information; and

FIG. 105a illustrates a cross-section of the cutting edge of unused tool T, as shown in FIG. 40a, which cross-section may be stored as before-use image data in an image memory;

FIG. 105b illustrates a cross-section of the cutting edge of tool T, shown in FIG. 40b, as an example of image data obtained by photography using the CCD camera; and FIG. 105c illustrates a cross-section of the cutting-edge of tool T, where tool T has reached the limit of its usefulness as shown in FIG. 40c, which cross-section may be stored as use-limit image data in the image memory.

BEST MODE FOR CARRYING OUT THE INVENTION

Figure 1:
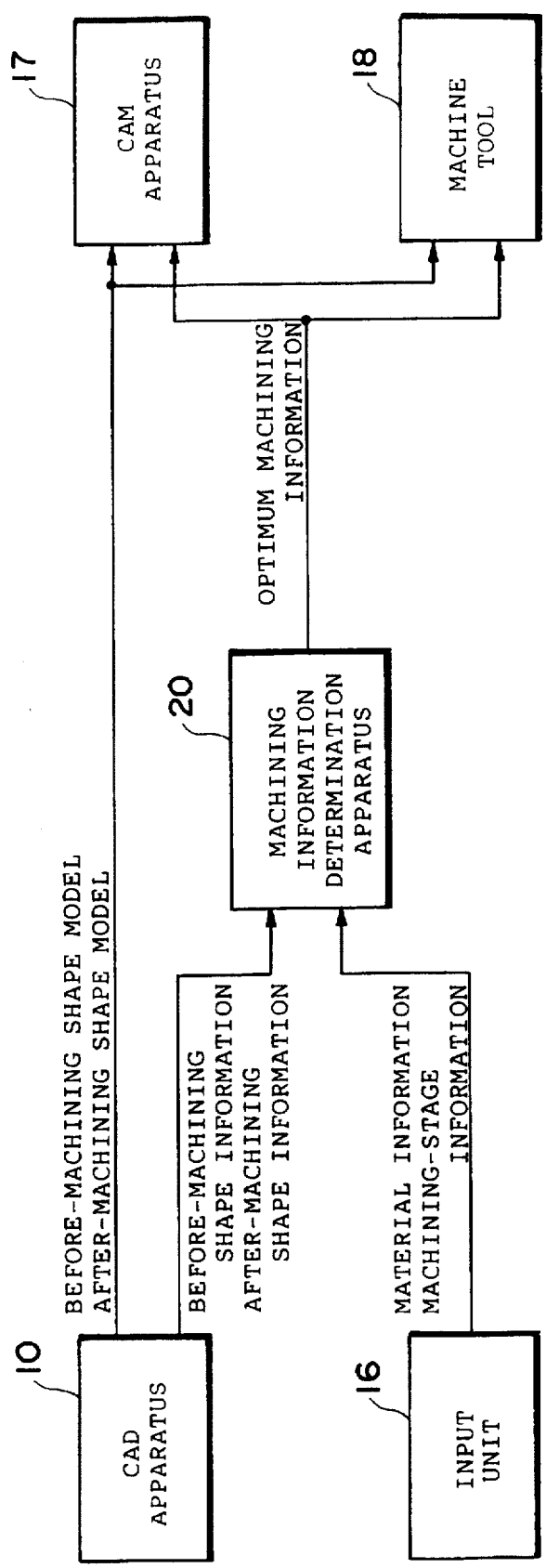
FIG. 1 is a functional block diagram illustrating the overall configuration of a machining information determination system.

Contents
1. Machining information determination system (part 1) (When fuzzy reasoning is used)
   1.1 Summary
   1.2 Hardware configuration
   1.3 CAD apparatus
      (1) Construction of CAD apparatus
      (2) Overall processing of CAD apparatus
      (3) Cutting zone extraction unit
      (4) Before-machining/after-machining shape information extraction unit
   1.4 Input unit
   1.5 Machining information determination apparatus
      (1) Construction of machining information determination apparatus
      (2) Overall processing of machining information determination apparatus
      (3) Tool-use determination unit and optimum tool-use determination unit
      (4) Tool-path mode determination unit
      (5) Machining condition determination unit
   1.6 CAM apparatus
   1.7 Machine tool
2. Special functions of machining information determination system (modification)
   2.1 Machining condition determination unit for determining machining conditions while taking into account degree of wear of tool used
      (1) Summary
      (2) Method of directly photographing tool used and detecting degree of wear thereof
      (3) Method of detecting degree of wear of tool used based upon machining marks produced by machining standard workpiece material
      (4) Method of detecting degree of wear of tool used based upon impression of tool taken using standard templating material (5) Method of detecting degree of wear of tool used based upon current consumed by machine tool motor 2.2 Membership-function learning unit for learning membership functions of machining condition determination unit
  (1) Summary
  (2) Method of learning using machine tool parameters as teaching information
  (3) Method of learning using machining conditions as teaching information
  (4) Method of learning upon entering machining conditions as teaching information a plurality of times 2.3 Machining condition determination unit for deciding absolute values after deciding relative values of machining condition information 2.4 Machining condition determination unit for deciding absolute values of machining condition information 2.5 Material & tool data base reconstruction unit
  (1) Summary
  (2) Method of constructing data base classified according to user
  (3) Method of constructing data base in which data files are fuzzified 3. Machining information determination system (part 2) (When data files are used)
  3.1 Summary
  3.2 Machining information determination apparatus
    (1) Construction of machining information determination apparatus
    (2) Overall processing of machining information determination apparatus
    (3) Tool-use determination unit and optimum tool-use determination unit
    (4) Tool-path mode determination unit
    (5) Machining condition determination unit 4. Machining-process information determination system
  4.1 Summary
  4.2 CAD apparatus
  4.3 Standard machining information data base
  4.4 Machining-process information determination apparatus
    (1) Construction of machining-process information determination apparatus
    (2) Overall processing of machining-process information determination apparatus
    (3) Machining-shape parameter extraction unit
    (4) Macro pattern development unit
    (5) Machining sequence determination unit
    (6) Machining condition determination unit
  4.5 CAM apparatus
  4.6 Machine tool 1. Machining information determination system (part 1)

1.1 Summary

FIG. 1 is a functional block diagram illustrating the overall configuration of a machining information determination system.

The machining information determination system comprises a CAD apparatus 10, an input unit 16, a machining information determination apparatus 20, a CAM apparatus 17 and a machine tool 18.

Each of these units will now be described in simple terms, with the details being saved for later.

The CAD (computer aided design) apparatus 10 creates before-machining shape information relating to a workpiece before machining and after-machining shape information relating to the workpiece after machining on the basis of before-machining shape model of the workpiece before it is machined and an after-machining shape model of the workpiece after it is machined. The processing for creating the before-machining shape information and after-machining shape information will be described later.

The input unit 16 enters material information relating to the material of the workpiece and machining-stage information relating to the machining stage of the workpiece. The entered material information and machining-stage information will be described later.

The machining information determination apparatus 20 decides optimum machining information on the basis of the before-machining shape information and after-machining shape information created by the CAD apparatus 10 and the material information and machining-stage information entered from the input unit 16. The details of the optimum machining information decided will be described later.

The CAM (computer aided manufacture) apparatus 17 creates NC (numerical control) data for controlling the machine tool on the basis of the before-machining shape model and after-machining shape model created by the CAD apparatus 10 and the optimum machining information decided by the machining information determination apparatus 20. By way of example, the CAM apparatus 17 is implemented by a combination of a computer system and software which operates in the computer system.

The machine tool 18 covers, say, an NC machine, an electrical discharge machine, a wire-cut machine, etc.

A controller of the machine tool 18 may be furnished with a function for creating NC data on the basis of the before-machining shape model and after-machining shape model created by the CAD apparatus 10 and the optimum machining information decided by the machining information determination apparatus 20. The NC data is created by automatic programming with furnished for the machine tool 18 in advance. In this case, the CAM apparatus 17 is unnecessary.

1.2 Hardware configuration

Figure 2:
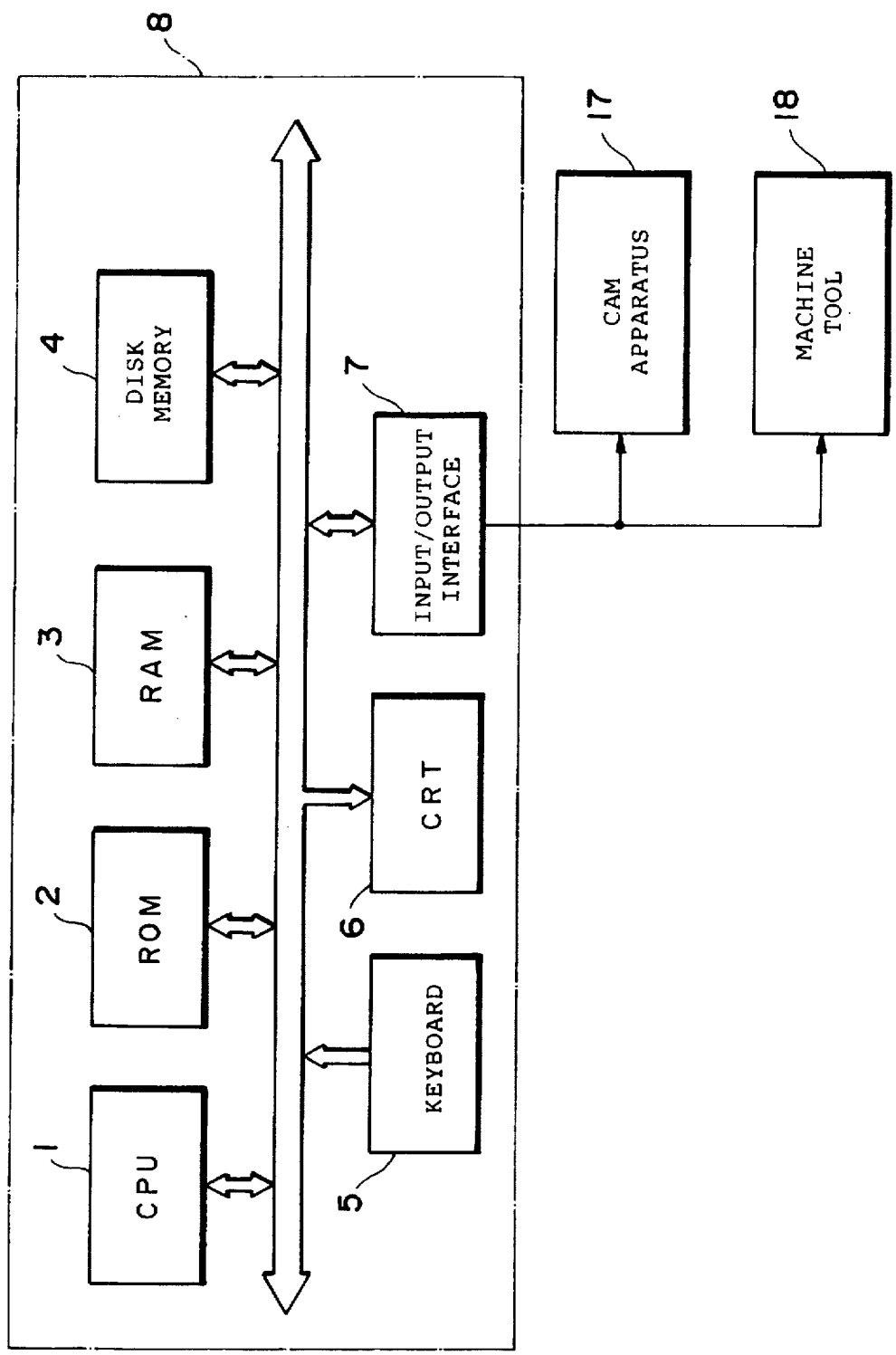
FIG. 2 is a diagram illustrating the hardware configuration of the machining information determination system.

FIG. 2 is a diagram illustrating the hardware configuration of the machining information determination system.

The CAD apparatus 10, input unit 16 and machining information determination apparatus 20 are implemented by a computer system 8 constituted by a CPU 1, a ROM 2, a RAM 3, a disk memory 4, a keyboard 5, a CRT 6 and an input/output interface 7.

The CPU 1 executes processing in accordance with a program stored in the ROM 2 in advance.

Stored in the ROM 2 in advance is an application program for implementing the processing (functions) described below.

The RAM 3 stores data (information) necessary for the CPU to execute processing as well as data (information) entered from the keyboard 5. Further, a buffer, stack and counter, etc., are implemented in a storage area within the RAM 3.

The disk memory 4 stores data files and the like. For example, a data base or the like is implemented by the disk memory 4.

The keyboard 5 enters data (information). For example, the input unit 16 is implemented by the keyboard 5.

The CRT 6 displays messages, etc. by necessity. For example, a display unit or the like is implemented by the CRT 6.

The input/output interface 7 is for the sending and receiving of data (information) between the computer system 8, and the CAM apparatus 17 and machining tool 18.

The CAD apparatus 10 and machining information determination apparatus 20 can each be implemented by separate computer systems.

1.3 CAD apparatus (1) Construction of CAD apparatus

The CAD apparatus 10 creates the before-machining shape information relating to the workpiece before it is machined and the after-machining shape information relating to the workpiece after it is machined.

Figure 3:
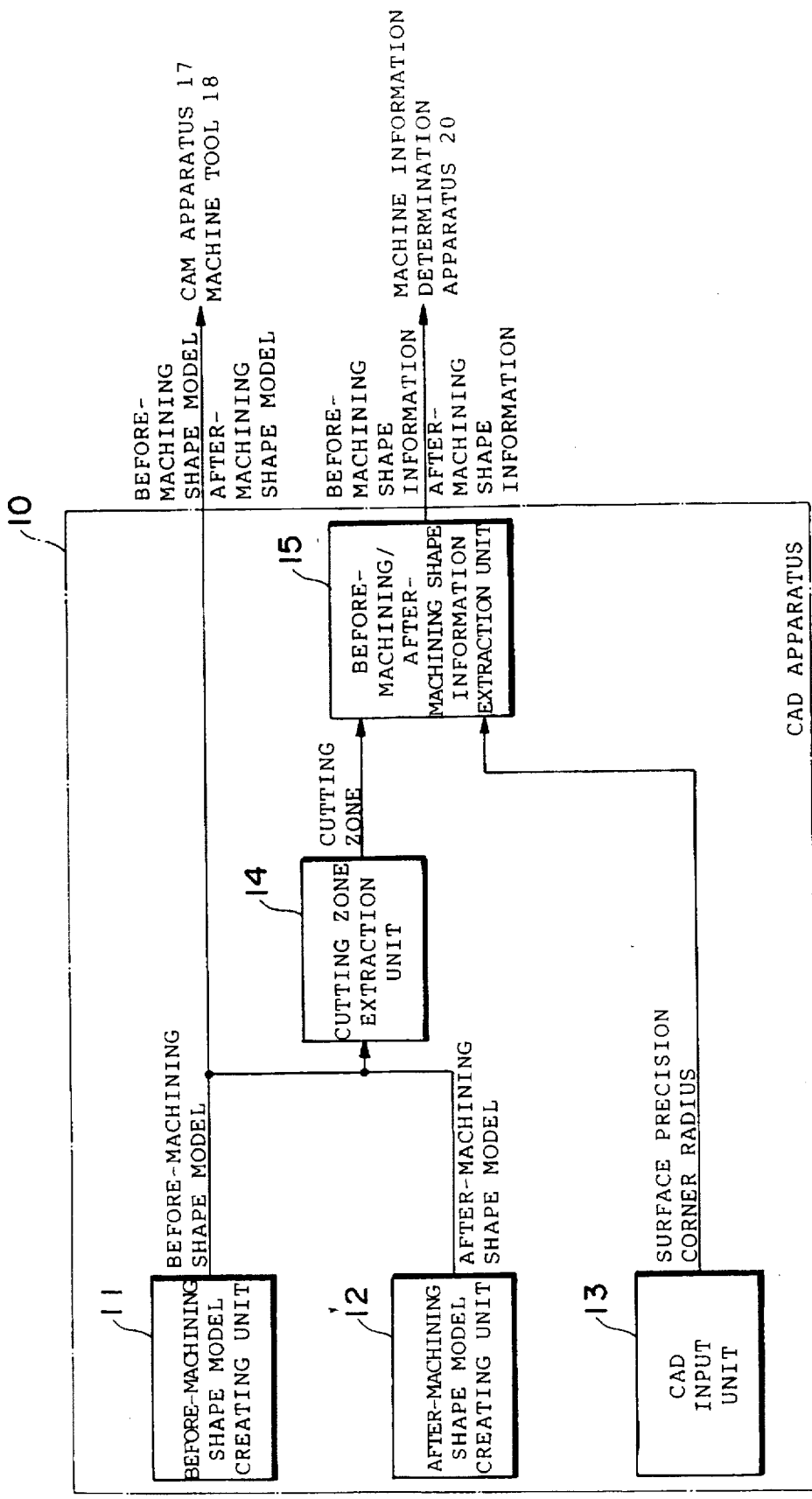
FIG. 3 is a functional block diagram illustrating the detailed construction of a CAD apparatus.

FIG. 3 is a functional block diagram illustrating the detailed construction of the CAD apparatus 10.

The CAD apparatus 10 comprises a unit 11 for creating the before-machining shape model, a unit 12 for creating the after-machining shape model, a CAD input unit 13, a cutting zone extraction unit 14 and a before-machining/after-machining shape information extraction unit 15. The before-machining shape model creating unit 11, after-machining shape model creating unit 12, CAD input unit 13, cutting zone extraction unit 14 and before-machining/after-machining shape information extraction unit 15 are actually implemented by a programmed computer system. It should be understood that this expresses the functions described below and is constituted by part of the combination of the computer system and its software.

The before-machining shape model creating unit 11 creates the before-machining shape model, which has the shape of the workpiece before the workpiece has been machined.

The before-machining shape model is expressed by a solid model. A solid model is obtained by expressing a solid by a set of points. Each point constructing the solid has coordinate data composed of X, Y and Z coordinates. Accordingly, each point constructing the before-machining shape model has coordinate data composed of X, Y and Z coordinates. The before-machining shape model is created in a positive area of the X, Y and Z axes.

The before-machining shape model created is applied to the cutting zone extraction unit 14 from the before-machining shape model creating unit 11.

The after-machining shape model creating unit 12 creates the after-machining shape model, which is the shape of the workpiece after the workpiece has been machined.

The after-machining shape model also is expressed by a solid model in the same manner as the before-machining shape model.

The after-machining shape model created is applied to the cutting zone extraction unit 14 from the after-machining shape model creating unit 12.

The CAD input unit 13 enters surface precision, which represents the surface machining precision for a case where machining is applied to the workpiece, and corner radius, which represents the roundness of the corner of the workpiece machined.

Surface precision generally is represented by the symbols "ΔΔ" if a coarse machined surface is acceptable and by the symbols "ΔΔΔ" if the surface is to be smoothened. In this embodiment, the surface precision is expressed by a numerical value. The larger the numerical value, the smoother the surface. Linguistic information (e.g., "coarse", "smooth", etc.) is also used jointly to express surface precision. The surface precision is entered in the form of a combination of linguistic information and a numerical value. Even if surfaces have surface precisions expressed by the same linguistic information, the larger the numerical value, the smoother the surface.

The cutting zone extraction unit 14 extracts a portion to be cut from the before-machining shape model, namely a cutting zone, on the basis of the before-machining shape model created by the before-machining shape model creating unit 11 and the after-machining shape model created by the after-machining shape model creating unit 12.

The before-machining/after-machining shape information extraction unit 15 extracts the before-machining shape information and after-machining shape information on the basis of the cutting zone extracted by the cutting zone extraction unit 14 and the surface precision and corner radius entered from the CAD input unit 13.

The before-machining shape information includes cutting area, machining shape, cutting width and cutting depth.

The cutting area is the total area of the extracted cutting zone.

Information relating to cutting shape is of two types. These are "total surface cutting" for a case in which the entirety of the extracted cutting zone is a region to be cut, and "partial surface cutting" for a case in which a region not be cut is present in the cutting zone.

Cutting width is the width of the narrowest portion in the cutting zone extracted.

Cutting depth indicates the maximum depth cut.

The after-machining shape information includes surface precision, degree of complexity of shape after machining, convexity and corner radius.

Surface precision is entered from the CAD input unit 13.

The degree of shape complexity after machining is an indication of how complicated the shape of the model is after machining. The larger the value of the degree of shape complexity, the more complicated the shape after machining.

Convexity is an indicator representing the volume of a portion protruding from the after-machining shape model, namely a portion whose shape is convex. The larger the value of convexity, the larger the convex portion.

Corner radius is entered from the CAD input unit 13.

(2) Overall processing of CAD apparatus

Figure 4:
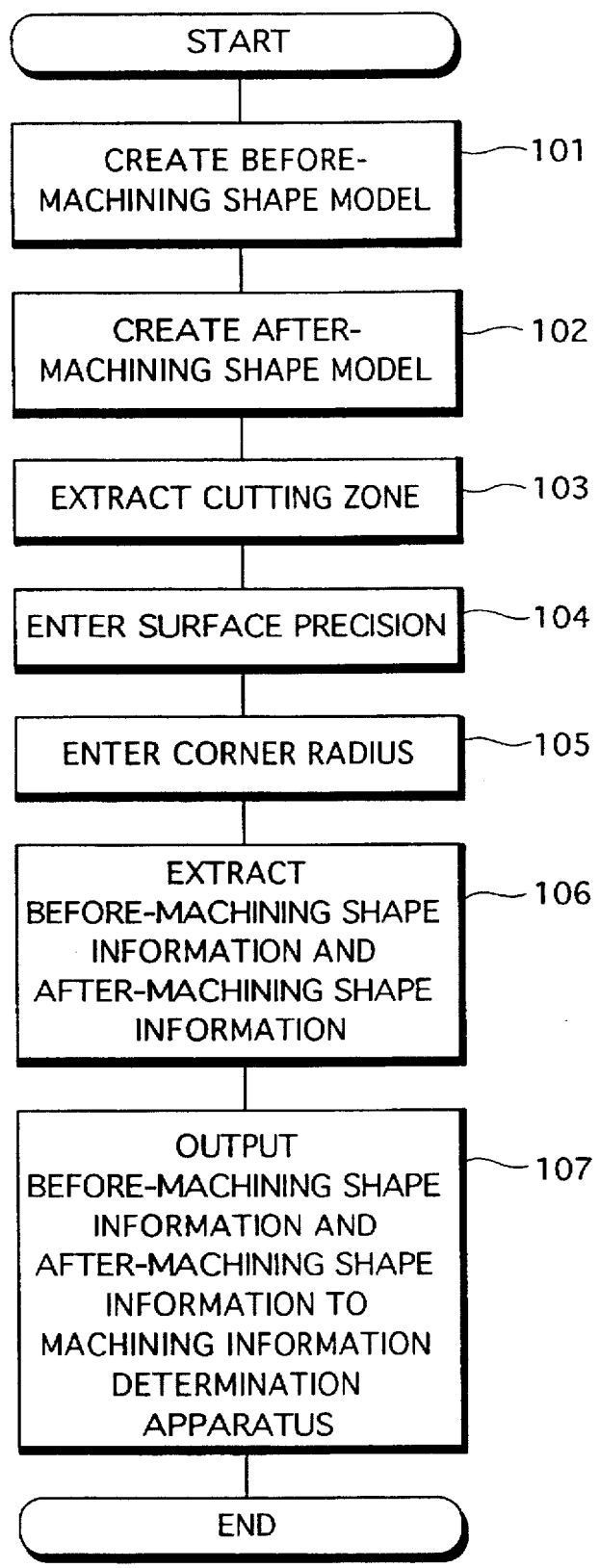
FIG. 4 is a flowchart illustrating the overall processing procedure in the CAD apparatus.

FIG. 4 is a flowchart illustrating the overall processing procedure in the CAD apparatus 10.

The before-machining shape model creating unit 11 creates data representing the before-machining shape model (FIG. 4; step 101).

Figure 5:
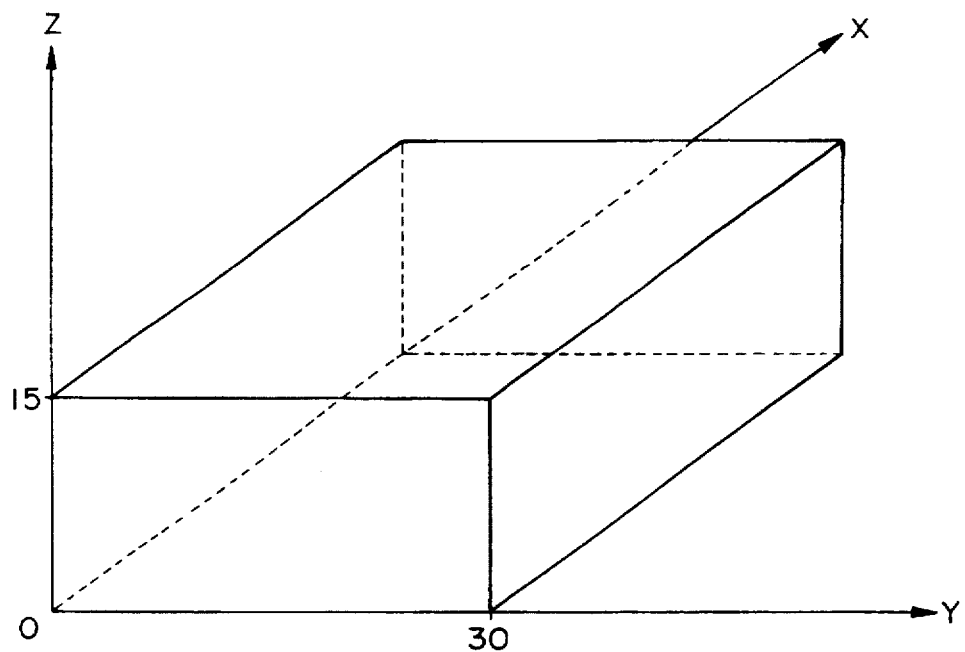
FIG. 5 illustrates an example of a shape model before machining.

FIG. 5 illustrates an example of a shape model before machining. This before-machining shape model is expressed by a solid model, as mentioned above, and is created by a operator on a display screen based upon position data entered via the keyboard 5, a mouse (not shown), etc.

The before-machining shape model created by the before-machining shape model creating unit 11 is applied to the cutting zone extraction unit 14.

The after-machining shape model creating unit 12 creates data representing the after-machining shape model (FIG. 4; step 102). This data is created in the same manner as the data created by the before-machining shape model creating unit 11.

Figure 6:
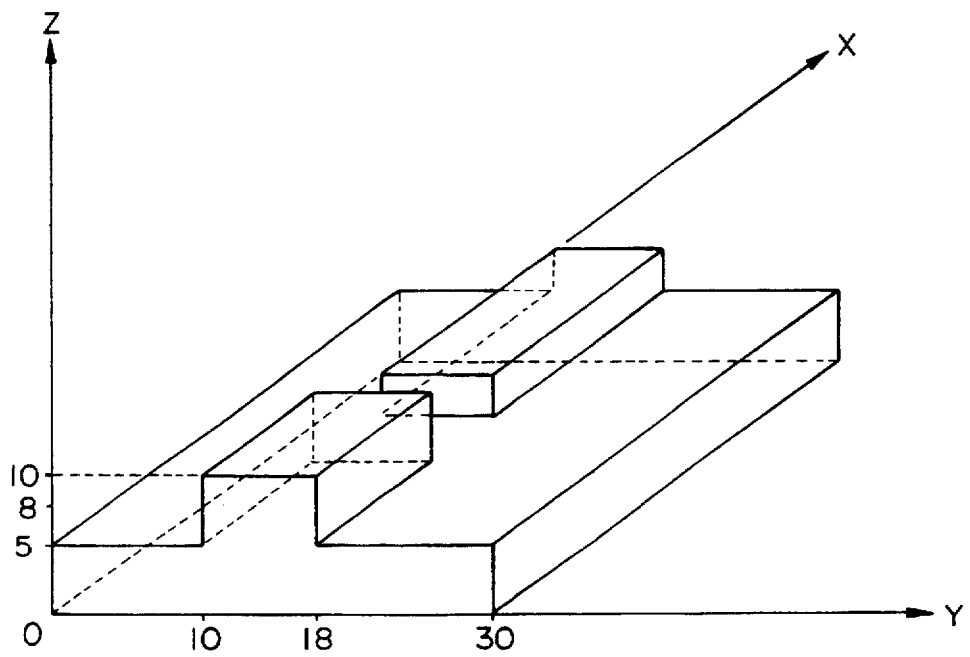
FIG. 6 illustrates an example of the shape model after machining.

FIG. 6 illustrates an example of the shape model after machining. The after-machining shape model is expressed by a solid model, as set forth above.

The after-machining shape model created by the after-machining shape model creating unit 12 is applied to the cutting zone extraction unit 14.

The cutting zone extraction unit 14 extracts a cutting zone on the basis of the before-machining shape model provided by the before-machining shape model creating unit 11 and the after-machining shape model provided by the after-machining shape model creating unit 12 (FIG. 4; step 103).

The details of processing for extracting the cutting zone executed in the cutting zone extraction unit 14 will be described later.

The cutting zone extracted by the cutting zone extracting unit 14 is applied to the before-machining/after-machining shape information extraction unit 15.

The surface precision is entered by the operator from the CAD input unit 13 (FIG. 4; step 104). For example, the surface precision is "(smooth, 3.8)".

The corner radius is entered by the operator from the CAD input unit 13 (FIG. 4; step 105). For example, the corner radius R is "0".

The before-machining/after-machining shape information extraction unit 15 creates the before-machining shape information and the after-machining shape information relating to the workpiece on the basis of the cutting zone provided by the cutting-zone extraction unit 14 and the surface precision and corner radius entered from the CAD input unit 13 (FIG. 4; step 106).

The details of processing for extracting the before-machining shape information and after-machining shape information executed in the before-machining/after-machining shape information extraction unit 15 will be described later.

The before-machining shape information and after-machining shape information extracted by the before-machining/after-machining shape information extraction unit 15 is applied to the machining information determination apparatus 20 (FIG. 4; step 107).

(3) Cutting zone extraction unit

The cutting zone extraction unit 14 extracts the cutting zone on the basis of the before-machining shape model provided by the before-machining shape model creating unit 11 and the after-machining shape model provided by the after-machining shape model creating unit 12.

Figure 7:
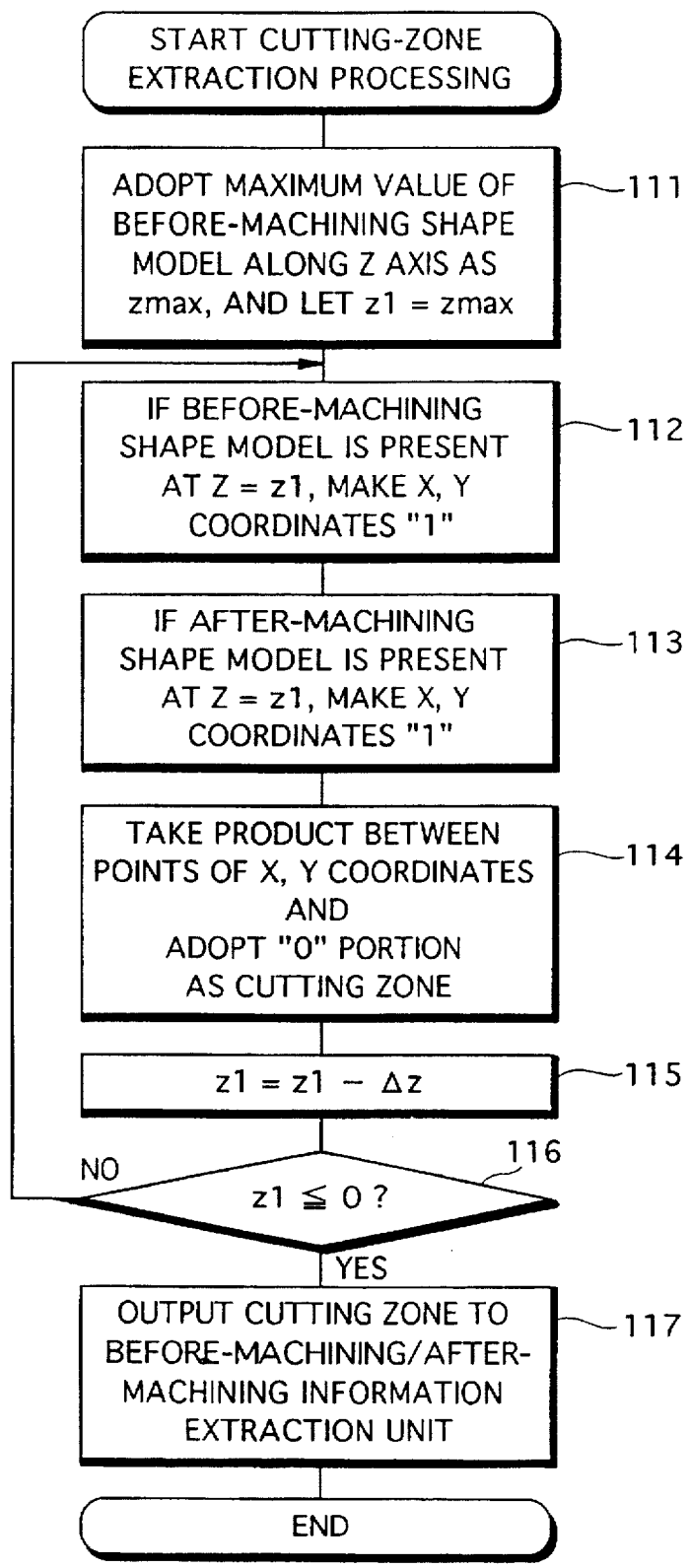
FIG. 7 is a flowchart illustrating a processing procedure in a cutting zone extraction unit.

FIG. 7 is a flowchart illustrating a processing procedure in the cutting zone extraction unit 14.

The cutting zone extraction unit 14 extracts the maximum value, along the Z axis, of the before-machining shape model provided by the before-machining shape model creating unit 11. Let this maximum value be $z_{max}$. Let a Z-axis parameter z1 for extracting the cutting zone be $z_{max}$ (FIG. 7; step 111).

By way of example, the maximum value $z_{max}$, along the Z axis, of the before-machining shape model in FIG. 5 is "15". Accordingly, we have "z1=15".

Thereafter, the processing from step 112 to step 115 is repeated taking the parameter z1 from the maximum value $z_{max}$ to the minimum value 0 along the Z axis of the before-machining shape model to extract the cutting zone.

The cutting zone extraction unit 14 creates a table (which will be referred to as a "before-machining shape model XY table" below) in which, if a point constructing the before-machining shape model resides on the XY plane at Z=z1, the X, Y coordinates of this point are made "1", whereas if a point constructing the before-machining shape model does not reside on this XY plane, the X, Y coordinates of the point are made "0" (FIG. 7; step 112).

Figure 8A:
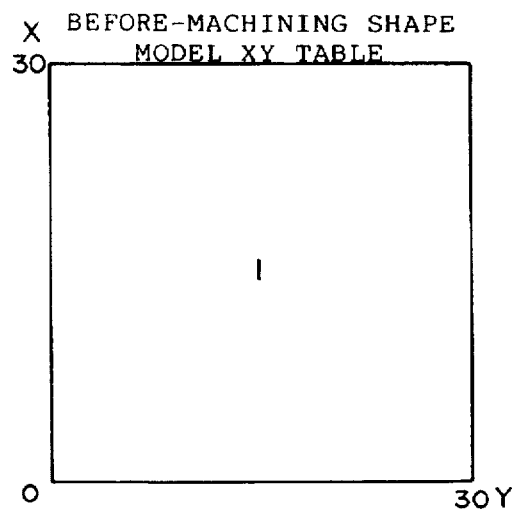
FIG. 8a illustrates an XY table of a shape model before machining, FIG. 8b an XY table of a shape model after machining, and FIG. 8c a cutting-zone XY table based upon the XY table of the shape model before machining in FIG. 8a and the XY table of the shape model after machining in FIG. 8b.

For example, the before-machining shape model XY table at Z=z1=15 is as shown in FIG. 8a. It should be understood from FIG. 8a that the before-machining shape model XY table at Z=15 is "1" in its entirety.

In a manner similar to that for the before-machining shape model, the cutting zone extraction unit 14 creates a table (which will be referred to as an "after-machining shape model XY table" below) in which, if a point constructing the after-machining shape model resides on the XY plane at Z=z1, the X, Y coordinates of this point are made "1", whereas if a point constructing the after-machining shape model does not reside on this XY plane, the X, Y coordinates of the point are made "0" (FIG. 7; step 113).

Figure 8B:
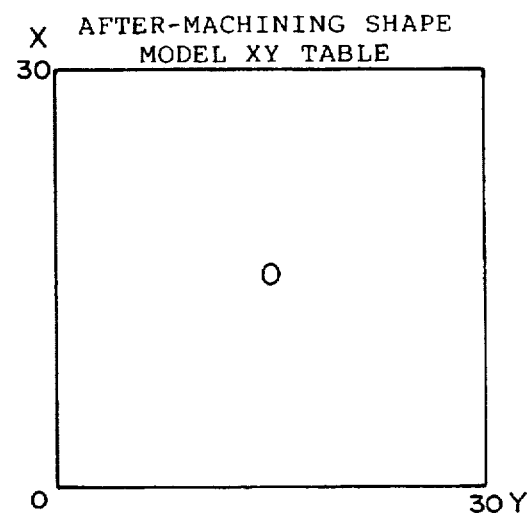

For example, the after-machining shape model XY table at Z=z1=15 is as shown in FIG. 8b. It should be understood from FIG. 8b that the after-machining shape model XY table at Z=15 is "0" in its entirety.

The cutting zone extraction unit 14 creates a cutting-zone XY table by taking the product (logical product) between points of the corresponding X, Y coordinates of the before-machining model XY table created at step 112 and after-machining model XY table created at step 113 and adopts the portion at which the product is "0" as the cutting zone (FIG. 7; step 114).

Since the portion at which the product of the before-machining shape model XY table and after-machining shape model XY table is "1" is a portion common to the before-machining shape model and after-machining shape model, this is a portion that is not to be cut. Further, the portion at which the product of the before-machining shape model XY table and after-machining shape model XY table is "0" is a portion that resides on the before-machining shape model but not on the after-machining shape model. Accordingly, this portion is an unnecessary portion, namely a portion to be cut away, and therefore this portion is adopted as a cutting zone.

Figure 8C:
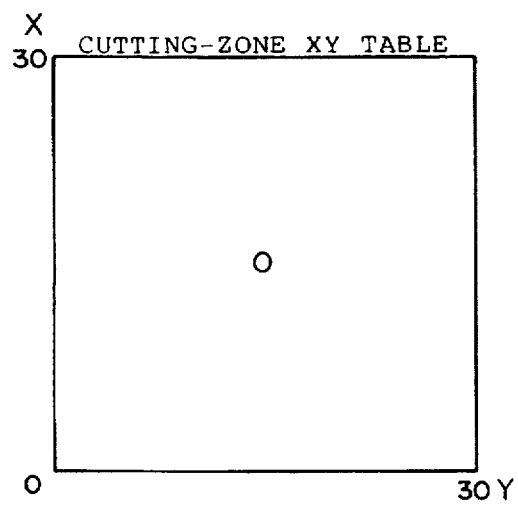

By way of example, when the product between points of the corresponding X, Y coordinates of the before-machining shape model XY table of FIG. 8a and the after-machining shape model XY table of FIG. 8b is taken, the result is the cutting-zone XY table shown in FIG. 8c. It should be understood from FIG. 8c that the entirety of the table is "0". Accordingly, the entire portion of the cutting-zone model XY table is the cutting zone.

The cutting-zone extraction unit 14 decrements the parameter z1 by Δz to update the parameter z1 (FIG. 7; step 115).

The cutting zone extraction unit 14 determines whether the parameter z1 is equal to or less than 0, namely whether the parameter z1 is the minimum value of the before-machining shape model along the Z axis (FIG. 7; step 116).

If extraction of the cutting zone has not been completed by the cutting zone extraction unit 14 from the maximum value $z_{max}$ to the minimum value 0 of the before-machining shape model along the Z axis (NO at step 116), then the program returns to step 112 and the cutting zone extraction unit 14 performs extraction of the cutting zone. When the cutting zone extraction unit 14 performs extraction of the cutting zone from the maximum value $z_{max}$ to the minimum value 0 of the before-machining shape model along the Z axis (YES at step 116), then processing for extracting the cutting zone is halted.

The cutting zone extraction unit 14 outputs the cutting-zone XY table, which has been obtained by the cutting-zone extraction processing, to the before-machining/after-machining shape information extraction unit 15 (FIG. 7; step 117).

Thus, the cutting zone extraction unit 14 extracts the cutting zone.

By way of example, when a cutting zone is extracted with regard to the before-machining shape model of FIG. 6 and the after-machining shape model of FIG. 7, the result is as shown in FIGS. 9a~9d.

Figure 9A:
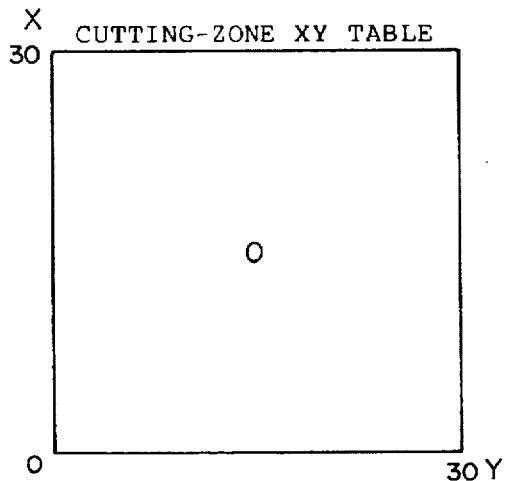
FIGS. 9a, 9b, 9c and 9d illustrate examples of the cutting-zone XY tables.
Figure 9B:
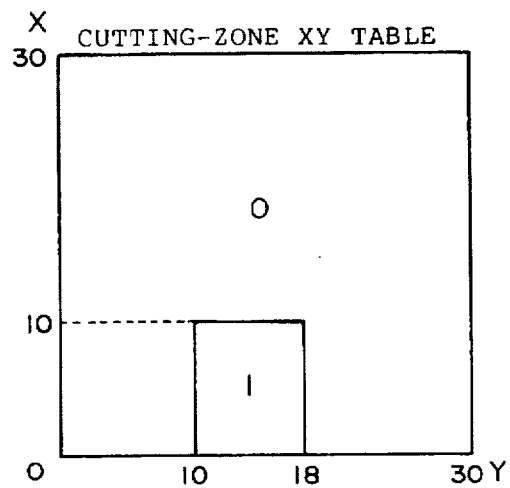
Figure 9C:
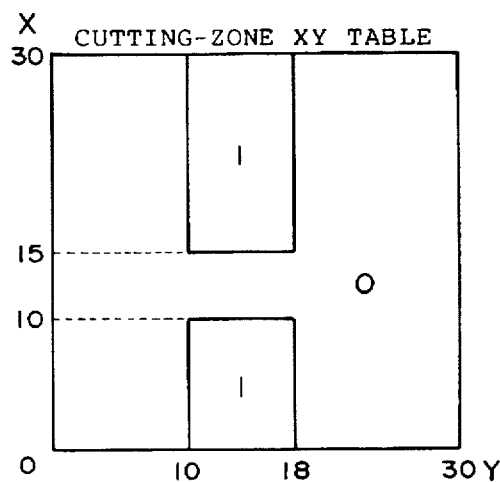
Figure 9D:
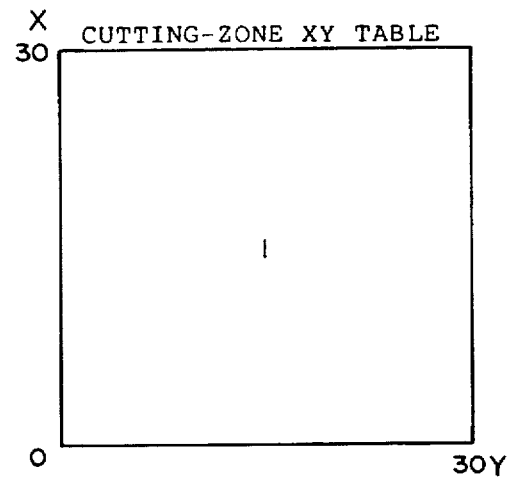

FIG. 9a illustrates a cutting-zone XY table at 15≧Z>10; FIG. 9b illustrates a cutting-zone XY table at 10≧Z>8; FIG. 9b illustrates a cutting-zone XY table at 8≧Z>5; and FIG. 9d illustrates a cutting-zone XY table at 5≧Z>0.

(4) Before-machining/after-machining shape information extraction unit

The before-machining/after-machining shape information extraction unit 15 extracts the before-machining shape information and after-machining shape information on the basis of the cutting zone provided by the cutting zone extraction unit 14.

FIGS. 10a–10d are flowcharts illustrating the processing procedure in the before-machining/after-machining shape information extraction unit 15.

Figure 10A:
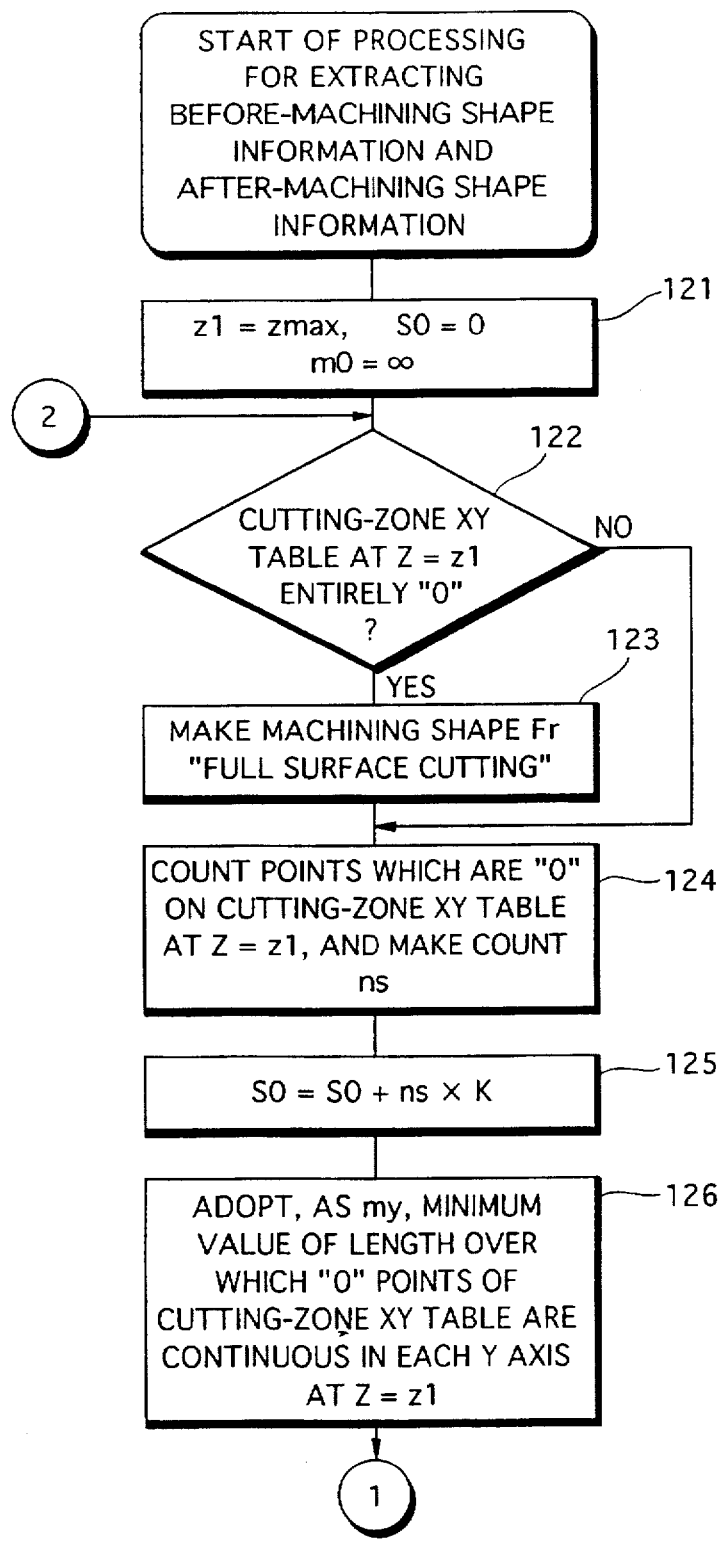
FIGS. 10a, 10b, 10c, and 10d are flowcharts illustrating a processing procedure in a before-machining/after-machining shape information extraction unit.
Figure 10B:
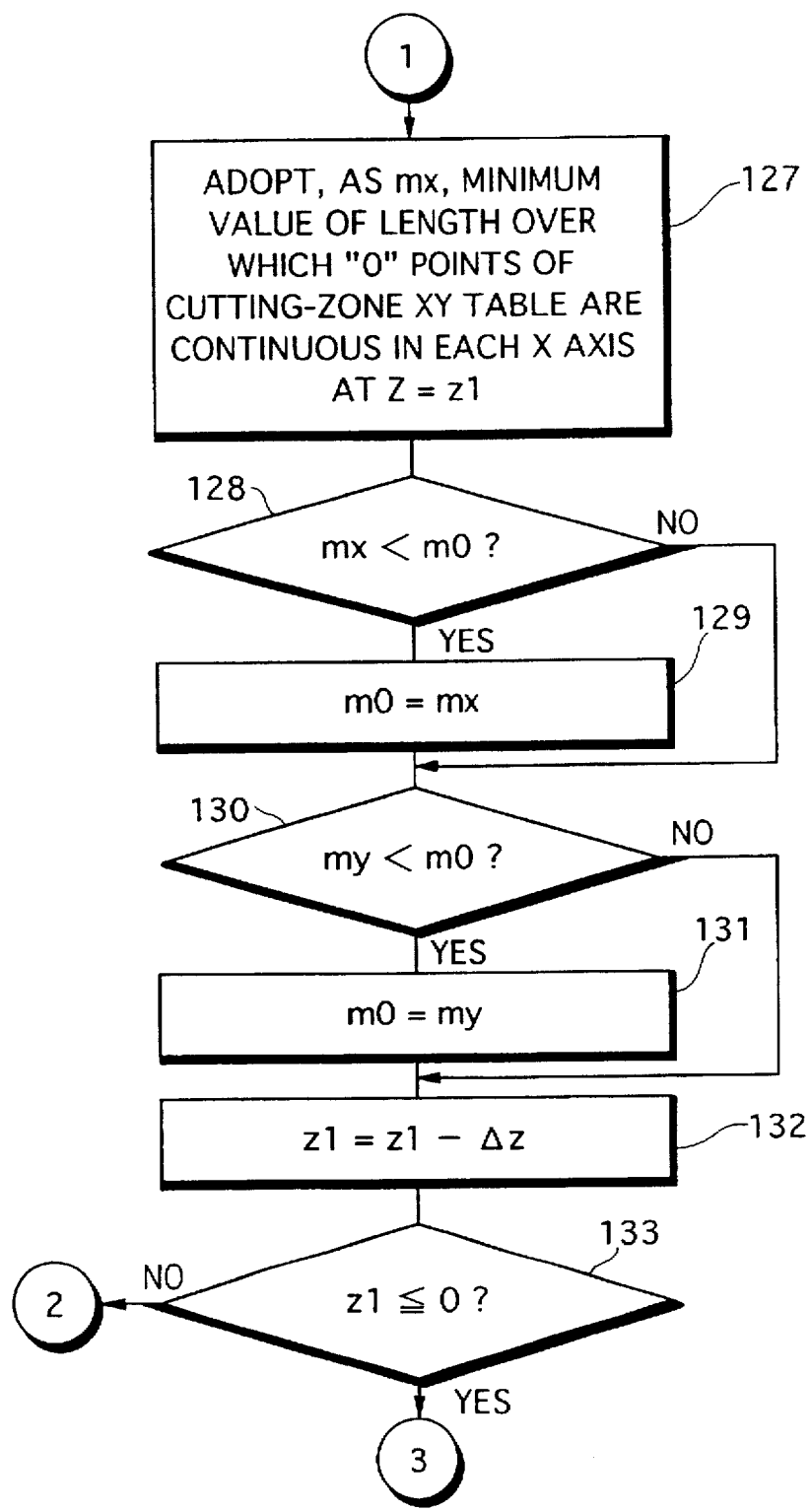

The before-machining/after-machining shape information extraction unit 15 executes the processing from step 121 of FIG. 10a to step 133 of FIG. 10b to extract the cutting area, machining shape and cutting width of the before-machining shape information. The before-machining/after-machining shape information extraction unit 15 further executes the processing from step 134 of FIG. 10c to step 147 of FIG. 10d to extract the cutting depth of the before-machining shape information as well as the degree of shape complexity and convexity of the after-machining shape information.

The parameter z1 along the Z axis is made the maximum value $z_{max}$ of the before-machining shape model along the Z axis. Further initial settings are performed by making the cutting area S0 equal to 0 and the cutting width m0 equal to ∞ (FIG. 10a; step 121).

When the initial settings are made, the before-machining/after-machining shape information extraction unit 15 determines whether all points in the cutting-zone XY table at z=z1 are "0", namely whether the entirety of the cutting-zone XY table is a region to be cut (FIG. 10a; step 122).

In a case where all points in the cutting-zone XY table are "0", namely when the entire zone is to be cut (YES at step 122), then the machining shape Fr is made "full surface cutting" (FIG. 10a; step 123).

For example, when Z=z1=15 holds, all points in the cutting-zone XY table are "0", as shown in FIG. 9a, and therefore the machining shape Fr is made "full surface cutting".

The before-machining/after-machining shape information extraction unit 15 counts points which are "0"s, namely all regions to be cut, with regard to the cutting-zone XY table at Z=z1 and designates the value of the count by ns (FIG. 10a; step 124).

The unit 15 multiplies the counted value ns by a constant K and adds the product to the cutting area S0 to accumulate the cutting area S0 (FIG. 10a; step 125). By multiplying the counted value ns by the constant K, the points are treated as a plane.

A length, parallel to the X axis of the cutting-zone XY table at Z=z1, over which "0" portions are continuous is extracted and the minimum value of this length is adopted as the minimum value my of the cutting width along the Y axis (FIG. 10a; step 126).

For example, when Z=z1=15 holds, the entirety of the cutting-zone XY table is "0" and the minimum value my of the cutting width along the Y axis is "30".

Next, a length, parallel to the Y axis of the cutting-zone XY table at Z=z1, over which "0" portions are continuous is extracted and the minimum value of this length is adopted as the minimum value mx of the cutting width along the X axis (FIG. 10b; step 127).

For example, when Z=z1=15 holds, the entirety of the cutting-zone XY table is "0" and the minimum value mx of the cutting width along the X axis is "30".

The before-machining/after-machining shape information extraction unit 15 compares the minimum value mx of the cutting width along the X axis with the cutting width m0 and, if mx is smaller than m0, substitutes mx for m0 to update m0 (FIG. 10b; steps 128, 129).

For example, initially m0=∞ and mx=30 hold. Therefore, m0 is updated to 30.

The before-machining/after-machining shape information extraction unit 15 compares the minimum value my of the cutting width along the Y axis with the cutting width m0 and, if my is smaller than m0, substitutes my for m0 to update m0 (FIG. 10b; steps 130, 131).

For example, m0=30 is established at step 129 and my=30 holds. Therefore, the prevailing value of m0 is employed as is and m0 is not updated.

Accordingly, in the processing of steps 128–131, of the minimum value my of cutting width along the Y axis and the minimum value mx of cutting width along the X axis extracted by the processing of steps 126 and 127, the smaller becomes the cutting width m0.

The before-machining/after-machining shape information extraction unit 15 decrements the parameter z1 by Δz to update the parameter z1 (FIG. 10b; step 132).

The before-machining/after-machining shape information extraction unit 15 determines whether the parameter z1 is equal to or less than 0, namely whether the parameter z1 is the minimum value of the before-machining shape model along the Z axis (FIG. 10b; step 133).

If processing for extracting the cutting area S0, which is cumulative values of the cutting zone, and cutting width m0 has not been completed by the before-machining/after-machining shape information extraction unit 15 up to the minimum value 0 of the before-machining shape model along the Z axis (NO at step 133), then the program returns to step 122 and the before-machining/after-machining shape information extraction unit 15 performs extraction of the cutting area S0 and cutting width m0.

In order to extract the cutting depth as well as the degree of shape complexity after machining and convexity, the before-machining/after-machining shape information extraction unit 15 makes the parameter z1 equal to the maximum value zmax of the before-machining shape along the Z axis. Further, the before-machining/after-machining shape information extraction unit 15 makes degree of complexity nd of the same after machining, the convexity D0, the upper surface h1 and lower surface h0 of the cutting depth equal to 0 to perform the initial settings (FIG. 10c; step 134).

Figure 10C:
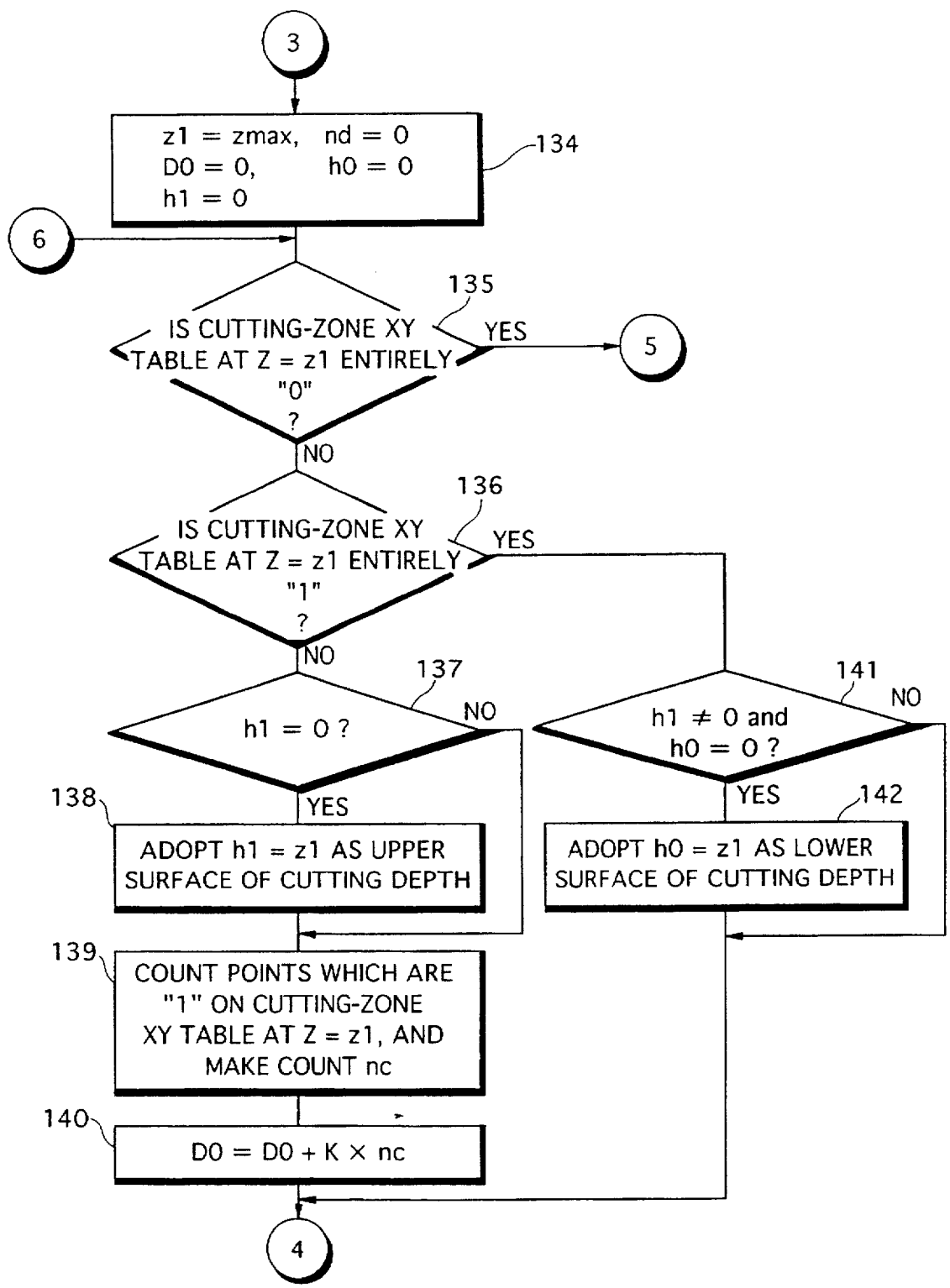

When the initial settings are made, the before-machining/after-machining shape information extraction unit 15 determines whether the entirety of the cutting-zone XY table at Z=z1 is "0", that is, whether the entire zone is the region to be cut (FIG. 10c; step 135).

When the before-machining/after-machining shape information extraction unit 15 determines that the entirety of the cutting-zone XY table is not "0" (NO at step 135), the unit 15 determines whether the cutting-zone XY table at Z=z1 is "1" in its entirety, namely whether the entirety of the cutting-zone XY table is a region not to be cut (FIG. 10c; step 136).

When the before-machining/after-machining shape information extraction unit 15 determines that the cutting-zone XY table is not "1" in its entirety (NO at step 136), this means that a region to be cut and a region not to be cut resides in the cutting-zone XY table. Accordingly, the unit 15 determines whether the upper surface h1 of the cutting depth is 0 or not (FIG. 10c; step 137).

In a case where the upper surface h1 of the cutting depth is 0 (YES at step 137), the before-machining/after-machining shape information extraction unit 15 substitutes the current parameter z1 for h1 and makes z1 equal to the upper surface h1 of the cutting depth (FIG. 10c; step 138).

Accordingly, the Z coordinate at which both "0" and "1" first appear in the cutting-zone XY table becomes the upper surface h1 of the cutting depth.

For example, since "0" and "1" are present in the cutting-zone XY table of FIG. 9b, the upper surface h1 of the cutting depth becomes "10".

The before-machining/after-machining shape information extraction unit 15 counts points which are "1"s, namely all regions not to be cut, with regard to the cutting-zone XY table at Z=z1 and designates the value of the count by nc (FIG. 10c; step 139).

The before-machining/after-machining shape information extraction unit 15 multiplies the counted value nc by a constant K and adds the product to the convexity D0 to accumulate the convexity D0 (FIG. 10c; step 140). By multiplying the counted value nc by the constant K, the points are treated as a plane.

When the before-machining/after-machining shape information extraction unit 15 determines that the entirety of the cutting-zone XY table is "1" (YES at step 136), this means that the entirety of the cutting-zone XY table is a region that is not to be cut. Therefore, the unit 15 determines whether the upper surface h1 of the cutting depth is not 0 and whether the lower surface h0 of the cutting depth is 0 (FIG. 10c; step 141).

In a case where the upper surface h1 of the cutting depth is not 0 and the lower surface h0 of the cutting depth is 0 (YES at step 141), the before-machining/after-machining shape information extraction unit 15 substitutes the current parameter z1 for h0 and makes z1 equal to the lower surface h0 of the cutting depth (FIG. 10c; step 142).

Accordingly, when the entire region of the cutting-zone XY table is a region that is not to be cut in a case where the upper surface of the cutting depth exists but not the lower surface of the cutting depth, the Z coordinate of the region is the lower surface of the cutting depth.

For example, since the cutting-zone XY table of FIG. 9d is "1" in its entirety, the upper surface h0 of the cutting depth is "5".

The before-machining/after-machining shape information extraction unit 15 applies edge pattern filters shown in FIGS. 11a~11h with regard to the cutting-zone XY table at Z=z1. The unit 15 counts the number of times the cutting-zone XY table matches with any of the edge pattern filters and adopts nd1 as the value of the count (FIG. 10d; step 143).

Figure 10D:
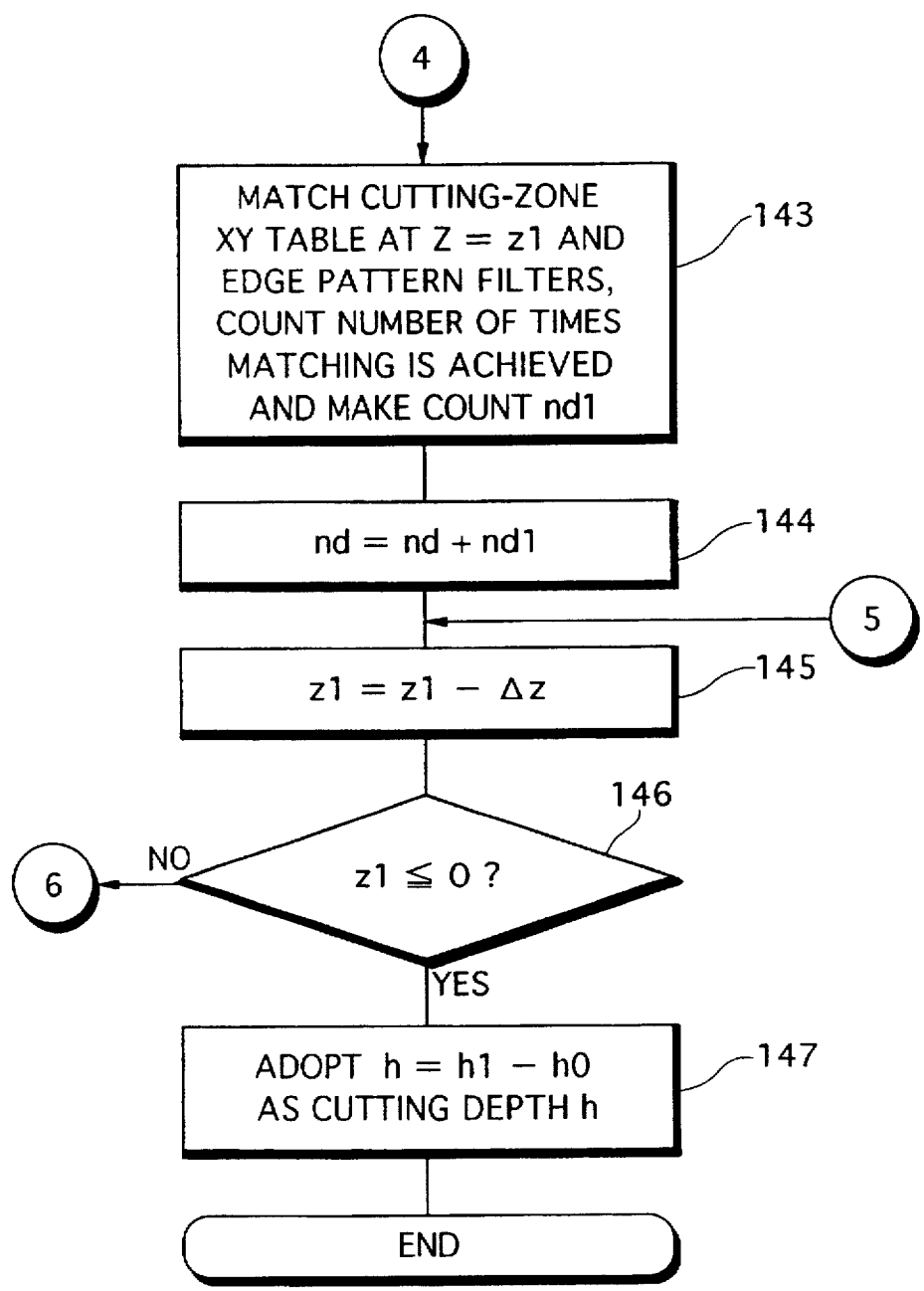

The unit 15 adds the counted value nd1 to the degree of shape complexity nd to accumulate the degree of shape complexity nd (FIG. 10d; step 144).

In a case where the entirety of the cutting-zone XY table is "0", i.e., the entire area of the table is a region to be cut (YES at step 135), the before-machining/after-machining shape information extraction unit 15 extracts neither the upper surface h1 of the cutting depth, the lower surface h0 of the cutting depth, the convexity D0 nor the degree of shape complexity nd after machining is extracted.

The before-machining/after-machining shape 10 information extraction unit 15 decrements the parameter z1 by $\Delta z$ to update the parameter z1 (FIG. 10d; step 145).

The before-machining/after-machining shape information extraction unit 15 determines whether the parameter z1 is equal to or less than 0, namely whether the parameter z1 is the minimum value of the before-machining shape model along the Z axis (FIG. 10d; step 146).

If processing for extracting the upper surface h1 20 of the cutting depth, the lower surface h0 of the cutting depth, the convexity D0 and the degree of complexity nd after machining has not been completed by the before-machining/after-machining shape information extraction unit 15 from the maximum value $z_{max}$ to the minimum value 0 of the before-machining shape model along the Z axis (NO at step 146), then the program returns to step 135 and the before-machining/after-machining shape information extraction unit 15 repeats extraction of the upper surface h1 of the cutting depth, the lower surface h0 of the cutting depth, the convexity D0 and the degree of complexity nd after machining.

If z1≦0 is determined to hold (YES at step 146), the before-machining/after-machining shape information extraction unit 15 obtains the difference between the upper surface h1 of the cutting depth and the lower surface h0 of the cutting depth to calculate the cutting depth h (FIG. 10d; step 147).

Thus, the before-machining/after-machining shape information extraction unit 15 extracts the cutting area, machining shape, cutting width and cutting depth of the before-machining shape information as well as the degree of shape complexity after machining and the convexity of the after-machining shape information.

FIGS. 12 and 13 illustrate examples of before-machining shape information and after-machining shape information, respectively, extracted by the before-machining/after-machining shape information extraction unit 15. In FIG. 13, the surface precision and corner radius of the after-machining shape information are entered from the CAD input unit 13.

The before-machining shape information and after-machining shape information are applied to the machining information determination apparatus 20 from the before-machining/after-machining shape information extraction unit 15 of the CAD apparatus 10.

1.4 Input unit

The input unit 16 enters material information and machining-stage information. The material information and machining-stage information is entered by the operator via the keyboard 5.

The material information indicates the material constituting the workpiece. Materials include SKD (quenched iron), iron, aluminum, bakelite, etc.

FIG. 14 illustrates an example of material information. For example, the material of the workpiece is "iron".

The machining-stage information represents the stage of machining which the workpiece undergoes. Machining stages include "rough machining", "semi-finishing" and "finishing".

FIG. 15 illustrates an example of machining-stage information. For example, the machining-stage information is "rough machining".

1.5 Machining information determination apparatus 20

(1) Construction of machining information determination apparatus

The machining information determination apparatus 20 decides optimum machining information on the basis of the before-machining shape information and after-machining shape information provided by the CAD apparatus 10 as well as the material information and machining-stage information entered from the input unit 16.

Figure 16:
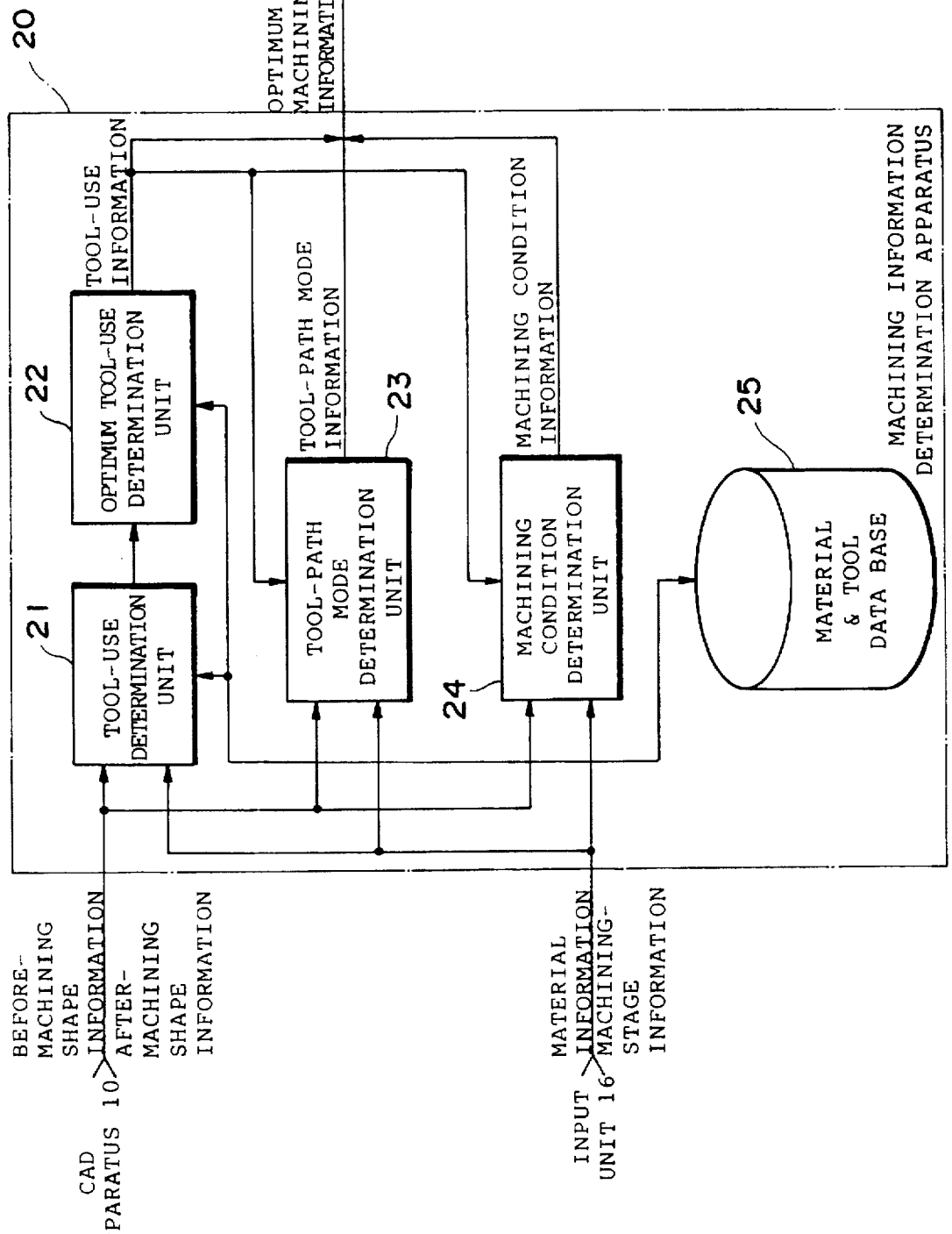
FIG. 16 is a functional block diagram illustrating the detailed construction of a machining-information determination apparatus.

FIG. 16 is a functional block diagram illustrating the detailed construction of a machining-information determination apparatus 20.

The machining-information determination apparatus 20 has a tool-use determination unit 21, an optimum tool-use determination unit 22, a tool-path mode determination unit 23, a machining condition determination unit 24 and a material & tool data base 25.

Each of these units will now be described in simple terms, with the details being saved for later.

In accordance with tool-use decision rules and membership functions established in advance, and on the basis of the before-machining shape information and after-machining shape information provided by the CAD apparatus 10 as well as the material information and machining-stage information entered from the input unit 16, the tool-use determination unit 21 decides upon the optimum machine tool for machining a workpiece and decides the tools used by this machine tool.

In a case where the tool-use determination unit 21 has decided that an NC machine is the optimum machine tool for machining, the optimum tool-use determination unit 22 decides upon the optimum tool to be used based upon the tools used decided by the tool-use determination unit 21. The optimum tool-use determination unit 22 decides upon the optimum tool-use by referring to an NC machine tool-use data file stored in the material & tool information data base 25, as will be described later.

In accordance with tool-path mode decision rules and membership functions established in advance, and on the basis of the before-machining shape information and after-machining shape information provided by the CAD apparatus 10 as well as the material information and machining-stage information entered from the input unit 16, the tool-path mode determination unit 23 decides a machining path mode according to which the NC machine machines the workpiece using an end mill.

In accordance with machining-condition decision rules and membership functions established in advance, and on the basis of the before-machining shape information and after-machining shape information provided by the CAD apparatus 10, the material information and machining-stage information entered from the input unit 16 and the tool-use information provided by the optimum tool-use determination unit 22, the machining condition determination unit 24 decides optimum machining conditions in order for the machine tool to machine the workpiece.

The material & tool data base 25 stores a material data file relating to the hardness of the material, and an NC machine tool-use data file relating to tools prepared beforehand as tools used for the NC machine. These data files are read out as necessary by the tool-use determination unit 21 and optimum tool-use determination unit 25. The details of the material data file and NC machine tool-use data file will be described later.

The tool-use information, tool-path mode information and machining condition information decided by the above-mentioned units are applied as optimum machining information to the CAM apparatus 17 and machine tool 18 from the machining-information determination apparatus 20.

(2) Overall processing of machining information determination apparatus

Figure 17:
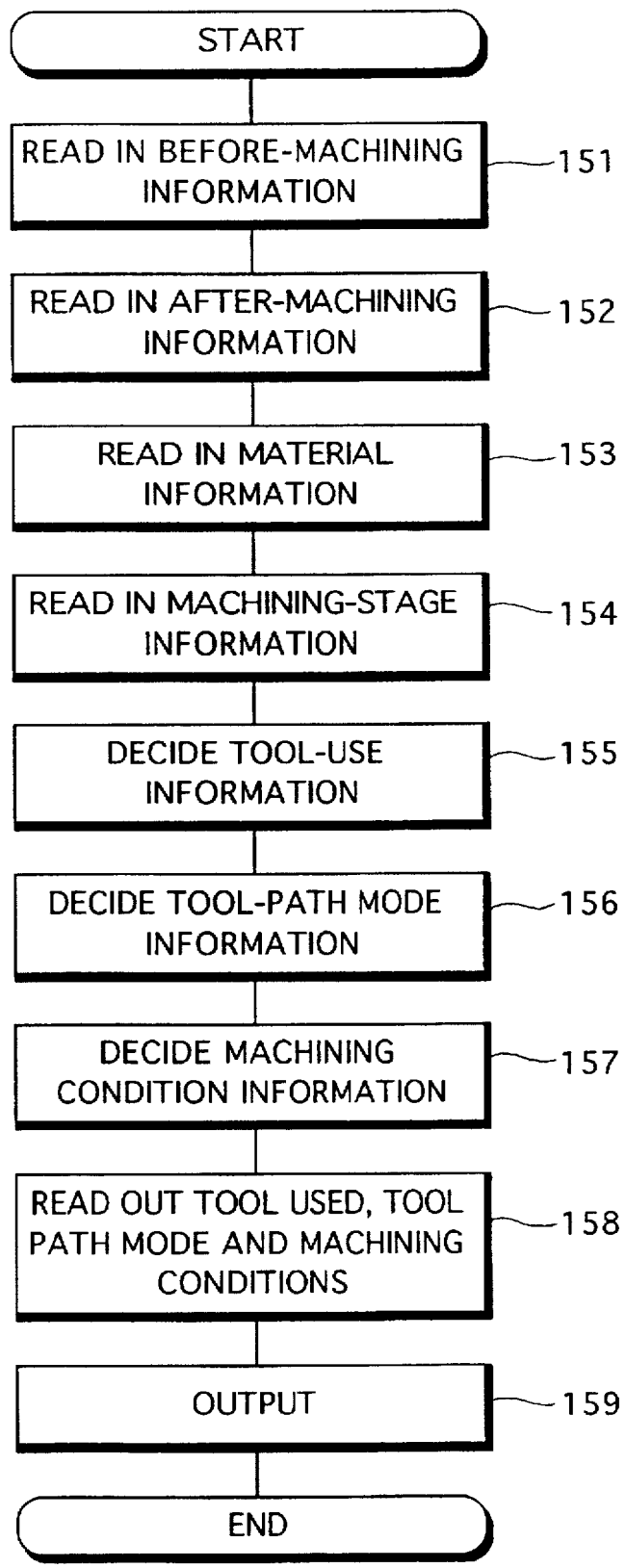
FIG. 17 is a flowchart illustrating the processing procedure of the machining-information determination apparatus.

FIG. 17 is a flowchart illustrating the processing procedure of the machining-information determination apparatus 20.

The machining-information determination apparatus 20 reads in the before-machining shape information provided by the CAD apparatus 10 (FIG. 17; step 151). For example, the machining information determination apparatus 20 reads in the before-machining shape information shown in FIG. 12.

The machining-information determination apparatus 20 reads in the after-machining shape information provided by the CAD apparatus 10 (FIG. 17; step 152). For example, the machining information determination apparatus 20 reads in the after-machining shape information shown in FIG. 13.

The machining-information determination apparatus 20 reads in the material information entered by the operator from the input unit 16 (FIG. 17; step 153). For example, the machining information determination apparatus 20 reads in the material information shown in FIG. 14.

The machining-information determination apparatus 20 reads in the machining-stage information entered by the operator from the input unit 16 (FIG. 17; step 154). For example, the machining information determination apparatus 20 reads in the machining-stage information shown in FIG. 15.

The before-machining shape information, after-machining shape information, material information and machining-stage information read in are applied to the tool-use determination unit 21, tool-path mode determination unit 23 and machining condition determination unit 24.

On the basis of the before-machining shape information, after-machining shape information, material information and machining-stage information, and in accordance with the tool-use decision rules and membership functions established in advance, the tool-use determination unit 21 decides upon the optimum machine tool and decides the tools used by this machine tool. In a case where the machine tool is an NC machine, the optimum tool-use determination unit 22 decides upon the optimum tool to be used by referring to the NC machine tool-use data file on the basis of the tools used decided by the tool-use determination unit 21 (FIG. 17; step 155).

In a case where the machine tool is an NC machine and the tool used is an end mill, the tool-path mode determination unit 23 decides a machining path mode on the basis of the before-machining shape information, after-machining shape information, material information and machining-stage information, and in accordance with the tool-path mode decision rules and membership functions established in advance (FIG. 17; step 156).

On the basis of the tool-use information, before-machining shape information, after-machining shape information, material information and machining-stage information, and in accordance with the machining-condition decision rules and membership functions established in advance, the machining condition determination unit 24 decides machining conditions (FIG. 17; step 157).

The machining-information determination apparatus 20 reads the tool-use information, tool-path mode information and machining condition information out of the aforementioned units and outputs this information to the CAM apparatus 17 and machine tool 18 (FIG. 17; steps 158, 159).

(3) Tool-use determination unit and optimum tool-use determination unit

On the basis of the before-machining shape information and after-machining shape information provided by the CAD apparatus 10 as well as the material information and machining-stage information entered from the input unit 16, and in accordance with the tool-use decision rule and membership functions established in advance, the tool-use determination unit 21 decides the optimum machine tool for machining the workpiece as well as the tools used by this machine tool.

On the basis of the material information entered from the input unit 16, the tool-use determination unit 21 searches the material data file, which has been stored in the material & tool data base 25, to obtain the material hardness of the material machined.

FIG. 18 illustrates an example of a material data file. The material data file stores "Material Name" and "Hardness" in a form corresponding to the name of the material.

For example, since the material information entered from the input unit 16 is "iron", the material hardness is "50" when the material hardness relating to "iron" is obtained by retrieval from the material data file.

On the basis of the machining-stage information, the material hardness based upon the material information, the cutting area and machining shape of the before-machining shape information as well as the surface precision and degree of shape complexity after machining of the after-machining shape information, and in accordance with the tool-use decision rules and membership functions, the tool-use determination unit 21 decides upon the machine tool and the tools used thereby.

Examples of the machine tool are an NC machine (numerical control machine), an electrical discharge machine (electric spark machine) and a wire-cut machine.

An NC machine machines a workpiece using tools such as an end mill, drill, etc., by way of example.

In the case of an NC machine, the tool-use determination unit 21 decides the tool used by the NC machine as well as the diameter of the tool.

The tools used include an end mill, drill, etc.

The tool diameter is the radius of the tool used, e.g., the radius of the end mill.

The electrical discharge machine utilizes the electrical discharge phenomenon to machine a workpiece. This machine is suited to the machining of a workpiece having a very high hardness, such as the machining of quenched iron (SKD).

In the case of an electrical discharge machine, the tool-use determination unit 21 decides the number of electrodes and clearance.

The number of electrodes is the number of electrode rods which the electrical discharge machine uses to machine the workpiece.

Clearance is the spacing between the electrode rod of the electrical discharge machine and the workpiece.

A wire-cut machine pays out a wire and uses the wire as an electrode to machine a workpiece.

In the case of a wire-cut machine, the tool-use determination unit 21 decides the tool diameter.

The tool diameter is the diameter of the wire used by the wire-cut machine.

By way of example, tool-use decision rules are of the following types with regard to the NC machine, electrical discharge machine and wire-cut machine:

NC machine
 IF the machining stage is rough machining and the cutting area is large and the material hardness is low,
 THEN the machine used is an NC machine, the tool used is an end mill and the tool diameter is large.
 IF the machining stage is rough machining and the cutting area is small and the material hardness is ordinary,
 THEN the machine used is an NC machine, the tools used are a drill and an end mill and the tool diameter is small.
 IF the machining stage is semi-finishing and the cutting area is large and the material hardness is low,
 THEN the machine used is an NC machine, the tool used is an end mill and the tool diameter is large.
 IF the machining stage is finishing and the cutting area is large and the material hardness is low and the surface precision is coarse,
 THEN the machine used is an NC machine, the tool used is an end mill and the tool diameter is somewhat small.
 IF the machining stage is rough machining and the cutting area is small and the material hardness is ordinary and the surface precision is smooth,
 THEN the machine used is an NC machine, the tool used is an end mill and the tool diameter is very small.

:
:

Electrical discharge machine
 IF the machining stage is finishing and the degree of shape complexity after machining is simple and the material hardness is high,
 THEN the machine used is an electrical discharge machine, the number of electrodes is small and the clearance is small.

:
:

Wire-cut machine
 IF the machining stage is rough machining and the machined shape is pierced and the material hardness is high,
 THEN the machine used is wire-cut machine and the tool diameter is somewhat large.

:
:

In these tool-use decision rules of the NC machine, adopting the large "tool diameter" in a case where the "cutting area" is large is for the purpose of improving the efficiency of cutting machining. Further, "the tools used are a drill and an end mill" is adopted in a case where "the material hardness is ordinary" because a pending hole is necessary. Furthermore, the "tool diameter" is made very small in a case where "the surface precision is smooth" and "the cutting area is small".

In the tool-use decision rules of the electrical discharge machine, it is so arranged that "the number of electrodes" becomes small in a case where "the degree of shape complexity after machining is simple".

FIGS. 19a–19m illustrate examples of membership functions and singletons with regard to antecedent variables and consequent variables of tool-use decision rules. The antecedent variables are common to each of the machine tools. The consequent variables are specific to the machine tools.

Figure 19A:
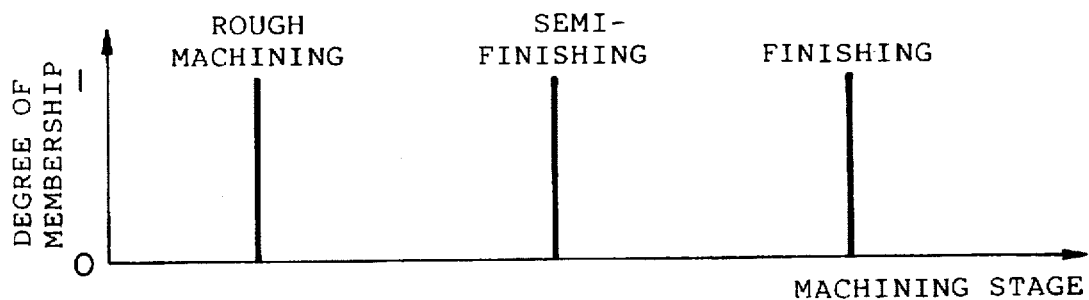

FIG. 19a illustrates three singletons of linguistic information "rough machining", "semi-finishing" and "finishing" with regard to the antecedent variable "machining stage".

Figure 19B:
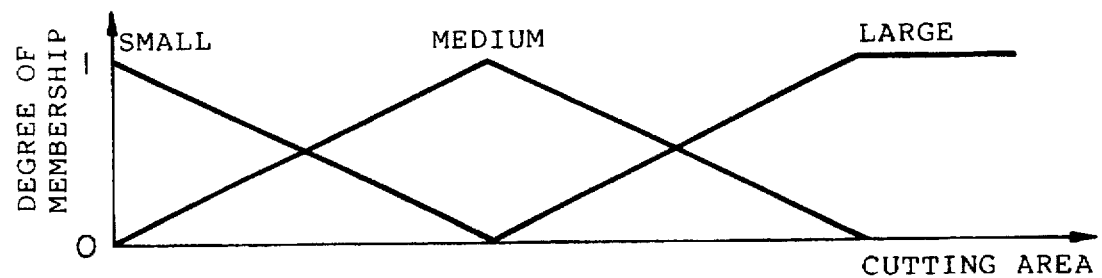

FIG. 19b illustrates three membership functions of linguistic information "small", "medium" and "large" with regard to the antecedent variable "cutting area".

Figure 19C:
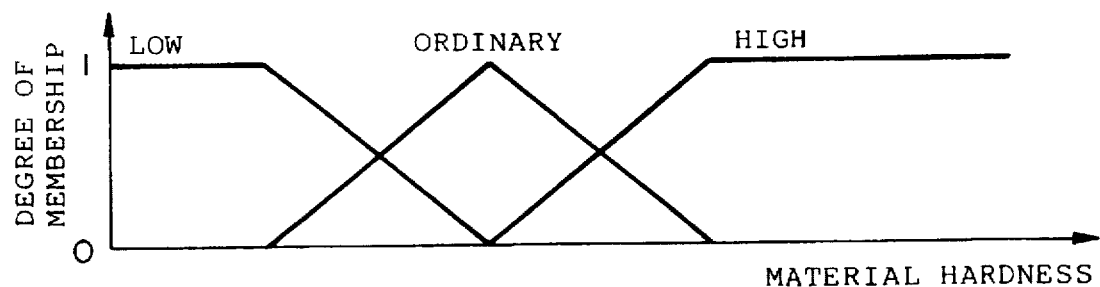

FIG. 19c illustrates three membership functions of linguistic information "low", "ordinary" and "high" with regard to the antecedent variable "material hardness".

Figure 19D:
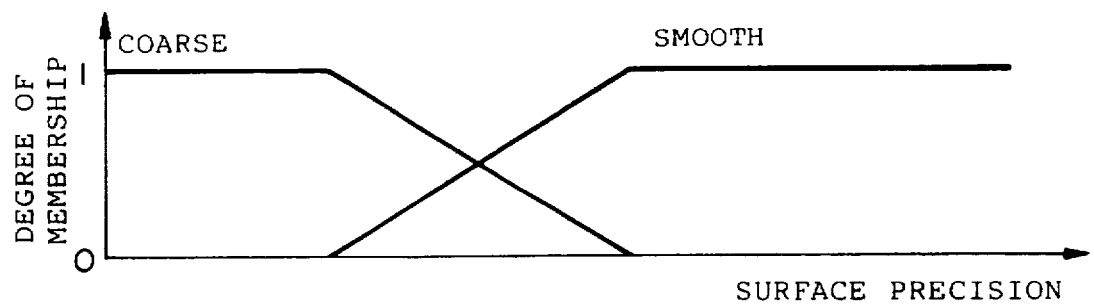

FIG. 19d illustrates two membership functions of linguistic information "coarse" and "smooth" with regard to the antecedent variable "surface precision".

Figure 19E:
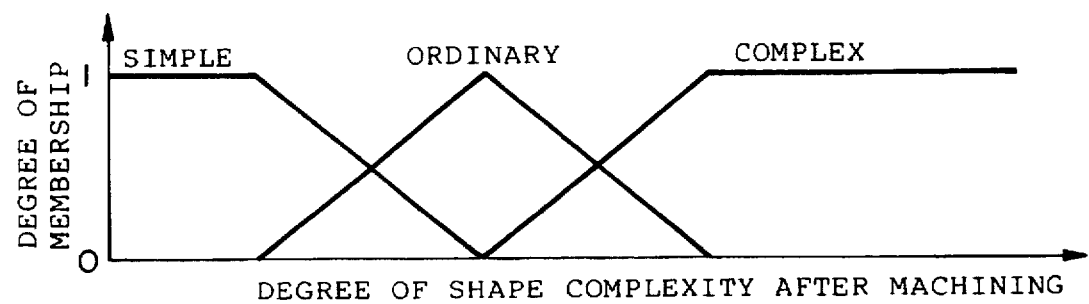

FIG. 19e illustrates membership functions of linguistic information "simple", "ordinary" and "complex" with regard to the antecedent variable "degree of shape complexity after machining".

Figure 19F:
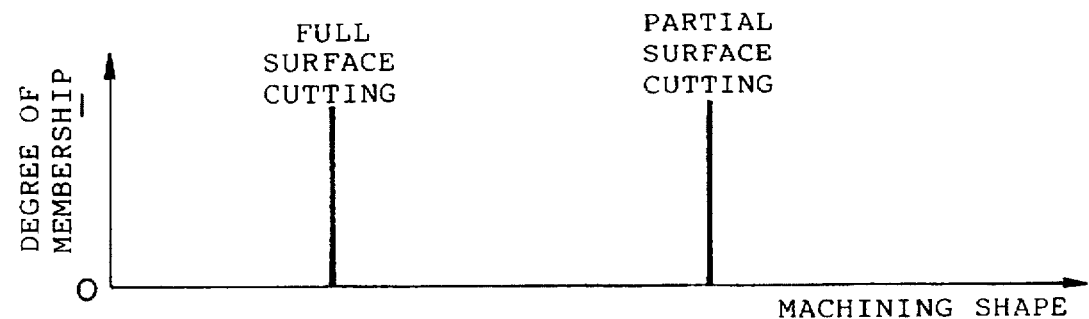

FIG. 19f illustrates two singletons of linguistic information "full surface cutting" and "partial surface cutting" with regard to the antecedent variable "machining shape".

Figure 19G:
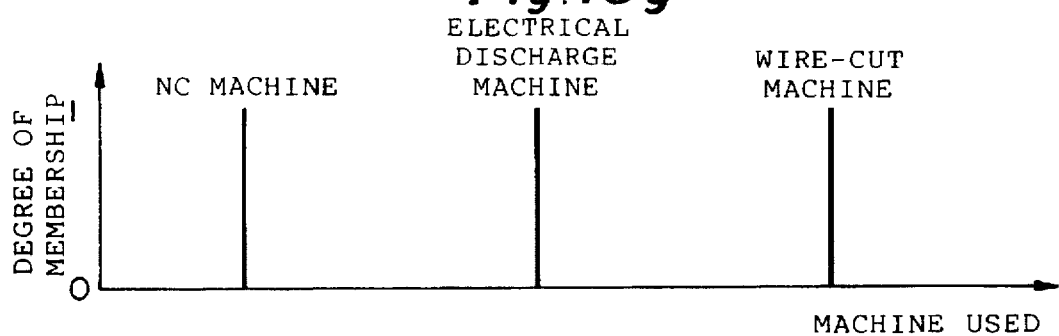

FIG. 19g illustrates three singletons of linguistic information "NC machine", "electrical discharge machine" and "wire-cut machine" with regard to the consequent variable "machined used".

Figure 19H:
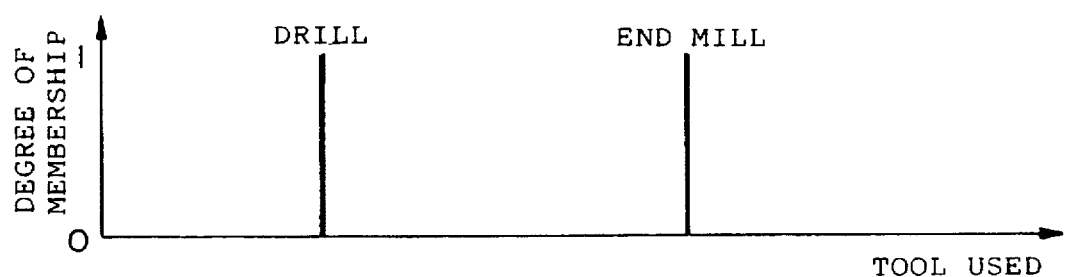

FIG. 19h illustrates two singletons of linguistic information "drill" and "end mill" with regard to the consequent variable "tool used" relating to the NC machine.

Figure 19I:
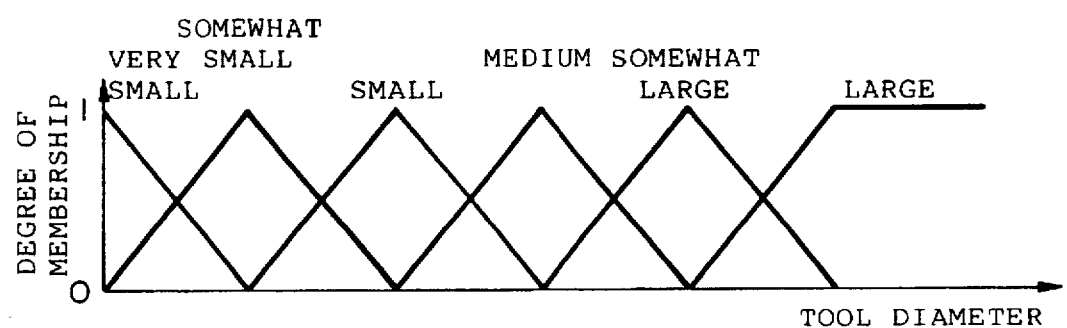

FIG. 19i illustrates six membership functions of linguistic information "very small", "somewhat small", "small", "medium", "somewhat large" and "large" with regard to the consequent variable "tool diameter" to the NC machine.

Figure 19J:
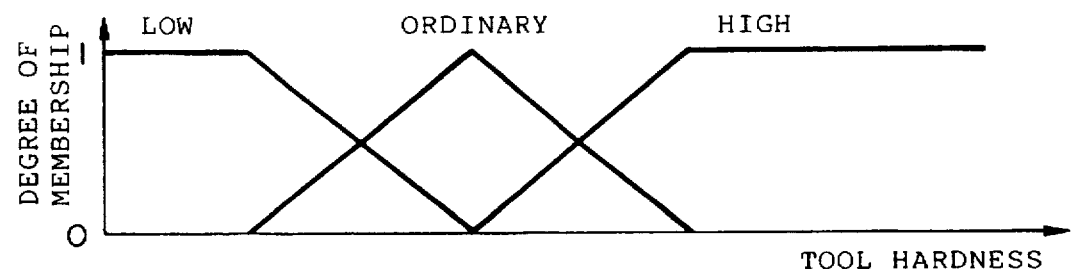

FIG. 19j illustrates three membership functions of linguistic information "low", "ordinary" and "high" with regard to the consequent variable "tool hardness" relating to the NC machine.

FIG. 19k illustrates three membership functions of linguistic information "small", "medium" and "large" with regard to the consequent variable "number of electrodes" relating to the electrical discharge machine.

FIG. 19l illustrates two membership functions of linguistic information "small" and "large" with regard to the consequent variable "clearance" relating to the electrical discharge machine.

FIG. 19m illustrates five membership functions of linguistic information "small", "somewhat small", "medium", "somewhat large" and "large" with regard to the consequent variable "tool diameter" relating to the wire-cut machine.

In accordance with the tool-use decision rules and membership functions, and on the basis of the information entered from the CAD apparatus 10 and input unit 16, the tool-use determination unit 21 calculates degree of membership of the antecedent relating to each machine. The tool-use determination unit 21 thenceforth calculates the degree of membership of the consequent variable on the basis of the degree of membership of the antecedent.

In the singletons of "NC machine", "electrical discharge machine" and "wire-cut machine" with regard to the consequent variable "machine used", the tool-use determination unit 21 decides upon the machine having the largest degree of membership as being the "machine used". When the "machine used" for which the degree of membership is largest is decided upon, the tool-use determination unit 21 makes a decision in relation to the consequent variables "tool used" and "tool diameter" regarding this machine used. For example, if the degree of membership of the "NC machine' is largest, then the tool-use determination unit 21 decides upon the NC machine as the machine used. The tool-use determination unit 21 decides upon the "end mill" as the tool used by the NC machine and decided upon "4" as the tool radius.

In the tool-use decision rules relating to the NC machine of the above-mentioned tool-use decision rules, the tool-use determination unit 21 decides upon the tool used and the tool diameter. In the case of the NC machine, tool hardness may also be added on as tool-use information.

In this case, the tool-use decision rules relating to the NC machine tool are as follows:

NC machine

IF the machining stage is rough machining and the cutting area is large and the material hardness is low, THEN the machine used is an NC machine, the tool used is an end mill, the tool diameter is large and the tool hardness is low.

IF the machining stage is rough machining and the cutting area is small and the material hardness is ordinary, THEN the machine used is an NC machine, the tools used are a drill and an end mill, the tool diameter is small and tool hardness is ordinary.

IF the machining stage is finishing and the cutting area is small and the material hardness is ordinary and the surface precision is smooth, THEN the machine used is an NC machine, the tool used is an end mill, the tool diameter is very small and the tool hardness is ordinary.

IF the machining stage is rough machining and the cutting area is small and the material hardness is ordinary and the surface precision is smooth, THEN the machine used is an NC machine, the tool used is an end mill, the tool diameter is very small and the tool hardness is high.

⋮

In these tool-use decision rules, "tool hardness" is made high in a case where the "surface precision is smooth" and the "tool hardness" is made low in a case where the "surface precision is coarse". Further, "tool hardness" is made high in a case where the "material hardness is high" and the "tool hardness" is made low in a case where the "material hardness is low".

The membership functions or singletons relating to the machining stage, cutting area, material hardness, surface precision, tool used and tool diameter of the antecedent variables and consequent variables in these tool-use decision rules are the same as in the case of the tool-use decision rules in which "tool hardness" is not included among the consequent variables.

The tool-use determination unit 21 decides the machine used as well as the tool used by this machine in accordance with the tool-use decision rules, which include "tool hardness" as a variable in the consequent variables, and membership functions.

When the NC machine is selected by the tool-use determination unit 21 as the machine used, the optimum tool-use determination unit 22 decides upon the optimum tool used by the NC machine by searching the NC machine tool-use data file stored in the material & tool data file 25.

FIG. 20 illustrates an example of a tool-use data file of an NC machine.

The NC machine tool-use data file stores, in regard to the tools used by the NC machine, "tool name", "tool number", "tool diameter", "tool length", "tool life" and "tool price".

Figure 21:
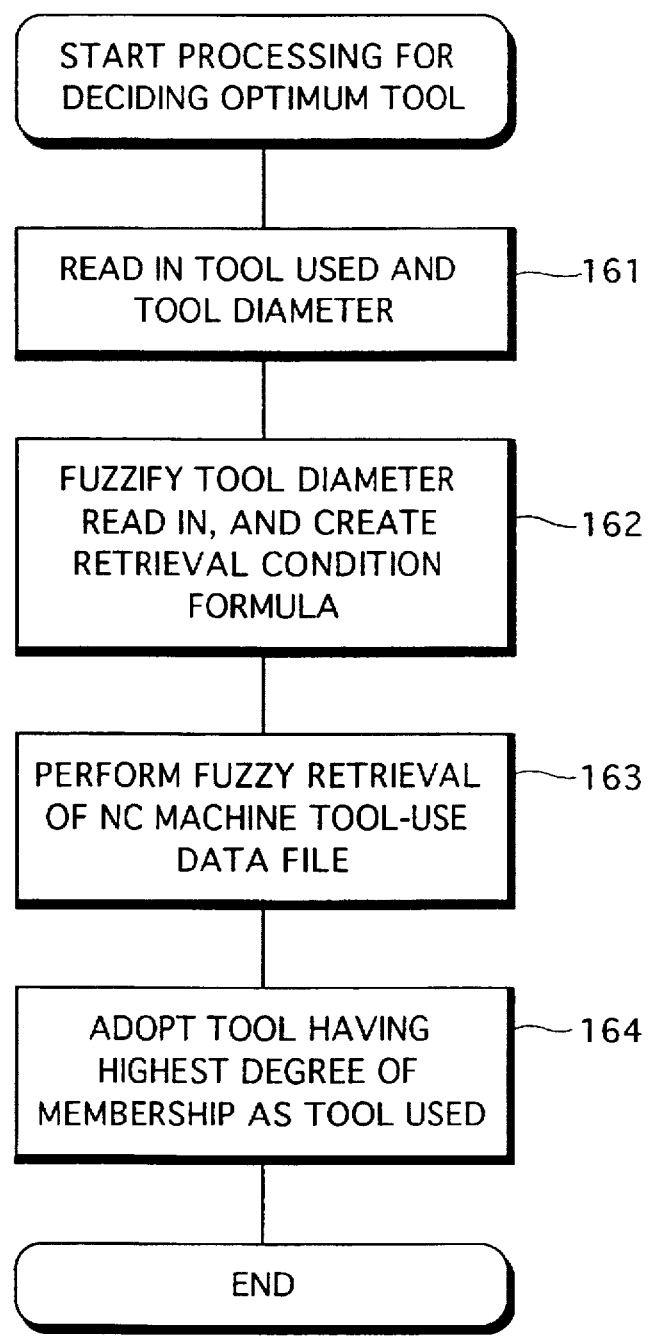
FIG. 21 is a flowchart illustrating a processing procedure in optimum tool determination unit.

FIG. 21 is a flowchart illustrating a processing procedure in the optimum tool-use determination unit 22.

The optimum tool-use determination unit 22 reads in a tool used and a tool diameter decided by the tool-use determination unit 21 (FIG. 21; step 161).

For example, the optimum tool-use determination unit 22 reads in the tool "end mill" and the tool diameter "4".

The optimum tool-use determination unit 22 fuzzifies the tool diameter read in and creates a retrieval condition formula for searching the NC machine tool-use data file (FIG. 21; step 162).

Figure 22A:
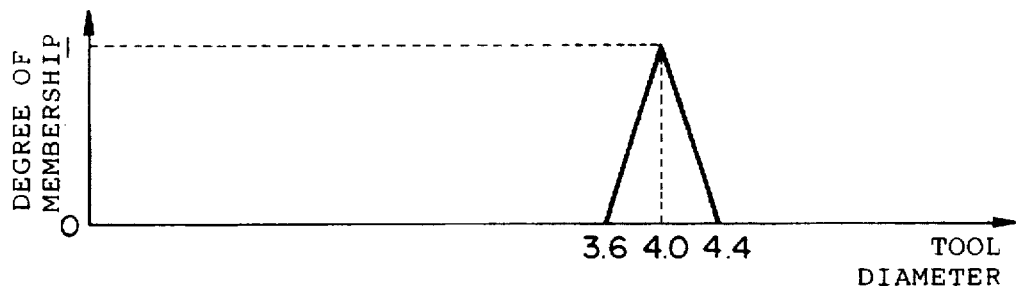
FIGS. 22a, 22b, 22c and 22d illustrate membership functions of retrieval conditions for retrieving a tool-use data file of an NC machine.

For example, since the "tool diameter" is "4 mm" owing to the operation of the tool-use determination unit 21, a membership function of the kind shown in FIG. 22a is obtained when the tool diameter "4" is fuzzified.

The membership function of the fuzzified tool diameter possesses a support set of values over a range of ±10% centered on "4" decided by the tool-use determination unit 21, namely a range of "3.6" to "4.4".

When tool diameter is fuzzified, a retrieval condition formula is created using the fact that the "tool used" decided by the tool-use determination unit 21 is the "end mill" and the fact that the fuzzified "tool diameter" is "about 4".

The retrieval condition formula has "tool used", "tool diameter", "tool life" and "tool price" as retrieval items.

For example, a retrieval condition formula is as follows:

The tool used is an end mill, and the tool diameter is about 4, and the tool life is long, and the tool price is low.

In this retrieval condition formula, "tool life is long" and "tool price is low" are set in advance. It goes without saying that a long life for the tool life of the tool used employed by the NC machine and a low price for the tool price is advantageous.

Figure 22B:
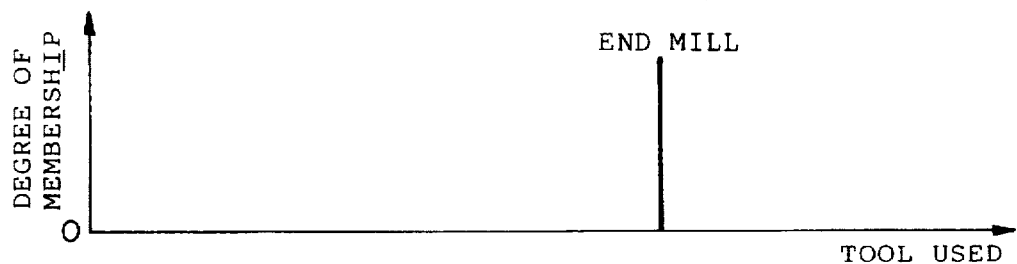
Figure 22C:
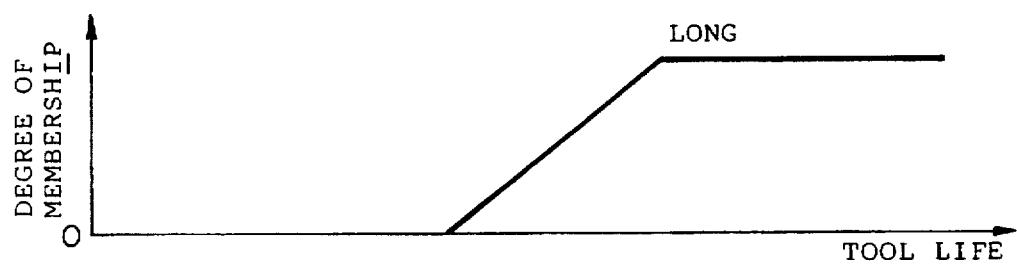
Figure 22D:
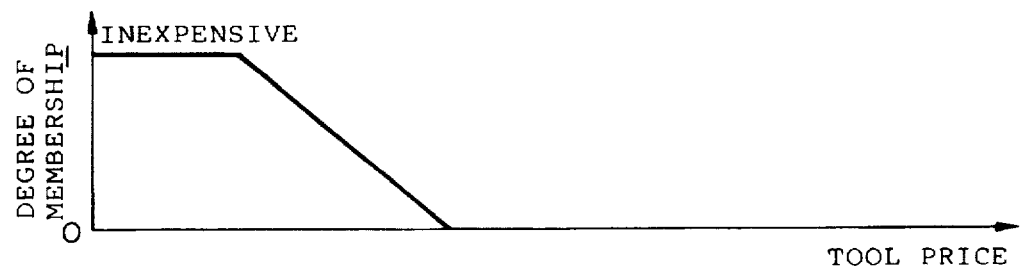

Examples of a singleton and membership functions relating to the tool used, tool life and tool price of the retrieval condition formula are illustrated in FIGS. 22b, 22c and 22d.

The optimum tool-use determination unit 22 searches the NC machine tool-use data file using the retrieval condition formula that has been created (FIG. 21; step 163).

When the optimum tool-use determination unit 22 searches the NC machine tool-use data file using the retrieval condition formula mentioned above, degrees of membership per retrieval condition of the kind shown in FIG. 23 are obtained with regard to the retrieval condition formula and each tool stored in the NC machine tool-use data file.

The optimum tool-use determination unit 22 calculates degrees of membership obtained by normalizing the degree of membership of each retrieval condition and decides upon the tool having the highest degree of membership among those calculated as the optimum tool used (FIG. 21; step 164).

For example, in a case where the degrees of membership shown in FIG. 23 are obtained, the optimum tool-use determination unit 22 selects the tool number "1" of tool name "end mill A", for which the degree of membership obtained by normalizing the degree of membership of each retrieval condition is "0.9", as the optimum tool for the NC machine.

The optimum tool-use determination unit 22 thus decides upon the optimum tool for the NC machine by referring to the NC machine tool-use data file.

Thus, in the case of the electrical discharge machine and wire-cut machine, the tool used decided by the tool-use determination unit 21 is outputted as tool-use information. In the case of the NC machine tool, the tool used decided by the optimum tool-use determination unit 22 is outputted as the tool-use information.

(4) Tool-path mode determination unit

The tool-path mode determination unit 23 decides the mode of the tool path in a case where the machine used is an NC machine and the tool used thereby is an end mill.

The mode of the tool path is the path along which the end mill machines the workpiece. Tool path modes include one-way travel, two-way travel and circuitous travel.

One-way travel refers to a method using either a down-cut or an up-cut.

Two-way travel refers to a method using both a down-cut and an up-cut.

Circuitous travel refers to a method in which, when a shape is a projecting shape, machining is performed around the projecting shape.

The tool-path mode determination unit 23 decides the tool path mode on the basis of the machining-stage information, machining shape information and after-machining shape information, and in accordance with tool-path mode decision rules and membership functions established in advance.

Tool-path mode decision rules are as follows, by way of example:

IF the machining stage is rough machining and the convexity is large and the cutting area is small,
THEN the tool path mode is one-way travel.

IF the machining stage is rough machining and the convexity is small and the cutting area is large,
THEN the tool path mode is circuitous travel.

IF the machining stage is finishing and the convexity is medium and the cutting area is large,
THEN the tool path mode is two-way travel.

IF the machining stage is finishing and the cutting area is large and the surface precision is coarse,
THEN the tool path mode is two-way travel.

:
:

IF the machining stage is finishing and the cutting area is small and the surface precision is smooth,
THEN the tool path mode is one-way travel.

In these tool-path mode decision rules, the tool path mode is made "one-way travel" in case of "the cutting area is small". The reason for this is that machining time is not lengthened that much even if the tool used is returned to the prescribed reference position by performing cutting machining in a fixed direction. In case of "the cutting area is large", on the other hand, the tool path mode is made "two-way travel". This is because machining time becomes too long when one-way travel is adopted for machining a cutting area that is large. Furthermore, in case of "the cutting area is large" and "the convexity is small", the tool path mode is made "circuitous travel". In case of "the surface precision is smooth", one-way travel is adopted.

FIGS. 24a–24e illustrate examples of membership functions and singletons with regard to antecedent variables and consequent variables of tool-path mode decision rules.

Figure 24A:
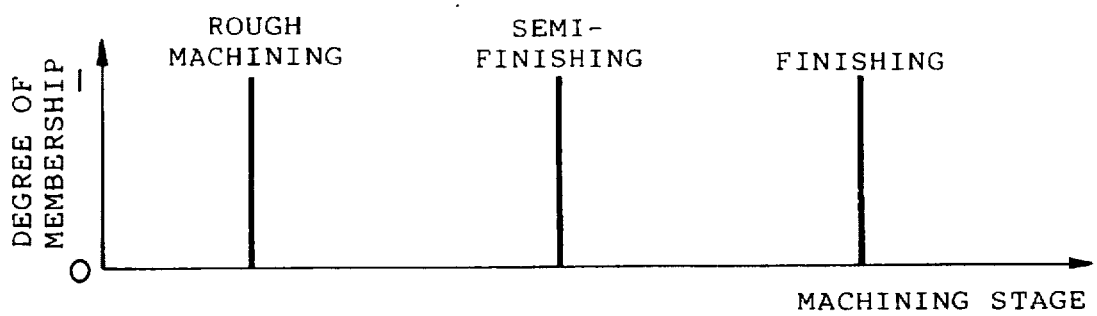
FIGS. 24a, 24b, 24c, 24d and 24e illustrate examples of membership functions and singletons with regard to antecedent variables and consequent variables of tool-path mode decision rules.

FIG. 24a illustrates three singletons of linguistic information "rough machining", "semi-finishing" and "finishing" with regard to the antecedent variable "machining stage".

Figure 24B:
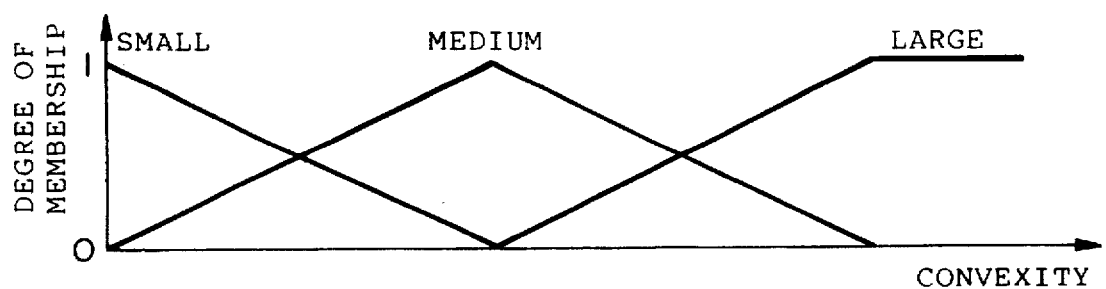

FIG. 24b illustrates three membership functions of linguistic information "small", "medium" and "large" with regard to the antecedent variable "convexity".

Figure 24C:
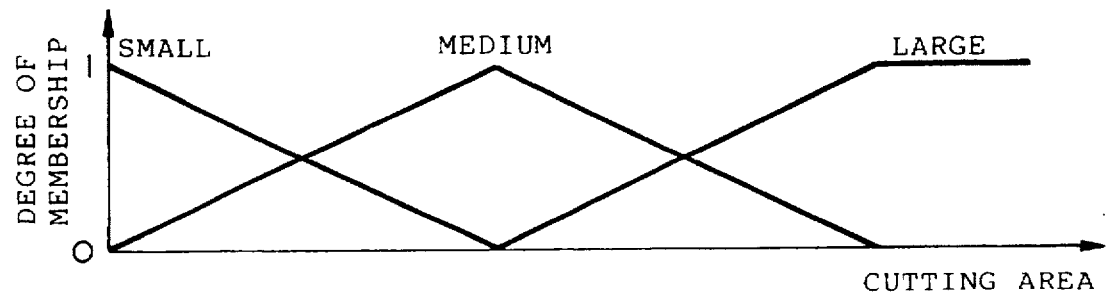

FIG. 24c illustrates three membership functions of linguistic information "small", "medium" and "large" with regard to the antecedent variable "cutting area".

Figure 24D:
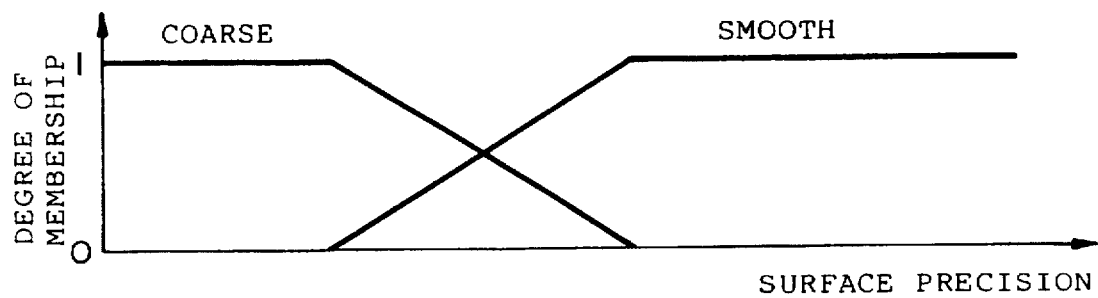

FIG. 24d illustrate two membership functions of linguistic information "coarse" and "smooth" with regard to the antecedent variable "surface precision".

Figure 24E:
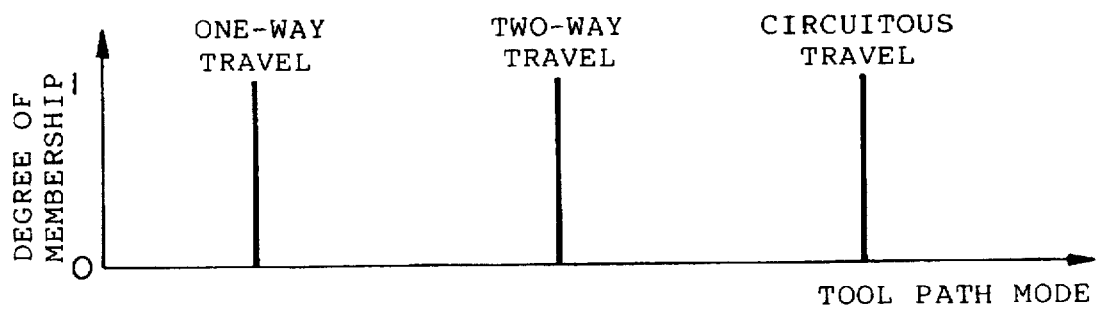

FIG. 24e illustrates three singletons of linguistic information "one-way travel", "two-way travel" and "circuitous travel" with regard to the consequent variable "tool path mode".

Among the "one-way travel", "two-way travel" and "circuitous travel" of the consequent variables, the tool-path mode determination unit 23 decides upon that having the highest degree of membership as the tool path mode.

For instance, in the example given above, the tool-path mode determination unit 23 decides upon "one-way travel" as the tool path mode.

The tool path mode decided upon by the tool-path mode determination unit 23 in the manner set forth above is outputted as tool-path mode information.

(5) Machining condition determination unit The machining condition determination unit 24 decides machining conditions based upon the material information, machining-stage information, before-machining shape information and after-machining shape information, and in accordance with machining-condition decision rules and membership functions established in advance.

The machining condition determination unit 24 decides the machining conditions with regard to any of the machines, namely the NC machine, electrical discharge machine and wire-cut machine, decided upon by the tool-use determination unit 21.

The machining conditions of the NC machine are the rotational speed and feed rate of the tool used.

The machining conditions of the electrical discharge machine are the feed rate of the electrode rod and output thereof.

The machining conditions of the wire-cut machine are the feed rate of the wire and output thereof.

Machining-condition decision rules are as follows, by way of example:

NC machine
- IF the machining stage is rough machining and the cutting width is small and the cutting depth is small and the material hardness is low,
- THEN the feed rate is high and the rotational speed is low.
- IF the machining stage is rough machining and the cutting width is small and the cutting depth is small and the material hardness is ordinary,
- THEN the feed rate is somewhat high and the rotational speed is somewhat low.
- IF the machining stage is finishing and the corner radius is large and the material hardness is low and the surface precision is coarse,
- THEN the feed rate is low and the rotational speed is high.
- IF the machining stage is finishing and the corner radius is large and the material hardness is low and the surface precision is smooth,
- THEN the feed rate is somewhat low and the rotational speed is somewhat high.

:
:

Electrical discharge machine
- IF the machining stage is rough machining and the cutting area is large,
- THEN the feed rate is somewhat high and the output is medium.
- IF the machining stage is semi-finishing and the cutting area is small,
- THEN the feed rate is somewhat low and the output is small.

:
:

Wire-cut machine
- IF the machining stage is rough machining and the cutting area is large,
- THEN the feed rate is somewhat high and the output is medium.
- IF the machining stage is semi-finishing and the cutting area is small,
- THEN the feed rate is somewhat high and the output is small.

:
:

These machining-condition decision rules are so adapted that the feed rate is made higher in case of "the material hardness is low". The reason for this is that the feed rate can be raised to perform machining when the workpiece material is soft. The same is true when "the cutting depth is small" and "the cutting width is small". Further, the feed rate is reduced in case of "the surface precision is smooth". Furthermore, if the machining portion is the corner, the feed rate is reduced.

FIGS. 25a–25m illustrate examples of membership functions and singletons with regard to the antecedents and consequents of machining-condition decision rules. The membership functions and singletons of the antecedent variables are common to each of the machine tools. The membership functions and singletons of the consequent variables are specific to the machine tools.

Figure 25A:
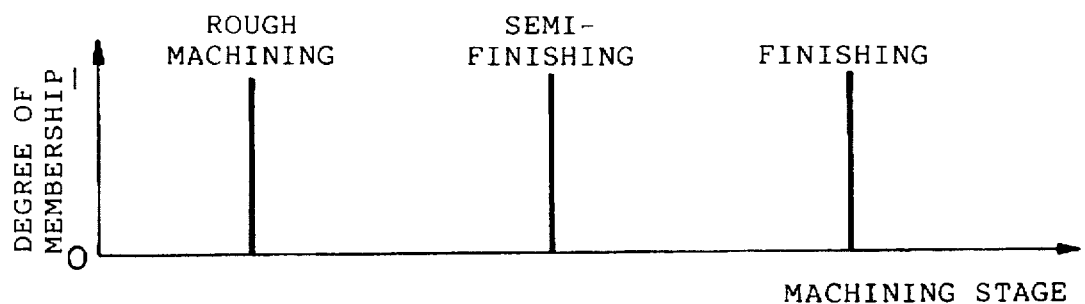
FIGS. 25a, 25b, 25c, 25d, 25e, 25f, 25g, 25h, 25i, 25j, 25k, 25l and 25m illustrate examples of membership functions and singletons with regard to antecedent variables and consequent variables of machining-condition decision rules.

FIG. 25a illustrates three singletons of linguistic information "rough machining", "semi-finishing" and "finishing" with regard to the antecedent variable "machining stage".

Figure 25B:
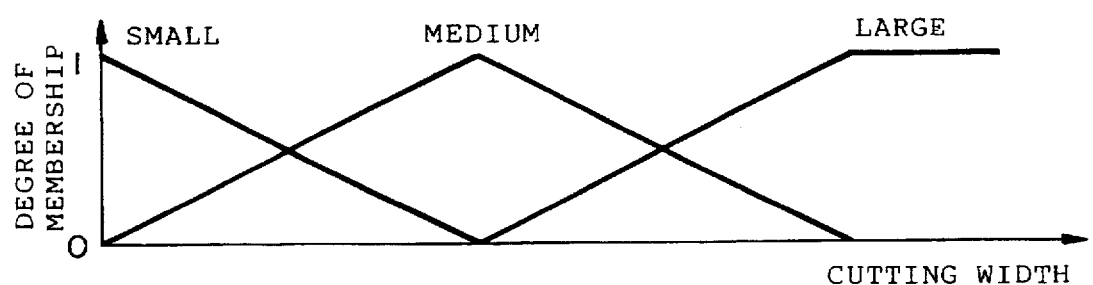

FIG. 25b illustrates three membership functions of linguistic information "small", "medium" and "large" with regard to the antecedent variable "cutting width".

Figure 25C:
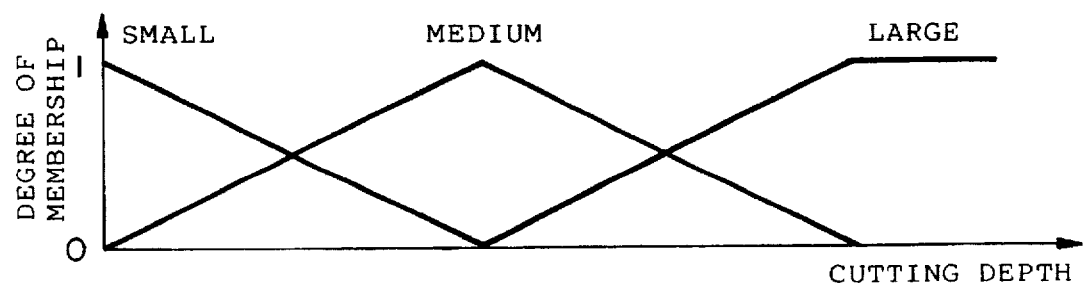

FIG. 25c illustrates three membership functions of linguistic information "small", "medium" and "large" with regard to the antecedent variable "cutting depth".

Figure 25D:
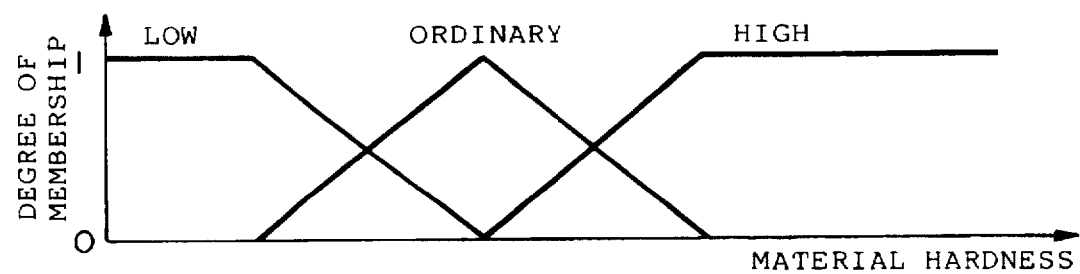

FIG. 25d illustrates three membership functions of linguistic information "low", "ordinary" and "high" with regard to the antecedent variable "material hardness".

Figure 25E:
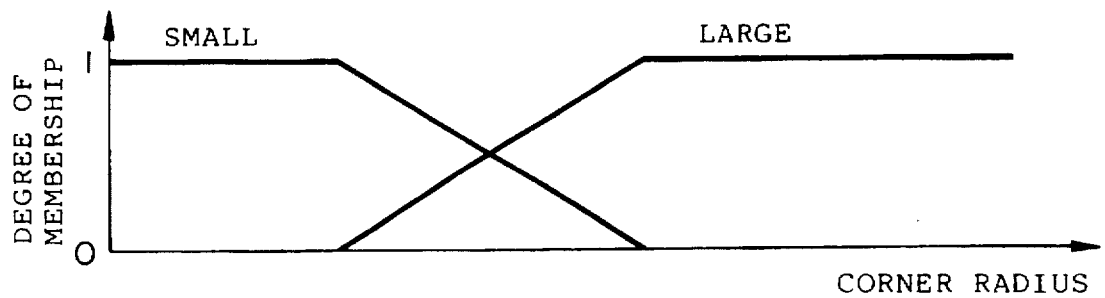

FIG. 25e illustrates two membership functions of linguistic information "small" and "large" with regard to the antecedent variable "corner radius".

Figure 25F:
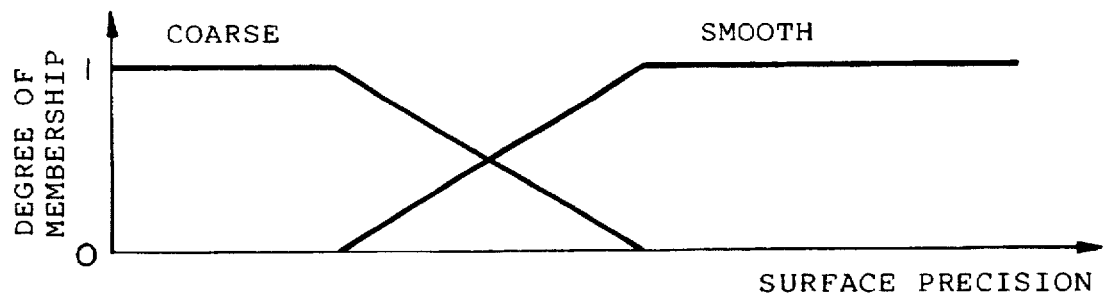

FIG. 25f illustrates two membership functions of linguistic information "coarse" and "smooth" with regard to the antecedent variable "surface precision".

Figure 25G:
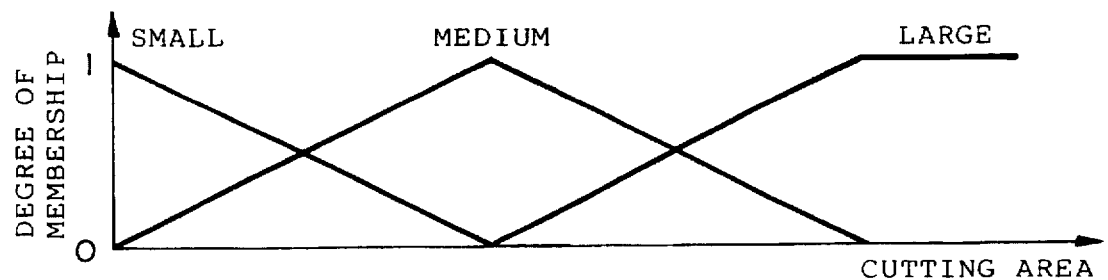

FIG. 25g illustrates three membership functions of linguistic information "small", "medium" and "large" with regard to the antecedent variable "cutting area".

Figure 25H:
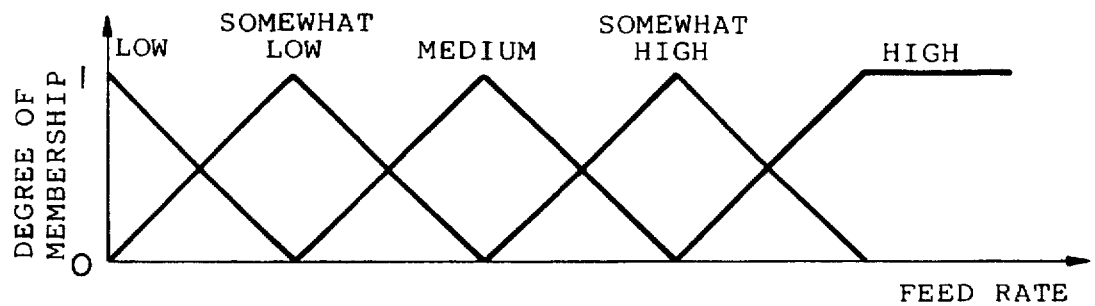

FIG. 25h illustrates five membership functions of linguistic information "low", "somewhat low", "medium", "somewhat high" and "high" with regard to the consequent variable "feed rate" relating to the NC machine.

Figure 25I:
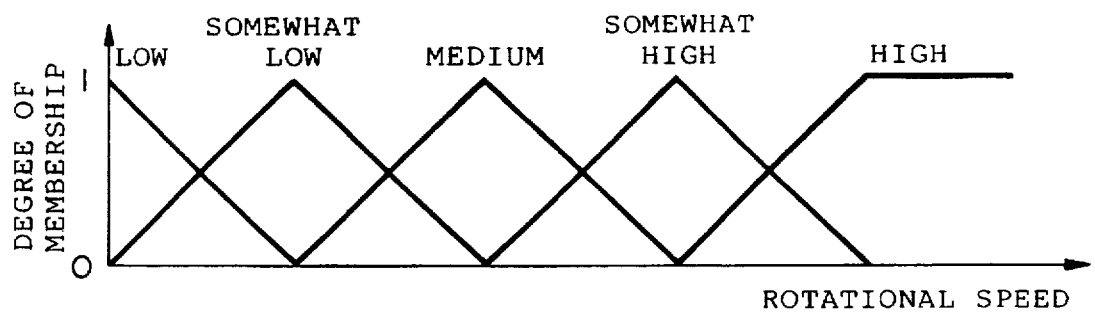

FIG. 25i illustrates five membership functions of linguistic information "low", "somewhat low", "medium", "somewhat high" and "high" with regard to the consequent variable "rotational speed" relating to the NC machine.

Figure 25J:
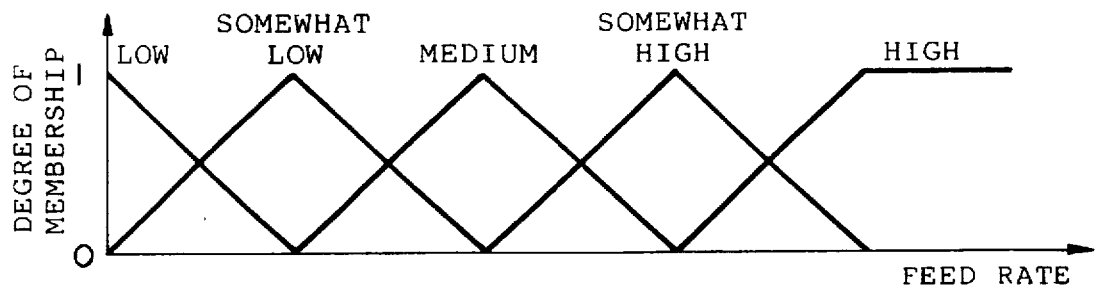

FIG. 25j illustrates five membership functions of linguistic information "low", "somewhat low", "medium", "somewhat high" and "high" with regard to the consequent variable "feed rate" relating to the electrical discharge machine.

Figure 25K:
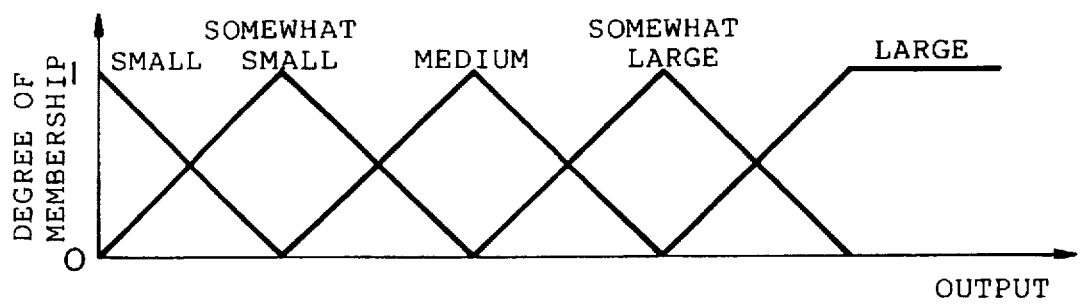

FIG. 25k illustrates five membership functions of linguistic information "small", "somewhat small", "medium", "somewhat large" and "large" with regard to the consequent variable "output" relating to the electrical discharge machine.

Figure 25L:
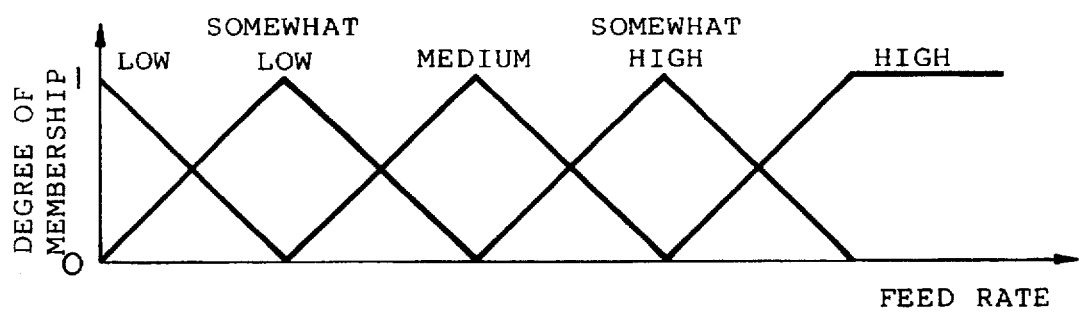

FIG. 25l illustrates five membership functions of linguistic information "low", "somewhat low", "medium", "somewhat high" and "high" with regard to the consequent variable "feed rate" relating to the wire-cut machine.

Figure 25M:
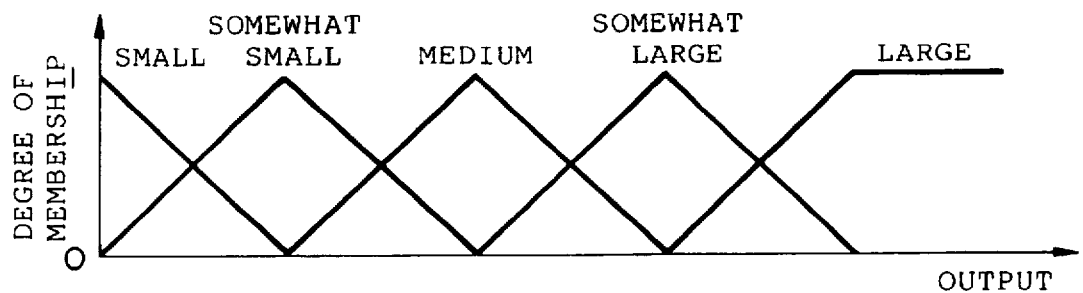

FIG. 25m illustrates five membership functions of linguistic information "small", "somewhat small", "medium", "somewhat large" and "large" with regard to the consequent variable "output" relating to the wire-cut machine.

By way of example, the tool-use determination unit 21 judges that the machine used is the NC machine. Therefore, the machining condition determination unit 24 decides the machining conditions in accordance with the machining-condition decision rules relating to the NC machine. The machining condition determination unit 24 decides upon a feed rate of "10" and a rotational speed of "3000" as the machining conditions.

Thus, the machining conditions decided by the machining condition determination unit 24 are outputted as the machining condition information.

When the machining information determination apparatus 20 decides the tool-use information, tool-path mode information and machining condition information, these items of information are outputted to the CAM apparatus 17 and machine tool 18 as optimum machining information.

For example, optimum machining information of the kind shown in FIG. 26 is obtained by the machining information determination apparatus 20 in the manner described above.

1.6 CAM apparatus

The CAM apparatus 17 generates NC data for controlling a machine tool on the basis of the before-machining shape model and after-machining shape model provided by the CAD apparatus 10 as well as the optimum machining information decided by the machining information determination apparatus 20.

The CAM apparatus 17 generally comprises a computer system and an application system (software) which operates in the computer system. The CAM apparatus 17 is easier for the operator to operate in comparison with the automatic programming of the machine tool 18.

Figure 27:
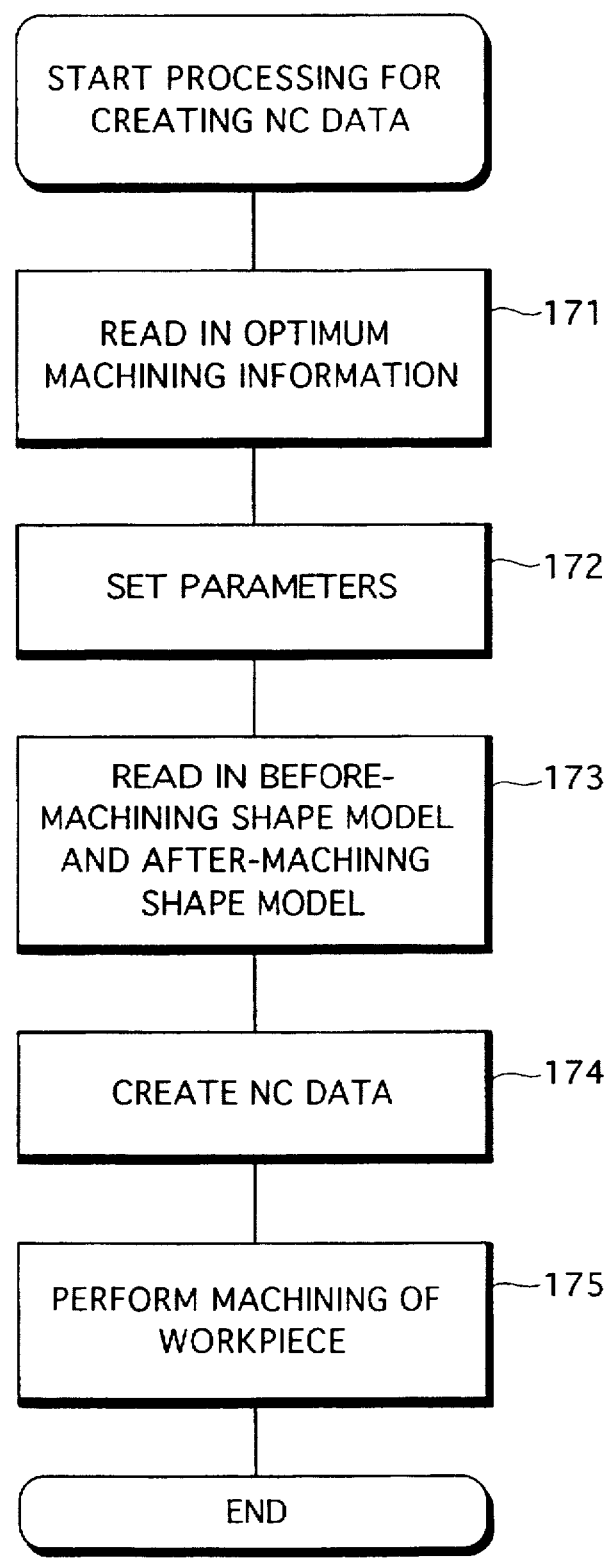
FIG. 27 is a flowchart illustrating the processing procedure in a CAM apparatus.

FIG. 27 is a flowchart illustrating the processing procedure in the CAM apparatus 17.

The CAM apparatus 17 reads in the optimum machining information provided by the machining information determination apparatus 20 (FIG. 27; example 171). For example, the CAM apparatus reads in the optimum machining information illustrated in FIG. 26.

The operator sets parameters relating to the machine tool 18 (FIG. 27; step 172).

An example of parameters of the machine tool 18 set by the operator is illustrated in FIG. 28.

The parameters of the machine tool are "initial tool position", "tool traveling height", "tool traveling distance", "before-machining shape model", "after-machining shape model" and "machine name".

Initial tool position is the position of a tool when the machine tool starts machining. For example, an initial tool position is "X=0, Y=0, Z=100".

Tool traveling height is the height of a tool when it is moved by the machine tool. For example, a tool traveling height is "Z=90".

Tool traveling distance is the distance over which a tool is moved by the machine tool. For example, a tool traveling distance is "Δx=5, Δy=5, Δz=5".

The before-machining shape model is created by the CAD apparatus 10. The file name of the data file of the before-machining shape model is entered. For example, a file name of a before-machining shape model is "bk.dat".

The after-machining shape model is created by the CAD apparatus 10. The file name of the data file of the after-machining shape model is entered. For example, a file name of an after-machining shape model is "ak.dat".

Machine name is the name of the machine tool which actually carries out machining. For example, a machine name is "OM1".

When the parameters of the machine tool are entered, the CAM apparatus 17 reads in the before-machining shape model and after-machining shape model from the CAD apparatus 10 on the basis of the file names of the before-machining shape model and after-machining shape model contained in the parameters (FIG. 27; step 173).

The CAM apparatus 17 decides the tool path on the basis of the before-machining shape model, after-machining shape model and optimum machining information read in and the machine tool parameters entered. The apparatus 17 converts the tool path to codes previously prepared and creates NC data (FIG. 27; step 174).

Figure 29:
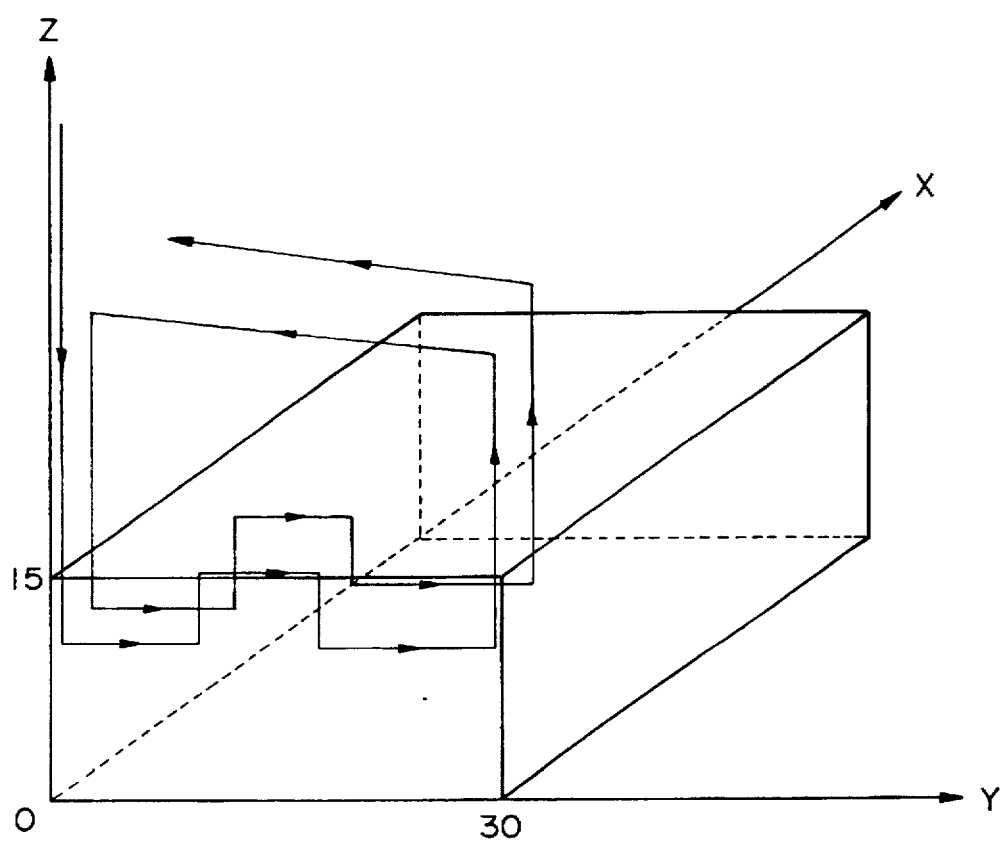
FIG. 29 illustrates an example of a tool path.

For example, a tool path of the kind shown in FIG. 29 is decided with regard to the after-machining shape model of FIG. 6. NC data is created on the basis of this tool path. The NC data created is applied to the machine tool 18.

The machine tool 18 performs machining of the workpiece on the basis of the NC data created by the CAM apparatus 17 (FIG. 27; step 174).

1.7 Machine tool

In a manner similar to that of the CAM apparatus 17, the machine tool 18 may react NC data by automatic programming, furnished in advance, on the basis of the before-machining shape model and after-machining shape model provided by the CAD apparatus 10 and the optimum machining information decided by the machining information determination apparatus 20. In such case, the CAM apparatus 17 is unnecessary.

The machine tool 18 actually machines the workpiece subsequently on the basis of the NC data generated.

Namely, the NC data is created as the result of processing, similar to that of the CAM apparatus 17, executed by automatic programming of the machine tool 18 (see FIG. 27; steps 171–174).

The machine tool 18 performs machining of the workpiece based upon the NC data that has been created (FIG. 27; step 175).

2. Special functions of machining information determination system

An embodiment in which some of the units in "1. Machining information determination system" are replaced by different units, and an embodiment in which new units are added to the above-mentioned system, will now be described.

Figure 30:
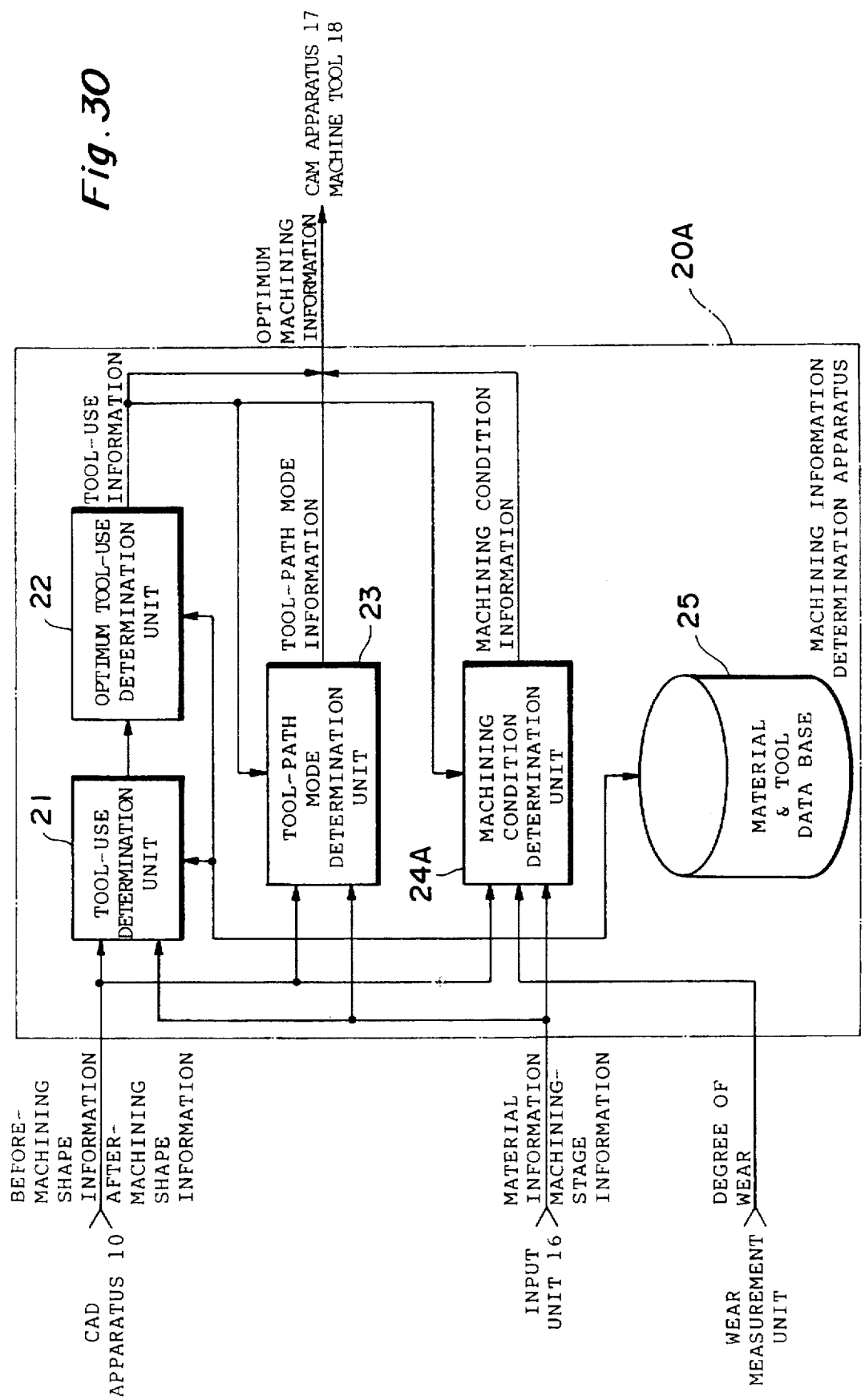
FIG. 30 is a functional block diagram illustrating the detailed construction of a modification of the machining information determination apparatus.

2.1 Machining condition determination unit for determining machining conditions while taking into account degree of wear of tool used (1) Summary FIG. 30 is a functional block diagram illustrating the construction of a machining information determination apparatus 20A. Components in FIG. 30 identical with those shown in FIG. 16 are designated by like reference characters and a detailed description thereof is omitted.

A machining condition determination unit 24A decides machining conditions based upon the before-machining shape information and after-machining shape information provided by the CAD apparatus 10, material information, machining-stage information and continuous-use prearranged-time entered from the input unit 16 and degree of wear of tool used provided by a wear measurement unit, and in accordance with machining-condition decision rules and membership functions established in advance.

The continuous-use prearranged-time, which is entered by the operator using the input unit 16, is the time during which a tool is used continuously.

Though a method of detecting degree of wear in the wear measurement unit will be described later, degree of wear includes degree of wear of a tool used by an NC machine and degree of wear of an electrode used by an electrical discharge machine.

By way of example, machining-condition decision rules are of the following types with regard to the NC machine and electrical discharge machine:

NC machine
  IF the machining stage is rough machining and the degree of wear is high and the continuous-use prearranged time is short,
  THEN the feed rate is high and the rotational speed is medium.
  IF the machining stage is semi-finishing and the degree of wear is low and the continuous-use prearranged time is medium,
  THEN the feed rate is medium and the rotational speed is low.
  IF the machining stage is finishing and the degree of wear is medium and the continuous-use prearranged time is long,
  THEN the feed rate is low and the rotational speed is high.
  IF the machining stage is finishing and the surface precision is smooth and the degree of wear is high and the continuous-use prearranged time is long, THEN "use of this tool is not recommended".

:

:

Electrical discharge machine
IF the machining stage is finishing and the degree of wear is high and the continuous-use prearranged time is short,
THEN "use of this electrode is not recommended".
IF the machining stage is finishing and the degree of wear is low and the continuous-use prearranged time is long,
THEN the feed rate is low and the output is medium.
IF the machining stage is finishing and the degree of wear is medium and the continuous-use prearranged time is short,
THEN the feed rate is high and the output is large.

:

:

FIGS. 31a–31h illustrate examples of membership functions and singletons with regard to antecedent variables and consequent variables of machining-condition decision rules.

Figure 31A:
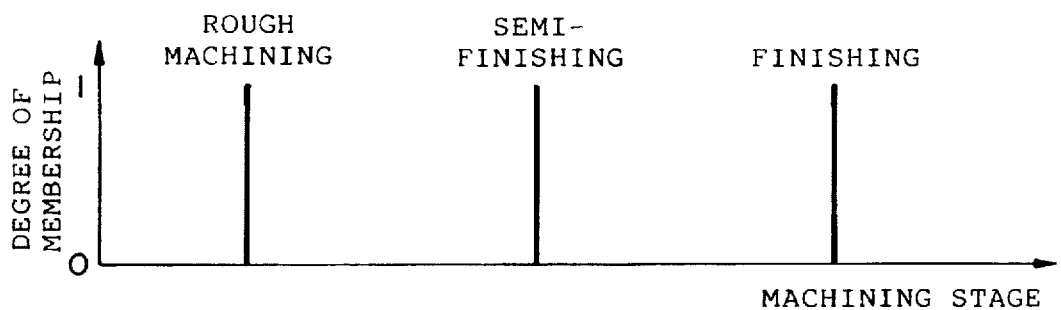
FIGS. 31a, 31b, 31c, 31d, 31e, 31f, 31g and 31h illustrate examples of membership functions and singletons with regard to antecedent variables and consequent variables of machining-condition decision rules.

FIG. 31a illustrates three singletons of linguistic information "rough machining", "semi-finishing" and "finishing-"with regard to the antecedent variable "machining stage".

Figure 31B:
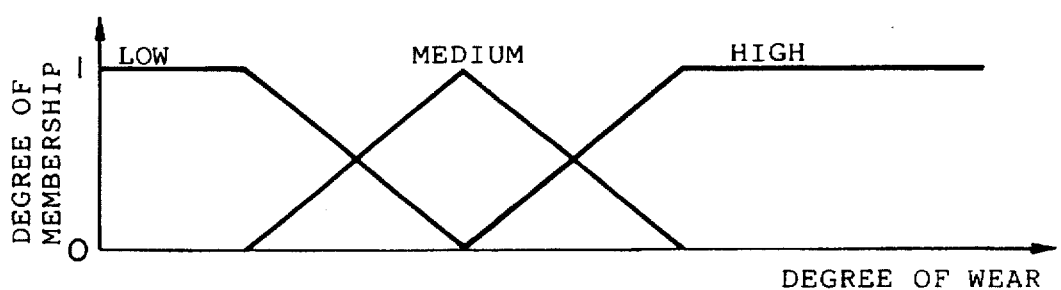

FIG. 31b illustrates three membership functions of linguistic information "low", "medium" and "high" with regard to the antecedent variable "degree of wear".

Figure 31C:
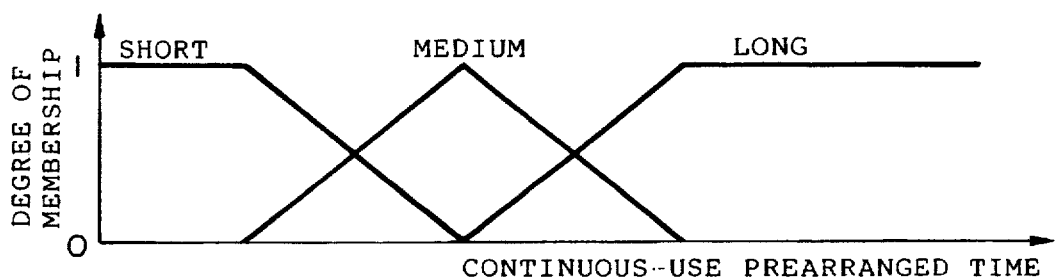

FIG. 31c illustrates three membership functions of linguistic information "short", "medium" and "long" with regard to the antecedent variable "continuous-use prearranged time".

Figure 31D:
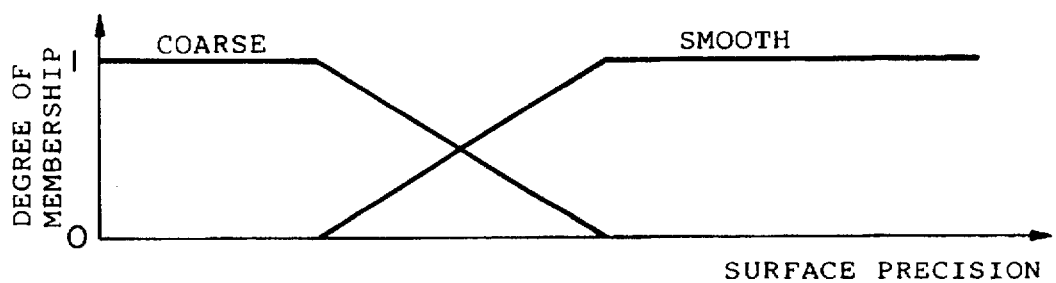

FIG. 31d illustrates two membership functions of linguistic information "coarse" and "smooth" with regard to the antecedent variable "surface precision".

Figure 31E:
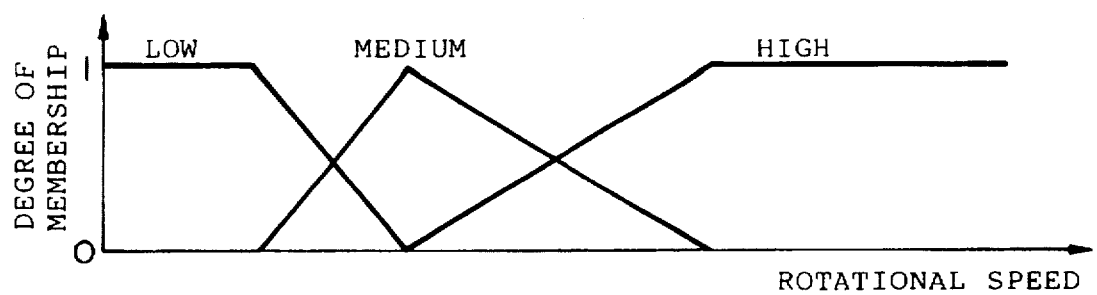

FIG. 31e illustrates three membership functions of linguistic information "low", "medium" and "high" with regard to the consequent variable "rotational speed relating to the NC machine.

Figure 31F:
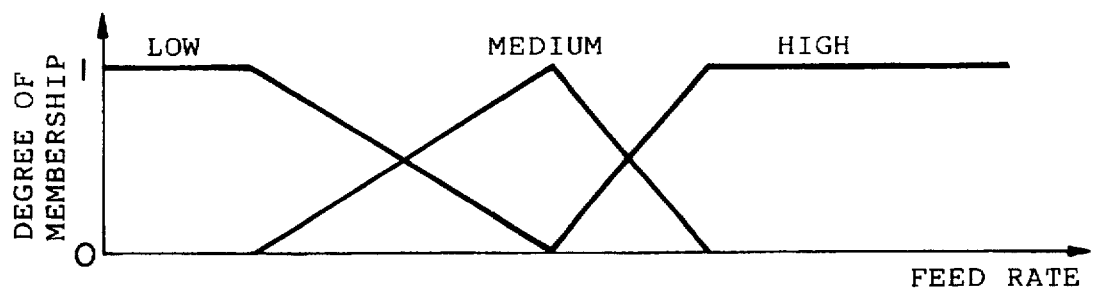

FIG. 31f illustrates three membership functions of linguistic information "low", "medium" and "high" with regard to the consequent variable "feed rate" relating to the NC machine.

Figure 31G:
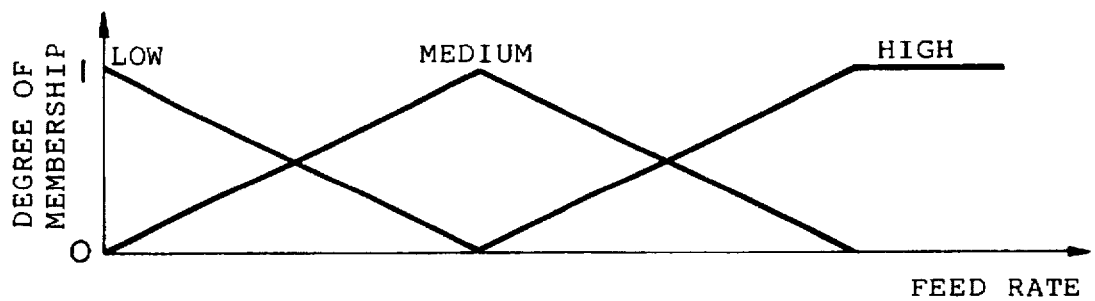

FIG. 31g illustrates three membership functions of linguistic information "low", "medium" and "high" with regard to the consequent variable "feed rate" relating to the electrical discharge machine.

Figure 31H:
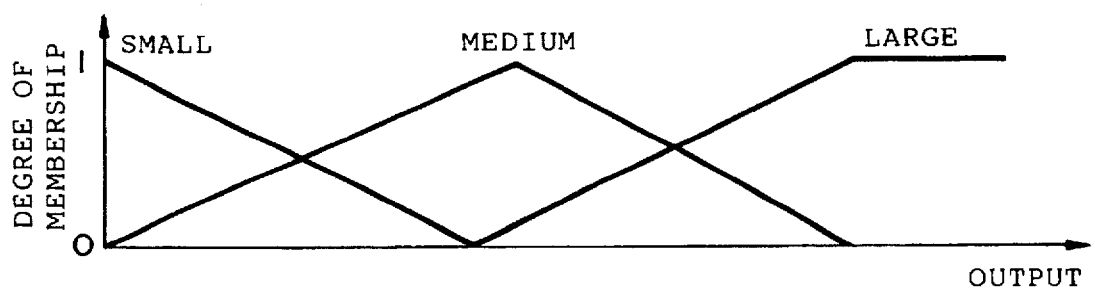

FIG. 31h illustrates three membership functions of linguistic information "small", "medium" and "large" with regard to the consequent variable "output" relating to the electrical discharge machine.

The machining condition determination unit 24A decides the machining conditions upon taking into consideration the degree of wear of the tool used, thereby making it possible to decide optimum machining conditions for a tool that has sustained wear.

Further, the machining condition determination unit 24A decides the machining conditions upon taking into consideration the period of time over which the tool is used continuously, thereby making it possible to decide optimum machining conditions even in a case where the continuous-use time is slightly longer than the life of the tool.

In this embodiment, the machining condition determination unit 24A decides machining conditions while taking into account the degree of wear and the continuous-use prearranged time. It is also possible to adopt an arrangement in which machining conditions are decided upon taking into consideration either the degree of wear or the continuous-use prearranged time.

Figure 32:
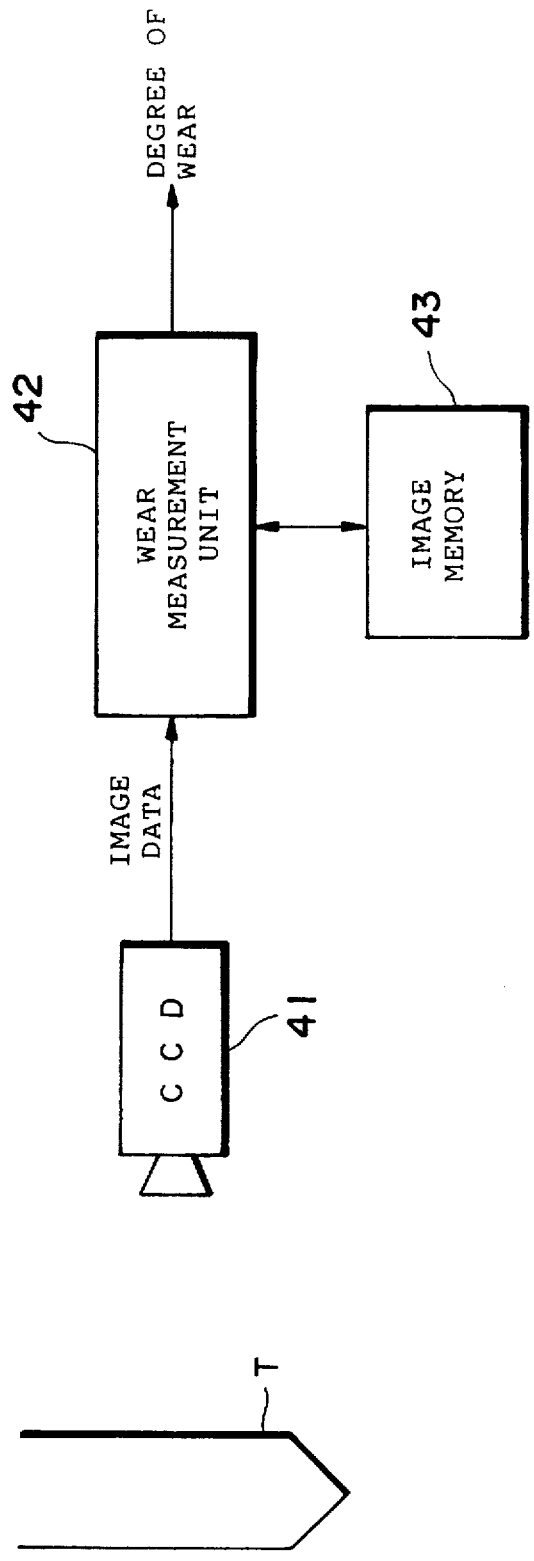
FIG. 32 is a block diagram in which, when a machine tool is an NC machine, a tool employed by the NC machine is photographed directly by a CCD camera and the degree of wear of the tool is detected.

(2) Method of directly photographing tool used and detecting degree of wear thereof FIG. 32 is a block diagram in which, when a machine tool is an NC machine, a tool employed by the NC machine is photographed directly by a CCD camera and the degree of wear of the tool is detected.

A CCD camera 41 photographs a tool T used by an NC machine. Image data representing the tool T photographed by the CCD camera 41 is applied to a wear measurement unit 42.

Before-use image data obtained when the tool T is photographed while brand new and use-limit image data, which is obtained when the tool T is photographed at the limit of its useful service life, are stored in an image memory 43 in advance. The before-use image data and the use-limit image data are obtained by binarizing, at a prescribed threshold value, the image data obtained in advance by photography using the CCD camera 42.

Figure 34C:
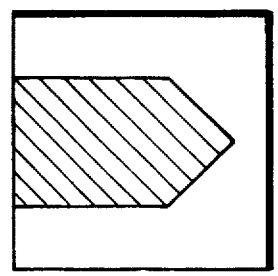
FIG. 34c an example of use-limit image data stored in the image memory.
Figure 34B:
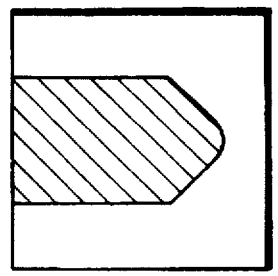
FIG. 34a illustrates an example of before-use image data stored in an image memory, FIG. 34b an example of data which is the result of binarizing the image data obtained by photography using the CCD camera.
Figure 34A:
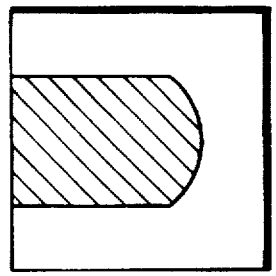

FIG. 34a illustrates an example of before-use image data stored in the image memory 43. FIG. 34c illustrates an example of use-limit image data stored in the image memory 43.

The wear measurement unit 42 calculates degree of wear on the basis of the image data provided by the CCD camera 41 as well as the before-use tool image data and use-limit image data stored in the image memory 43.

The calculated degree of wear is applied to the machining condition determination unit 24A from the wear measurement unit 42.

Figure 33:
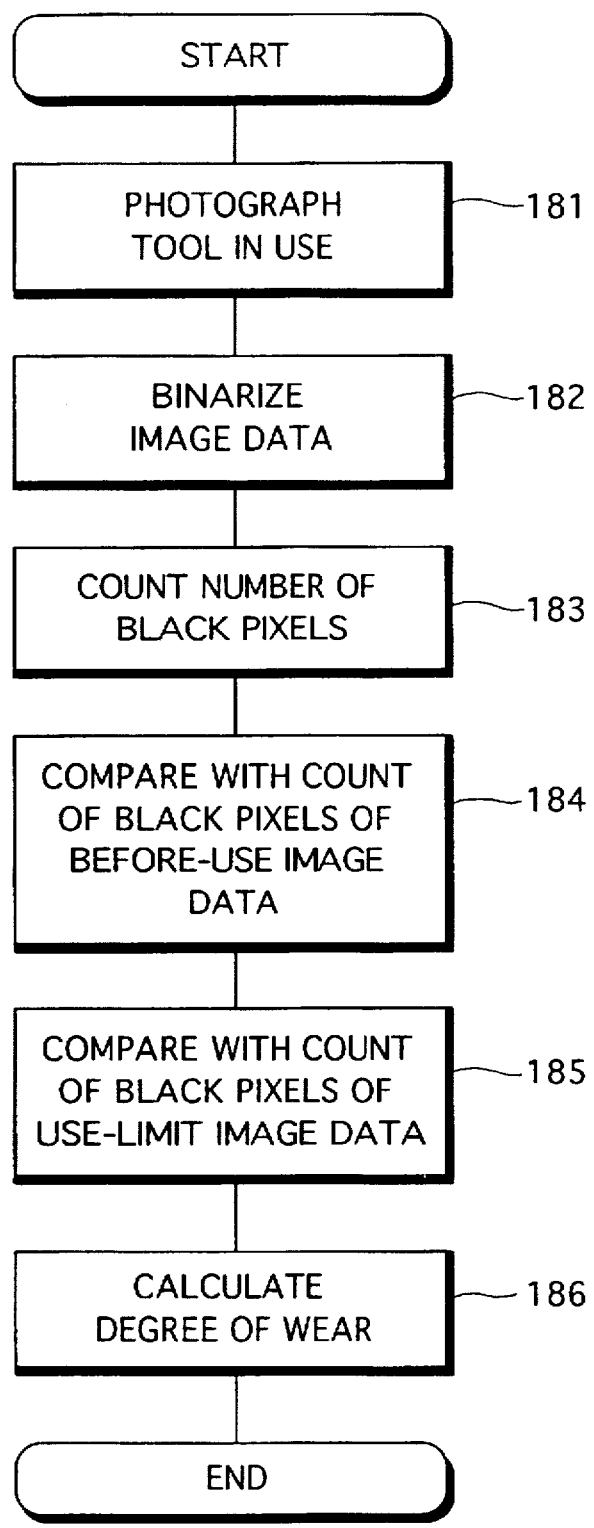
FIG. 33 is a flowchart illustrating a processing procedure for directly photographing a tool used and detecting the degree of wear of the tool.

FIG. 33 is a flowchart illustrating a processing procedure for directly photographing a tool used and detecting the degree of wear of the tool.

The tool T is photographed by the CCD camera 41 and the image data obtained by photography is applied to the wear measurement unit 42 (FIG. 33; step 181).

The wear measurement unit 42 binarizes the image data, which has been obtained by photography using the CCD camera 41, at a prescribed threshold value (FIG. 33; step 182). By way of example, FIG. 34b illustrates an example of data which is the result of binarizing the image data obtained by photography using the CCD camera 41.

The wear measurement unit 42 counts the number of black pixels of binarized image data and adopts Kx as the value of the count (FIG. 33; step 183).

The wear measurement unit 42 compares black pixel count Kx of the binarized image data and the black pixel count K0 of the before-use image data stored in the image memory 43 (FIG. 33; step 184). Since the before-use image data has already been stored in the image memory 43, the black pixel count K0 can be obtained in advance.

The wear measurement unit 42 compares black pixel cound Kx of the binarized image data and the black pixel count K1 of the use-limit image data stored in the image memory 43 (FIG. 33; step 185). Since the use-limit image data has already been stored in the image memory 43, the black pixel count K1 can be obtained in advance.

The wear measurement unit 42 calculates degree of wear Ab in accordance with the following equation (FIG. 33; step 186):

$$Ab=(K0-Kx)/(K0-K) \qquad (1)$$

The degree of wear calculated is applied to the machining information determination unit 24A from the wear measurement unit 42.

The degree of wear is thus calculated.

The degree of wear of the electrode rod of the electrical discharge machine is capable of being detected in the same manner as the degree of wear of the tool of the NC machine.

Figure 35:
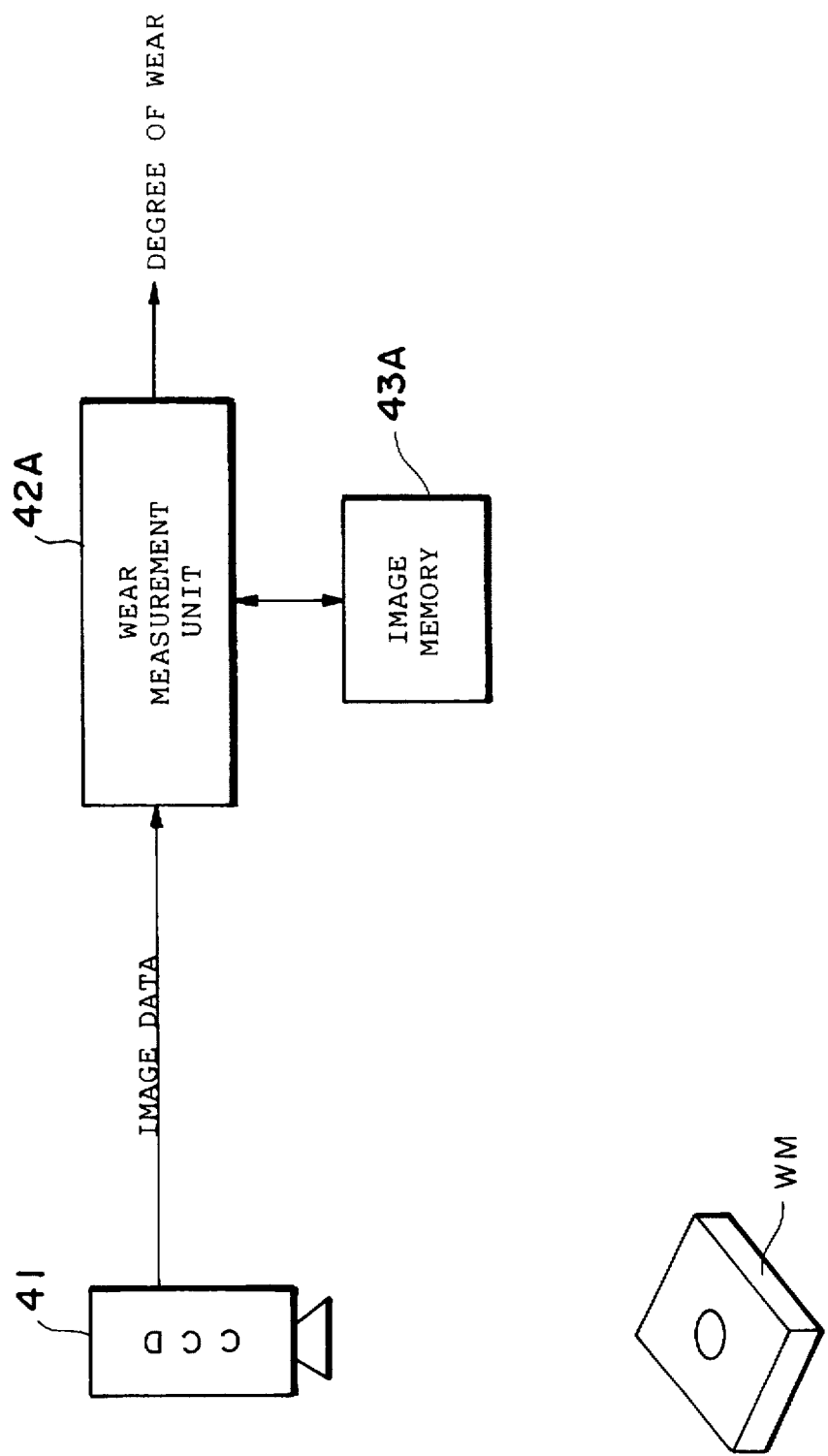
FIG. 35 is a block diagram in which machining marks, produced when a prescribed standard workpiece material is machined under fixed machining conditions using a tool employed by a machine tool, are photographed by a CCD camera and the degree of wear of the tool is detected.

(3) Method of detecting degree of wear of tool used based upon machining marks produced by machining standard workpiece material FIG. 35 is a block diagram in which machining marks, produced when a prescribed standard workpiece material is machined under fixed machining conditions using a tool employed by the NC machine, are photographed by the CCD camera and the degree of wear of the tool is detected.

The CCD camera 41 photographs machining marks produced when a prescribed standard workpiece material WM is machined under fixed machining conditions using the tool T employed by the NC machine. The image data representing the machining marks on the standard workpiece material WM photographed by the CCD camera 41 is applied to a wear measurement unit 42A.

Before-use image data representing machining marks produced when the standard workpiece material WM is machined by the NC machine using a brand new tool T and use-limit image data representing machining marks produced when the standard workpiece material WM is machined using a tool T that has reached the limit of its usefulness are stored in an image memory 43A in advance. These items of data are obtained by photography using the CCD camera 41 in advance.

Figure 37A:
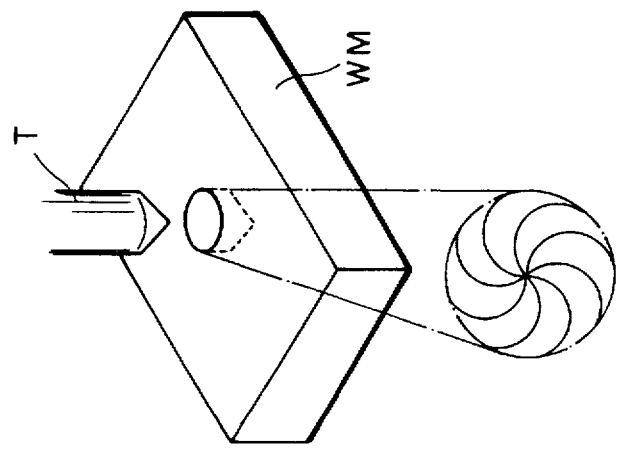
FIG. 37a illustrates an example of before-use image data stored in an image memory, FIG. 37b an example of image data of machining marks obtained by photography using a CCD camera, and FIG. 37c an example of use-limit image data stored in an image memory.
Figure 37B:
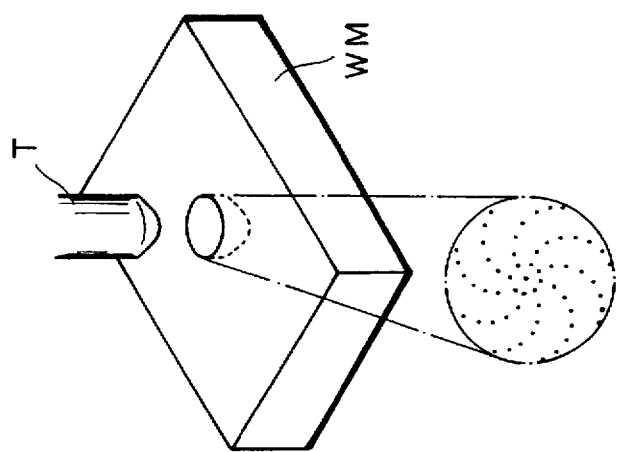
Figure 37C:
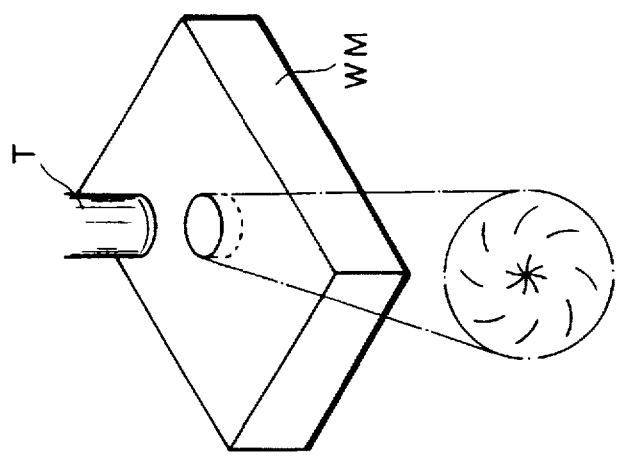

FIG. 37a illustrates an example of before-use image data stored in an image memory 43A, and FIG. 37c shows an example of use-limit image data stored in an image memory 43A.

The wear measurement unit 42A calculates degree of wear on the basis of the image data provided by the CCD camera 41 as well as the before-use tool image data and use-limit image data stored in the image memory 43A. The calculated degree of wear is applied to the machining condition determination unit 24A from the wear measurement unit 42A.

Figure 36:
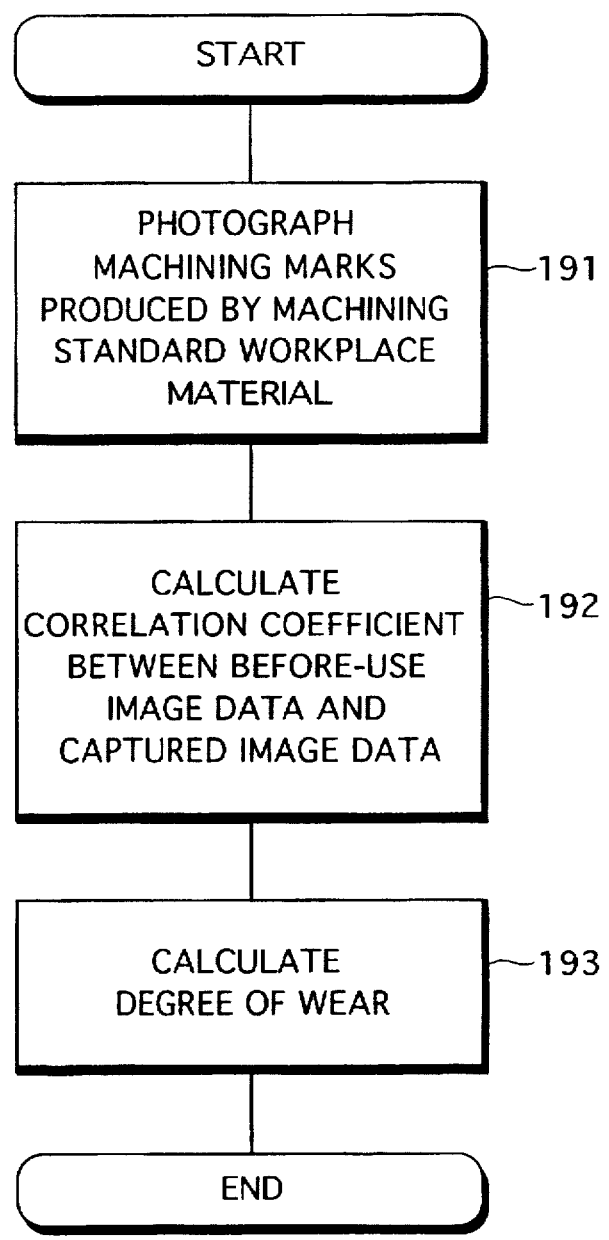
FIG. 36 is a flowchart illustrating a processing procedure for detecting degree of wear of a tool used, in which detection is performed based upon machining marks obtained by machining a standard workpiece material.

FIG. 36 is a flowchart illustrating a processing procedure for detecting degree of wear of a tool used, in which detection is performed based upon machining marks obtained by machining a standard workpiece material.

The tool T used is employed to machine the standard workpiece material WM under fixed machining conditions, and the machining marks on the standard workpiece material WM are photographed by the CCD camera 41 (FIG. 36; step 191). By way of example, FIG. 37b illustrates an example of image data representing machining marks obtained by photography using the CCD camera 41.

The wear measurement unit 42A calculates a coefficient fx of correlation between the image data of the machining marks of tool T obtained by photography using the CCD camera 41 and the before-use image data stored in the image memory 43 (FIG. 36; step 192).

The wear measurement unit 42A calculates degree of wear Ab in accordance with the following equation (FIG. 36; step 193):

$$Ab = (f0 - fx)/f0 \quad (2)$$

Here f0 is a coefficient of correlation between the before-use image data of machining marks produced on the standard workpiece material WM using an unused tool and use-limit image data of machining marks produced on the standard workpiece material WM using the tool T at the limit of its usefulness. Since the before-use image data and use-limit image data are stored in the image memory 43A beforehand, the correlation coefficient f0 can be calculated in advance.

The calculated degree of wear is applied to the machining condition determination unit 24A from the wear measurement unit 42A.

The degree of wear is thus calculated.

(4) Method of detecting degree of wear of tool used based upon impression of tool taken using standard templating material FIG. 38 is a block diagram in which an impression of a tool used by an NC machine is taken using a standard templating material, the resulting impression is photographed by a CCD camera and the degree of wear of the tool is detected.

The tool T currently being used by the NC machine to perform machining is pressed against a standard templating material FM under fixed conditions and the impression of the cutting end of the tool T is photographed by the CCD camera 41. The image representing the impression of the cutting end of the tool T in the standard templating material photographed by the CCD camera 41 is applied to a wear measurement unit 42B.

Before-use image data of the impression of the cutting end of tool T prevailing when the tool T, which has never been used, is pressed against the standard templating material FM, and use-limit image data of the impression of the cutting end of the tool T prevailing when the tool T, which has reached the limit of its usefulness, is pressed against the standard templating material FM, are stored in an image memory 43B in advance. These items of data are the result of photography performed by the CCD camera 41 in advance.

FIG. 105a illustrates an example of before-use image data stored in the image memory 43B. FIG. 105c illustrates an example of use-limit image data stored in the image memory 43B. It will be appreciated from FIGS. 105a and 105c that impression of the tool before use and the impression of the tool at the limit of its usefulness are different.

The wear measurement unit 42B calculates degree of wear on the basis of the image data provided by the CCD camera 41 as well as the before-use image data and use-limit image data stored in the image memory 43. The calculated degree of wear is applied to the machining condition determination unit 24A from the wear measurement unit 42B.

Figure 39:
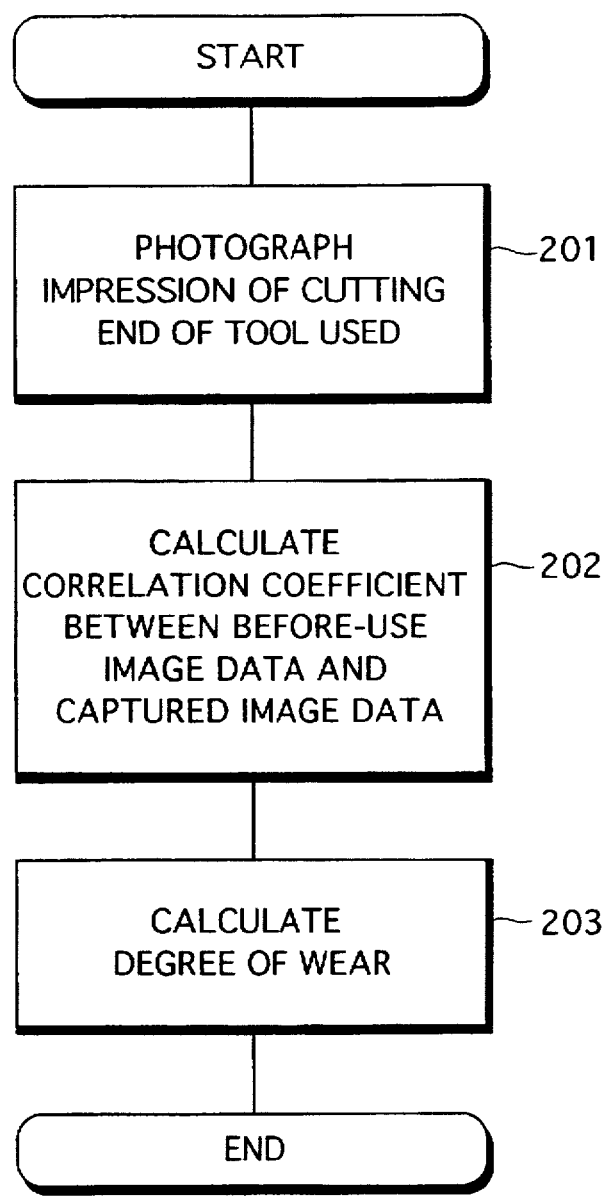
FIG. 39 is a flowchart illustrating a processing procedure for detecting degree of wear based upon an impression of a tool taken using a standard templating material.

FIG. 39 is a flowchart illustrating a processing procedure for detecting degree of wear bas ed upon an impression of a tool taken using a standard templating material.

Figure 40A:
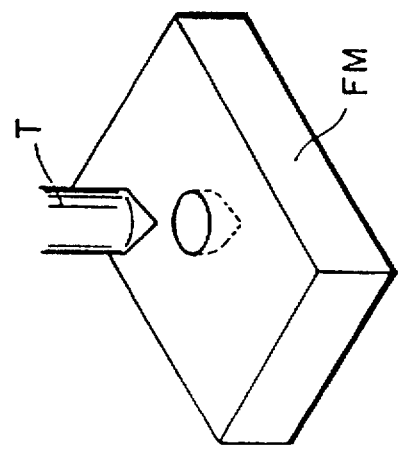
FIG. 40a illustrates an example of the shape of the cutting edge of tool T, where the tool T employed is an unused tool.
Figure 40B:
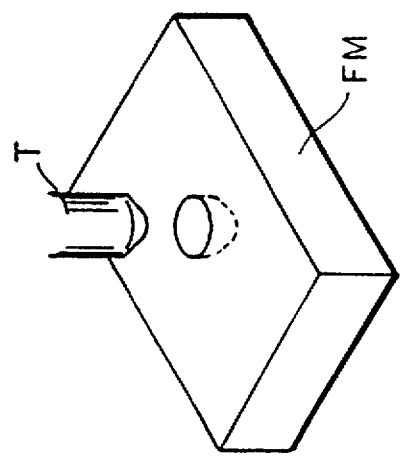
FIG. 40b illustrates an example of the shape of the cutting edge of tool T, where the tool T employed is not unused and has not reached the limit of its usefulness.
Figure 40C:
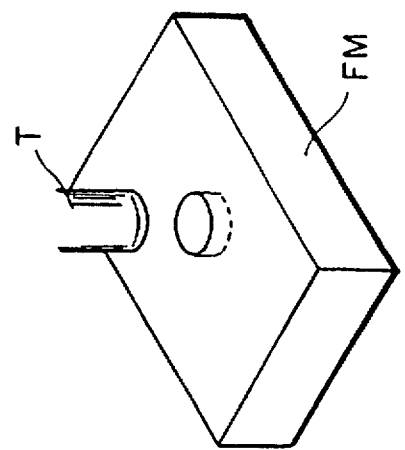
FIG. 40c illustrates an example of the shape of the cutting edge of tool T, where the tool T employed has reached the limit of its usefulness.

The tool T that is in use is pressed against the standard templating material under fixed conditions to take an impression of the cutting end of the tool T. The impression of the cutting end left in the standard templating material FM is photographed by the CCD camera 41 (FIG. 39; step 201). FIG. 40b illustrates an example of image data obtained by photography using the CCD camera 41.

The wear measurement unit 42B calculates the coefficient Fx of correlation between the image data of the impression of the cutting end of tool T in use, which image data is obtained by photography performed by the CCD camera 41, and the before-use image data that has been stored in the image memory 43B (FIG. 39; step 202).

The wear measurement unit 42B calculates degree of wear Ab in accordance with the following equation (FIG. 39; step 203):

$$Ab = Fx/F0 \quad (3)$$

Here F0 is a coefficient of correlation between the before-use image data of the impression of the cutting end of the tool when the tool, which is still unused, is pressed against the standard templating material FM, and the use-limit image data of the impression of the cutting end of the tool when the tool, which has reached the limit of its usefulness, is pressed against the standard templating material FM. Since the before-use image data and use-limit image data have been stored in the image memory in advance, the correlation coefficient F0 can be calculated beforehand.

The calculated degree of wear is applied to the machining condition determination unit 24A from the wear measurement unit 42B.

The degree of wear is thus calculated.

Figure 41:
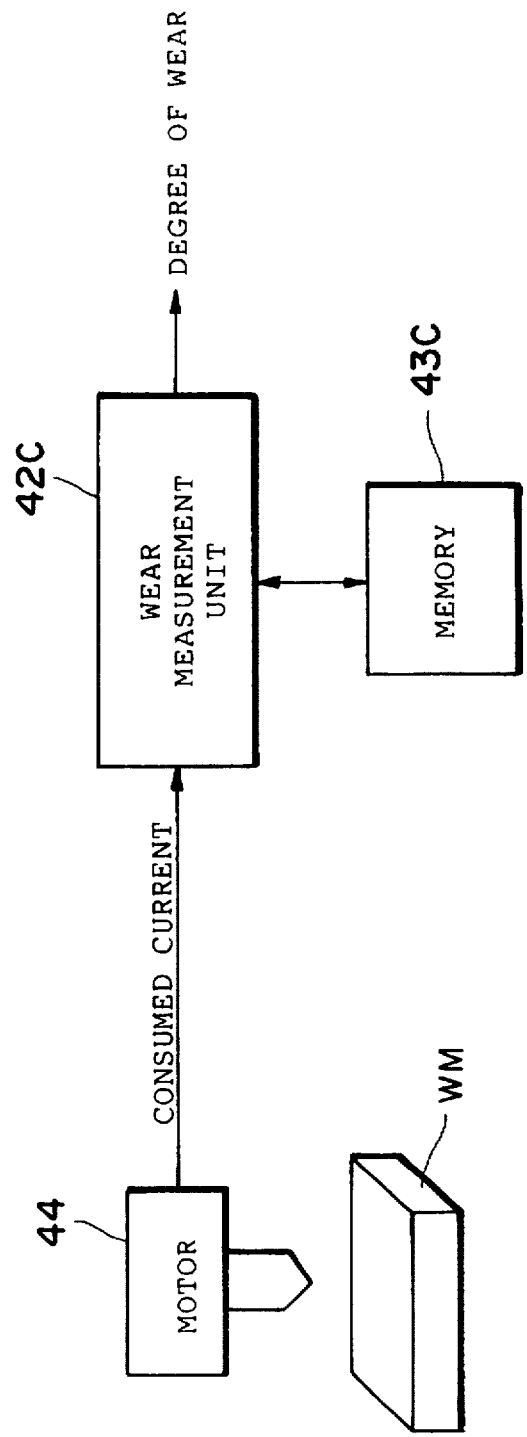
FIG. 41 is a block diagram in which the current consumed by the motor an NC machine is measured and the degree of wear of a tool used is detected based upon the characteristic data of the consumed current.

(5) Method of detecting degree of wear of tool used based upon characteristic data of current consumed by machine tool motor FIG. 41 is a block diagram in which the current consumed by the motor of an NC machine is measured and the degree of wear of a tool T is detected based upon the characteristic data of the consumed current.

A motor 44 is the motor of an NC machine and the current consumed by the motor is applied to a wear measurement unit 42C from the NC machine.

Characteristic data representing the current consumed by the motor 44 when the NC machine uses a brand new tool T to machine a standard workpiece material WM, and characteristic data representing the current consumed by the motor 44 when the NC machine uses a tool, which is at the limit of its usefulness, to machine the standard workpiece material WM, are stored in a memory 43C. These items of data are measured in advance.

Figure 43:
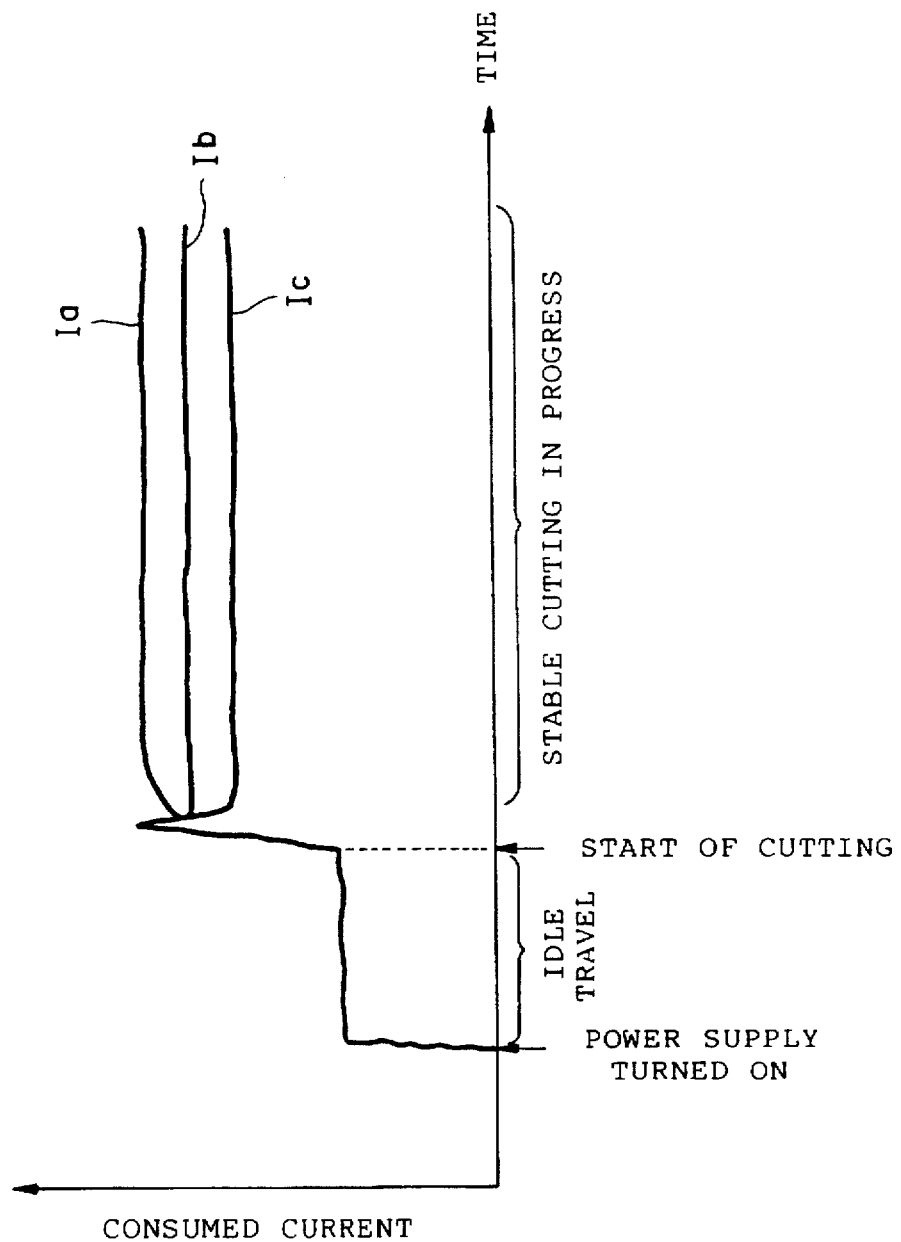
FIG. 43 illustrates an example of characteristic data of current consumed by a motor when an NC machine machines a standard workpiece material employing a tool used.

FIG. 43 illustrates an example of characteristic data representing current consumed by the motor 44 when the NC machine subjects the standard workpiece material WM to machining employing the tool T. In FIG. 43, Ia, which prevails during stable cutting, is before-use characteristic data representing the current consumed by the motor 44 when the standard workpiece material WM is machined using the unused tool T, this data having been stored in the memory 43C. Further, Ic is use-limit characteristic data representing the current consumed by the motor 44 when the standard workpiece material WM is machined using the tool T at the limit of its usefulness, this data also having been stored in the memory 43C.

The wear measurement unit 42C calculates degree of wear on the basis of the current consumed by the motor 44, during stable cutting, when the NC machine subjects the standard workpiece material to machining by the tool in use, as well as the before-use characteristic data and use-limit characteristic data stored in the memory 43C.

The calculated degree of wear is applied to the machining condition determination unit 24A from the wear measurement unit 42C.

Figure 42:
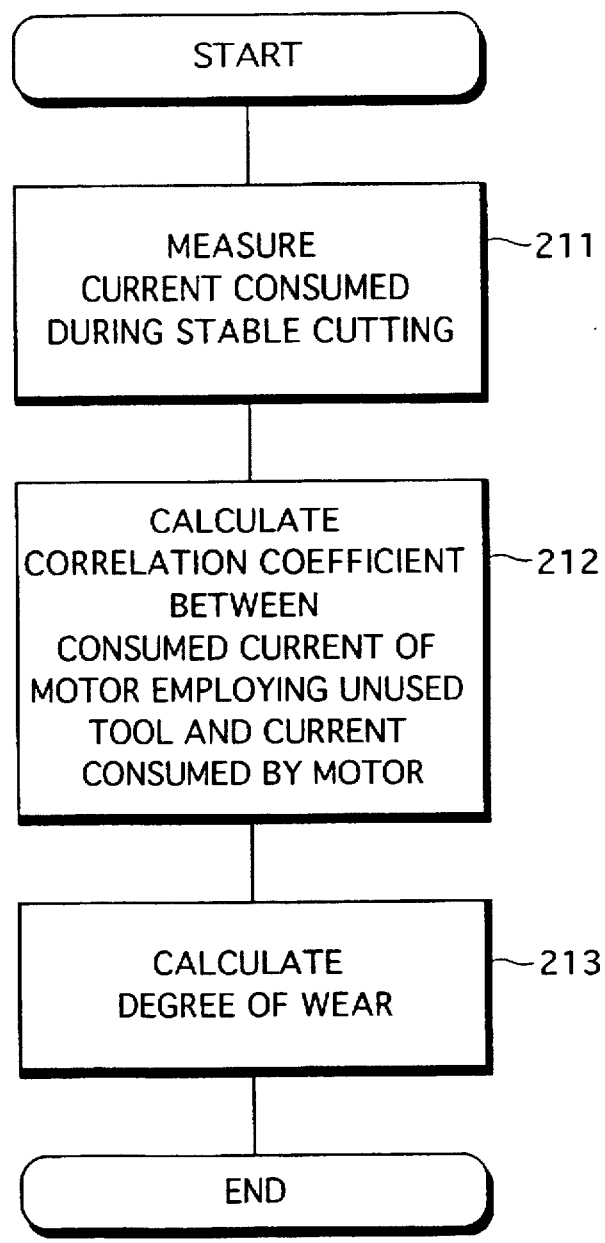
FIG. 42 is a flowchart illustrating a processing procedure for detecting degree of wear based upon characteristic data of current consumed by the motor of a machine tool.

FIG. 42 is a flowchart illustrating a processing procedure for detecting degree of wear based upon characteristic data of current consumed by the motor of a machine tool.

The prescribed standard workpiece material WM is machined under fixed machining conditions using the tool T employed by the NC machine. The current consumed by the motor 44 during stable cutting as the standard workpiece material WM is being machined is measured (FIG. 42; step 211). For example, characteristic data representing the measured consumed current of the motor 44 is as illustrated at Ib in FIG. 43.

The wear measurement unit 42C calculates a correlation coefficient Fx indicating the correlation between characteristic data of measurement current consumed by the motor 44 and before-use characteristic data stored in memory 43C (FIG. 42; step 212).

The wear measurement unit 42C calculates degree of wear Ab in accordance with the following equation (FIG. 42; step 213):

$$Ab = Fx/F0 \quad (4)$$

Here F0 is a coefficient of correlation between the before-use characteristic data and the use-limit characteristic data. Since the before-use characteristic data and use-limit characteristic data have been stored in the image memory in advance, the correlation function F0 can be calculated beforehand.

The calculated degree of wear is applied to the machining condition determination unit 24A from the wear measurement unit 42C.

The degree of wear is thus calculated.

2.2 Membership-function learning unit for learning membership functions of machining condition determination unit (1) Summary Described below will be the learning of membership functions of consequent variables in machining-condition decision rules, which relate to an NC machine, set in the machining condition determination unit 24 in advance.

Information used in the learning of membership functions of consequent variables in machining-condition decision rules includes the parameters of the machine tool, the machining conditions, etc.

Membership functions are learned through the methods described below.

(2) Method of learning using machine tool parameters as teaching information

Figure 44:
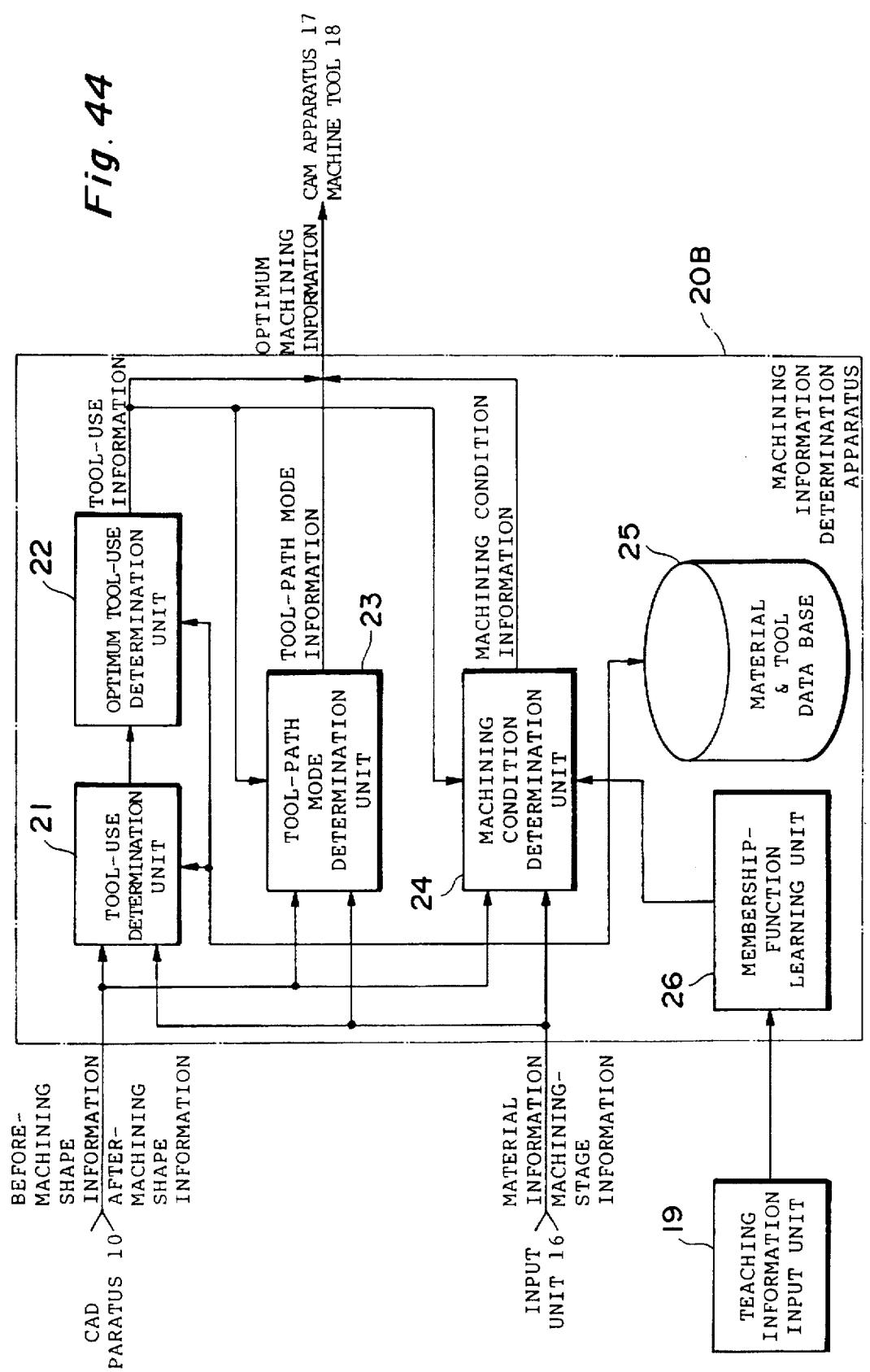
FIG. 44 is a functional block diagram illustrating the construction of a machining information determination apparatus further provided with a membership-function learning unit.

FIG. 44 is a functional block diagram illustrating the construction of an machining information determination apparatus 20B further provided with a membership-function learning unit 26.

Components in FIG. 44 identical with those shown in FIG. 16 are designated by like reference characters and a detailed description thereof is omitted.

The membership-function learning unit 26 learns the membership functions of the consequent variables in machining-condition decision rules set in the machining condition determination unit 24 in advance with the parameters of a machine tool serving as the teaching information.

By way of example, the spindle performance of the machine tool is used as a machine tool parameter employed in learning of membership functions.

Figure 46A:
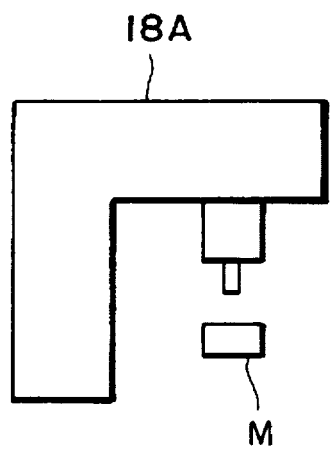
FIG. 46a illustrates a machine tool and 46b a high-performance machine tool.
Figure 46B:
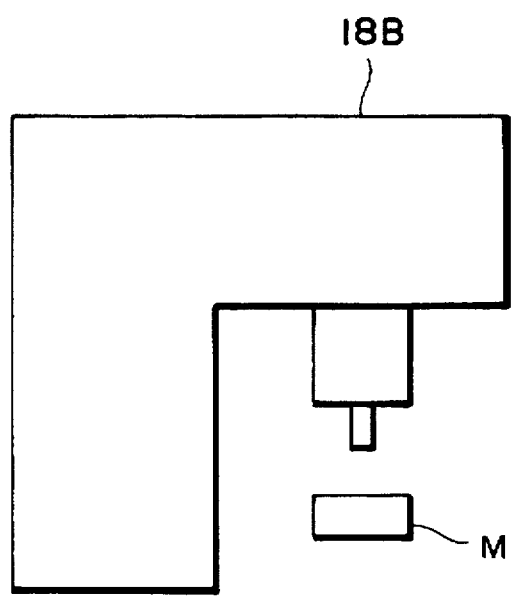

Reference values of machine tool parameters are set in the membership-function learning unit 26 in advance. By way of example, when a machine tool 18A illustrated in FIG. 46a has been changed to a high-performance machine tool 18B shown in FIG. 46b, the membership-function learning unit 26 attempts to revise the membership functions of the consequent variables in the machining-condition decision rules relating to the machine tool 18A before the change to membership functions suited to the high-performance machine tool 18B after the change.

Figure 45:
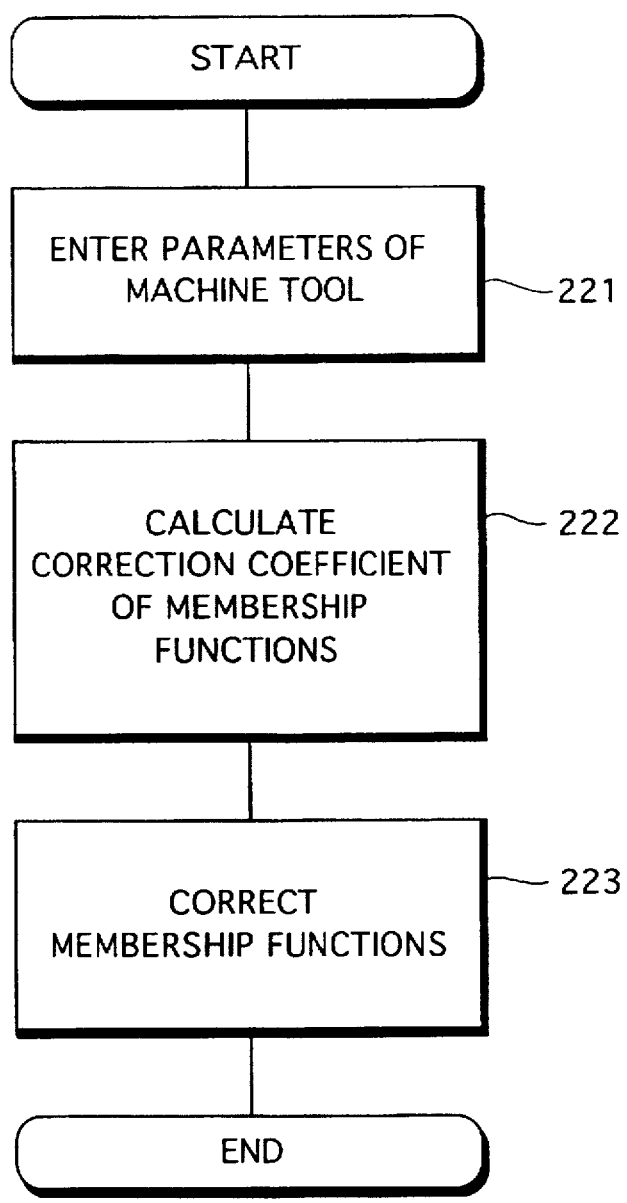
FIG. 45 is a flowchart illustrating a processing procedure for executing learning of membership functions of consequent variables in machining-condition decision rules, in which parameters of a machine tool serve as teaching information.

FIG. 45 is a flowchart illustrating a processing procedure for executing learning of membership functions of consequent variables in machining-condition decision rules, in which parameters of a machine tool serve as teaching information.

The machine-tool spindle performance G1 [kW], which is a parameter of the machine tool 18B and which is used in learning of membership functions by the membership-function learning unit 26, is entered by the operator from the input unit 16 (FIG. 45; step 221). For example, G1=0.6 [kw].

The membership-function learning unit 26 calculates a correction coefficient, which is for correcting membership functions, on the basis of the entered parameter G1 of the machine tool 18B and the preset parameter G0 of the machine tool 18A (FIG. 45; step 222).

The correction coefficient is calculated in accordance with the following equation:

$$T=(G1/G0) \tag{5}$$

For example, when G0=0.5 |kW| holds, we have T=(0.6/0.5)=1.2.

The membership-function learning unit 26 uses the calculated correction coefficient to correct the membership functions of the consequent variables in the machining-condition decision rules set in the machining condition determination unit 24 (FIG. 45; step 223).

Figure 47A:
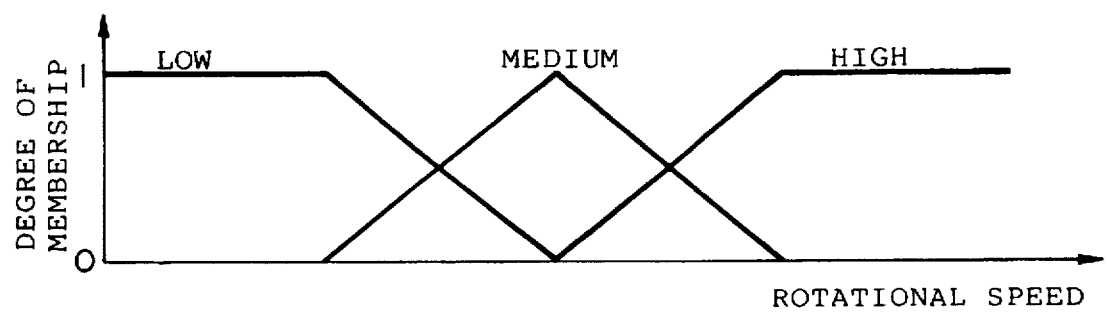
FIG. 47a illustrates membership functions of rotational speed, which is a consequent variable of machining-condition decision rules, before learning.
Figure 47B:
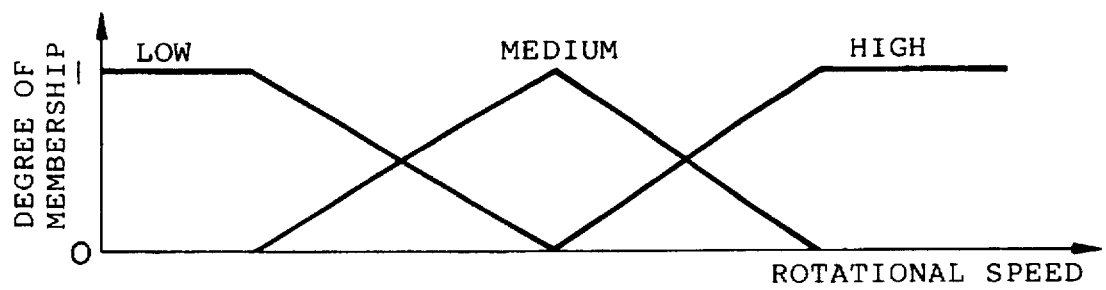
FIG. 47b illustrates the membership functions after learning.

For example, when membership functions of the consequent variable "rotational speed" in the machining-condition decision rules of FIG. 47a are corrected on the basis of the correction coefficient T, the result is as shown in FIG. 47b.

It will be appreciated from FIG. 47b that the support set of membership functions of the linguistic information "medium" is broadened, about the point at which the degree of membership of the function is "1", by an amount equivalent to the result of multiplication by the correction coefficient. Further, with regard to the membership function of linguistic information "low", the range of rotational speed for which the degree of membership is "1" is reduced. Furthermore, with regard to the membership function of linguistic information "high", the rotational speed at which the degree of membership becomes "1" is increased.

Membership functions of the consequent variable "feed rate" of the machining-condition decision rules are corrected in the same manner as the membership functions regarding "rotational speed".

(3) Method of learning using machining conditions as teaching information

Figure 48:
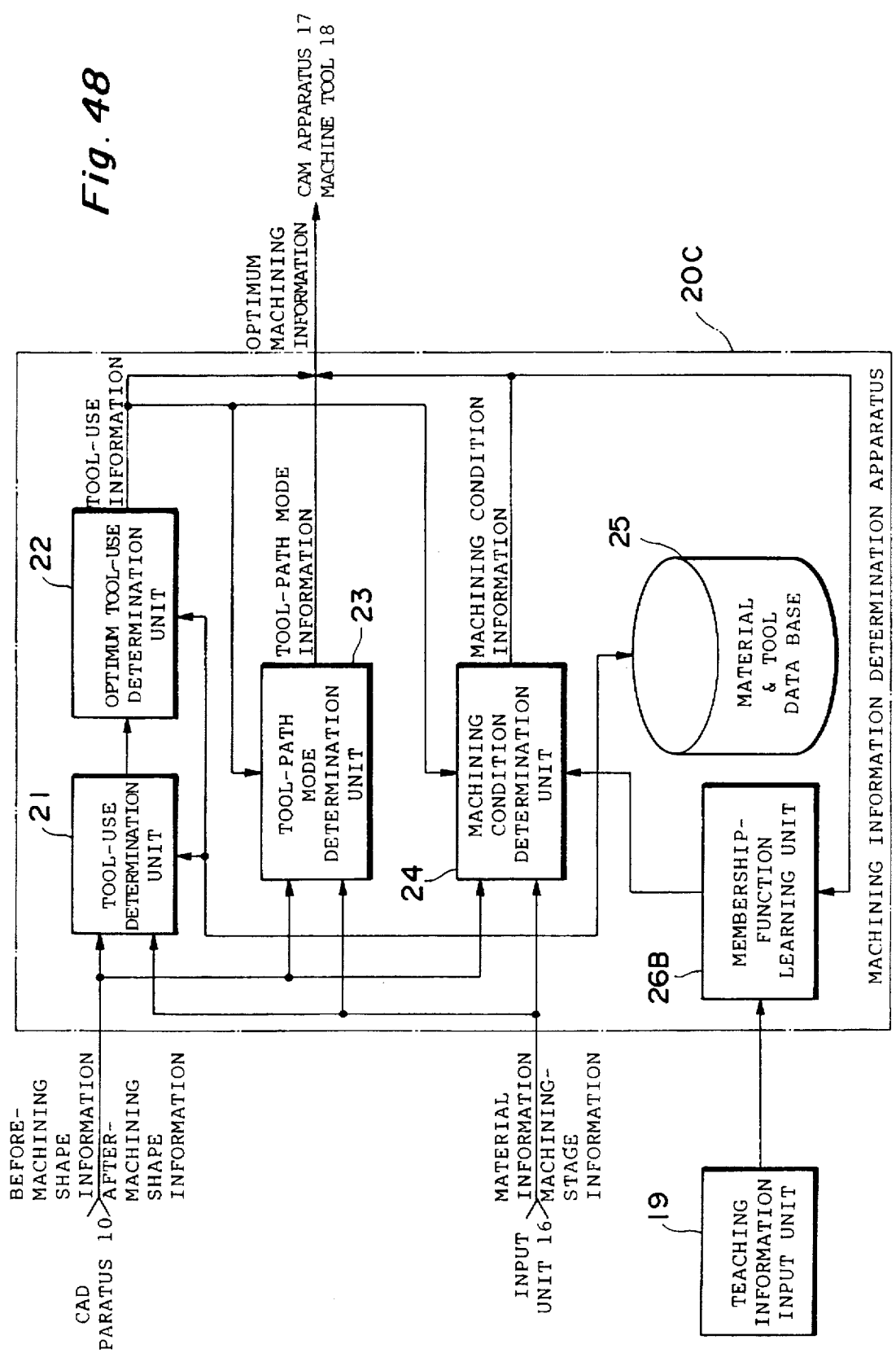
FIG. 48 is a functional block diagram illustrating the construction of a machining information determination apparatus further provided with a membership-function learning unit.

FIG. 48 is a functional block diagram illustrating the construction of a machining information determination apparatus 20C further provided with a membership-function learning unit 26B.

Components in FIG. 48 identical with those shown in FIG. 16 are designated by like reference characters and a detailed description thereof is omitted.

In a case where the operator judges that the machining conditions that have been decided by the machining condition determination unit 24 are inappropriate, the membership-function learning unit 26B learns and corrects membership functions on the basis of teaching machining condition information entered from the input unit 16. As a result, it is so arranged that the machining condition determination unit 24 is capable of deciding machining conditions using the optimum membership functions of the machining-condition decision rules.

Figure 49:
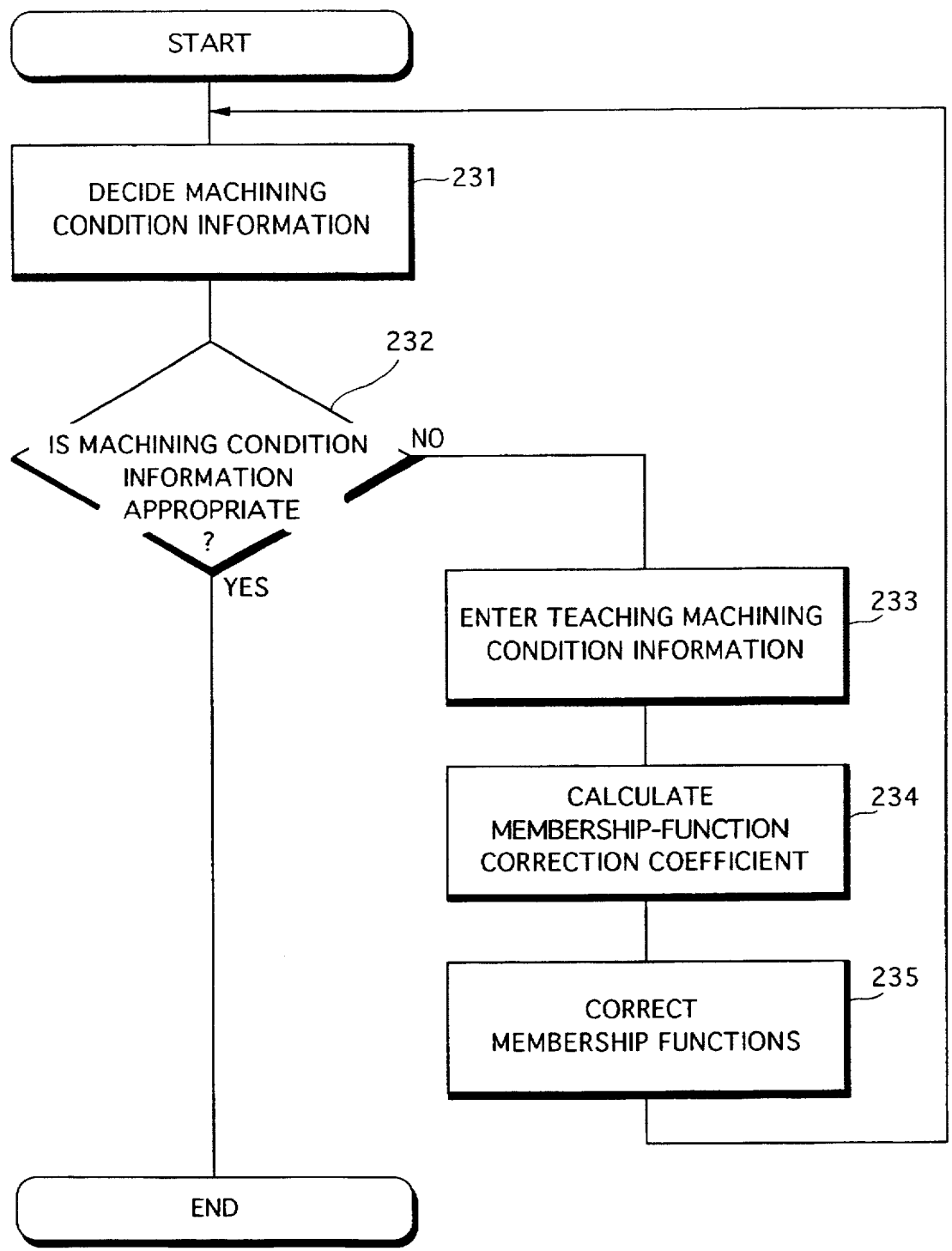
FIG. 49 is a flowchart illustrating a processing procedure for executing learning of membership functions, in which machining information serves as teaching information.

FIG. 49 is a flowchart illustrating a processing procedure for executing learning of membership functions, in which machining conditions serve as teaching information.

The machining condition determination unit 24 decides machining condition information on the basis of the before-machining shape information and after-machining shape information provided by the CAD apparatus 10 as well as the material information and machining-stage information entered from the input unit 16 (FIG. 49; step 231).

The operator determines whether the machining condition information decided by the machining condition determination unit 24 is appropriate or not (FIG. 49; step 232).

When the operator decides at step 232 that the machining condition information decided by the machining condition determination unit 24 is appropriate (YES at step 232), processing is terminated without the learning of membership functions.

When the operator decides that the machining condition information decided by the machining condition determination unit 24 is inappropriate (NO at step 232), the operator enters the teaching machining condition information (FIG. 49; step 233).

For example, assume that the machining condition determination unit 24 has decided upon a rotational speed of "R1=1000 |rpm|" and a feed rate of "F1=50 |mm/sec|" as the machining conditions relating to the NC machine at step 231. If the operator judges that a rotational speed of "R0=800 |rpm|" and a feed rate of "F0=40 |mm/sec|" are appropriate as the machining conditions, then the operator enters this rotational speed and feed rate from the input unit 16 as the teaching machining condition information.

On the basis of the teaching machining condition information entered by the operator and the machining condition information decided by the machining condition determination unit 24, the membership-function learning unit 26B calculates correction coefficients for correcting the membership functions (FIG. 49; step 234).

Correction coefficients TR and TF are calculated in accordance with the following equations with regard to rotational speed and feed rate, respectively:

$$TR=(R1/R0) \tag{6}$$

$$TF=(F1/F0) \tag{7}$$

For example, in a case where the operator has entered a rotational speed of "800 [rpm]" and a feed rate of "40 [mm/sec]" as the teaching machining condition information and the machining condition determination unit 24 has decided a rotational speed of "1000 [rpm]" and a feed rate of "50 [mm/sec]" as the machining condition information, the correction coefficients become TR=(800/1000)=0.8 and TF=(40/50)=0.8 with regard to the rotational speed and feed rate, respectively.

On the basis of the calculated correction coefficients TR and TF, the membership-function learning unit 26 corrects the membership functions of the consequent variables "rotational speed" and "feed rate" of the machining-information decision rules relating to the NC machine and set in the machining condition determination unit 24 in advance (FIG. 49; step 235).

The membership-function learning unit 26B corrects the membership functions in the same manner as described in the section "(2) Method of learning using machine tool parameters as teaching information".

As a result, machining conditions conforming to the capabilities of the machine tool can be obtained. For example, it is possible to obtain machining conditions that take into account the degree of importance of machining efficiency, the degree of importance of machining precision, etc.

(4) Method of learning upon entering machining-condition information as teaching information a plurality of times The membership-function learning unit 26B learns and corrects membership functions of consequent variables in machining-condition decision rules on the basis of the machining condition information decided by the machining condition determination unit 24 and teaching information of machining condition information entered by the operator a plurality of times. Accordingly, the machining condition determination unit 24 is capable of deciding optimum machining condition information based upon the teaching information entered.

Figure 50:
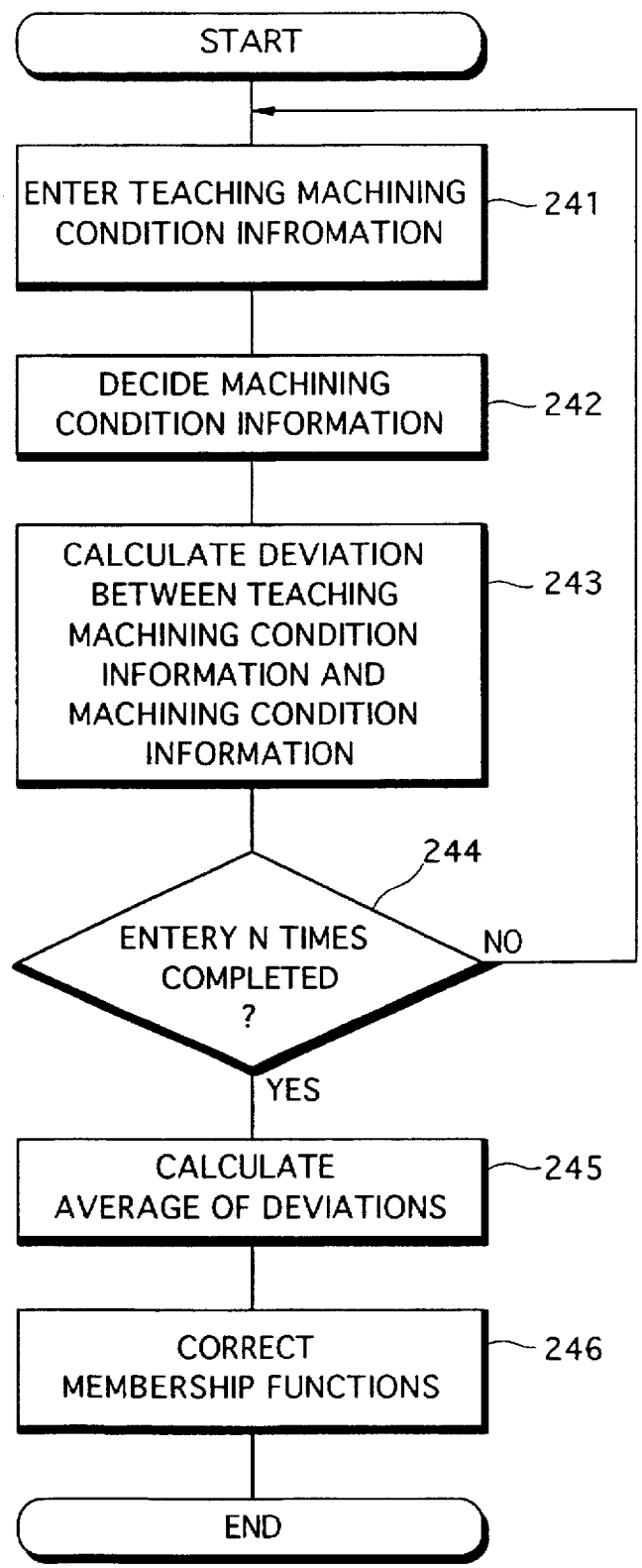
FIG. 50 is a flowchart illustrating a processing procedure for executing learning of membership functions upon entry of machining condition information as teaching information a plurality of times.

FIG. 50 is a flowchart illustrating a processing procedure for executing learning of membership functions upon entry of machining condition information as teaching information a plurality of times.

The operator enters teaching machining condition information, which is teaching information of machining condition information (FIG. 50; step 241).

The machining condition determination unit 24 decides machining condition information on the basis of the before-machining shape information and after-machining shape information provided by the CAD apparatus 10 as well as the shape information and machining-stage information entered from the input unit 16 (FIG. 50; step 242).

The membership-function learning unit 26B calculates a deviation between the entered teaching machining condition information and the machining condition information that has been decided by the machining condition determination unit 24 (FIG. 50; step 243).

The membership-function learning unit 26B determines whether the teaching machining condition information has been entered N times (FIG. 50; step 244).

If the teaching machining condition information has been entered repeatedly N times (YES at step 244), then the membership-function learning unit 26B calculates the average of the deviations computed at step 243 (FIG. 50; step 245).

The membership-function learning unit 26B corrects the membership functions of the machining-condition decision rules, which have been set in the machining condition determination unit 24, on the basis of the average deviation calculated at step 245 (FIG. 50; step 246).

The correction of the membership functions of the machining-condition decision rules set in the machining condition determination unit 24 in advance is performed in the same manner as in the case described above.

As a result, machining conditions conforming to the capabilities of the machine tool can be obtained. For example, it is possible to obtain machining conditions that take into account the degree of importance of machining efficiency, the degree of importance of machining precision, etc.

Figure 51:
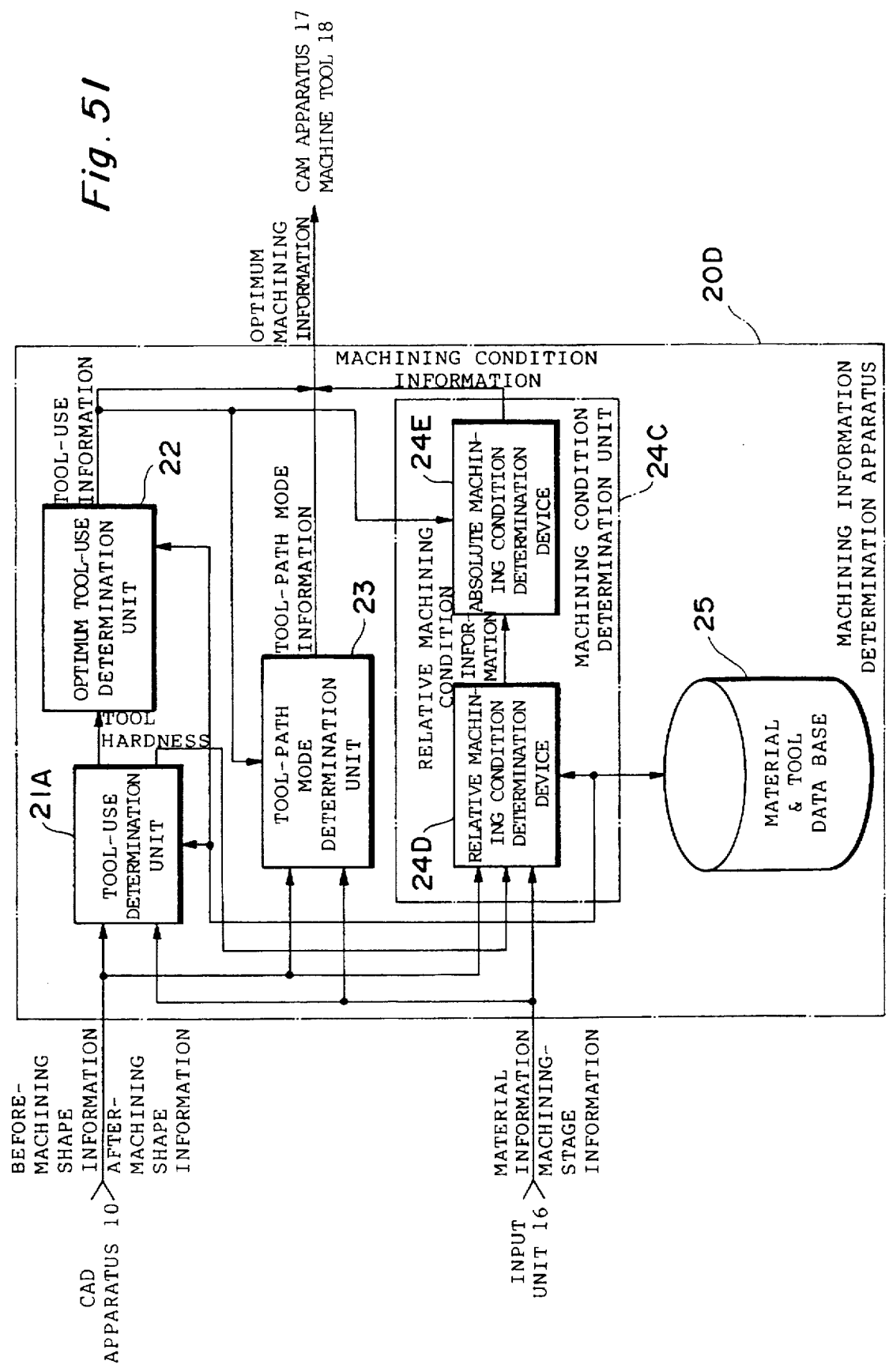
FIG. 51 is a functional block diagram illustrating the construction of a machining information determination apparatus.

2.3 Machining condition determination unit for deciding absolute values after deciding relative values of machining condition information FIG. 51 is a functional block diagram illustrating the construction of a machining information determination apparatus 20D.

Components in FIG. 51 identical with those shown in FIG. 16 are designated by like reference characters and a detailed description thereof is omitted.

When a tool-use determination unit 21A decides upon tool-use information with regard to an NC machine, the machining information determination apparatus 20D decides the tool hardness in addition to the tool used and the tool diameter.

The tool-use determination unit 21A decides the machine used as well as the tool used by the machine used in accordance with the tool-use decision rules and membership functions set in advance.

In this case, the tool-use determination unit 21A decides the tool-use information in accordance with tool-use decision rules and membership functions that take tool hardness into consideration with regard to the NC machine.

When the tool-use determination unit 21 decides the tool used in accordance with the tool-use decision rules, the tool hardness decided is applied to the machining condition determination unit 24C.

The machining condition determination unit 24C decides the machining condition information on the basis of the tool hardness fed by the tool-use determination unit 21A.

A machining condition determination unit 24C has a relative machining condition determination device 24D and an absolute machining condition determination device 24E.

The relative machining condition determination device 24D decides relative values of machining conditions as relative machining condition information on the basis of the before-machining shape information and after-machining shape information provided by the CAD apparatus 10, the material information and machining-stage information entered from the input unit 16 and the tool hardness provided by the tool-use determination unit 21A.

The absolute machining condition determination device 24E decides machining condition information, which serves as absolute values of machining conditions, on the basis of the relative machining condition information decided by the relative machining condition determination device 24D and the standard machining condition information set in advance.

As for the standard machining condition information, standard values of the rotational speed and feed rate, which are machining conditions, are set in advance. The standard machining condition information is stored in the material & tool data base 25. Examples of standard machining condition information is illustrated in FIGS. 53a and 53b.

The standard machining condition information shown in FIG. 53a includes standard values of feed rate and standard values of rotational speed stored in correspondence with tool diameter, material and machining stage. For example, a standard value "10" for feed rate and a standard value "3000" for rotational speed are stored in correspondence with a tool diameter of "4", a material which is "iron" and a machining stage which is "rough machining".

The standard machining condition information shown in FIG. 53b includes standard values of feed rate and standard values of rotational speed stored in correspondence with tool diameter, material and surface precision. For example, a standard value "5" for feed rate and a standard value "1000" for rotational speed are stored in correspondence with a tool diameter of "4", a material which is "iron" and a surface precision which is "coarse".

Figure 52:
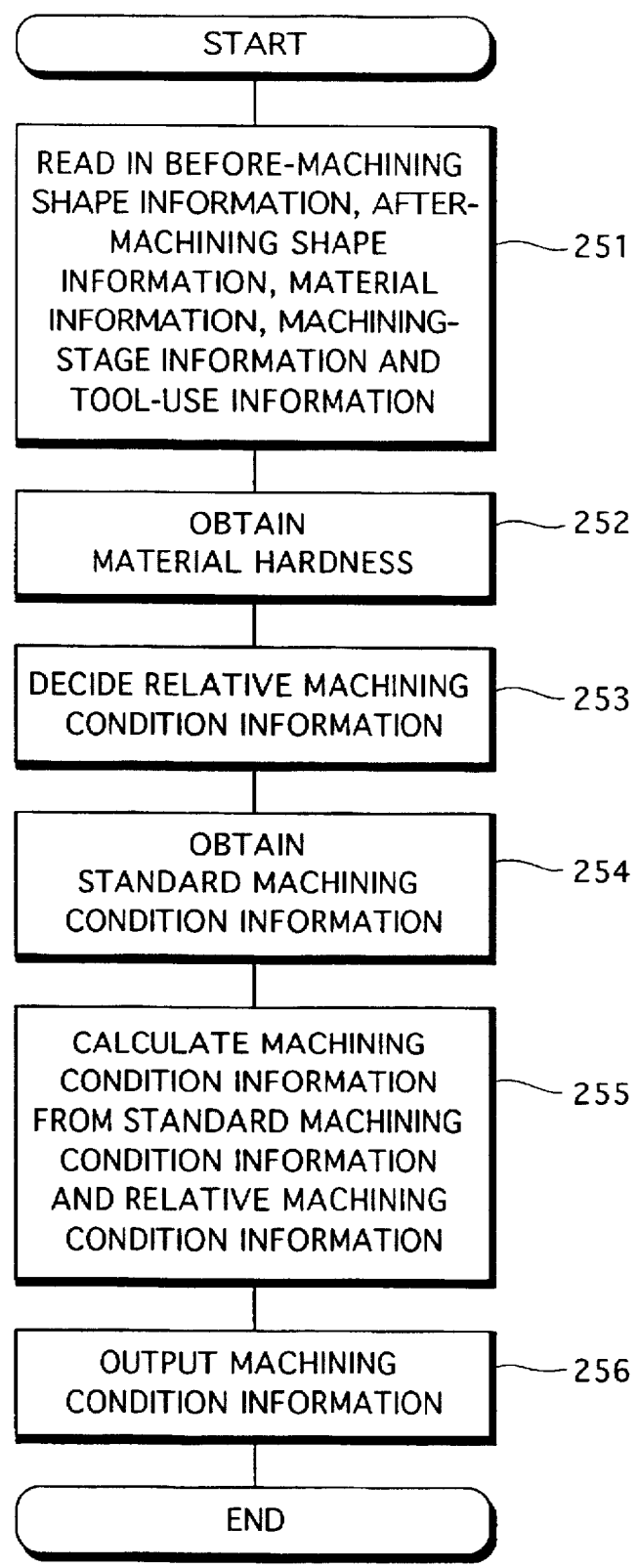
FIG. 52 is a flowchart illustrating a processing procedure in a machining condition determination unit.

FIG. 52 is a flowchart illustrating a processing procedure in the machining condition determination unit 24C.

The relative machining condition determination device 24D reads in the before-machining shape information and after-machining shape information provided by the CAD apparatus 10, the material information and machining-stage information entered from the input unit 16 the tool hardness provided by the tool-use determination unit 21A and the tool-use information provided by the optimum tool-use determination unit 22 (FIG. 52; step 251).

The relative machining condition determination device 24D obtains material hardness by searching the material data file, which has been stored in the material & tool data base 25, on the basis of the material information read in (FIG. 52; step 252). For example, since the material entered from the input unit 16 is "iron", the material hardness is "50".

The relative machining condition determination device 24D decides the relative machining condition information on the basis of the information read in at step 251 and in accordance with relative machining-condition decision rules and membership functions established in advance (FIG. 52; step 253).

The relative machining-condition decision rules relating to an NC machine are as follows, by way of example.

IF the machining stage is rough machining and the material hardness is low and the tool hardness is high, THEN the rotational speed is lowered and the feed rate is raised.

IF the machining stage is semi-finishing and the material hardness is high and the tool hardness is low, THEN the rotational speed is left as is and the feed rate is raised.

IF the machining stage is finishing and the surface precision is coarse and the material hardness is low and the tool hardness is high, THEN the rotational speed is raised and the feed rate is left as is.

IF the machining stage is finishing and the surface precision is smooth and the material hardness is high and the tool hardness is low, THEN the rotational speed is raised and the feed rate is lowered.

:
:

In these machining-condition decision rules, there is a case in which "the material hardness is high" and the "tool hardness is low". It goes without saying that material hardness and tool hardness are strictly relative quantities and that in terms of absolute hardness, the tool hardness is greater than material hardness.

FIGS. 54a–54f illustrate examples of membership functions and singletons with regard to antecedent variables and consequent variables of machining-condition decision rules.

Figure 54A:
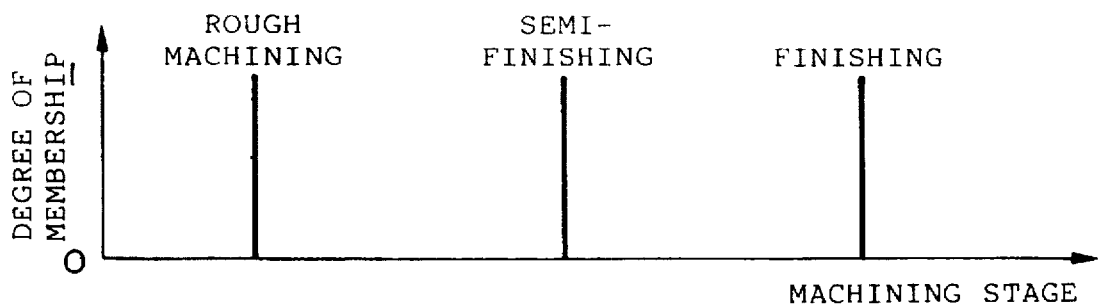
FIGS. 54a, 54b, 54c, 54d, 54e, and 54f illustrate examples of membership functions and singletons with regard to antecedent variables and consequent variables of machining condition-decision rules.

FIG. 54a illustrates three singletons of linguistic information "rough machining", "semi-finishing" and "finishing" with regard to the antecedent variable "machining stage".

Figure 54B:
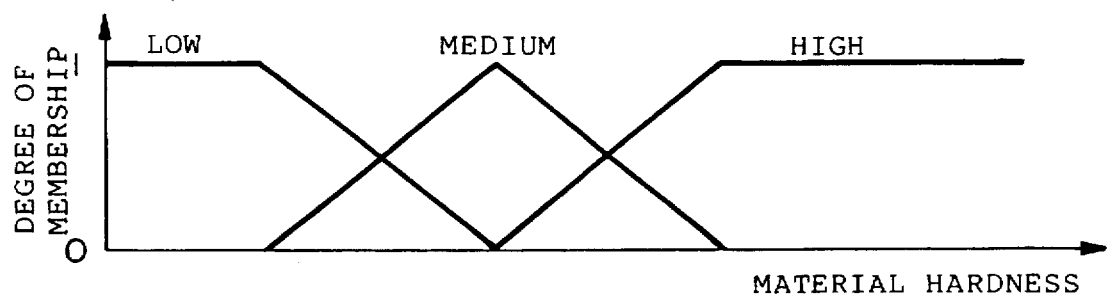

FIG. 54b illustrates three membership functions of linguistic information "low", "medium" and "high" with regard to the antecedent variable "material hardness".

Figure 54C:
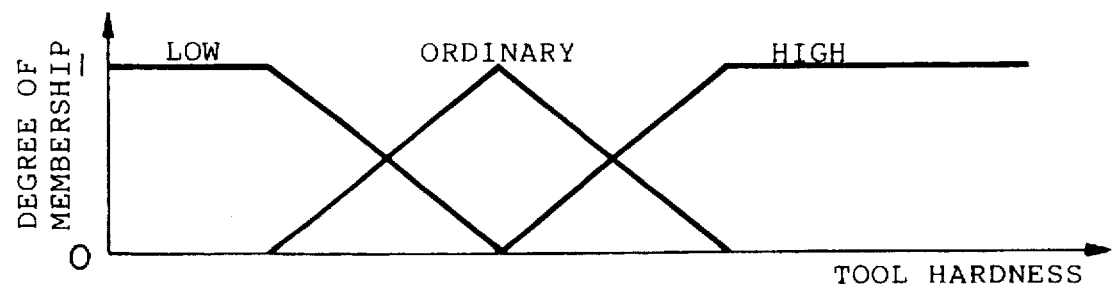

FIG. 54c illustrates membership functions of linguistic information "low", "ordinary" and "high" with regard to the antecedent variable "tool hardness".

Figure 54D:
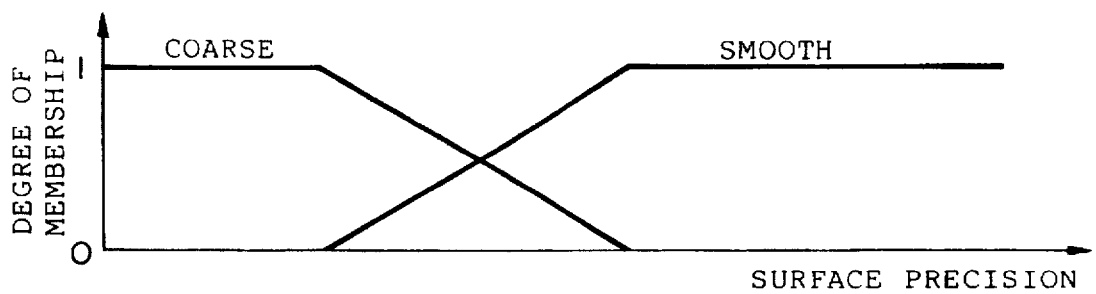

FIG. 54d illustrates two membership functions of linguistic information "coarse" and "smooth" with regard to the antecedent variable "surface precision".

Figure 54E:
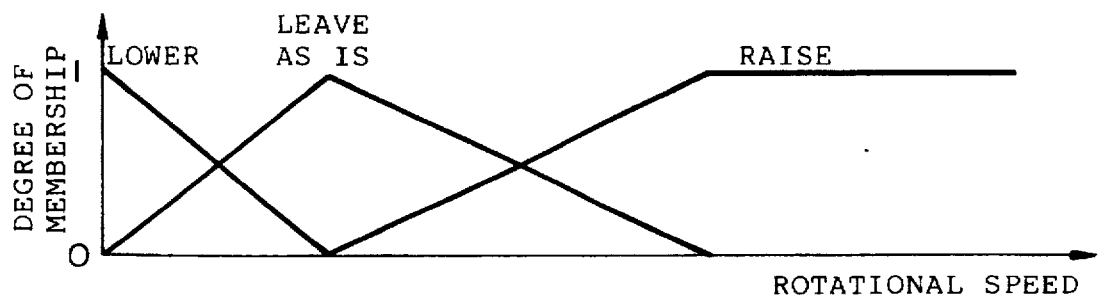

FIG. 54e illustrates three singletons of linguistic information "lower", "leave as is" and "raise" with regard to the consequent variable "rotational speed".

Figure 54F:
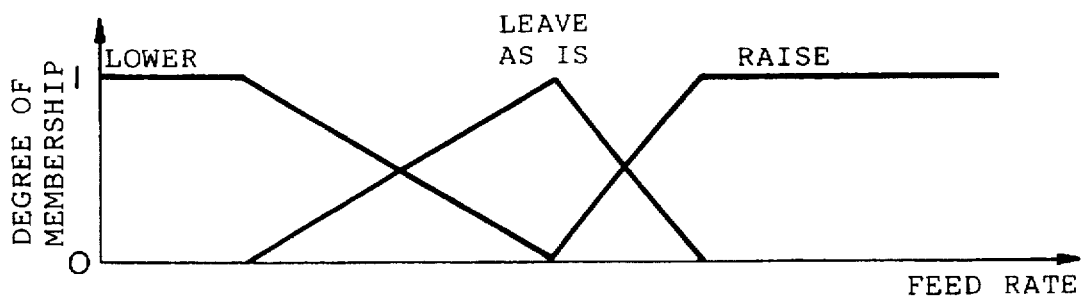

FIG. 54f illustrates three membership functions of linguistic information "lower", "leave as is" and "raise" with regard to the consequent variable "feed rate".

The relative machining condition determination device 24D decides the relative machining condition information in accordance with the relative machining-condition decision rules and membership functions, the device 24D applies the relative machining condition information that has been decided to the absolute machining condition determination device 24E.

On the basis of the information read in at step 251, the absolute machining condition determination device 24E obtains the corresponding standard machining condition information from the material & tool data base 25 (FIG. 52; step 254).

For example, in a case where the machining stage is "rough machining, the material is "iron", the surface precision is "smooth" and the tool diameter is "8", a standard value of "10" for the feed rate and a standard value of "3000" for the rotational speed are read in from the standard machining condition information shown in FIG. 53b.

The absolute machining condition determination device 24E corrects the standard machining condition information, which has been read in, using the relative machining condition information decided by the relative machining condition determination device 24D, thereby obtaining machining condition information (FIG. 52; step 255).

The machining condition information that has been decided is outputted to the CAM apparatus 17 and machine tool 18 (FIG. 52; step 256).

Thus, the machining condition determination unit 24C is capable of deciding machining condition information by correcting the standard machining condition information using the relative machining condition information.

Accordingly, even if standard values of machining conditions are changed, optimum machining conditions for the particular tool can be obtained.

2.4 Machining condition determination unit for deciding absolute values of machining condition information The above-described machining condition determination unit 24C decides absolute values of machining conditions for tools used after deciding relative values with respect to the standard values of machining conditions.

In this embodiment, absolute values of machining conditions for the tools used are decided directly.

Figure 55:
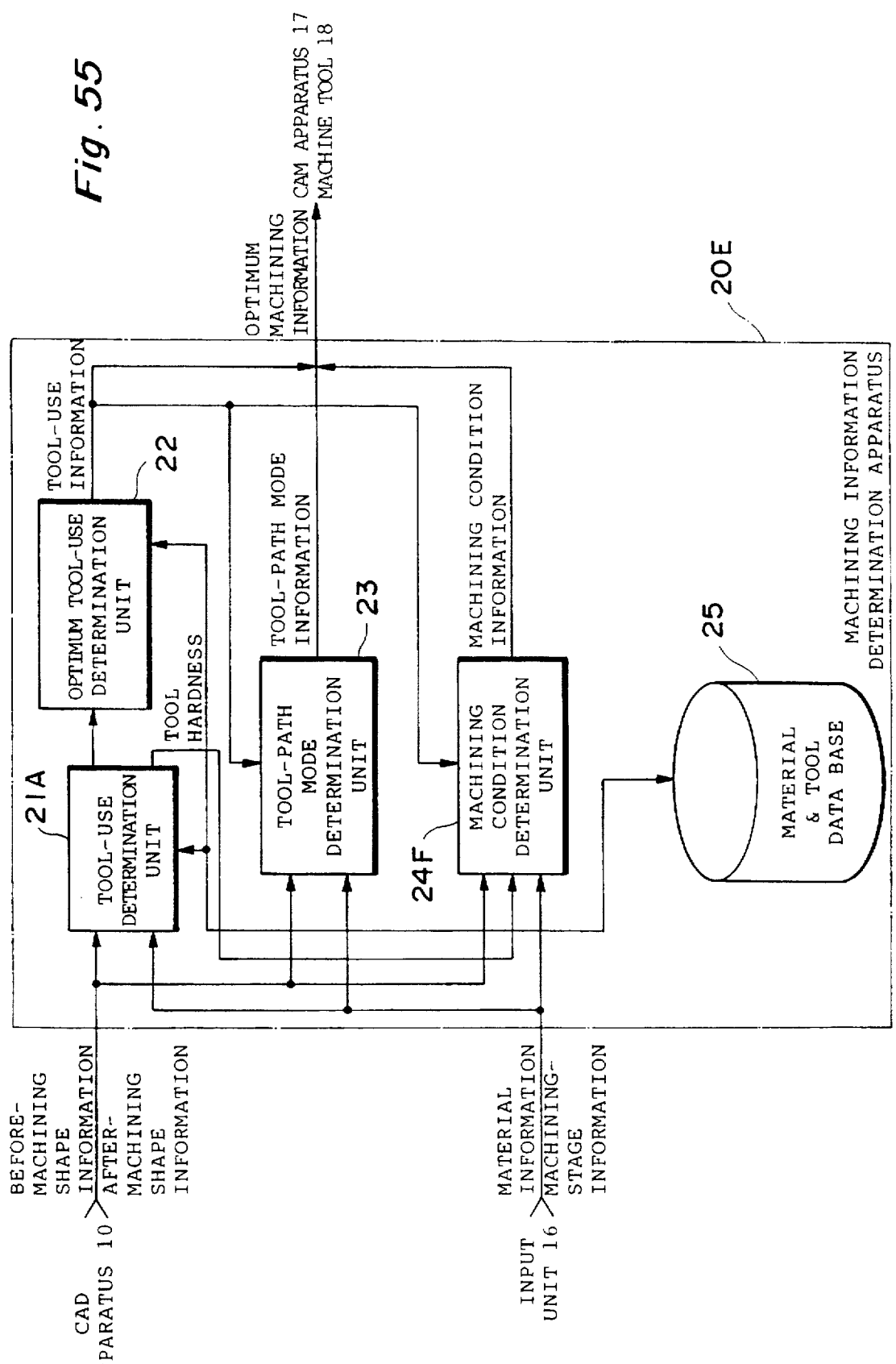
FIG. 55 is a functional block diagram illustrating the construction of a machining information determination apparatus.

FIG. 55 is a functional block diagram illustrating the construction of a machining information determination apparatus 20E. Components in FIG. 55 identical with those shown in FIG. 51 are designated by like reference characters and a detailed description thereof is omitted.

A machining condition determination unit 24F creates membership functions of machining-condition decision rules using proper machining condition range information set in the material & tool data base 25 in advance and decides absolute values of machining condition information in accordance with the machining-condition decision rules and membership functions that have been created.

In order to decide optimum machining conditions, a proper range (minimum and maximum values) of membership functions is set as proper machining condition range information with regard to each of the consequent variables, i.e., feed rate and rotational speed, of the machining condition decision rules relating to the NC machine.

FIGS. 57a and 57b illustrate examples of proper machining condition range information.

The proper machining condition range information shown in FIG. 57a includes maximum and minimum values of feed rate as well as maximum and minimum values of rotational speed in correspondence with tool diameter, material and machining stage. For example, a minimum value "8" and a maximum value "13" of feed rate as well as a minimum value "2500" and a maximum value "3500" of rotational speed are stored in correspondence with a tool diameter of "4", a material which is "iron" and a machining stage which is "rough machining".

The proper machining condition range information shown in FIG. 57b includes maximum and minimum values of feed rate as well as maximum and minimum values of rotational speed in correspondence with tool diameter, material and surface precision. For example, a minimum value "3" and a maximum value "7" of feed rate as well as a minimum value "700" and a maximum value "1300" of rotational speed are stored in correspondence with a tool diameter of "4", a material which is "iron" and a surface precision which is "coarse".

Figure 56:
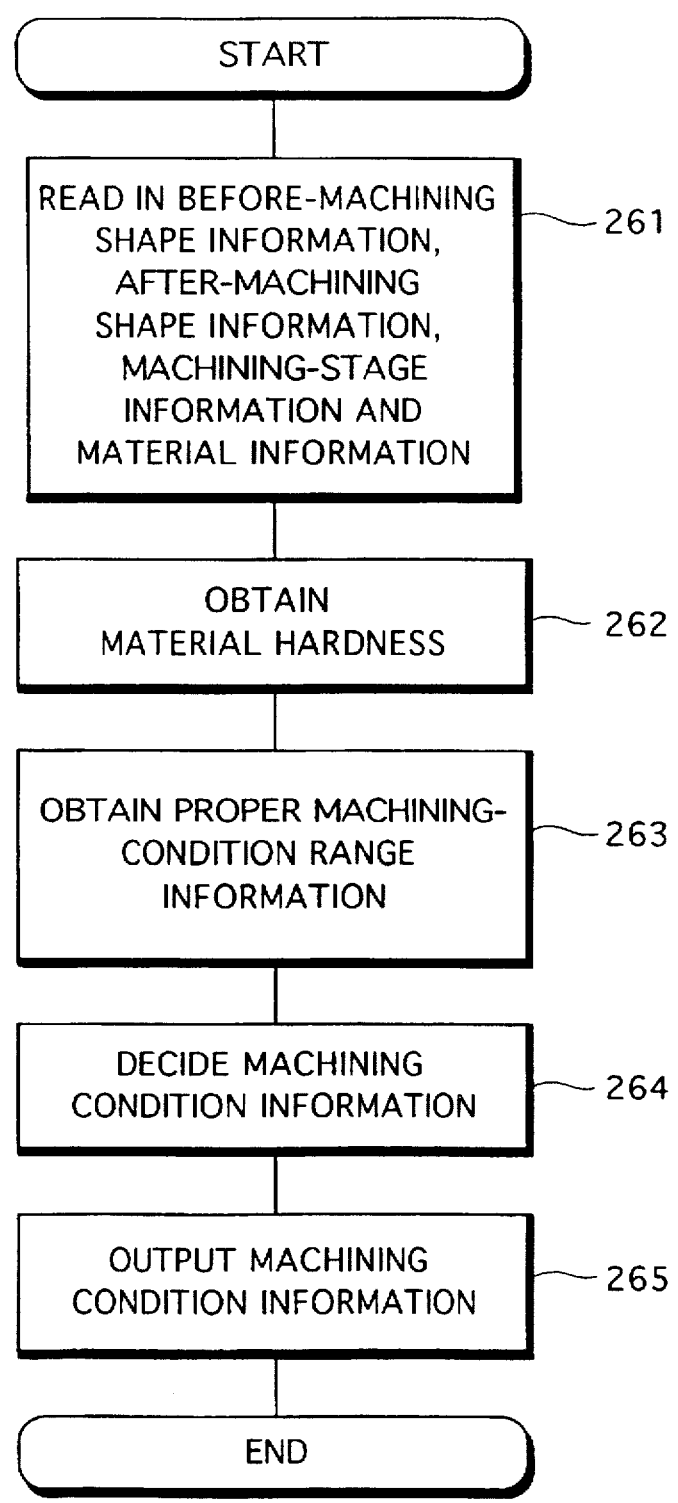
FIG. 56 is a flowchart illustrating a processing procedure in the machining condition determination unit.

FIG. 56 is a flowchart illustrating a processing procedure in the machining condition determination unit 24F.

The relative machining condition determination unit 24F reads in the before-machining shape information and after-machining shape information provided by the CAD apparatus 10, the material information and machining-stage information entered from the input unit 16 and the tool hardness provided by the tool-use determination unit 21A (FIG. 56; step 261).

The machining condition determination device 24F obtains the material hardness by searching the material data file of FIG. 18 on the basis of the material information that has been read in (FIG. 56; step 262).

On the basis of the information read in, the machining condition determination unit 24F decides the corresponding minimum and maximum values of rotational speed and corresponding minimum and maximum values of feed rate from the proper machining condition range information established in advance (FIG. 56; step 263).

The machining condition determination unit 24F creates the membership functions of the consequent variables in the machining-condition decision rules on the basis of the proper machining condition range decided.

The machining condition determination unit 24F decides the machining condition information in accordance with the machining-condition decision rules established in advance (FIG. 56; step 264).

The machining-condition decision rules are as follows, by way of example.

NC machine
- IF the machining stage is rough machining and the material hardness is low and the tool hardness is high,
- THEN the rotational speed is low and the feed rate is high.
- IF the machining stage is semi-finishing and the material hardness is high and the tool hardness is high,
- THEN the rotational speed is medium and the feed rate is high.
- IF the machining stage is finishing and the surface precision is coarse and the material hardness is low and the tool hardness is high,
- THEN the rotational speed is high and the feed rate is medium.
- IF the machining stage is finishing and the surface precision is smooth and the material hardness is high and the tool hardness is low,
- THEN the rotational speed is high and the feed rate is low.

:
:

In these machining-condition information decision rules, there is a case in which "the material hardness is high" and the "tool hardness is low". It goes without saying that material hardness and tool hardness are strictly relative quantities and that in terms of absolute hardness, the tool hardness is greater than material hardness.

FIGS. 58a–58f illustrate examples of membership functions and singletons with regard to antecedent variables and consequent variables of machining-condition decision rules.

Figure 58A:
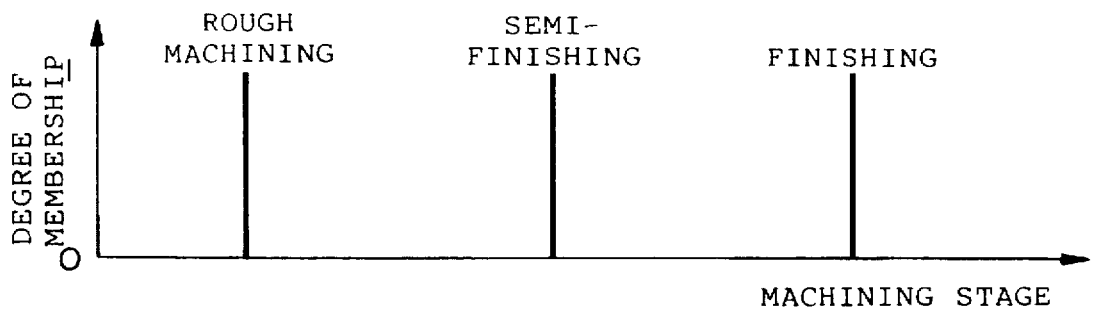
FIGS. 58a, 58b, 58c, 58d, 58e and 58f illustrate examples of membership functions and singletons with regard to antecedent variables and consequent variables of a machining condition decision rule.

FIG. 58a illustrates three singletons of linguistic information "rough machining", "semi-finishing" and "finishing" with regard to the antecedent variable "machining stage".

Figure 58B:
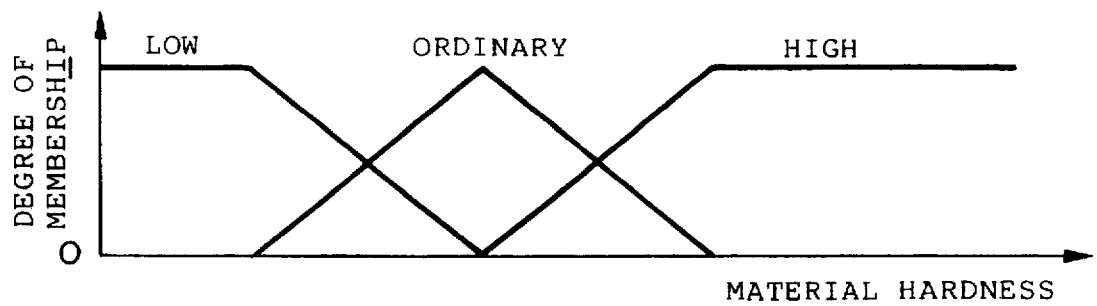

FIG. 58b illustrates three membership functions of linguistic information "low", "ordinary" and "high" with regard to the antecedent variable "material hardness".

Figure 58C:
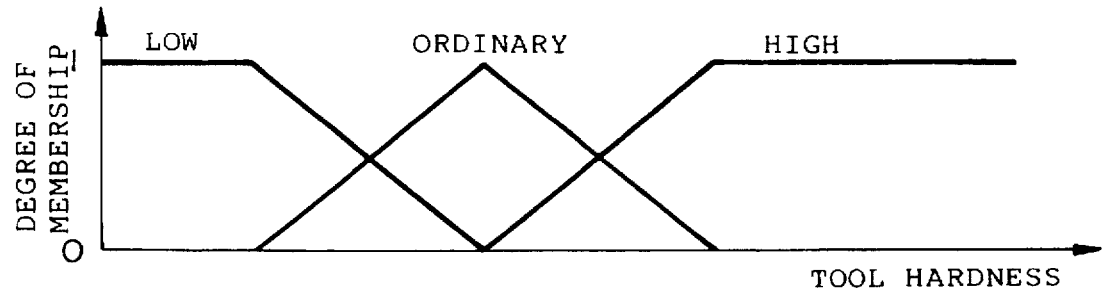

FIG. 58c illustrates membership functions of linguistic information "low", "ordinary" and "high" with regard to the antecedent variable "tool hardness".

Figure 58D:
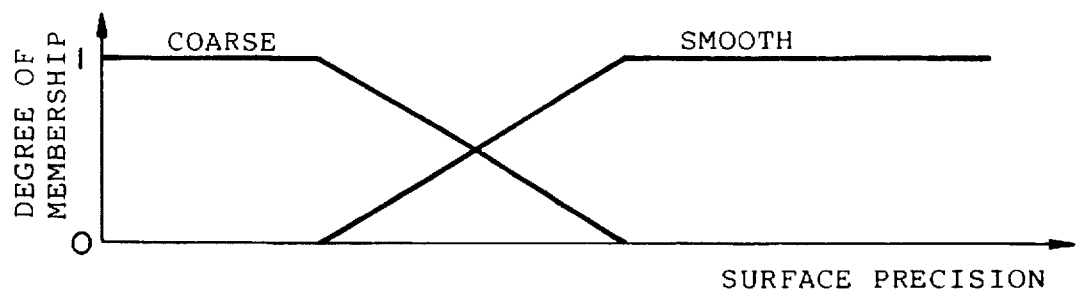

FIG. 58d illustrates two membership functions of linguistic information "coarse" and "smooth" with regard to the antecedent variable "surface precision".

Figure 58E:
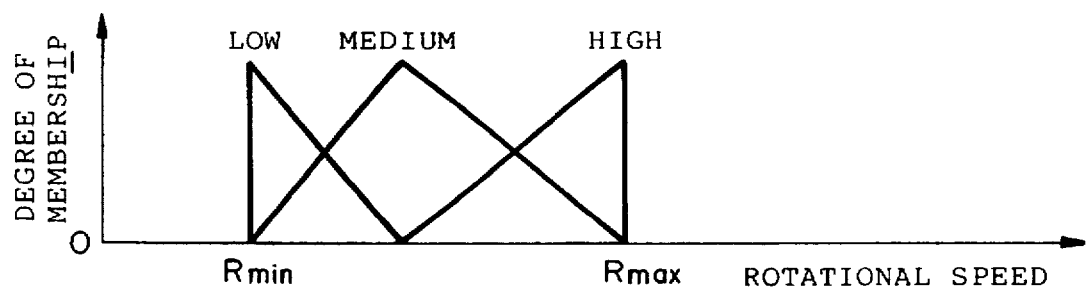

FIG. 58e illustrates three membership functions of linguistic information "low", "medium" and "high" with regard to the consequent variable "rotational speed".

Figure 58F:
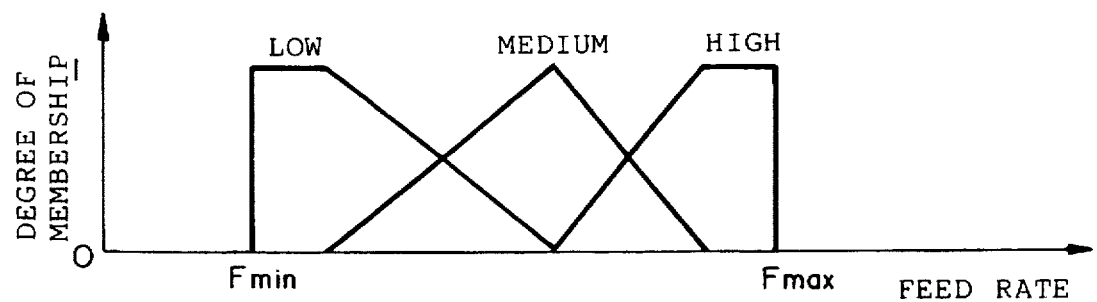

FIG. 58f illustrates three membership functions of linguistic information "low", "medium" and "high" with regard to the consequent variable "feed rate".

With regard to the consequent variable "rotational speed" of FIG. 58e, three membership functions are defined between the minimum value Rmin and maximum value Rmax. Further, with regard to the consequent variable "feed rate" of FIG. 58f, three membership functions are defined between the minimum value Fmin and maximum value Fmax.

When the proper machining condition range (maximum and minimum values) is read out of the material & tool data base 25, the machining condition determination unit 24F creates the above-mentioned membership functions on the basis of the proper machining condition range that has been read out. It then decides the machining condition, namely the rotational speed and feed rate of the tool used, using the membership functions that have been created.

The machining condition determination unit 24F outputs the decided machining conditions to the CAM apparatus 17 and machine tool 18 as machining condition information (FIG. 56; step 265).

Accordingly, the machining condition determination unit 24F creates consequent variables of machining-condition decision rules on the basis of the proper machining condition range of the tool used by the NC machine and then decides the machining conditions. As a result, the unit is capable of deciding the optimum machining conditions for the tool used.

2.5 Material & tool data base reconstruction unit (1) Summary

Figure 59:
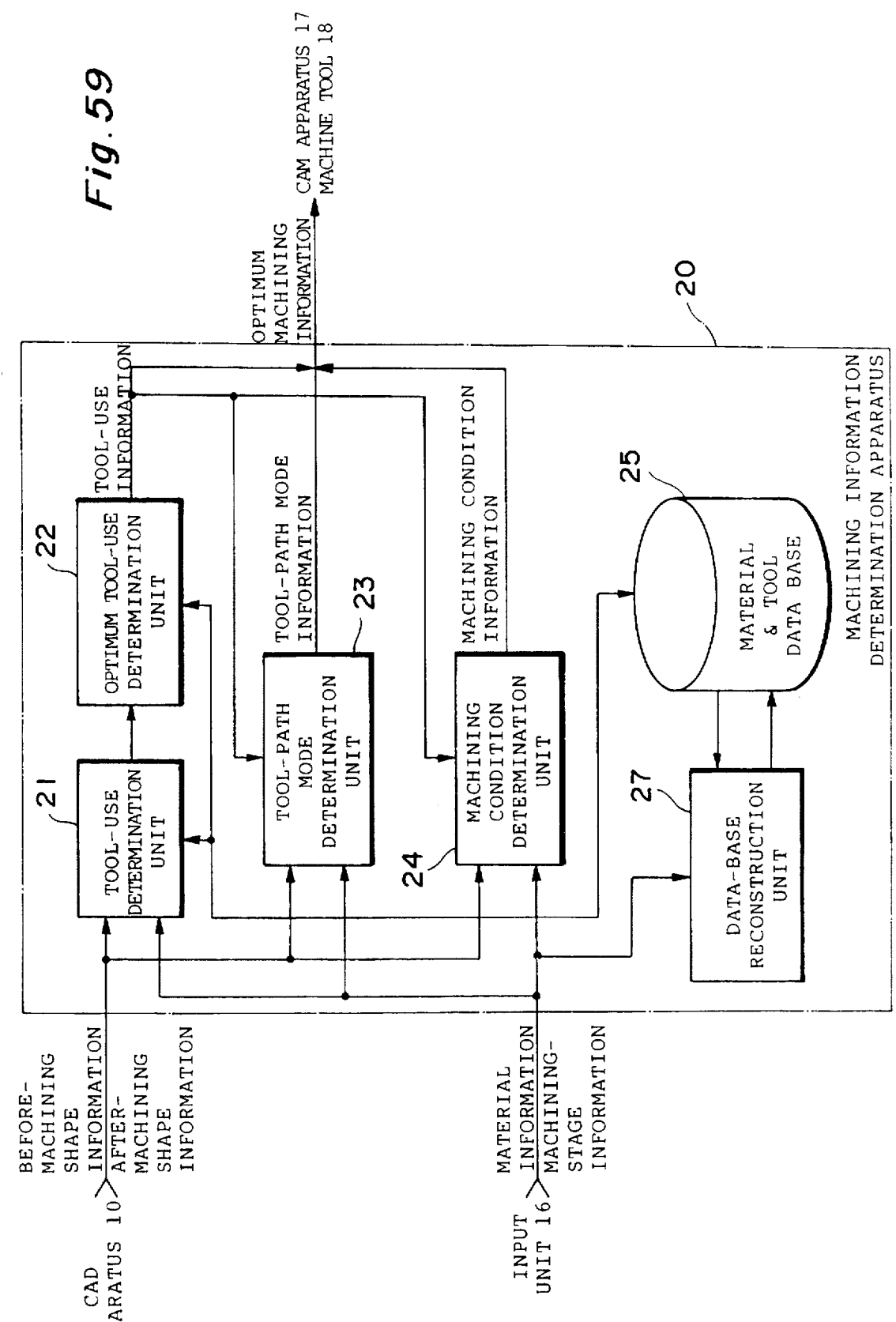
FIG. 59 is a block diagram illustrating the construction of a machining information determination apparatus provided with a data-file reconstruction unit.

FIG. 59 is a block diagram illustrating the construction of a machining information determination apparatus 20 provided with a data-file reconstruction unit 27.

The material & tool data base 25 stores the material data file, NC machine tool-use data file and standard machining condition information. These data files contain an enormous amount of data. Accordingly, an embodiment will now be described in which the data-base file reconstruction unit 27 stores these data files in the material & tool data base 25 efficiently.

(2) Method of constructing data base classified according to user

The NC machine tool-use data file stores an enormous amount of data regarding tools used by an NC machine.

The data-base file reconstruction unit 27 constructs the material & tool data file 25 comprising solely data relating to tools selected by the user.

Figure 60A:
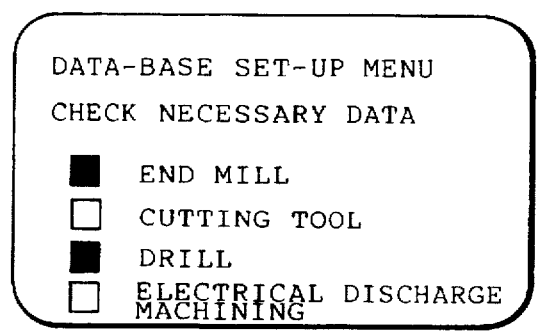
FIG. 60a illustrates an example of a display screen for reconstructing a data base.
Figure 60B:
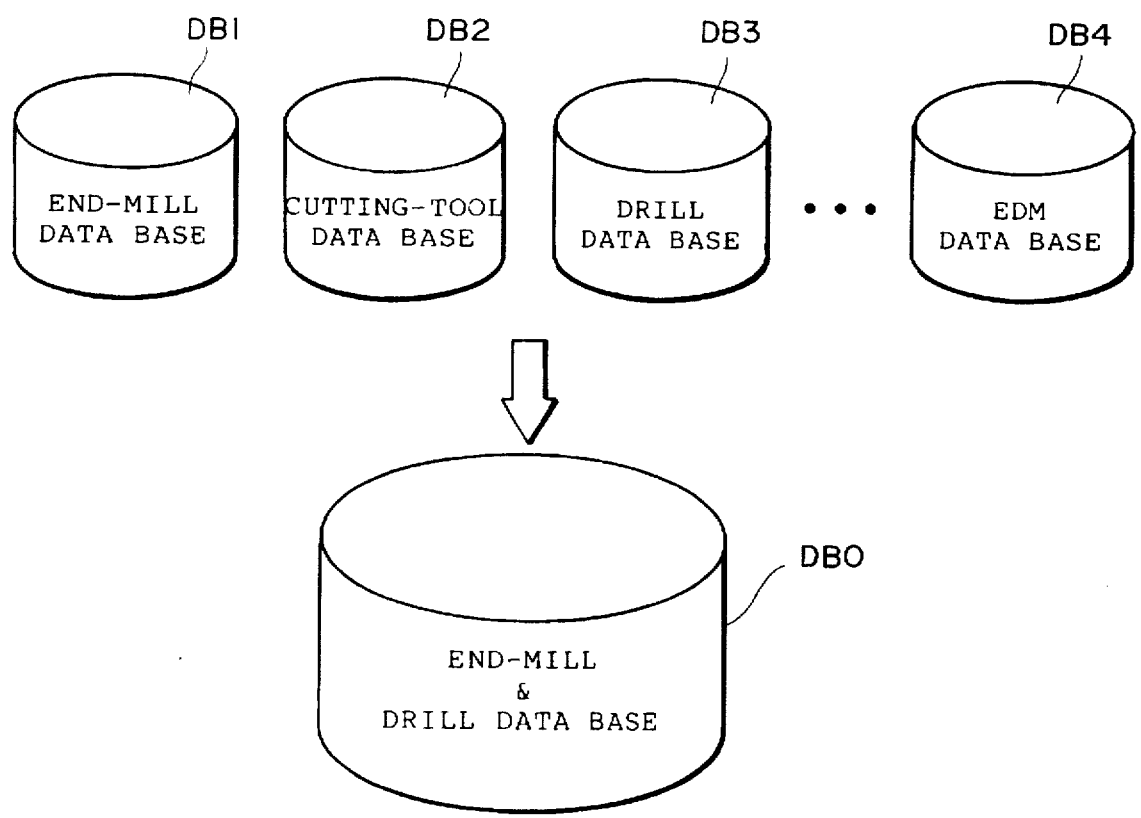
FIG. 60b shows an example of a data base before and after data-base reconstruction.

By way of example, assume the existence of data bases relating to tools, such as an end-mill data base DB1, cutting-tool data base DB2, drill data base DB3, etc., shown in FIG. 60b. A display screen shown in FIG. 60a is displayed on a prescribed display unit and the user selects the necessary tools in accordance with this display screen. The data-base file reconstruction unit 27 reconstructs the material & tool data base 25 comprising the tools selected by the user. The data bases of tools not selected are deleted.

For example, if the user selects the end mill and drill as the necessary tools, then the data-base file reconstruction unit 27 constructs an end-mill & drill data base DB0 (see FIG. 60b).

Furthermore, the end-mill data base DB1, for example, stores data relating to tools on a tool-number basis. In a case where this data base has a tool of a tool number not used by the user, an arrangement may be adopted in which the data-base file reconstruction unit 27 reconstructs the material & tool data base 25 by deleting this unused tool.

In the case described above, the data-base file reconstruction unit 27 deletes a data base concerning a tool not required by the user. However, an arrangement may be adopted in which, rather than deleting an unselected data base, the data base is excluded as an object of retrieval.

Further, a material data file comprising material data required by the user may be constructed in the same manner.

Thus, the material & tool data file 25 is capable of exploiting resources effectively. In addition, the time needed for data retrieval can be shortened.

(3) Method of constructing data base in which data files are fuzzified

The material & tool data base 25 stores standard machining condition information. This information includes tool diameter, tool length, tool hardness, feed rate and rotational speed with regard to each tool. When data is stored in the material & tool data base 25 in the form of crisp information regarding each of these items, the amount of data becomes enormous. Accordingly, the standard machining condition information is stored in the material & tool data base 25 in the form of fuzzy information.

Figure 61A:
FIG. 61a illustrates linguistic information relating tool diameter, tool length, tool hardness, feed rate and rotational speed of each of various tools.

FIG. 61a illustrates linguistic information relating tool diameter, tool length, tool hardness, feed rate and rotational speed of each tool. FIGS. 61b–61f illustrate membership functions representing linguistic information regarding each of the items shown in FIG. 61a.

Figure 61B:
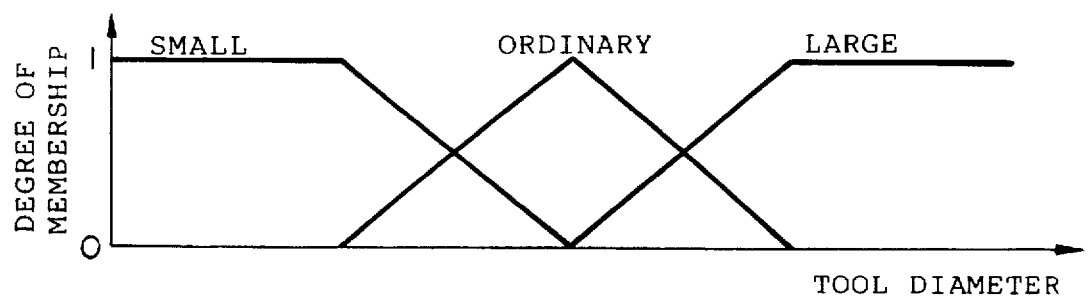

FIG. 61b illustrates three membership functions of linguistic information "small", "ordinary" and "large, regarding "tool diameter".

Figure 61C:
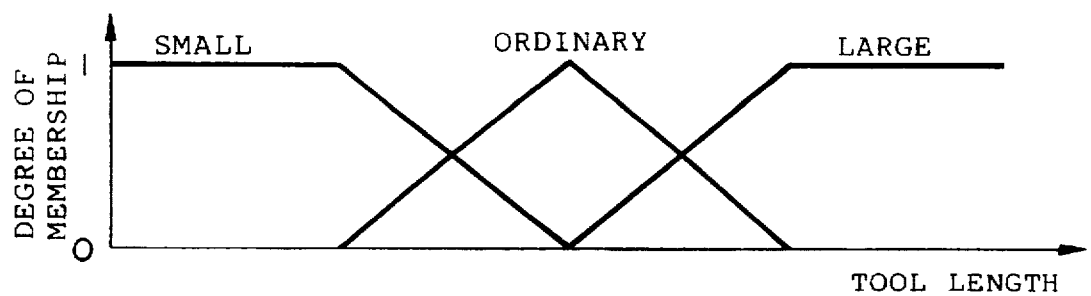

FIG. 61c illustrates three membership functions of linguistic information "small", "ordinary" and "large" regarding "tool length".

Figure 61D:
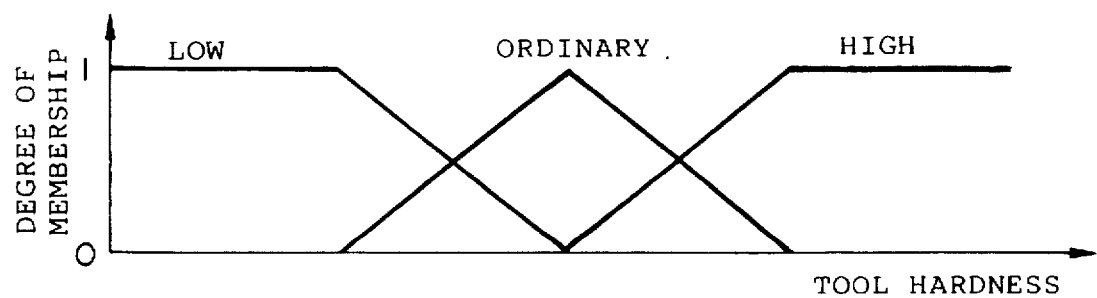

FIG. 61d illustrates membership functions of linguistic information "low", "ordinary" and "high" regarding "tool hardness".

Figure 61E:
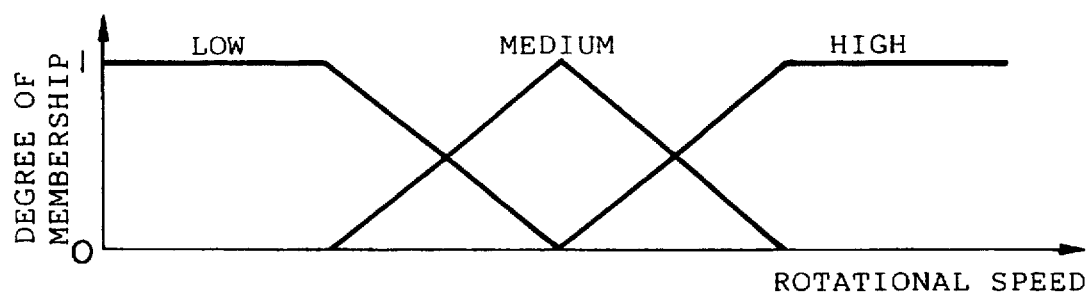

FIG. 61e illustrates three membership functions of linguistic information "low", "medium" and "high" regarding "rotational speed".

Figure 61F:
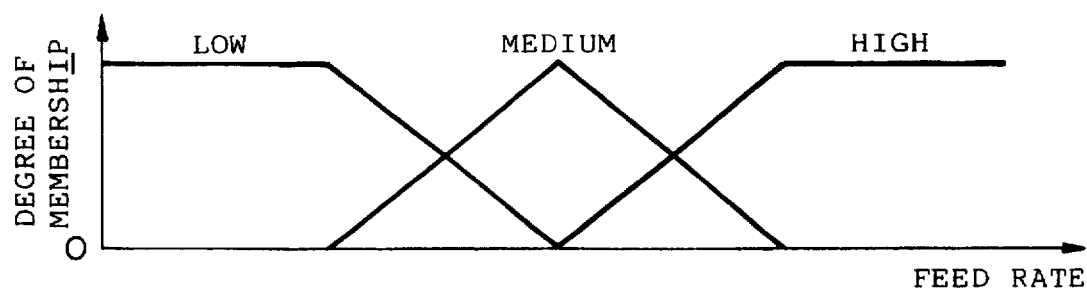

FIG. 61f illustrates three membership functions of linguistic information "low", "medium" and "high" regarding "feed rate".

Accordingly, storing information in the form of fuzzy information rather than crisp information makes it possible to exploit the storage capacity of the material & tool data base 25 more effectively.

3. Machining information determination system (part 2) (When data files are used)

3.1 Summary

In this machining information determination system, the machining information determination apparatus 20 in FIG. 1 is replaced by a machining information determination apparatus 30.

In the section "1. Machining information determination system", the machining information determination apparatus 20 decides the optimum machining information on the basis of the before-machining shape information and after-machining shape information provided by the CAD apparatus 10 as well as the material information and machining stage information entered from the input unit 16, and in accordance with the decision rules and membership functions.

In this machining information determination system, the machining information determination apparatus 30 decides the optimum machining information using data files registered in a material & tool data base 35 in advance.

3.1 Machining information determination apparatus 30

(1) Construction of machining information determination apparatus

FIG. 62 is a functional block diagram illustrating the detailed construction of the machining information determination apparatus 30.

The machining-information determination apparatus 30 has a tool-use determination unit 31, an optimum tool-use determination unit 32, a tool-path mode determination unit 33, a machining condition determination unit 34 and a material & tool information data base 35.

Each of these units will now be described in simple terms, with the details being saved for later.

On the basis of the before-machining shape information and after-machining shape information provided by the CAD apparatus 10 as well as the material information and machining-stage information entered from the input unit 16, the tool-use determination unit 31 refers to a tool-use data file, which has been stored in the material & tool data base 35, described below, to decide upon a machine tool for machining a workpiece as well as the tools used by this machine tool.

In a case where the tool-use determination unit 31 has decided that an NC machine is the optimum machine tool for machining, the optimum tool-use determination unit 32 decides upon the optimum tool used by referring to an NC machine tool-use data file, which has been stored in the material & tool data base 35, described below, on the basis of the tools decided by the tool-use determination unit 31. The tools decided upon are outputted as the tool-use information.

On the basis of the before-machining shape information and after-machining shape information provided by the CAD apparatus 10, the material information and machining-stage information entered from the input unit 16 and the tool-use information decided by the optimum tool-use determination unit 32, the tool-path mode determination unit 33 refers to a tool-path mode data file, which has been stored in the material & tool data base 35, and which will be described later, to decide a machining path mode according to which the NC machine subjects the workpiece to machining. The tool path mode that has been decided is outputted as a tool-path mode information.

On the basis of the before-machining shape information and after-machining shape information provided by the CAD apparatus 10, the material information and machining-stage information entered from the input unit 16 and the tool-use information decided by the optimum tool-use determination unit 32, the machining condition determination unit 34 refers to a machining-condition data file, described later, to decide optimum machining conditions in order for a machine tool to machine the workpiece. The machining conditions that have been decided are outputted as machining condition information.

The material & tool data base 35 stores a material data file relating to the material of the workpiece, a tool-use data file, an NC machine tool-use data file, a tool-path mode data file and a machining-condition data file.

The material data file and NC machine tool-use data file are identical with those stored in the material & tool data base 25. The details of the tool-use data file, tool-path mode data file and machining-condition data file will be described later.

(2) Overall processing of machining information determination apparatus

Figure 63:
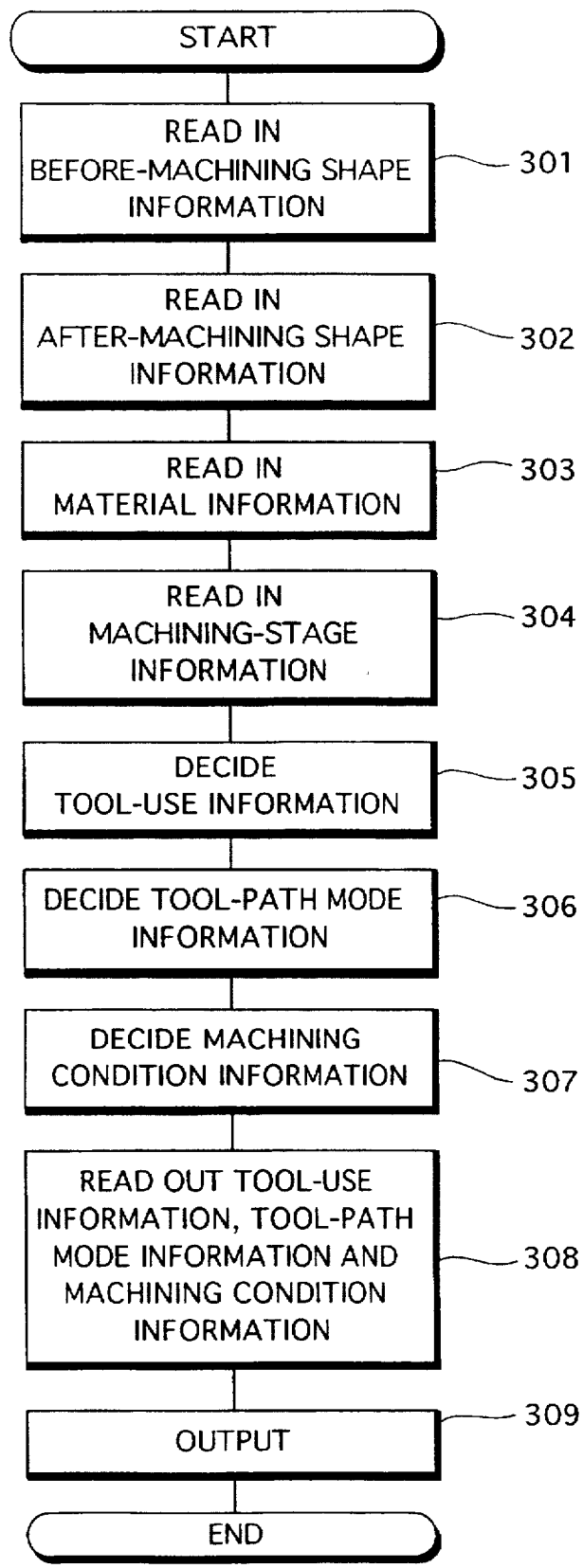
FIG. 63 is a flowchart illustrating a processing procedure in the machining information determination apparatus.

FIG. 63 is a flowchart illustrating a processing procedure in the machining information determination apparatus.

The machining-information determination apparatus 30 reads in the before-machining shape information provided by the CAD apparatus 10 (FIG. 63; step 301). For example, the machining information determination apparatus 30 reads in the before-machining shape information shown in FIG. 12.

The machining-information determination apparatus 30 reads in the after-machining shape information provided by the CAD apparatus 10 (FIG. 63; step 302). For example, the machining information determination apparatus 30 reads in the after-machining shape information shown in FIG. 13.

The machining-information determination apparatus 30 reads in the material information entered from the input unit 16 (FIG. 63; step 303). For example, the machining information determination apparatus 30 reads in the material information shown in FIG. 14.

The machining-information determination apparatus 30 reads in the machining-stage information entered from the input unit 16 (FIG. 63; step 304). For example, the machining information determination apparatus 30 reads in the machining-stage information shown in FIG. 15.

The before-machining shape information, after-machining shape information, material information and machining-stage information read in are applied to the tool-use determination unit 31, tool-path mode determination unit 33 and machining condition determination unit 34.

The tool-use determination unit 31 decides upon the optimum machine tool among the machine tools available on the basis of the before-machining shape information, after-machining shape information, material information and machining-stage information read in, and then decides upon the tools used by this machine tool by referring to the tool-use data file stored in the material & tool data base 35. The optimum tool-use determination unit 32 decides upon the tool to be used by referring to the NC machine tool-use data file stored in the material & tool data case 35 on the basis of the tools used decided by the tool-use determination unit 31 (FIG. 63; step 305).

The NC machine tool-use data file is as illustrated in FIG. 20. The details of the tool-use data file will be described later.

If the tool used is decided, then, in a case where the machine tool is an NC machine and the tool used is an end mill, the tool-path mode determination unit 33 decides a tool path mode by referring to the tool-path mode data file stored in the material & tool data base 35 on the basis of the tool-use information, before-machining shape information, after-machining shape information, material information and machining-stage information (FIG. 63; step 306).

The details of the tool-path mode data file will be described later.

The machining condition determination unit 34 decides machining conditions by referring to the machining-condition data file stored in the material & tool data file 35 on the basis of the tool-use information, before-machining shape information, after-machining shape information, material information and machining-stage information. (FIG. 63; step 307).

The details of the machining-condition data file will be described later.

The machining-information determination apparatus 30 reads out the tool-use information, tool-path mode information and machining condition information and outputs this information to the CAM apparatus 17 and machine tool 18 (FIG. 63; steps 308, 309).

(3) Tool-use determination unit and optimum tool-use determination unit

On the basis of the before-machining shape information and after-machining shape information provided by the CAD apparatus 10 as well as the material information and machining-stage information entered from the input unit 16, the tool-use determination unit 31 decides the optimum machine tool for machining and then decides the tool used by this machine tool by referring to the tool-use data file stored in the material & tool data base 35.

Figure 64A:
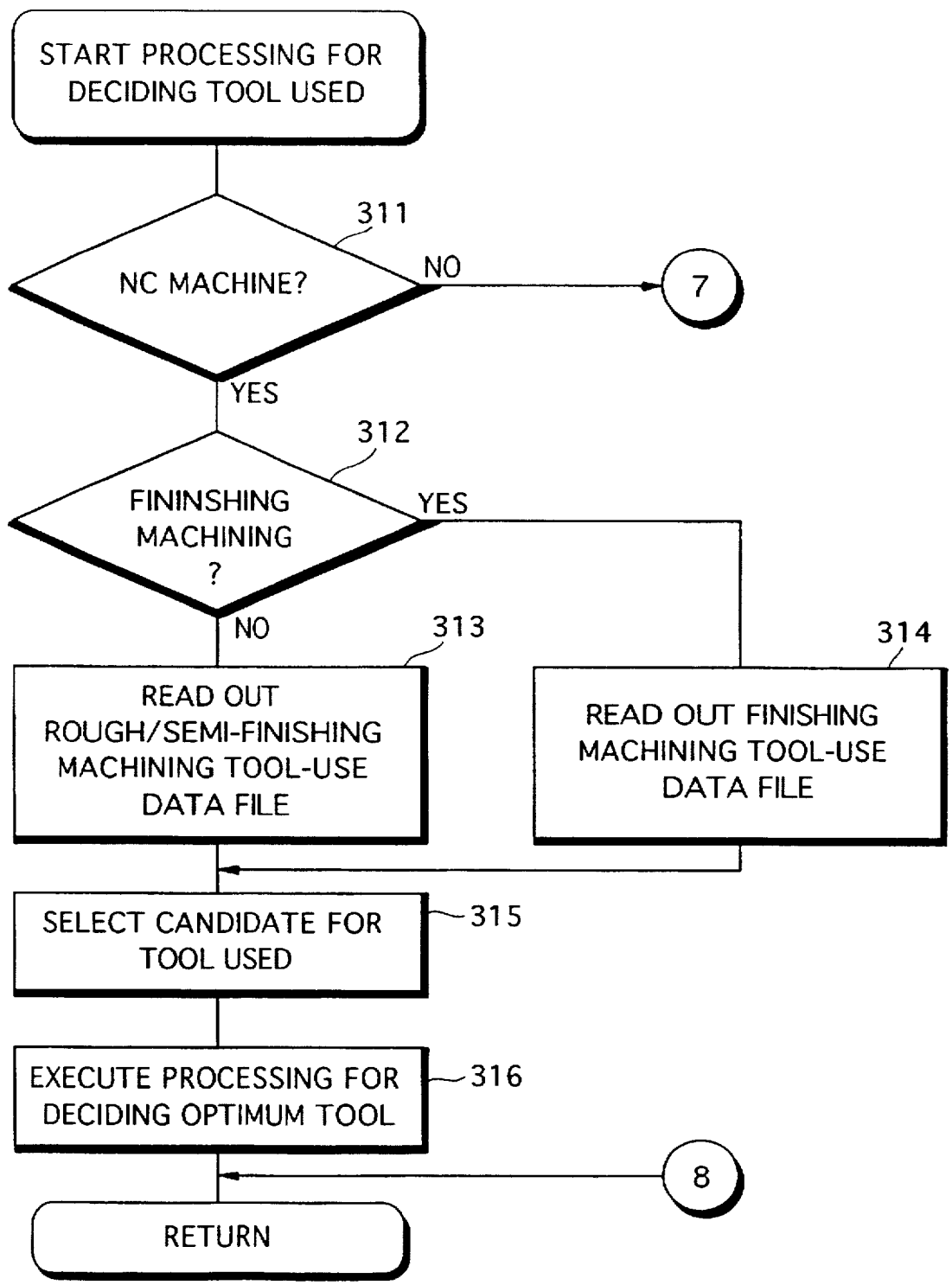
FIGS. 64a and 64b are flowcharts illustrating a processing procedure in a tool-use determination unit.
Figure 64B:
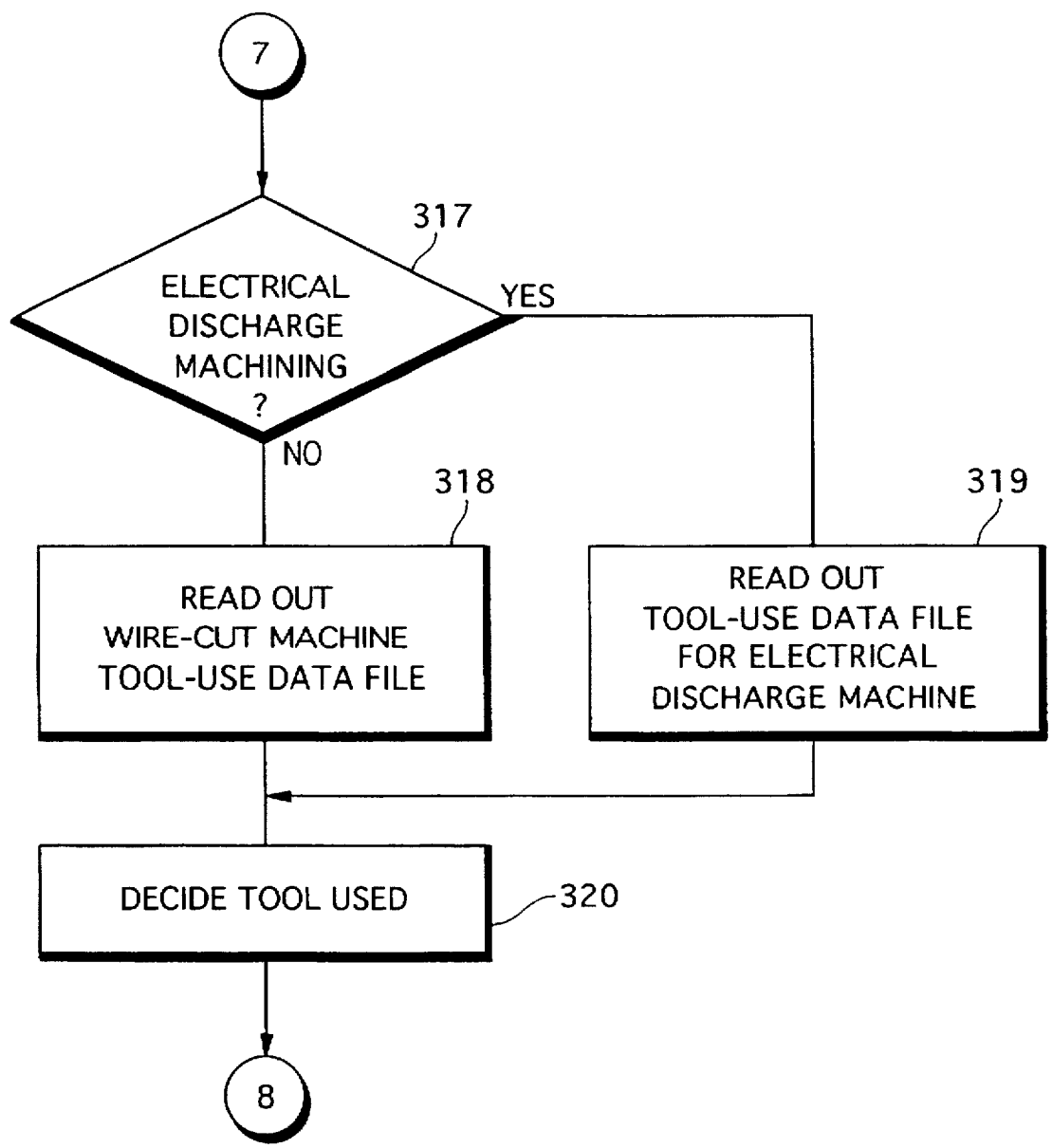

FIGS. 64a and 64b are flowcharts illustrating a processing procedure in the tool-use determination unit 31.

The tool-use determination unit 31 determines whether the NC machine is used as the machine tool on the basis of the machining shape information in the before-machining shape information provided by the CAD apparatus 10 (FIG. 64a; step 311).

The tool-use determination unit 31 decides that the NC machine is to be used as the machine tool when the machining shape of the before-machining shape information is indicative of "partial surface cutting", and decides that the electrical discharge machine or wire-cut machine is to used as the machine tool when the machining shape is indicative of "full surface cutting".

When the tool-use determination unit 31 decides that the NC machine is to be used as the machine tool (YES at step 311), it judges, based upon the machining-stage information entered from the input unit 16, whether the machining stage is either finishing machining or rough/semi-finishing machining (FIG. 64a; step 312).

When the tool-use determination unit 31 decides that the machining stage is rough/semi-finishing machining (NO at step 312), it reads a rough/semi-finishing machining tool-use data file out of the material & tool data base 35 (FIG. 64a; step 313).

FIG. 65 illustrates an example of the tool-use data file for rough machining and semi-finishing machining.

The rough/semi-finishing machining tool-use data file includes tool names and tool diameters stored in correspondence with material, machining stage, cutting width and cutting depth. For example, a tool name "end mill A" and a tool diameter "10–30" are stored in correspondence with a material "iron", a machining stage "rough machining", a cutting width "10 or greater" and a cutting depth "30 or less".

In a case where the machining stage is finishing machining (YES at step 312), the tool-use determination unit 31 reads a finishing machining tool-use data file out of the material & tool data base 35 (FIG. 64a; step 314).

FIG. 66 illustrates an example of the tool-use data file for finishing.

The finishing machining tool-use data file includes tool names and tool diameters stored in correspondence with material, surface precision, cutting width and cutting depth. For example, a tool name "end mill A" and a tool diameter "5–8" are stored in correspondence with a material "iron", a surface precision "coarse", a cutting width "10 or greater" and a cutting depth "30 or less".

The tool-use determination unit 31 reads out either the rough/semi-finishing machining tool-use data file or the finishing machining tool-use data file on the basis of the machining-stage information entered. When this is done, the unit 31 selects, on the basis of the entered before-machining shape information, after-machining shape information, material information and machining-stage information, the tool conforming to the conditions contained in this information as well as the tool diameter of this tool (FIG. 64a; step 315).

In the case of rough machining, a tool selected for use is one whose tool diameter is greater than the cutting width. The reason for this is that when a tool having a tool diameter smaller than the cutting width is selected, rough machining is carried out using a tool whose diameter is too small. The result is inefficiency. In this case, it is so arranged that rough machining is not performed at locations where the cutting width is smaller than the tool diameter. When finishing is carried out, it will suffice to machine these locations not machined at the time of rough machining.

When the tool-use determination unit 31 selects the tool of the NC machine from the tool-use data file, the optimum tool-use determination unit 32 decides upon the optimum tool for use by searching the NC machine tool-use data file on the basis of the tool decided by the tool-use determination unit 31 (FIG. 64a; step 316).

When the tool-use determination unit 31 decides upon the electrical discharge machine or wire-cut machine at step 311 on the basis of the machining shape of the after-machining shape information (NO at step 311), the unit 31 judges whether the electrical discharge machine is to be used as the machine tool (FIG. 64b; step 317).

The tool-use determination unit 31 selects the wire-cut machine or electrical discharge machine on the basis of the machining-stage information entered from the input unit 16. The tool-use determination unit 31 decides upon use of the wire-cut machine when the machining stage is "rough machining" or "semi-finishing". Further, the electrical discharge machine is decided upon when the machining stage is "finishing".

When the tool-use determination unit 31 decides upon use of the wire-cut machine (NO at step 317), it reads a wire-cut machine tool-use data file out of the material & tool data base 35 (FIG. 64b; step 318).

FIG. 67 illustrates an example of the tool-use data file for the wire-cut machine.

The wire-cut machine tool-use data file includes tool diameter stored in correspondence with material, machining stage, cutting width and machining shape. For example, a tool diameter "0.5" is stored in correspondence with a material "iron", a machining stage "rough machining", a cutting width "10 or greater" and a machining shape "full surface cutting".

When the tool-use determination unit 31 decides that the machining stage is finishing machining (YES at step 317), the unit 31 reads a tool-use data file for the electrical discharge machine out of the material & tool data base 35 (FIG. 64b; step 319).

FIG. 68 illustrates an example of a tool-use data file for the electrical discharge machine.

The tool-use data file for the electrical discharge machine includes electrode number stored in correspondence with material, surface precision, cutting width and machining depth. For example, a number of electrodes "1" is stored in correspondence with a material "iron", a surface precision "coarse", a cutting width "1 or greater" and a cutting depth "25 or less". It is so arranged that the number of electrodes is raised in a case where the cutting width is small and the cutting depth is large.

The tool-use determination unit 31 reads out either the wire-cut machine tool-use data file or the tool-use data file for the electrical discharge machine. When this is done, the unit 31 selects, on the basis of the entered before-machining shape information, after-machining shape information, material information and machining-stage information, the tool diameter or number of electrodes conforming to the conditions contained in this information. This is adopted as tool-use information (FIG. 64b; step 320).

Though the wire-cut machine is adopted in case of rough machining, the electrical discharge machine may be used instead. Depending upon the tool hardness, cutting width and cutting depth, there are cases in which it is better to use the electrical discharge machine rather than the wire-cut machine or even cases in which machining cannot be performed unless the electrical discharge machine is employed. In the these cases, machining is carried out using the electrical discharge machine instead of the NC machine.

Furthermore, in a case where the machining stage is finishing, it may be arranged to perform machining using the wire-cut machine.

Figure 69:
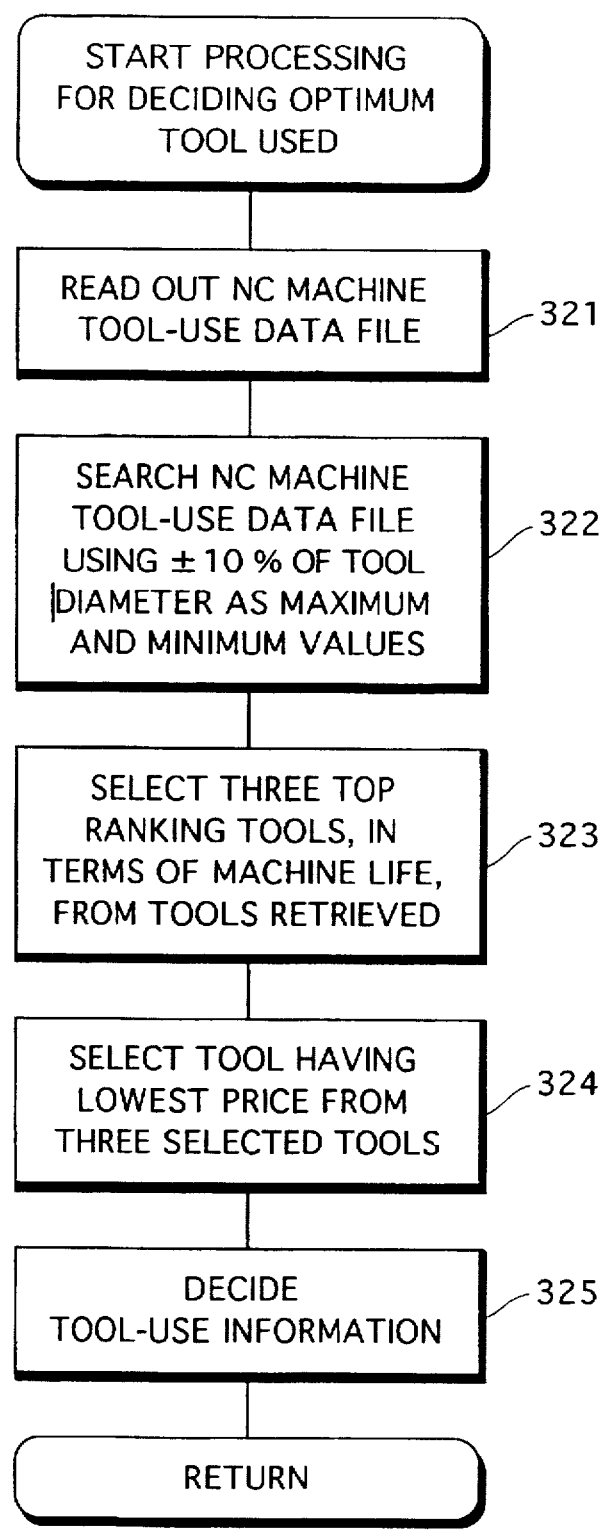
FIG. 69 is a flowchart illustrating a processing procedure in an optimum tool-use determination unit.

FIG. 69 is a flowchart illustrating the processing procedure executed in the optimum tool-use determination unit 32 at step 316.

The optimum tool-use determination unit 32 decides upon the optimum tool to be used by the NC machine on the basis of the tool used and its tool diameter decided by the tool-use determination unit 31.

The optimum tool-use determination unit 32 reads the NC machine tool-use data file out of the material & tool data base (FIG. 69; step 321).

The optimum tool-use determination unit 32 adopts ±10 of the tool diameter, which has been decided by the tool-use determination unit 31, as maximum and minimum values of the tool diameter and retrieves tools within this range from the NC machine tool-use data file (FIG. 69; step 322).

With regard to the tools thus obtained by retrieval from the NC machine tool-use data file, the unit 32 selects the three top ranking tools in terms of tool life (FIG. 69; step 323).

The optimum tool-use determination unit 32 then selects, as the optimum tool for use, the tool having the lowest price among these three selected tools (FIG. 69; step 324).

The optimum tool-use determination unit 32 decides upon the tool having the lowest price as the optimum tool for use by the NC machine (FIG. 69; step 325).

Thus, tool-use information is decided.

(4) Tool-path mode determination unit

In a case where the machine used is an NC machine and the tool used thereby is an end mill, the tool-path mode determination unit 33 decides the mode of the tool path on the basis of the before-machining shape information and after-machining shape information provided by the CAD 10, the material information and machining-stage information entered from the input unit 16 and the tool-use information provided by the optimum tool-use determination unit 32.

Figure 70:
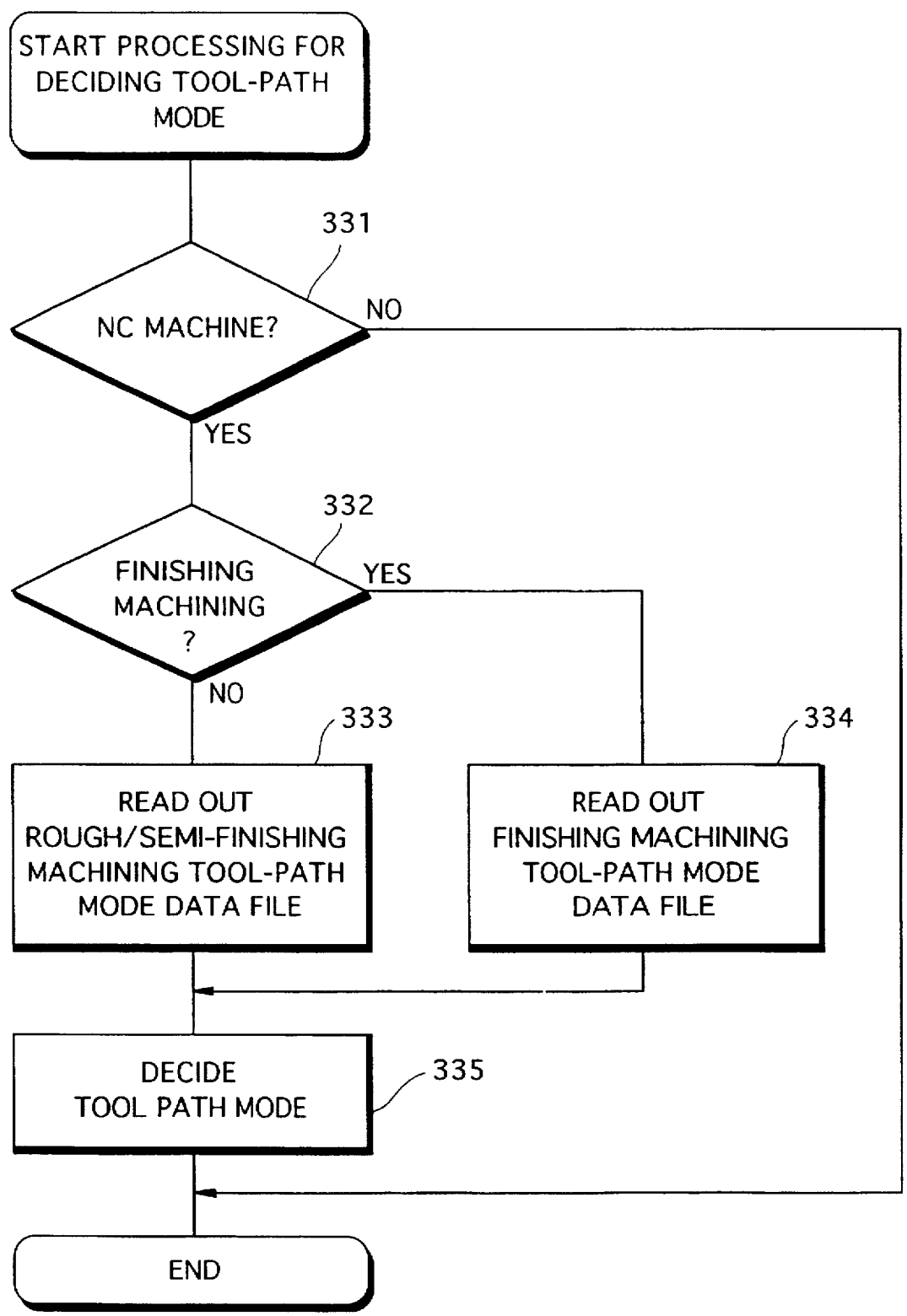
FIG. 70 is a flowchart illustrating a processing procedure in a tool-path determination unit.

FIG. 70 is a flowchart illustrating a processing procedure in the tool-path mode determination unit 33.

The tool-path determination unit 33 decides upon the mode of a tool path in a case where the tool-use determination unit 31 decides that the NC machine is used as the machine tool and that the end mill is used as the tool used (FIG. 70; step 331).

In a case where the NC machine is used as the machine tool and the end mill is used as the tool (YES at step 331), the tool-path mode determination unit 33 judges, on the basis of the machining-stage information entered from the input unit 16, whether the machining stage is either finishing machining or rough/semi-finishing machining (FIG. 70; step 332).

When the tool-path mode determination unit 33 decides that the machining stage is rough/semi-finishing machining (NO at step 332), it reads a rough/semi-finishing machining tool-path mode data file out of the material & tool data base 35 (FIG. 70; step 333).

FIG. 71 illustrates an example of a data file of tool path modes for rough machining and semi-finishing.

In the rough/semi-finishing machining tool-path mode data file, modes of tool paths have been decided to correspond to machining stage, cutting area, cutting width, cutting depth and convexity. For example, a tool path mode "one-way travel" corresponds to a machining stage "rough machining", a cutting area "400 or greater", a cutting width "40 or less", a cutting depth "5 or less" and a convexity "25 or greater".

When the tool-path mode determination unit 33 decides that the machining stage is finishing machining (YES at step 332), it reads the finishing tool-path mode data file out of the material & tool data base 35 (FIG. 70; step 334).

FIG. 72 illustrates an example of a data file of tool path modes for finishing;

In the finishing machining tool-path mode data file, modes of tool paths have been decided to correspond to surface precision, cutting area, cutting width, cutting depth and convexity. For example, a tool path mode "one-way travel" corresponds to a surface precision "coarse", a cutting area "400 or greater", a cutting width "40 or less", a cutting depth "5 or less" and a convexity "25 or greater".

The tool-path mode determination unit 33 reads out either the rough/semi-finishing machining tool-path mode data file or the finishing machining tool-path mode data file. When this is done, the unit 33 decides, on the basis of the before-machining shape information, after-machining shape information, material information and machining-stage information, the tool path mode conforming most closely to the conditions contained in this information (FIG. 70; step 335).

In a case where the end mill is not used as the tool of the NC machine serving as the machine tool (NO at step 331), the tool-path mode determination unit 33 does not execute determination of tool-path mode.

(5) Machining condition determination unit

The machining condition determination unit 34 decides machining conditions relating to tools used based upon the before-machining shape information and after-machining shape information provided by the CAD apparatus 10, as well as the material information and machining-stage information entered from the input unit 16.

Figure 73A:
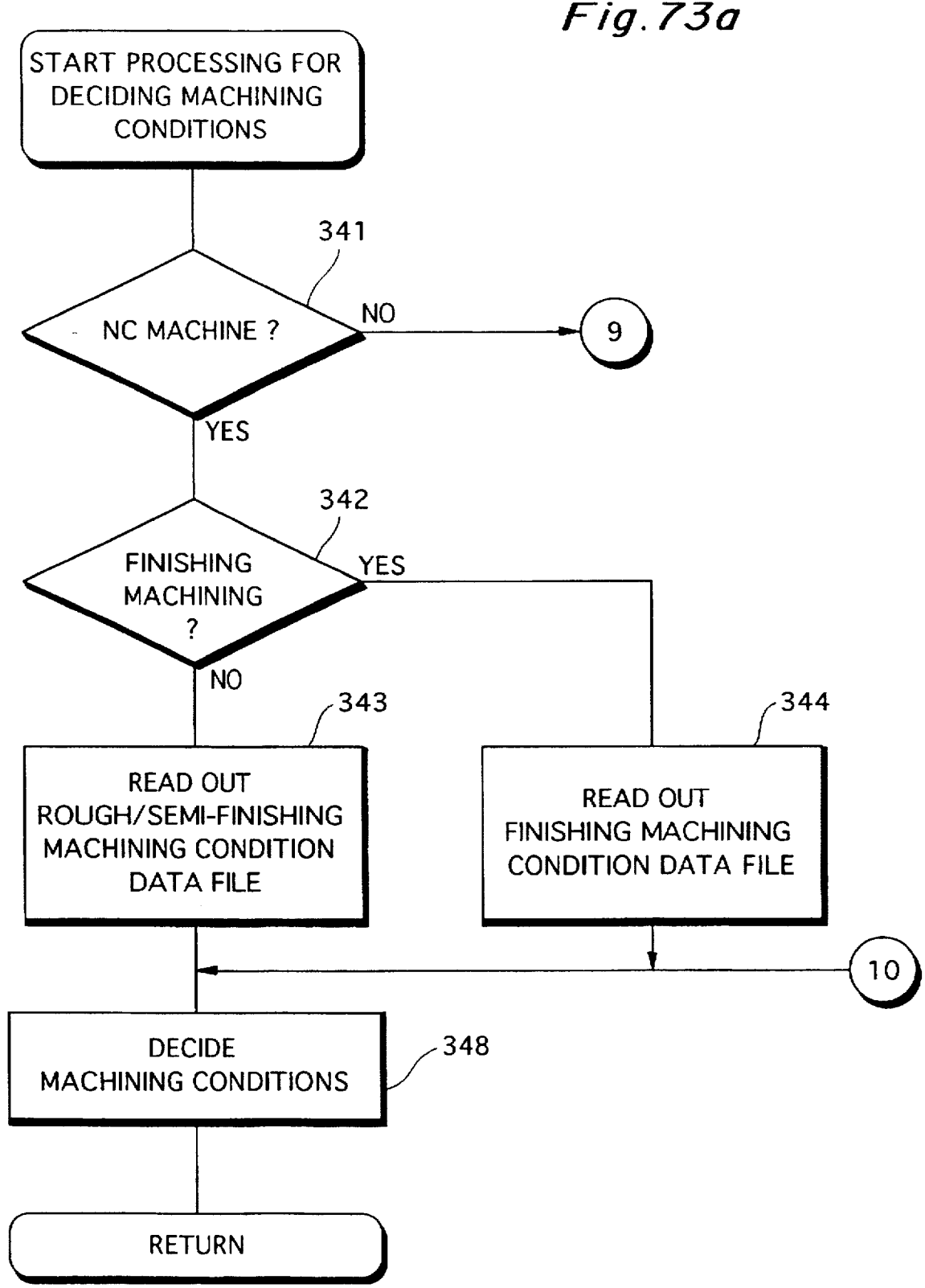
FIGS. 73a and 73b are flowcharts illustrating a processing procedure in a machining condition determination unit.
Figure 73B:
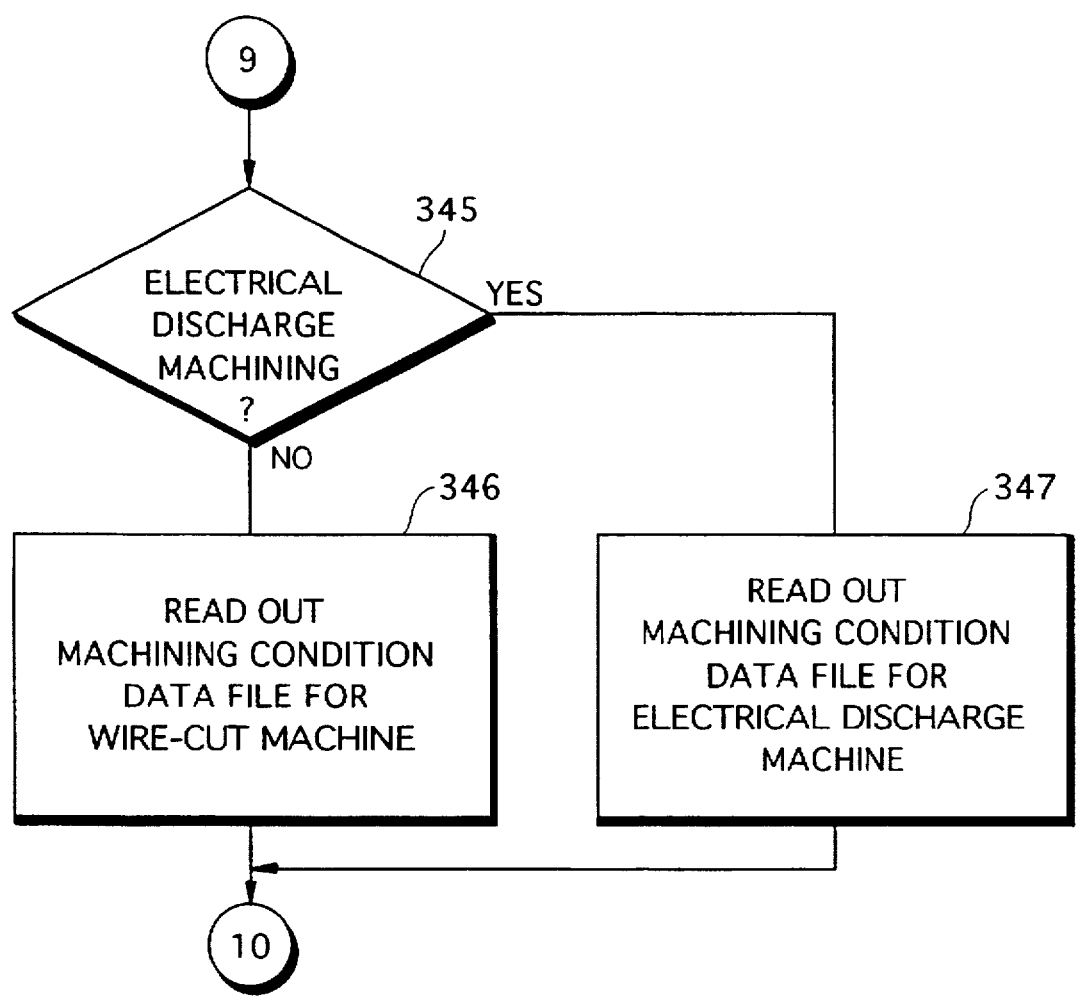

FIGS. 73a and 73b are flowcharts illustrating a processing procedure in the machining condition determination unit 34.

The machining condition determination unit 34 determines whether the machine tool decided upon by the tool-use determination unit 31 is an NC machine (FIG. 73a; step 341).

When the tool-use determination unit 31 decides upon the NC machine as the machine tool (YES at step 341), the machining condition determination unit 34 judges, based upon the machining-stage information entered from the input unit 16, whether the machining stage is either finishing machining or rough/semi-finishing machining (FIG. 73a; step 342).

When the machining condition determination unit 34 decides that the machining stage is rough/semi-finishing machining (NO at step 342), it reads out a rough/semi-finishing machining-condition data file (FIG. 73b; step 343).

FIG. 74 illustrates an example of the data file of machining conditions for rough machining and semi-finishing.

The rough/semi-finishing machining-condition data file includes feed rates and rotational speeds stored in correspondence with tool diameter, material and machining stage. For example, a feed rate "10" and a rotational speed "3000" are stored in correspondence with a tool diameter "4", a material "iron" and a machining stage "rough machining".

When the machining condition determination unit 34 decides that the machining stage is finishing machining (YES at step 342), it reads a finishing machining-condition data file out of the material & tool data base 35 (FIG. 73a; step 344).

FIG. 75 illustrates an example of the data file of machining conditions for finishing.

The finishing machining-condition data file includes feed rates and rotational speeds stored in correspondence with tool diameter, material and surface precision. For example, a feed rate "5" and a rotational speed "1000" are stored in correspondence with a tool diameter "4", a material "iron" and a surface precision "coarse".

When a NO decision is obtained at step 341, i.e., when the machining condition determination unit 34 decides that the machine tool is an electrical discharge machine or wire-cut machine and not an NC machine, it judges whether the electrical discharge machine is used (FIG. 73b; step 345).

On the basis of the machining-stage information entered from the input unit 16, the machining condition determination unit 34 decides upon use of the wire-cut machine when the machining stage is "rough machining" or "semi-finishing", and decides upon use of the electrical discharge machine when the machining stage is "finishing".

When the machining condition determination unit 34 decides that the wire-cut machine is to be used (NO at step 345), it reads a wire-cut machine machining-condition data file out of the material & tool data base 35 (FIG. 73b; step 346).

FIG. 76 illustrates an example of the data file of machining conditions for the wire-cut machine.

The wire-cut machining-condition data file includes feed rates and outputs stored in correspondence with tool diameter, material and machining stage. For example, a feed rate "5" and an output "5" are stored in correspondence with a tool diameter "0.5", a material "iron" and a machining stage "rough machining".

In case of the electrical discharge machine (YES at step 345), the machining condition determination unit 34 reads a machining-condition data file for the electrical discharge machine out of the material & tool data base 35 (FIG. 73b; step 347).

FIG. 77 illustrates an example of a machining-condition data file for the electrical discharge machine.

The machining-condition data file for the electrical discharge machine includes feed rates and outputs serving as machining conditions stored in correspondence with number of electrodes, material and surface precision. For example, a feed rate "10" and an output "6" are stored in correspondence with a number of electrode "1", a material "iron" and a surface precision "coarse".

On the basis of the entered before-machining shape information, after-machining shape information, material information and machining-stage information as well as the tool used decided upon by the tool-use determination unit 31, the machining condition determination unit 34 decides, with regard to any of the machining-condition data files read out in the manner set forth above, the machining conditions conforming most closely to the conditions contained in this information (FIG. 73a; step 348).

Machining condition information is thus decided.

4. Machining-process information determination system 4.1 Summary

Figure 78:
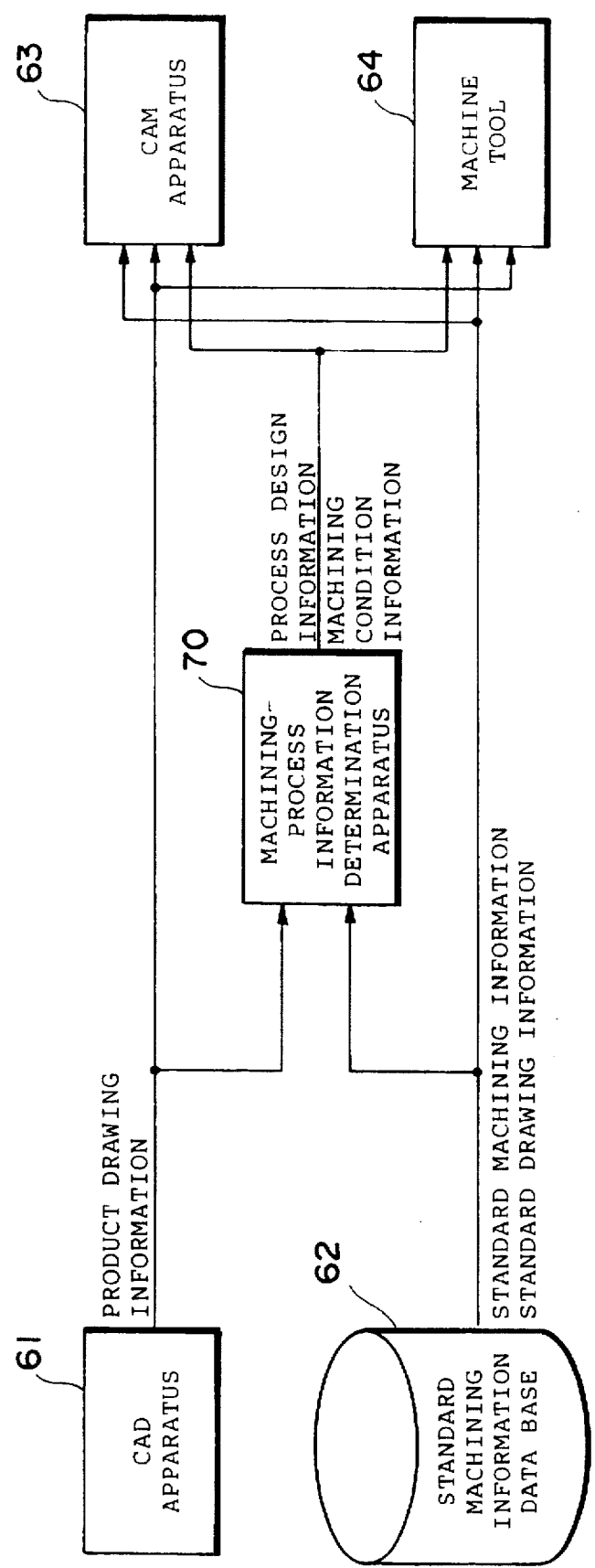
FIG. 78 is a functional block diagram illustrating the overall configuration of a machining-process information determination system.

FIG. 78 is a functional block diagram illustrating the overall configuration of a machining-process information determination system.

The machining-process information determination system has a CAD apparatus 61, a standard machining information data base 62, a machining-process information determination apparatus 70, a CAM apparatus 63 and a machine tool 64.

Each of these units will now be described in simple terms, with the details being saved for later.

The CAD apparatus 61 creates product drawing information relating a workpiece after machining. The product drawing information created by the CAD apparatus 61 will be described later.

The product drawing information is applied to the CAM apparatus 63 and the machine tool 64 from the CAD apparatus 61.

The standard machining information data base 62 stores standard drawing information relating to a workpiece before machining and, in correspondence with machining macro patterns, standard machining information relating to machining methods, machining tools, etc. The standard drawing information and standard machining information stored will be described later.

The standard drawing information and standard machining information is read out as necessary by the machining-process information determination apparatus 70, the CAM apparatus 63 and the machine tool 64.

The machining-process information determination apparatus 70 decides process design information and machining condition information on the basis of the product drawing information provided by the CAD apparatus 61 as well as the standard drawing information and standard machining information stored in the standard machining information data base 62. The process design information and machining condition information will be described later.

The process design information and machining condition information is applied to the CAM apparatus 63 and machine tool 64.

The CAM apparatus 63 creates NC data, which is for controlling the machine tool, on the basis of the product drawing information created by the CAD apparatus 61, the standard drawing information and standard machining information stored in the standard machining information data base 62 as well as the machining process information and machining condition information decided by the machining-process information determination apparatus 70. The CAM apparatus 63 is implemented by a computer system and software which operates in the system, by way of example.

The machine tool 64 is an NC machine, by way of example. The machine tool 64 subjects a workpiece to machining on the basis of the NC data created by the CAM apparatus 63.

The machine tool 63 is capable of being provided with a function for creating the NC data on the basis of the product drawing information created by the CAD apparatus 61, the standard drawing information and standard machining information stored in the standard machining information data base 62 as well as the machining process information and machining condition information decided by the machining-process information determination apparatus 70.

In this case the CAM apparatus 63 is unnecessary. The NC data is created by automatic programming with which the machine tool 64 is provided in advance.

4.2 CAD apparatus

The CAD apparatus 61 creates the product drawing information relating to the workpiece after machining.

Figure 79:
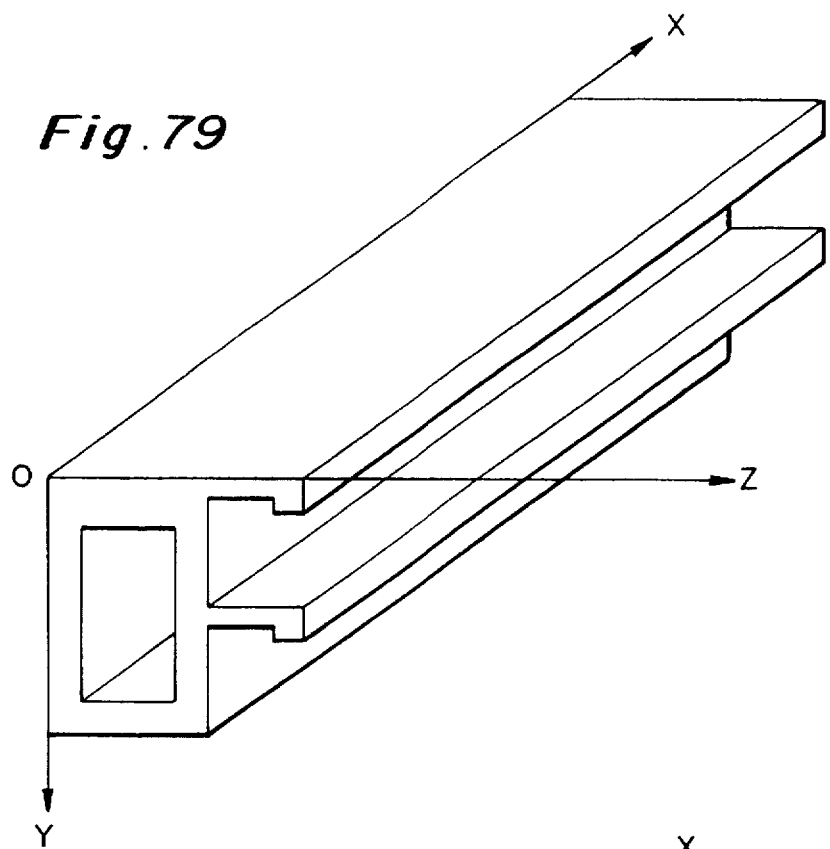
FIG. 79 illustrates the shape of a workpiece before machining.
Figure 80:
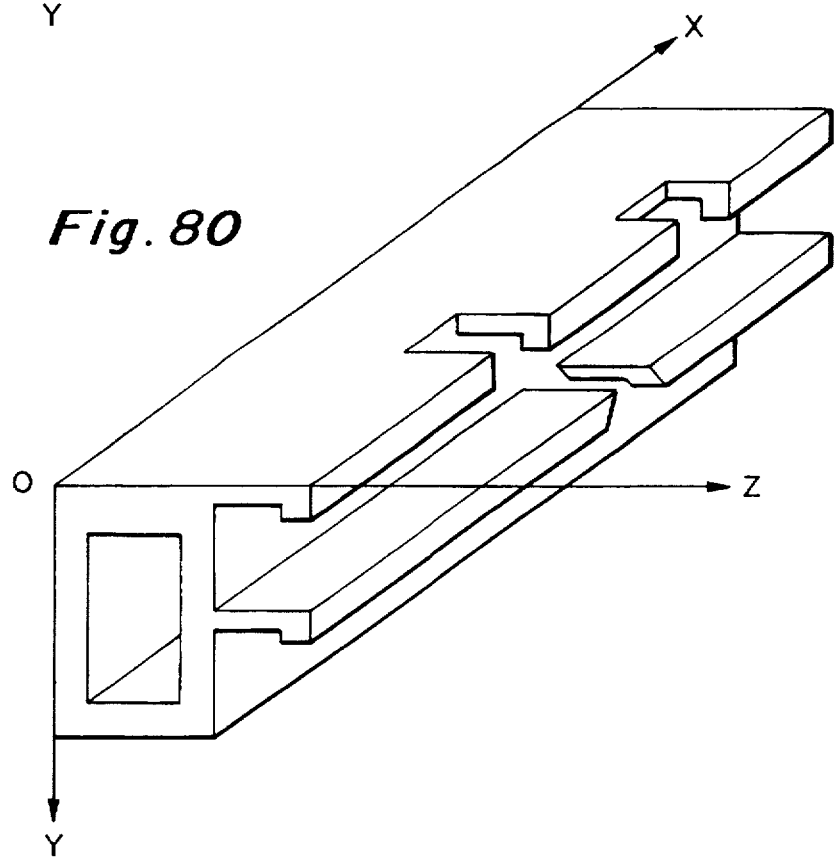
FIG. 80 illustrates a manufactured product obtained by machining the workpiece of FIG. 79.

For example, in a case where a workpiece of the kind shown in FIG. 79 is machined to fabricate a product shown in FIG. 80, the CAD apparatus 61 creates product drawing information relating to the product of FIG. 80.

Figure 81:
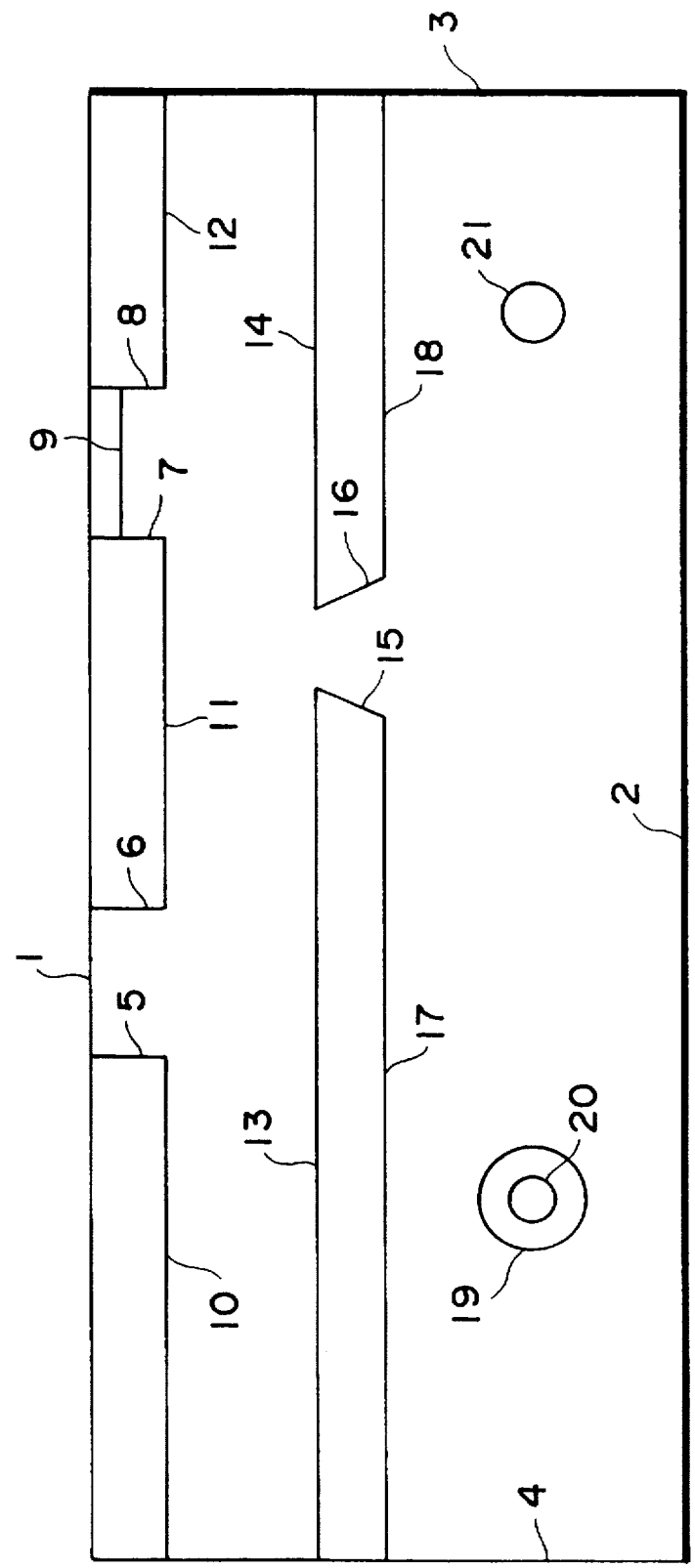
FIG. 81 illustrates an example of a product drawing of product drawing information.

FIG. 81 illustrates an example of a product drawing of product drawing information.

The product drawing of the product drawing information is a front view of the product illustrated in FIG. 80. The product drawing comprises line segments and circles as the drawing elements that construct the product drawing. It goes without saying that the drawing elements constructing a product drawing are not limited to line segments and circles; elements representing other shapes can also be used.

FIGS. 82a and 82b illustrate an example of drawing element information relating to the product drawing of the product drawing information shown in FIG. 81. The drawing element information contains starting-point coordinates (X,Y) and end-point coordinates (X,Y) as well as center coordinates (X,Y), radius R and machining depth $\Delta Z$ stored with regard to drawing elements, which are the line segments or circles depicted in FIG. 81.

With regard to the line segment drawing elements, the starting-point coordinates (X,Y) and end-point coordinates (X,Y) are stored in correspondence therewith. For example, the line segment of a drawing element 1 has starting-point coordinates of (0,0) and end-point coordinates of (100,0).

With regard to the circle drawing elements, the center coordinates (X,Y) and radius R are stored in correspondence therewith. For example, the circle of a drawing element 19 has center coordinates of (23,30) and a radius of (7).

Machining depth represents the depth of a portion expressed by a line segment or circle. For example, the machining depth $\Delta Z$ of the line segment of drawing element 5 is "15".

The product drawing and the drawing element information of the product drawing information are provided to the machining-process information determination apparatus 70, the CAM apparatus 63 and the machine tool 64 from the CAD apparatus 61.

4.3 Standard machining information data base

The standard machining information data base 62 stores the standard drawing information relating to the workpiece before machining and, in correspondence with machining macro patterns, the standard machining information relating to machining methods, machining tools, etc.

Figure 83:
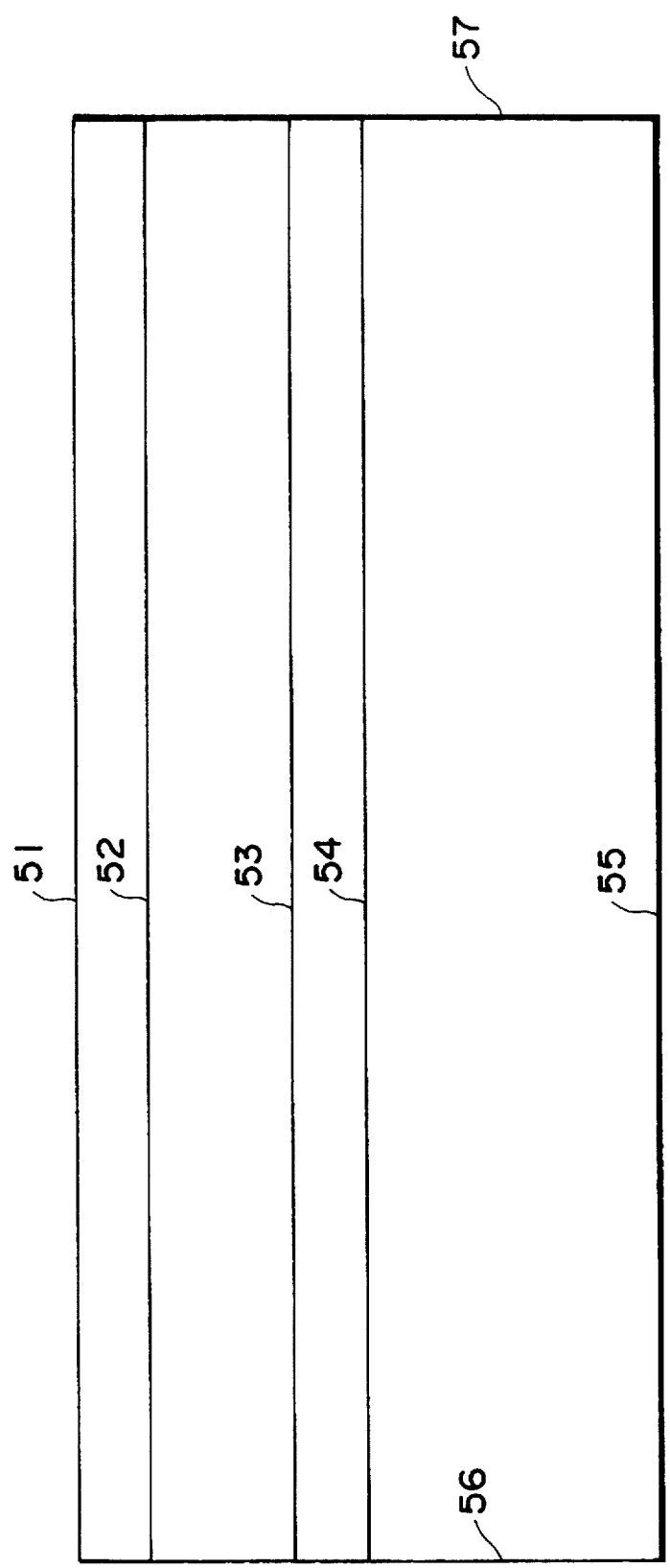
FIG. 83 illustrates an example of a standard drawing of standard drawing information.
Figure 85:
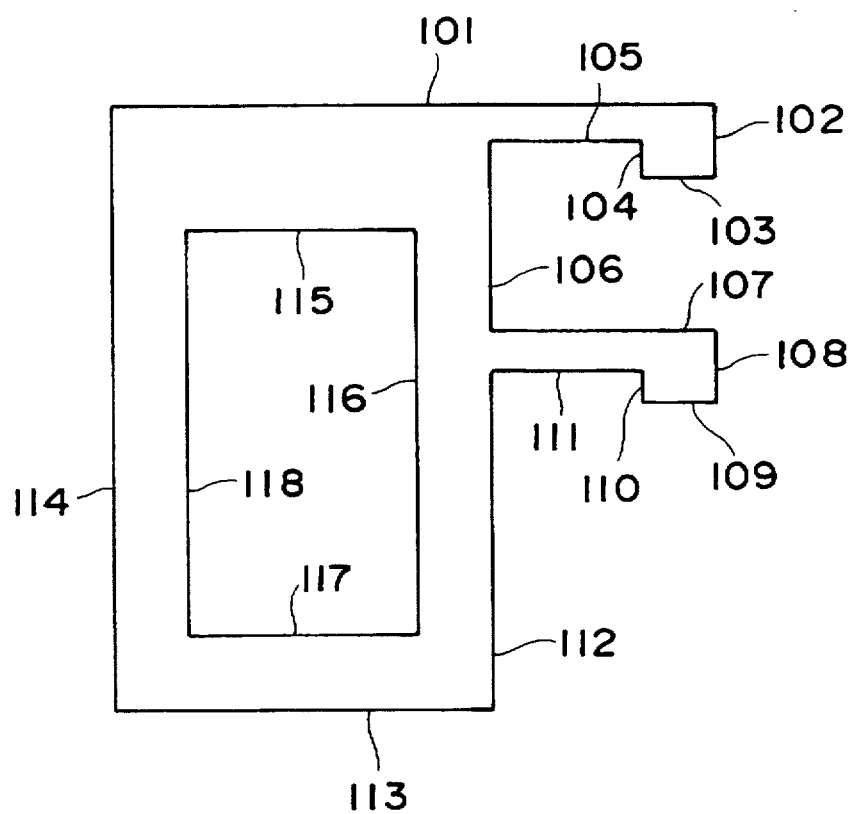
FIG. 85 illustrates an example of a standard drawing of standard drawing information.
Figure 87D:

FIGS. 83 and 85 illustrate examples of standard drawings of standard drawing information.

FIG. 83 is a front view of the workpiece and FIG. 85 a sectional view thereof. The standard drawings comprise line segments and circles as the drawing elements. It goes without saying that the drawing elements in the standard drawings are not limited to line segments and circles; elements representing other shapes can also be used.

FIG. 84 illustrates an example of drawing element information relating to the standard drawing information shown in FIG. 83.

The drawing element information contains starting-point coordinates (X,Y) and end-point coordinates (X,Y) as well as center coordinates (X,Y) and radius R stored with regard to the drawing elements, which are the line segments or circles depicted in FIG. 83.

With regard to the line segment drawing elements, the starting-point coordinates (X,Y) and end-point coordinates (X,Y) are stored in correspondence therewith. For example, the line segment of a drawing element 51 has starting-point coordinates of (0,0) and end-point coordinates of (100,0).

With regard to the circle drawing elements, the center coordinates (X,Y) and radius R are stored in correspondence therewith. This standard drawing has no circle drawing elements.

FIGS. 86a and 86b illustrate an example of drawing element information relating to the standard drawing information shown in FIG. 85. The drawing element information contains starting-point coordinates (Z,Y) and end-point coordinates (Z,Y) as well as center coordinates (Z,Y) and radius R stored with regard to drawing elements, which are the line segments or circles depicted in FIG. 85.

With regard to the line segment drawing elements, the starting-point coordinates (Z,Y) and end-point coordinates (Z,Y) are stored in correspondence therewith. For example, the line segment of a drawing element 101 has starting-point coordinates of (0,0) and end-point coordinates of (40,0).

With regard to the circle drawing elements, the center coordinates (Z,Y) and radius R are stored in correspondence therewith. This standard drawing information has no circle drawing elements.

The standard drawing and the drawing element information of the standard drawing information are provided to the machining-process information determination apparatus 70 and to the CAM apparatus 63 or machine tool 64 from the standard machining information data base 62.

The standard machining information data base 62 further stores standard machining information.

FIGS. 87a–87d illustrates an example of standard machining information.

The standard machining information includes parameters, machining processes, machining tools and machining methods stored with regard to various shapes of machining macro patterns.

The parameters relate to the shapes of machining macro patterns. For example, with regard to No. 1, the machining macro pattern is one representing hole machining and its parameters a(ra) are a parameter a and radius ra.

The machining processes represent processes (types) of machining for subjecting workpieces to machining. Examples are hole machining, cutting machining, cut-off machining and milling. By way of example, the machining macro pattern of No. 1 is hole machining.

The machining tools represent the tools used in machining processes. Examples are a center drill, drill, end mill, etc.

A machining method represents the diameters of machining tools and the order of the machining processes with regard to the parameter of a machining macro pattern. A machining method is represented by rules in which parameters serve as antecedent variables while tool diameter and machining process serve as consequent variables.

For example, the machining macro pattern of No. 1 is "Parameter ra is small.→Center drill→Drill of tool radius ra". According to this machining method, when the parameter ra is small, a preceding hole is drilled by hole machining using the center drill, and then hole machining is performed using the drill of tool radius ra.

Membership functions are established with regard to the parameters, such as the linguistic information "small", "large", etc., serving as the antecedent variables in this machining method. These membership functions are stored in the standard machining information data base 62 along with the standard machining information.

Figure 88A:
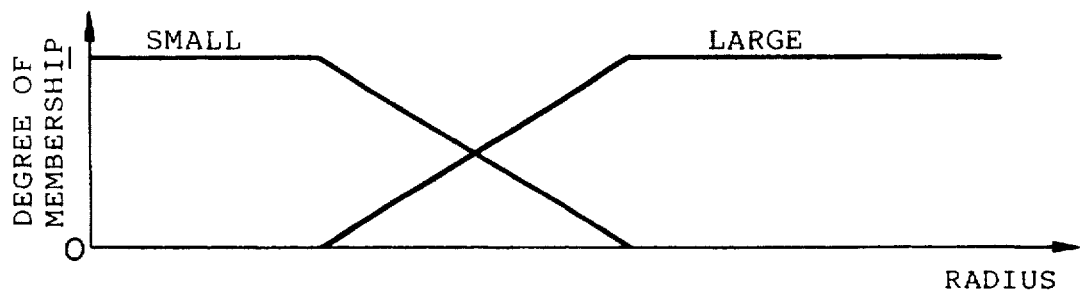
FIGS. 88a, 88b and 88c illustrate examples of membership functions set for antecedent variables of machining methods in standard machining information.
Figure 88B:
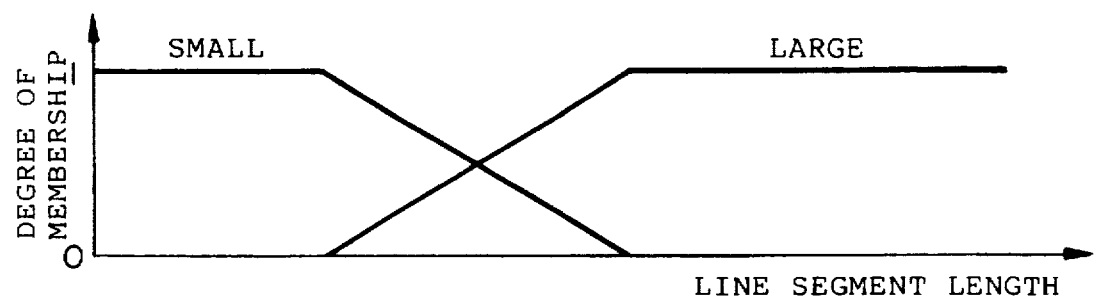
Figure 88C:
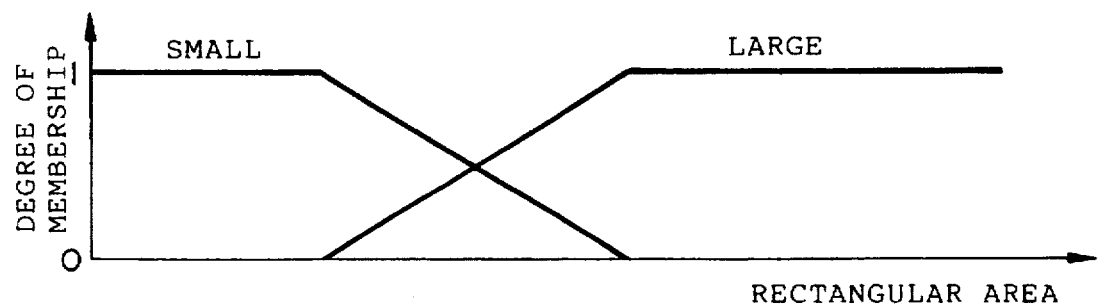

FIGS. 88a–88c illustrate examples of membership functions set for antecedent variables.

FIG. 88a illustrates two membership functions of "small" and "large" with regard to a parameter relating to "radius".

FIG. 88b illustrates two membership functions of "small" and "large" with regard to a parameter relating to "line segment length".

FIG. 88c illustrates two membership functions of "small" and "large" with regard to a parameter relating to "rectangular area".

4.4 Machining-process information determination apparatus (1) Construction of machining-process information determination apparatus The machining-process information determination apparatus 70 decides the process design information and machining condition information on the basis of the product drawing information provided by the CAD apparatus 61 and standard machining process information stored in the standard machining information data base 62.

FIG. 89 is a functional block diagram showing the detailed construction of the machining-process information determination apparatus 70.

The machining-process information determination apparatus 70 has a machining-shape parameter extraction unit 71, a macro pattern development unit 72, a machining sequence determination unit 73 and a machining condition determination unit 74.

Each of these units will now be described in simple terms, with the details being saved for later.

The machining-shape parameter extraction unit 71 extracts machining shape parameters on the basis of the product drawing information provided by the CAD apparatus 61 and the standard drawing information stored in the standard machining information data base 62.

The machining shape parameters, the details of which will be described below, are drawing elements representing the difference between drawing elements of the product drawing information and drawing elements of the standard drawing information.

The macro pattern development unit 72 creates machining macro patterns on the basis of the machining shape parameters extracted by the machining-shape parameter extraction unit 71.

A machining macro pattern, the details of which will be described below, represent the shape of a location at which a workpiece is machined.

The machining sequence determination unit 73 decides process design information by referring to the standard machining information, which has been stored in the standard machining information data base 62, on the basis of a machining macro pattern developed by the macro pattern development unit 72.

The details of the process design information will be described later.

The machining condition determination unit 74 decides machining condition information on the basis of the process design information decided by the machining sequence determination unit 73.

The details of the machining condition information will be described later.

(2) Overall processing of machining-process information determination apparatus

Figure 90:
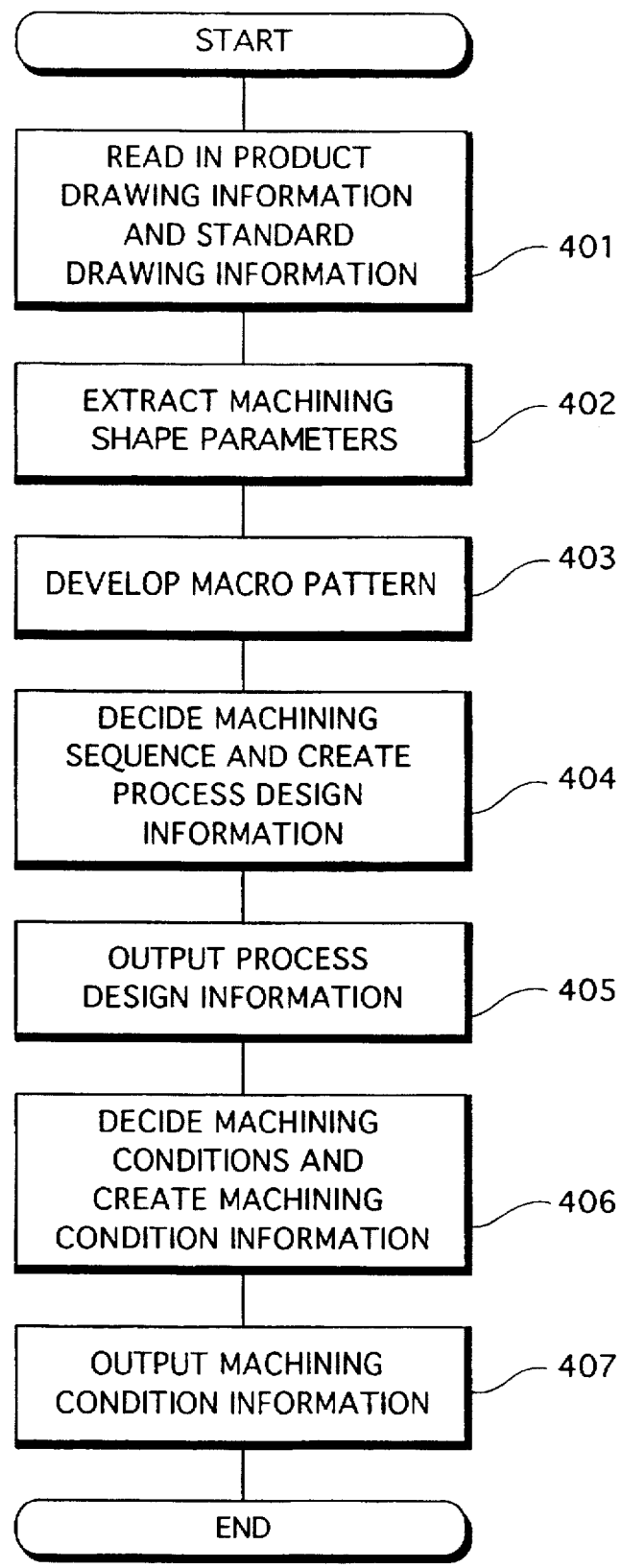
FIG. 90 is a flowchart illustrating the overall processing procedure of the machining-process information determination apparatus.
Figure 9L:
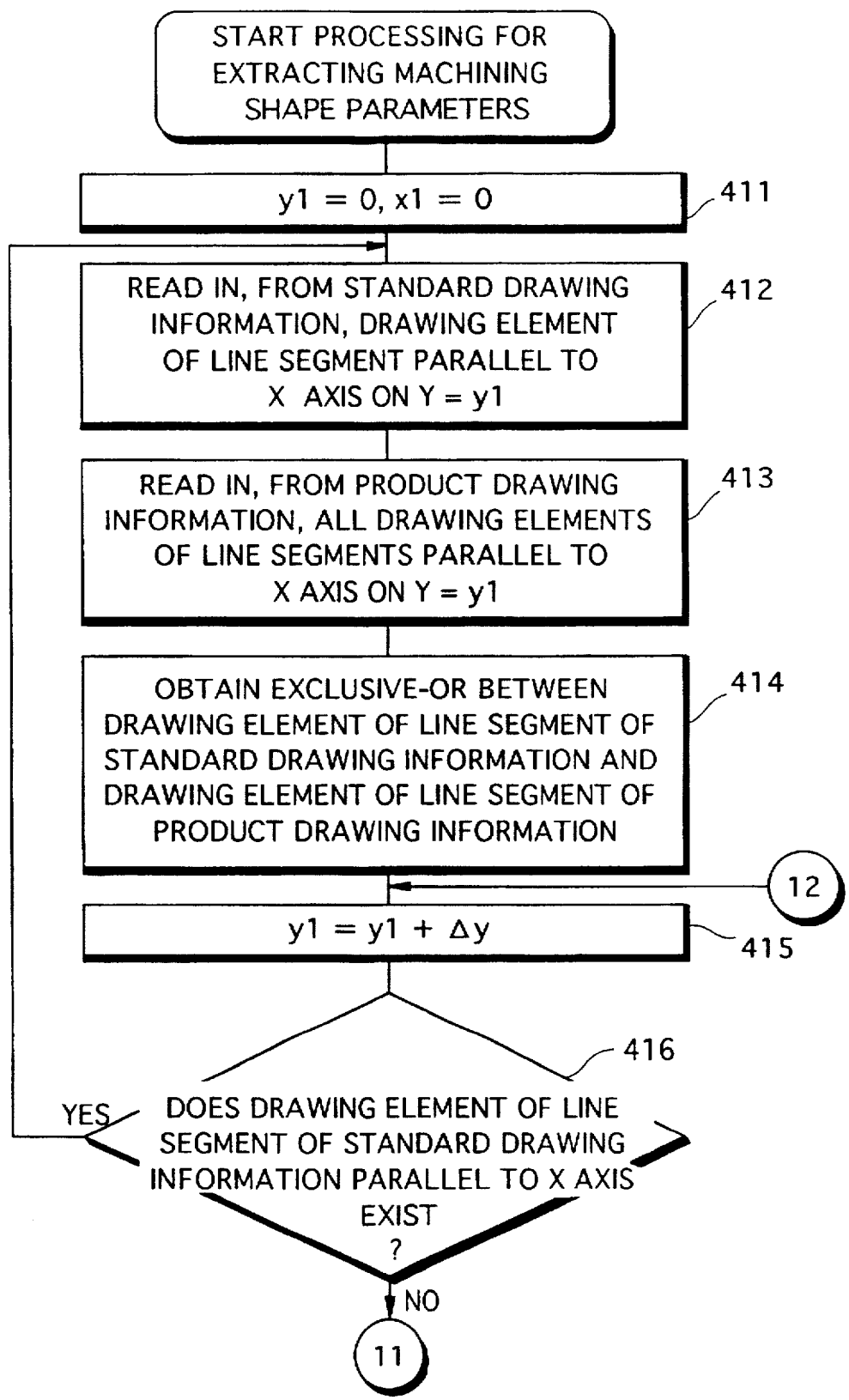

FIG. 90 is a flowchart illustrating the overall processing procedure of the machining-process information determination apparatus 70.

The machining-shape parameter extraction unit 71 reads in the product drawing information provided by the CAD apparatus 61 and the standard drawing information stored in the standard machining information data base 62 (FIG. 90; step 401).

The macro pattern development unit 72 extracts the machining shape parameters on the basis of the product drawing information and standard drawing information read in (FIG. 90; step 402).

The macro pattern development unit 72 creates machining macro patterns on the basis of the machining shape parameters extracted by the machining-shape parameter extraction unit 71 (FIG. 90; step 403).

The machining sequence determination unit 73 decides the machining sequence and creates the process design information by referring to the standard machining information, which has been stored in the standard machining information data base 62, on the basis of the machining macro pattern created by the macro pattern development unit 72 (FIG. 90; step 404).

The machining sequence determination unit 73 outputs the created process design information to the CAM apparatus 63 and machine tool 64 (FIG. 90; step 405).

The machining condition determination unit 74 decides machining condition information on the basis of the process design information decided by the machining sequence determination unit 73 (FIG. 90; step 406).

The machining condition determination unit 74 outputs the decided machining condition information to the CAM apparatus 63 and machine tool 64 (FIG. 90; step 407).

(3) Machining-shape parameter extraction unit

The machining-shape parameter extraction unit 71 extracts machining shape parameters on the basis of the product drawing information provided by the CAD apparatus 61 and the standard drawing information stored in the standard machining information data base 62.

A machining shape parameter is difference information between a product drawing of the product drawing information provided by the CAD apparatus 61 and the standard drawing of the standard drawing information stored in the standard machining information data base 62.

Figure 91B:
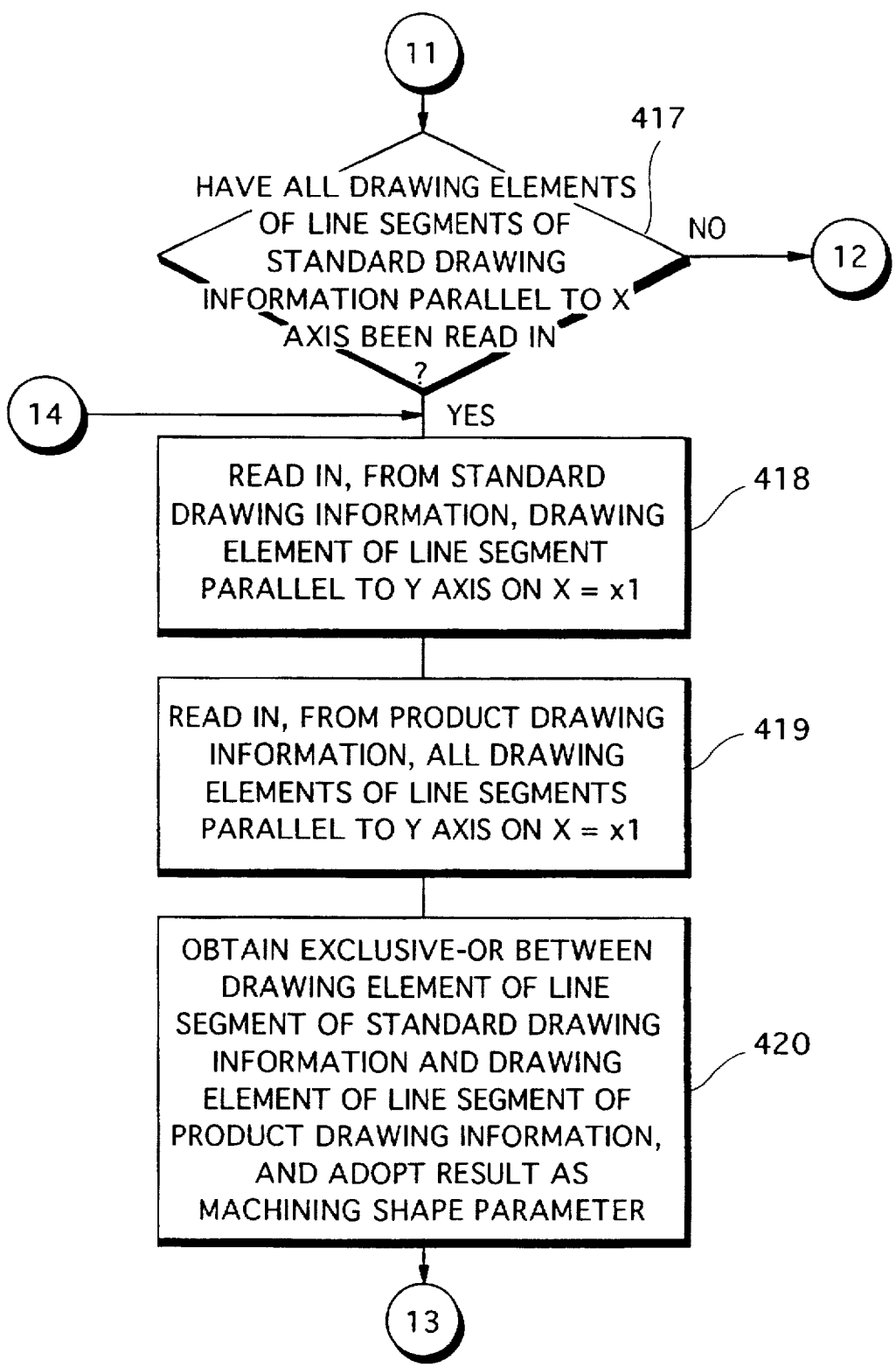
Figure 91C:
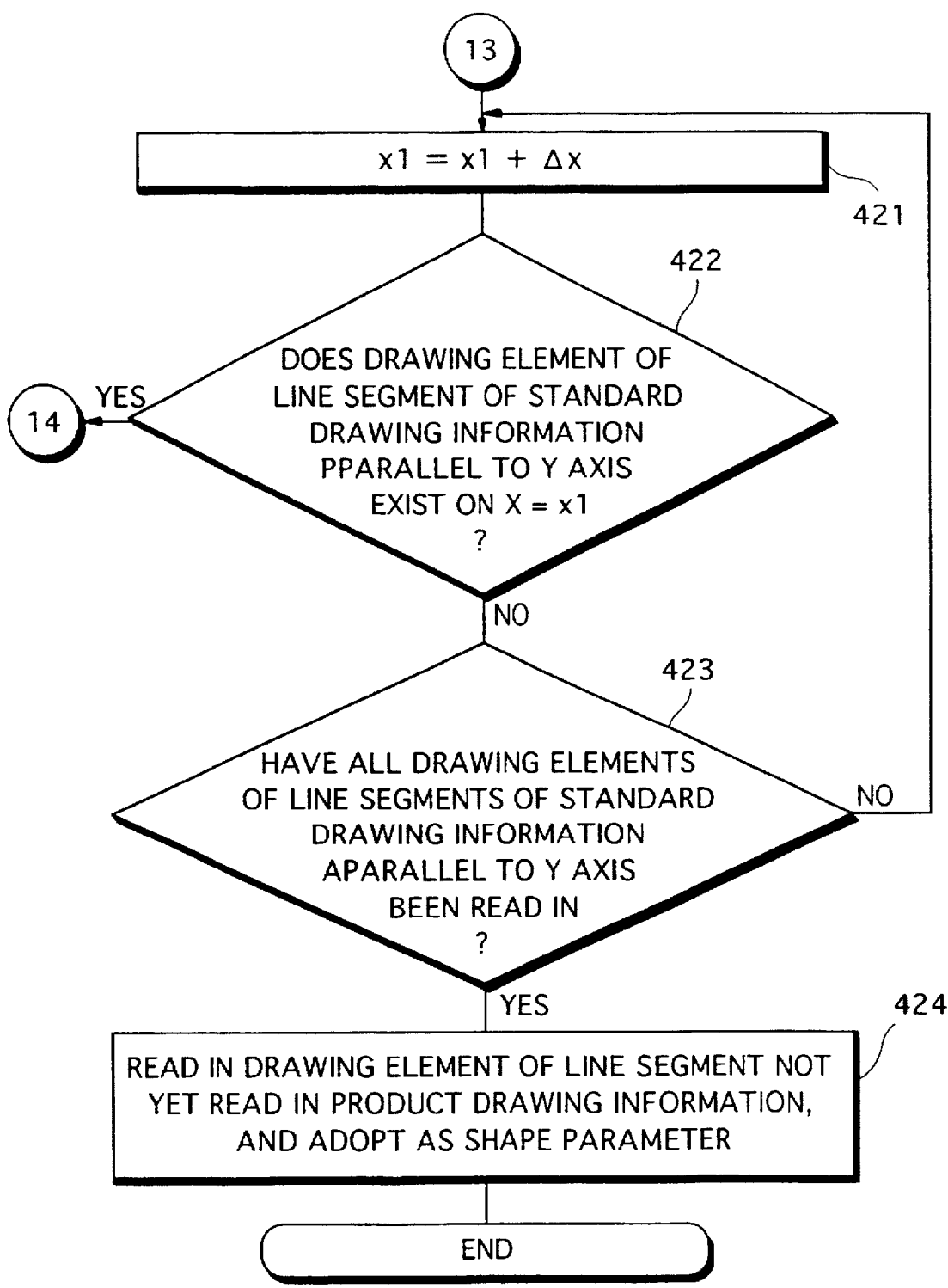

FIGS. 91a and 91c are flowcharts illustrating a processing procedure in the machining-shape parameter determination unit.

The machining-shape parameter extraction unit 71 executes the processing from step 412 of FIG. 91a to step 417 of FIG. 91b to extract machining shape parameters with regard to line segments parallel to the X axis among the drawing elements in the product drawings of the product drawing information. Further, the machining-shape parameter extraction unit 71 executes the processing from step 418 of FIG. 91b to step 423 of FIG. 91c to extract machining shape parameters with regard to line segments parallel to the Y axis among the drawing elements in the product drawings of the product drawing information.

The machining-shape parameter extraction unit 71 makes variables x1, y1, which are for extracting a machining shape parameter, equal to 0 (FIG. 91a; step 411).

Accordingly, the machining-shape parameter extraction unit 71 starts extraction of machining-shape parameter with regard to a line segment passing through the origin (0,0).

The machining-shape parameter extraction unit 71 refers to the drawing element information of the standard drawing information stored in the standard machining information data base 62 and reads in a line segment that is parallel to the X axis and for which Y=y1 holds (FIG. 91a; step 412) from the standard drawing of the standard drawing information.

For example, the machining-shape parameter extraction unit 71 reads in the drawing element 51, which is an element for which the Y coordinate of the starting point and Y coordinate of the end point are each 0, from the product drawing information.

The machining-shape parameter extraction unit 71 refers to the drawing element information of the product drawing information provided by the CAD apparatus 61 and reads in a line segment that is parallel to the X axis and for which Y=y1 holds (FIG. 91a; step 413).

For example, the machining-shape parameter extraction unit 71 reads in the drawing element 1, which is an element for which the Y coordinate of the starting point and Y coordinate of the end point are each 0, from the product drawing information.

The machining-shape parameter extraction unit 71 takes the exclusive-OR between the drawing element of the product drawing information read in at step 413 and the drawing element of the standard drawing information read in at step 412 (FIG. 91a; step 414).

For example, when the exclusive-OR is taken between the drawing element 1 and the drawing element 51, all results are 0 from X=0 to X=100 since the line segments for the drawing element 1 and the drawing element 51 fall within the range of from X=0 to X=100.

The machining-shape parameter extraction unit 71 increments y1 by Δy to update y1 (FIG. 91a; step 415).

The machining-shape parameter extraction unit 71 refers to the drawing element information of the standard drawing information to determine whether there is a drawing element of the line segment on Y=y1 (FIG. 91a; step 415).

When the line segment of Y=y1 exists (YES at step 416), the program returns to step 412 and the machining-shape parameter extraction unit 71 executes processing with regard to the drawing element of this line segment.

The machining-shape parameter extraction unit 71 refers to the drawing element information of the standard drawing information to determine whether all line segments parallel to the X axis have been read in (FIG. 91b; step 417).

If line segments parallel to the X axis remain (NO at step 417), the program returns to step 415 and machining-shape parameter extraction is performed repeatedly with regard to drawing elements of line segments parallel to the X axis.

The machining-shape parameter extraction unit 71 refers to the drawing element information of the standard drawing information stored in the standard machining information data base 62 and reads in a line segment that is parallel to the Y axis and for which X=x1 holds (FIG. 91b; step 418).

For example, the machining-shape parameter extraction unit 71 reads in the drawing element 56, which is an element for which the X coordinate of the starting point and X coordinate of the end point are each 0, from the standard drawing information.

The machining-shape parameter extraction unit 71 refers to the drawing element information of the product drawing information provided by the CAD apparatus 61 and reads in a line segment that is parallel to the Y axis and for which X=x1 holds (FIG. 91b; step 419).

For example, the machining-shape parameter extraction unit 71 reads in the drawing element 4, which is an element for which the X coordinate of the starting point and X coordinate of the end point are each 0, from the product drawing information.

The machining-shape parameter extraction unit 71 takes the exclusive-OR between the drawing element of the product drawing information read in at step 419 and the drawing element of the standard drawing information read in at step 418 (FIG. 91b; step 420).

For example, when the exclusive-OR is taken between the drawing element 4 and the drawing element 56, all results are 0 from Y=0 to Y=40 since the line segments for the drawing element 4 and the drawing element 56 fall within the range of from Y=0 to Y=40.

The machining-shape parameter extraction unit 71 increments x1 by Δx to update x1 (FIG. 91c; step 421).

The machining-shape parameter extraction unit 71 refers to the drawing element information of the standard drawing information to determine whether there is a drawing element of the line segment on X=x1 (FIG. 91c; step 422).

When the line segment X=x1 exists (YES at step 422), the program returns to step 418 and the machining-shape parameter extraction unit 71 executes processing with regard to the drawing element of this line segment.

The machining-shape parameter extraction unit 71 refers to the drawing element information of the standard drawing information to determine whether all line segments parallel to the Y axis have been read in (FIG. 91c; step 423).

If line segments parallel to the Y axis remain (No at step 423), the program returns to step 421 and machining-shape parameter extraction is performed repeatedly with regard to drawing elements of line segments parallel to the Y axis.

Thus, as set forth above, the machining-shape parameter extraction unit 71 performs machining-shape parameter extraction with regard to all drawing elements of a product drawing in the product drawing information.

Finally, the machining-shape parameter extraction unit 71 reads in all of those drawing elements in the product drawing information not yet read in by the processing of steps 413 and 419 and adopts these as machining shape parameters (FIG. 91*c*; step 424)

The machining-shape parameter extraction unit 71 thus extracts machining shape parameters.

Figure 92:
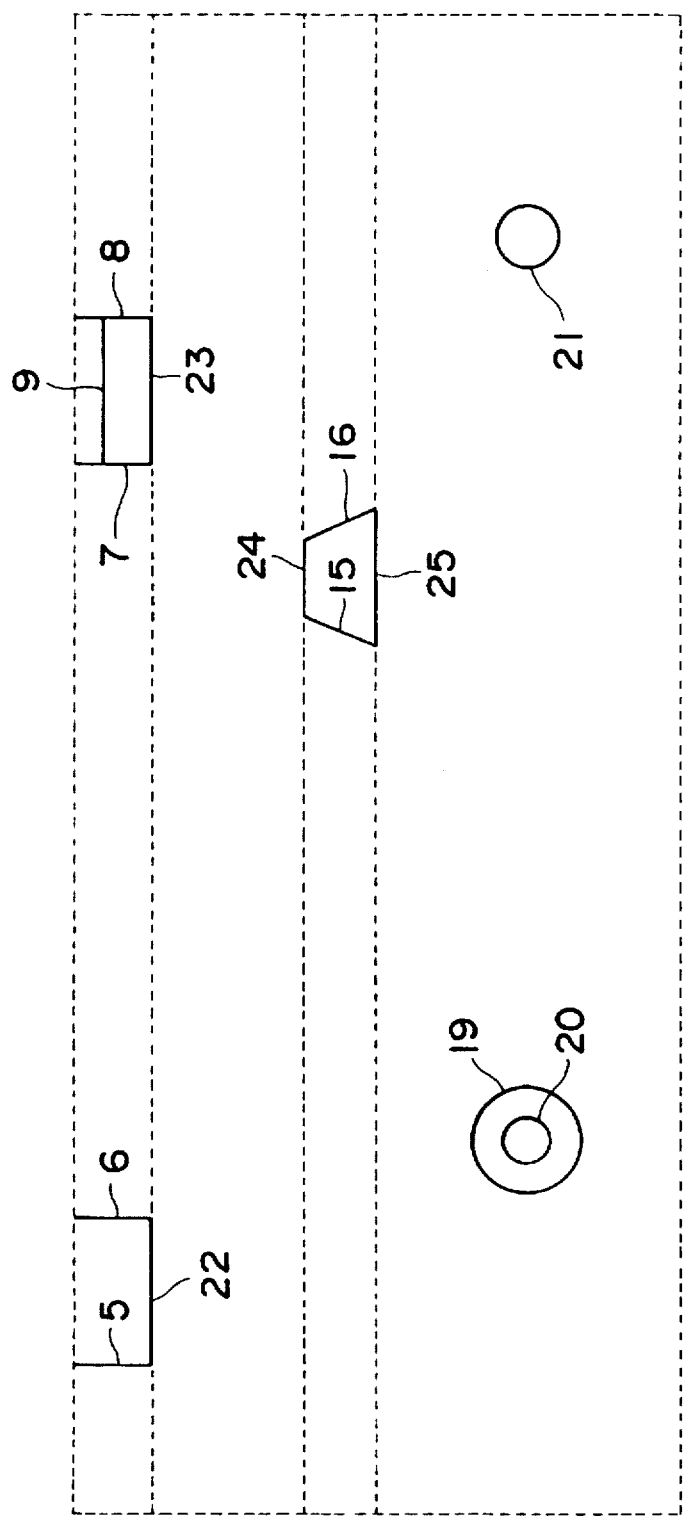
FIG. 92 illustrates an example of drawing elements of machining shape parameters.

FIG. 92 illustrates an example of drawing elements of machining shape parameters extracted by the machining-shape parameter extraction unit 71. FIG. 93 is the drawing element information in FIG. 92.

The machining shape parameters are applied to the macro pattern development unit 72 from the machining-shape parameter extraction unit 71.

(4) Macro pattern development unit

The macro pattern development unit 72 creates machining macro patterns on the basis of the machining shape parameters extracted by the machining-shape parameter extraction unit 71.

FIGS. 94*a*–94*e* are flowcharts illustrating the processing procedure of processing for developing a macro pattern.

The macro pattern development unit 72 sets i representing a shape element constituting the machining macro pattern for 1, and clear buffers X and Y for storing data of the drawing element of the line segment (FIG. 84*a*; step 431).

Figure 94A:
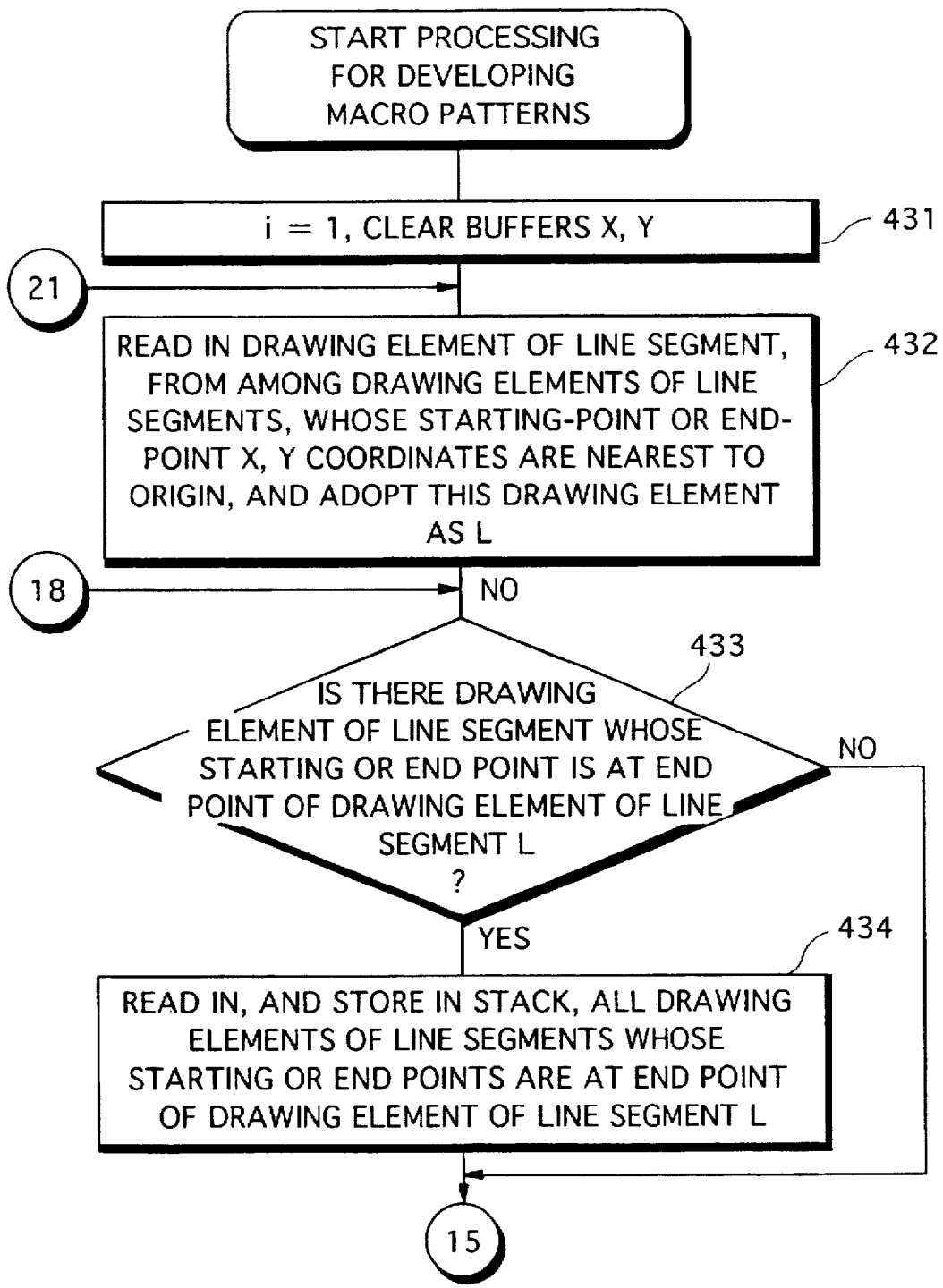
FIGS. 94a, 94b, 94c, 94d, and 94e are flowcharts illustrating the processing procedure of processing for developing a macro pattern.

With regard to a machining shape parameter extracted by the machining-shape parameter extraction unit 71, the macro pattern development unit 72 reads in the drawing element of a line segment, from among the drawing elements of line segments, whose starting-point or end-point coordinates are nearest to the origin, and adopts L as the drawing element of this line segment (FIG. 94*a*; step 432). For example, the macro pattern development unit 72 reads in the line segment of the drawing element 5 and sets this drawing element 5 to L.

The macro pattern development unit 72 determines whether there is a drawing element of a line segment whose starting point or end point is at the end point of the drawing element of the line segment L (FIG. 94*a*; step 433).

When it is decided that there is a drawing element of a line segment whose starting point or end point is at the end point of the drawing element of the line segment L (YES at step 433), the macro pattern development unit 72 reads in the drawing element of this line segment and stores it in a stack (FIG. 94*a*; step 434).

For example, since there is a drawing element 22 for a line segment whose starting point or end point is located at the end point (35,0) of the drawing element 5, the macro pattern development unit 72 stores the drawing element 22 in a stack.

Figure 94B:
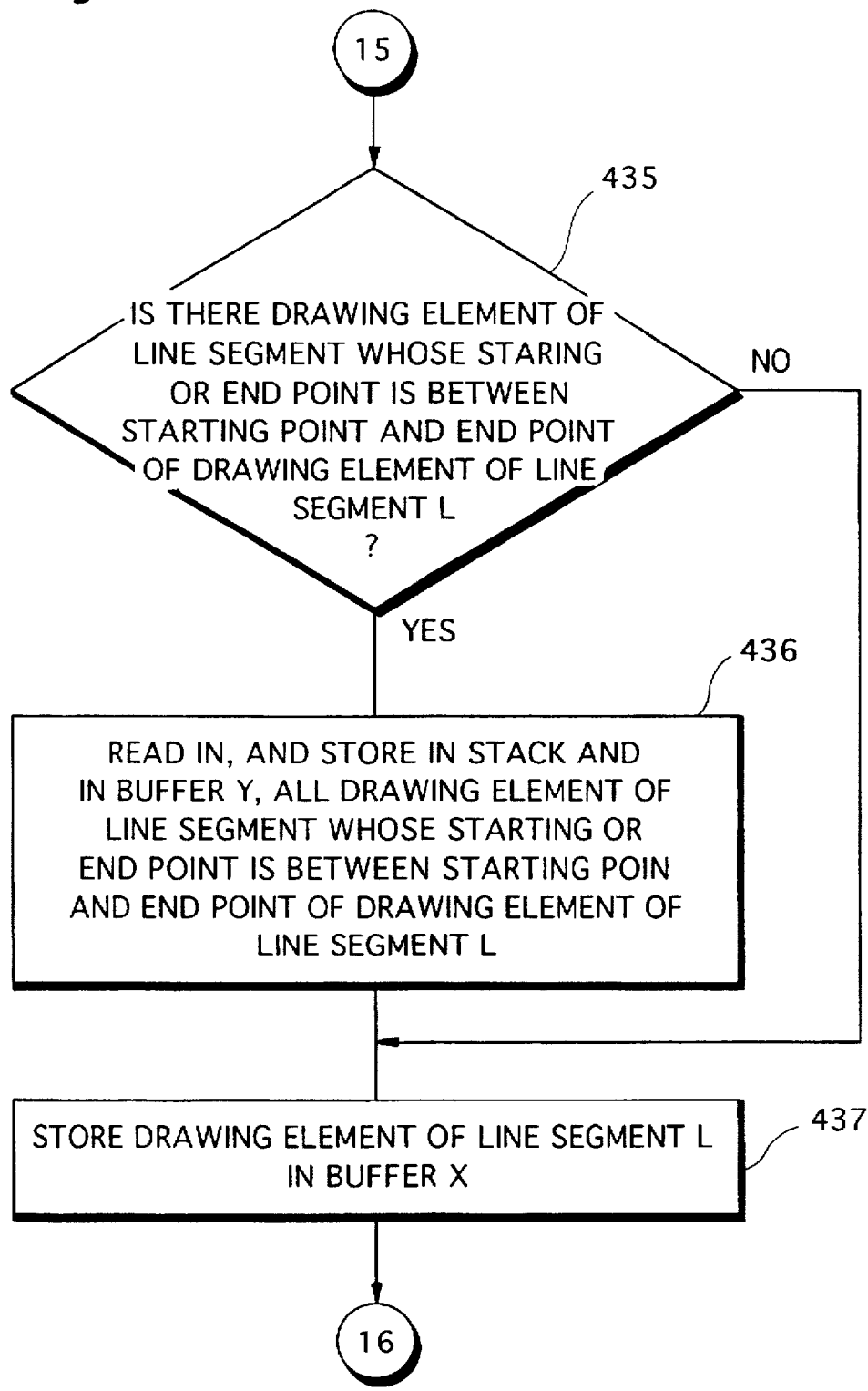

When the macro pattern development unit 72 decides that there is no drawing element of a line segment whose starting point or end point is at the end point of the drawing element of line segment L (NO at step 433), the unit 72 determines whether there is a drawing element of a line segment whose starting point or end point is between the starting point and end point of the drawing element of the line segment L (FIG. 94*b*; step 435).

When the macro pattern development unit 72 decides that there is a drawing element of a line segment whose starting point or end point is between the starting point and end point of the drawing element of the line segment L (YES step 435), the unit 72 reads in the drawing element of this line segment and stores it in a stack and in a buffer Y (FIG. 94*b*; step 436).

For example, in a case where the macro pattern development unit 72 has read in the drawing element 7 at the processing of step 432, there is a drawing element 9 for a line segment whose starting point or end point is located between the starting point (70,0) and end point (70,5) of the drawing element 7; hence, the macro pattern development unit 72 stores the drawing element 9 in the stack.

The macro pattern development unit 72 stores the drawing element of the line segment read in at the processing of step 432 in the buffer X (FIG. 94*b*; step 437).

For example, the macro pattern development unit 72 stores the line segment of the drawing element 5 in the buffer X.

Figure 94C:
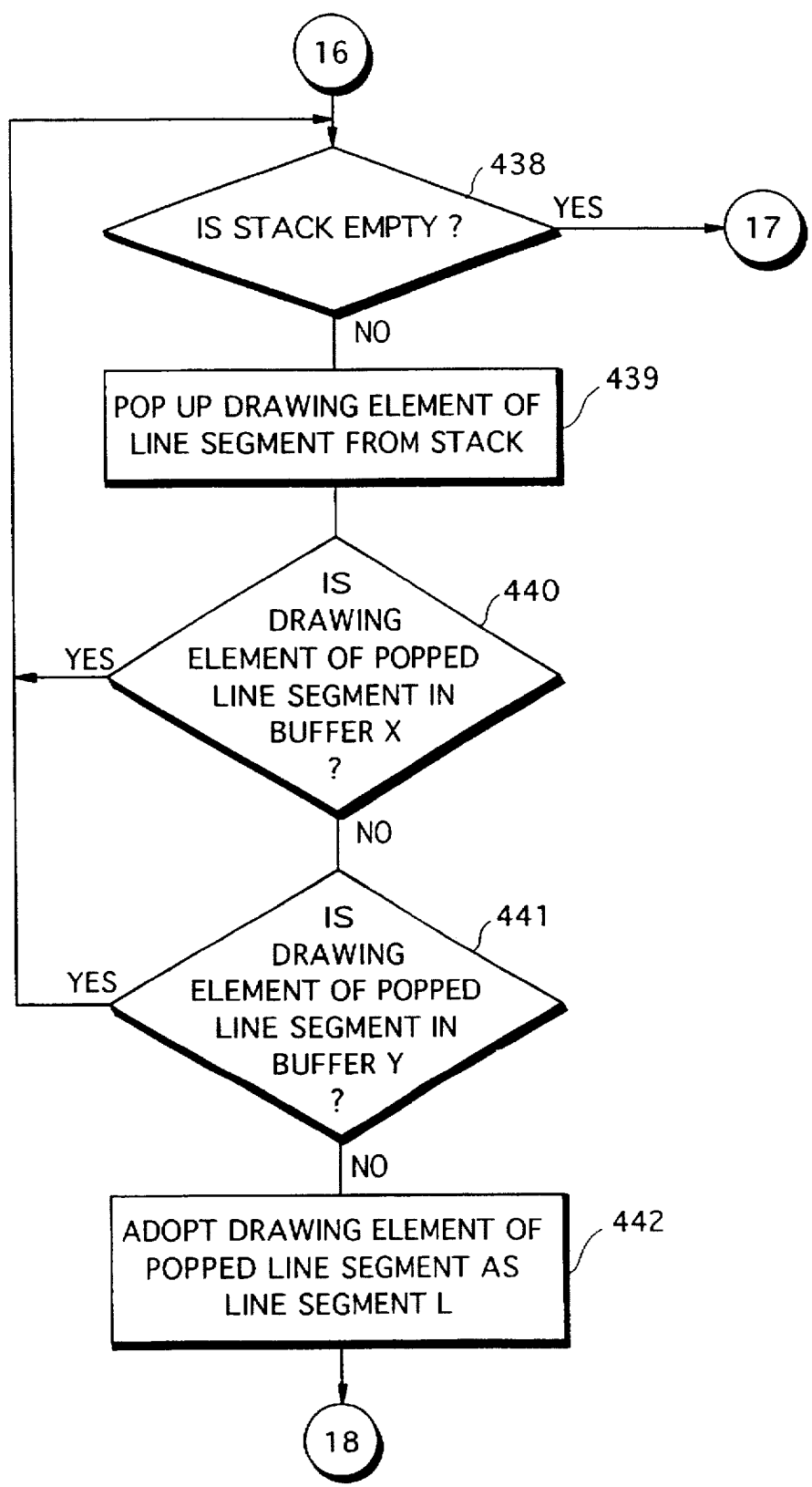

The macro pattern development unit 72 determines whether a drawing element of a line segment has been stored in the stack (FIG. 94*c*; step 438).

If there is a drawing element of a line segment in the stack (NO at step 438), then the macro pattern development unit 72 pops this drawing element from the stack (FIG. 94*b*; step 439).

For example, the drawing element 22 has been stored in the stack, so the macro pattern development unit 72 pops this drawing element 22 from the stack.

The macro pattern development unit 72 determines whether the drawing element of the line segment popped up from the stack is in the buffer X or the buffer Y (FIG. 94*c*; steps 440, 441).

In a case where the drawing element of the line segment popped up from the stack is in the buffer X or in the buffer Y, the program returns to step 438 (YES at steps 440 and 441).

In a case where the drawing element of the line segment popped up from the stack is not in the buffer X and not in the buffer Y, the drawing element of the line segment popped up from the stack is updated to L (FIG. 94*c*; step 442). When L has been updated, the program returns to step 433 and a drawing element of a line segment is retrieved.

For example, since the drawing element 22 of a line segment has not been stored in the buffer X, the macro pattern development unit 72 sets the drawing element 22 of this line segment to L when the drawing element 22 is popped from the stack.

Figure 94D:
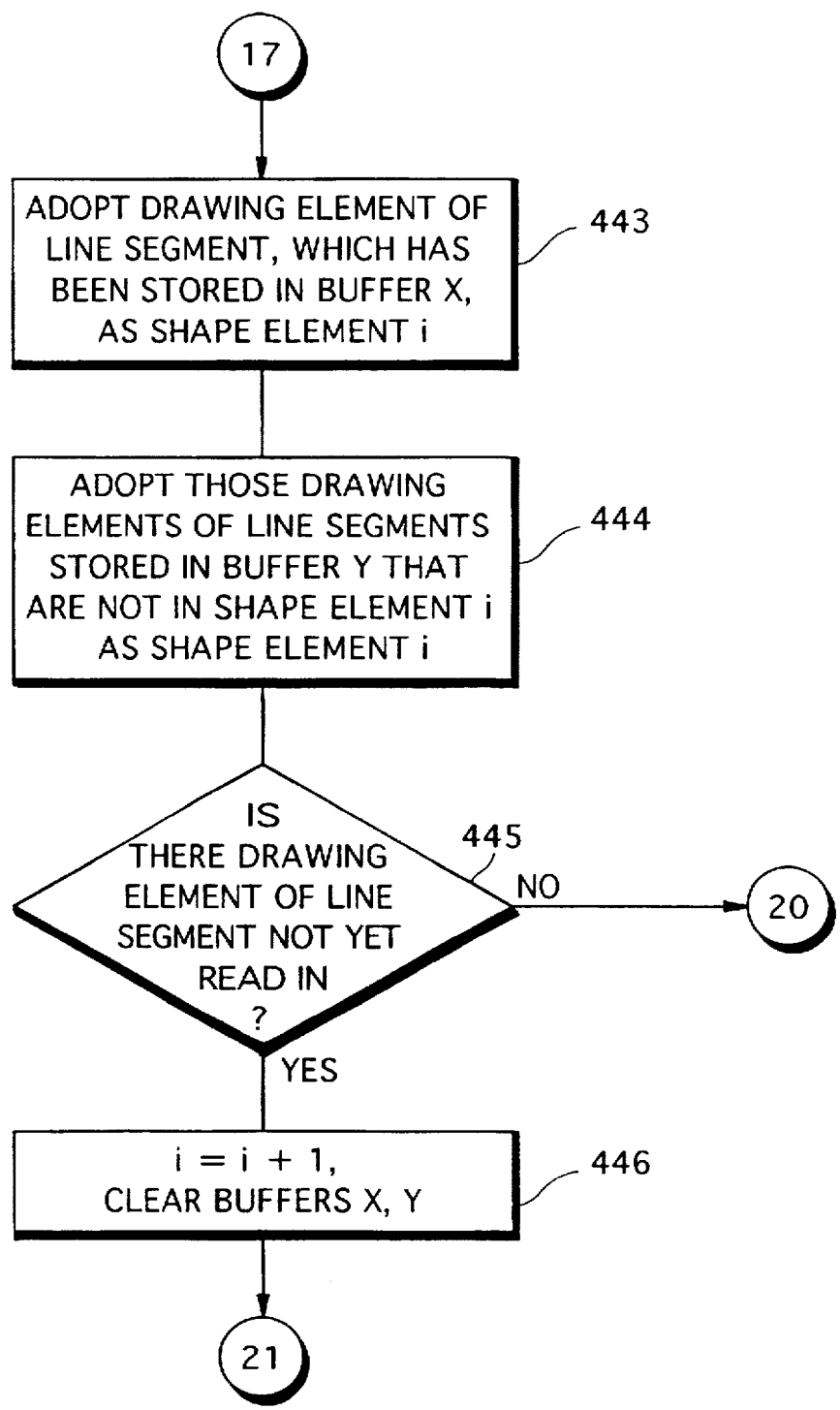

When the macro pattern development unit 72 has popped up all drawing elements of lines segments from the stack so that the stack is empty (YES at step 438), it adopts the drawing elements of the line segments that have been stored in the buffer X as a shape element i (FIG. 94*d*; step 443).

For example, the macro pattern development unit 72 adopts the drawing elements 5, 22, 6 as a shape element 1.

Those drawing elements of line segments stored in the buffer Y that are not in the shape element i are made a shape element i by the macro pattern development unit 72 (FIG. 94*d*; step 444).

The macro pattern development unit 72 determines whether there are no drawing elements of line segments not yet read in among the machining shape parameters extracted by the machining-shape parameter extraction unit 71 (FIG. 94*d*; step 445).

If the macro pattern development unit 72 has not read in all drawing elements of line segments with regard to the machining shape parameters, the variable i representing the shape element is incremented and the buffers X, Y are cleared (FIG. 94*d*; step 446).

The program subsequently returns to step 432.

Figure 94E:
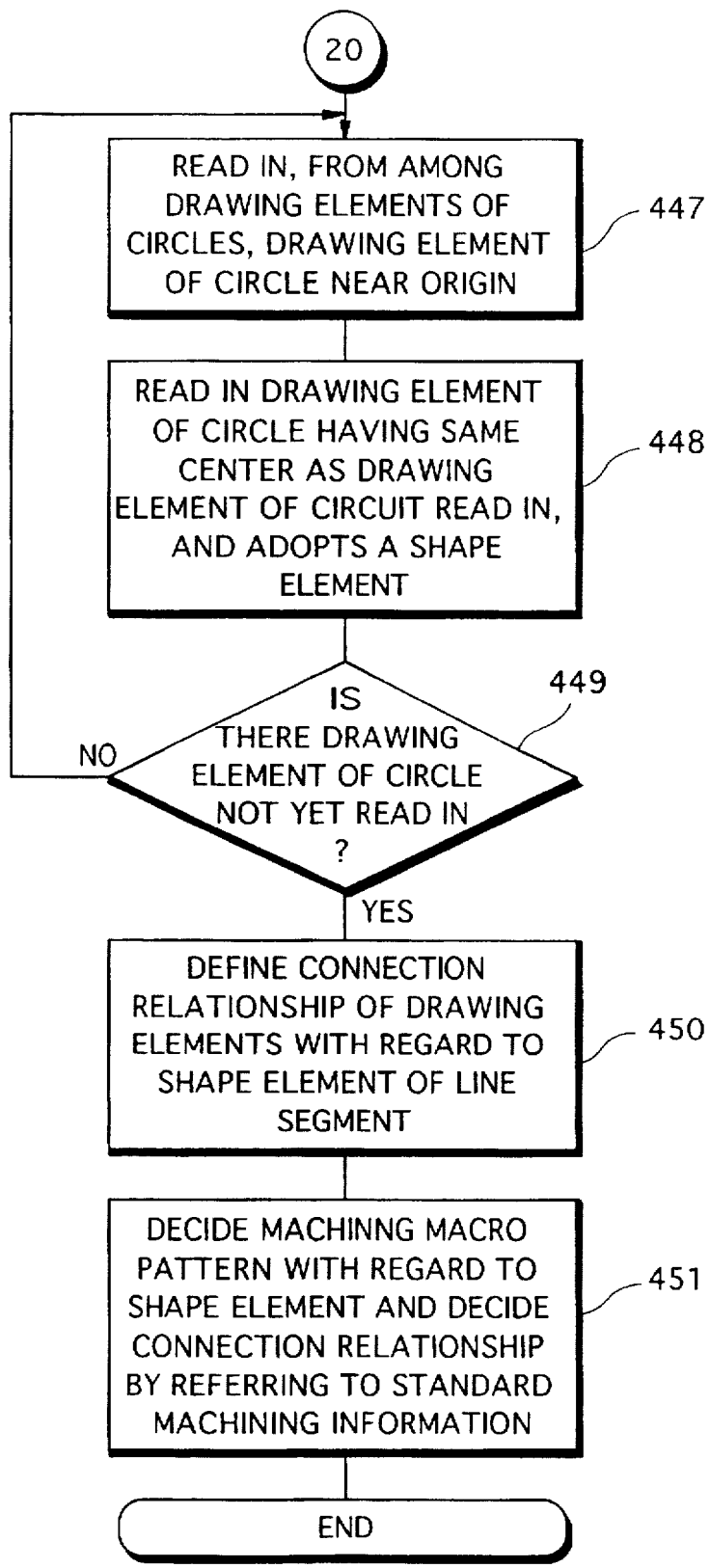

When a NO decision is rendered at step 445, the macro pattern development unit 72 reads in, from among the drawing elements of circles, a drawing element of a circle near the origin (FIG. 94*e*; step 447).

For example, the macro pattern development unit 72 reads in the circle of drawing element 19.

The macro pattern development unit 72 reads in, from among the machining shape parameters, the drawing element of a circle the coordinates of the center of which are identical with those of the drawing element of the circle read in earlier, and adopts this drawing element as a shape element (FIG. 94e; step 448).

For example, since a circle of drawing element 20 is located at the drawing element of a circle the coordinates of the center of which are identical with those of the circle of drawing element 19, the drawing element 20 is read in.

The macro pattern development unit 72 determines whether there are drawing elements of circles not yet read in (FIG. 94e; step 449).

If there is a drawing element of a circle not yet read in (NO at step 449), then the program returns to step 447 and the macro pattern development unit 72 reads in the drawing element of the next circle.

When the macro pattern development unit 72 has read in all machining shape parameters (YES at step 449), it defines the connection relationship of the drawing elements with regard to the shape element and extracts parameters (FIG. 94e; step 450).

When an end point (starting point or end point) of a certain line segment and an end point (starting point or end point) of another line segment are connected with regard to a shape element comprising drawing elements of line segments, the numbers of the drawing elements of these line segments are connected by "→". For example, since the shape element 1 is such that end point of the drawing element 5 and the starting point of the line segment 22 are connected, we have "5→22". In this case, an angle defined by the two line segments is displayed. For example, the line segment of the drawing element 5 and the line segment of the drawing element 22 define a right angle. Therefore, the angle "∟" is displayed above "→".

In the connection relationship between one drawing element of a line segment and another drawing element of a line segment, there are cases in which another line segment is connected between the starting point and end point of a certain line segment. In such case, the number of the drawing elements of these line segments are connected by ",". For example, with regard to the shape element 2, the line segment of drawing element 9 is connected to the line segment of the drawing element 8. Therefore, we have "8,9".

With regard to the drawing element of a circle, the radius is displayed as a parameter along with the number of the drawing element. For example, with regard to the circle of drawing element 19, the shape element 4 is displayed as "19(7)" since the radius of this circle is "7".

Further, in a case where the center of a certain circle and the center of another circle coincide in the drawing elements of circles, the drawing elements of these circles are such that the number of these drawing elements are connected by ",". For example, since the center of the circle of drawing element 19 and the center of the circle of drawing element 20 are identical, we have "19(7), 20(3)".

Thus, the macro pattern development unit 72 defines the connection relationship by parameters.

With regard to each shape element, the macro pattern development unit 72 decides a machining macro pattern by referring to the standard machining information, which has been stored in the standard machining information data base 62, on the basis of the parameters (FIG. 94e; step 451).

For example, the machining macro pattern of shape element 1 is "No. 5".

The macro pattern development unit 72 thus develops machining macro patterns on the basis of the machining shape parameters. The machining macro patterns are applied to the machining sequence determination unit 73 from the macro pattern development unit 72.

An example of machining macro patterns obtained in the manner described above is illustrated in FIG. 95.

(5) Machining sequence determination unit

The machining sequence determination unit 73 decides process design information by referring to machining methods in standard machining information, which has been stored in the standard machining information data base 62, on the basis of the machining macro patterns created by the macro pattern development unit 72.

Figure 96:
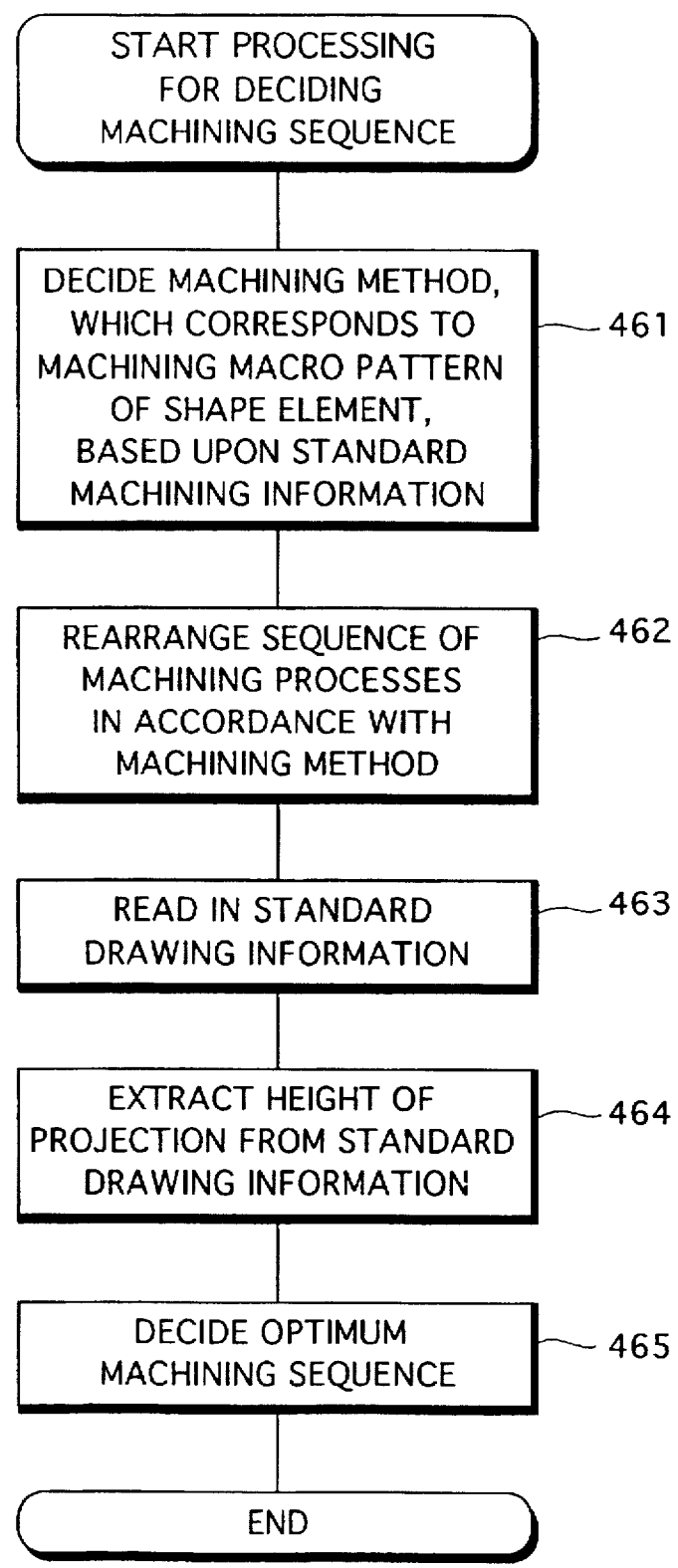
FIG. 96 is a flowchart illustrating a processing procedure in a machining sequence determination unit.

FIG. 96 is a flowchart illustrating a processing procedure in the machining sequence determination unit 73.

The machining sequence determination unit 73 decides processes of machining in the standard machining information, which has been stored in the standard machining information data base 62, on the basis of the machining macro patterns provided by the macro pattern development unit 72 (FIG. 96; step 461).

For example, since the machining macro pattern of shape element 1 is "No. 5" of the standard machining information, this machining method (rules) and its membership functions are read in from the standard machining information data base 62.

Next, when the machining sequence determination unit 73 executes reasoning using the machining method (rule) read in on the basis of the parameter, namely, the line segment length, of the machining macro pattern, the machining process of shape element 1 becomes "cutting machining".

Thus, the machining sequence determination unit 73 decides the machining process with regard to each shape element.

FIG. 97 illustrates an example of machining processes decided by the machining sequence determination unit 73.

The machining sequence determination unit 73 rearranges the shape elements in a machining sequence in accordance with the machining processes that has been decided (FIG. 96; step 462).

For example, the machining sequence determination unit 73 rearranges the shape elements in the order "cutting-off machining", "hole machining", "milling (large tool diameter)", "milling (small tool diameter". Since the shape elements 4 and 5 involve the same hole machining, the place in the machining sequence is 2. Further, since the shape element 4 involves performing milling after hole machining, two machining operations are carried out, namely hole machining at place 2 in the machining sequence and milling (large tool diameter) at place 3 in the machining sequence.

FIG. 98 illustrates a machining sequence decided by the machining sequence determination unit 73 with regard to the machining processes of FIG. 97.

The machining sequence determination unit 73 reads in a cross sectional drawing of the standard drawing information from the standard machining information data base 62 (FIG. 96; step 463).

The machining sequence determination unit 73 extracts the heights of projections by referring to the cross sectional drawing in the standard drawing information that has been read in (FIG. 96; step 464).

For example, the machining sequence determination unit 73 extracts the height of a projection formed by drawing elements 101, 102, 103, 104 and 105 or by drawing elements 107, 108, 109, 110 and 111.

The machining sequence determination unit 73 decides an optimum machining sequence on the basis of the machining processes and heights of projections. etc.. and in accordance with optimum machining sequence decision rules and membership functions established in advance (FIG. 96; step 465).

Optimum machining sequence decision rules are as follows. by way of example:

IF height of projection is large.

THEN raise the place in the machining sequence.

IF there is milling machining.

THEN raise the place in the machining sequence.

Figure 99A:
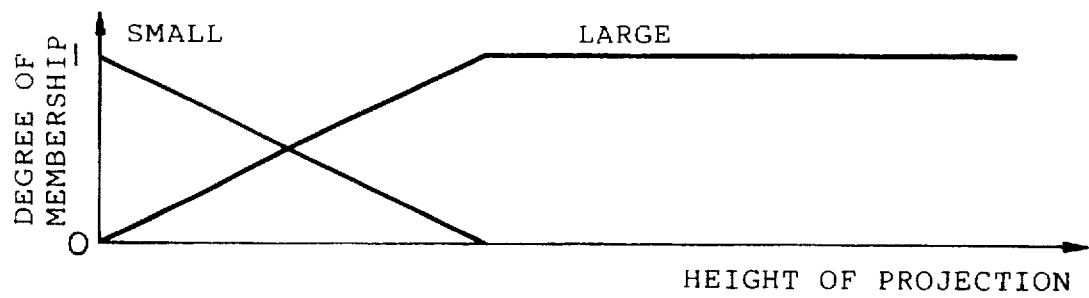
FIGS. 99a, 99b, and 99c illustrate examples of membership functions and singletons with regard to antecedent variables and consequent variables of optimum machining sequence decision rules.
Figure 99B:
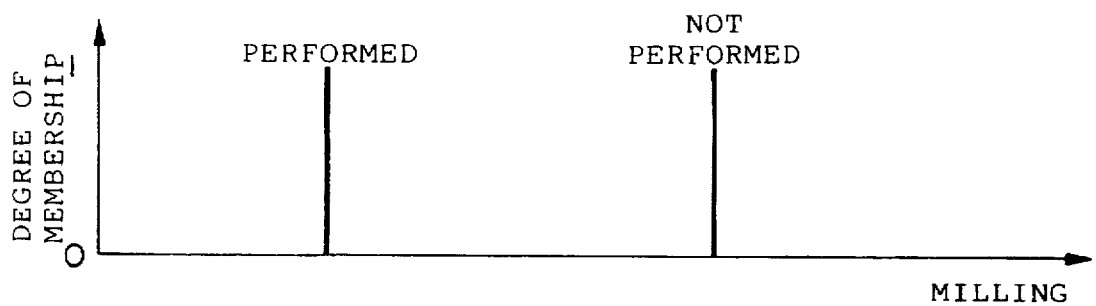
Figure 99C:
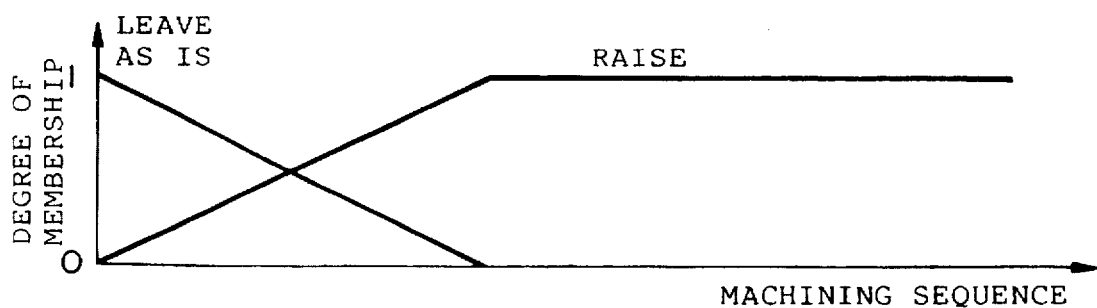

:
:

FIGS. 99a-99c illustrate examples of membership functions and singletons with regard to antecedent variables and consequent variables of optimum machining sequence decision rules FIG. 99a illustrates examples of two membership functions of linguistic information "small" and "large" with regard to the antecedent variable "height of projection" of the optimum machining sequence decision rules.

FIG. 99b illustrates examples of two singletons of linguistic information "performed" and "not performed" with regard to the antecedent variable "milling machining" of the optimum machining sequence decision rules.

FIG. 99c illustrates examples of two membership functions of linguistic information "leave as is" and "raise" with regard to the consequent variable of the optimum machining sequence decision rules.

When the machining sequence determination unit 73 executes reasoning in accordance with the optimum machining sequence decision rules and membership functions with regard to the shape elements of the machining sequence of FIG. 98, the result is the machining sequence shown in FIG. 100. In this case, the shape elements 2 and 3, which had the order of 3 and 4 in the machining sequence, are placed ahead of hole machining and have their places in the machining sequence raised.

Thus, the machining sequence determination unit 73 decides the place in the machining sequence with regard to each of the machining shapes.

The machining sequence is applied as design process information to the machining condition determination unit 74 from the machining sequence determination unit 73.

(6) Machining condition determination unit

The machining condition determination unit 74 decides machining condition information on the basis of process design information decided by the machining sequence determination unit 73.

Figure 101:
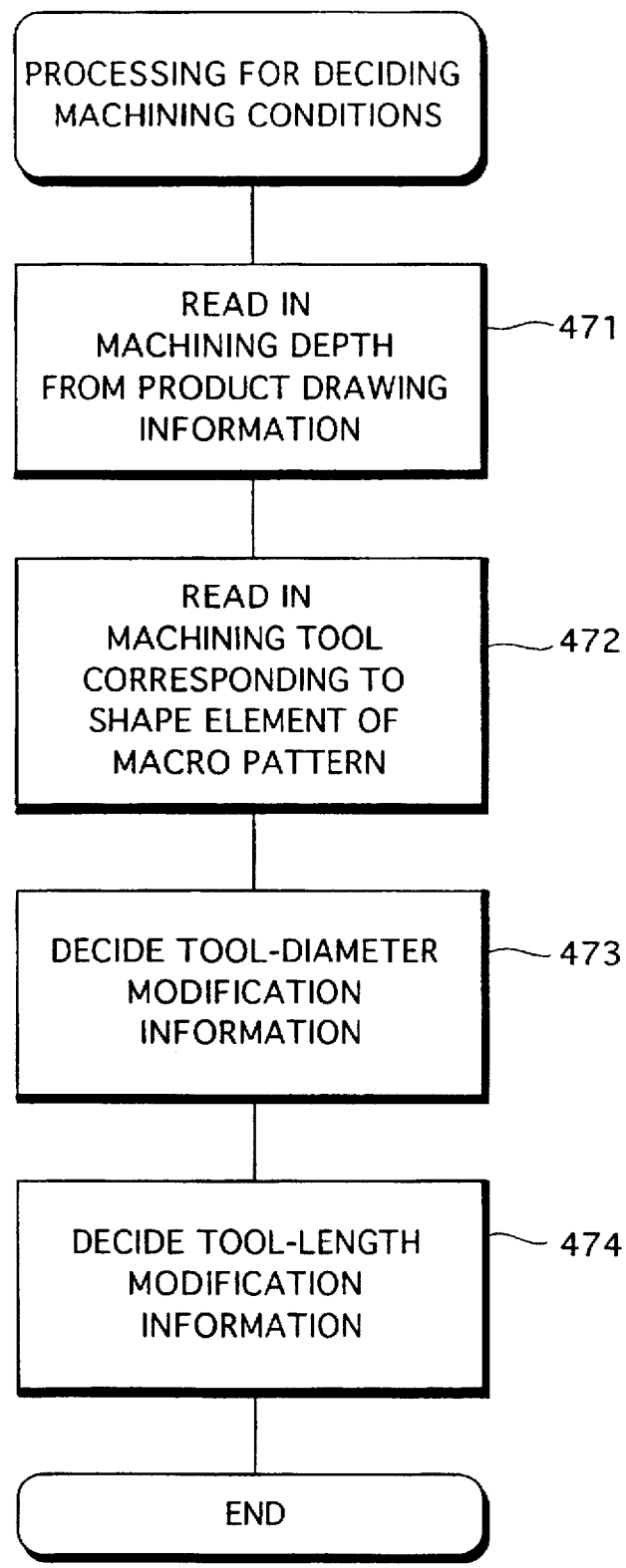
FIG. 101 is a flowchart illustrating the processing procedure of a machining condition determination unit.

FIG. 101 is a flowchart illustrating the processing procedure of the machining condition determination unit 74.

The machining condition determination unit 74 reads in the machining depth ΔZ, with regard to each machining macro pattern, from the product drawing information (FIG. 101; step 471).

The machining condition determination unit 74 reads in a machining tool for the shape element of a machining macro pattern from the standard machining information data base 62 (FIG. 101; step 472).

The machining condition determination unit 74 decides a tool-diameter modification coefficient, which changes the tool diameter of a machining tool, in accordance with tool-diameter modification coefficient decision rules and membership functions established in advance (FIG. 101; step 473).

Tool-diameter modification coefficient decision rules are as follows. by way of example:

IF the machining tool is an end mill and there is a corner

THEN reduce the tool diameter

IF the machining tool is an end mill and there is an incline

THEN reduce the tool diameter

:
:

FIGS. 102a-102d illustrate examples of membership functions and singletons of antecedent variables and consequent variables of tool-diameter modification coefficient decision rules.

Figure 102A:
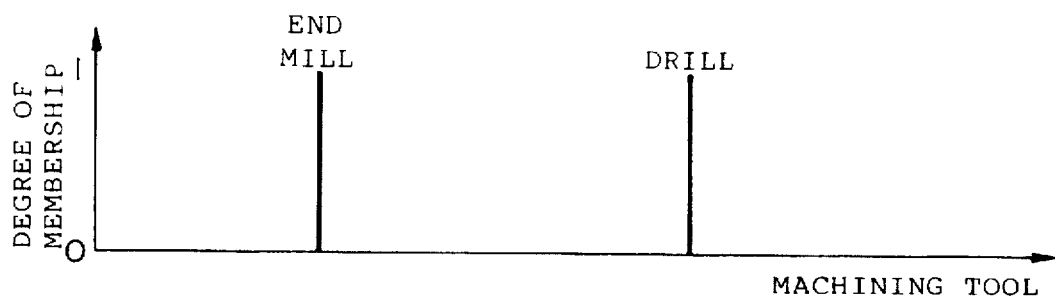
FIGS. 102a, 102b, 102c, and 102d illustrate examples of membership functions and singletons of antecedent variables and consequent variables of tool-diameter modification coefficient decision rules.

FIG. 102a illustrates examples of two singletons of linguistic information "end mill" and "drill" with regard to the antecedent variable "machining tool" of the tool-diameter modification coefficient decision rules.

Figure 102B:
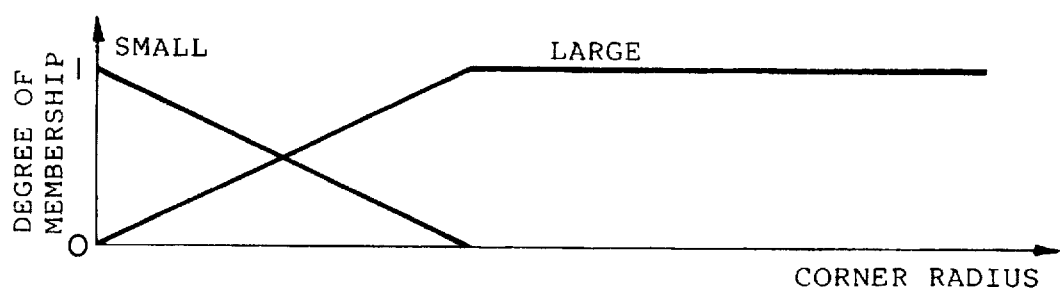

FIG. 102b illustrates examples of two membership functions of linguistic information "small" and "large" with regard to the antecedent variable "corner" of the tool-diameter modification coefficient decision rules.

Figure 102C:
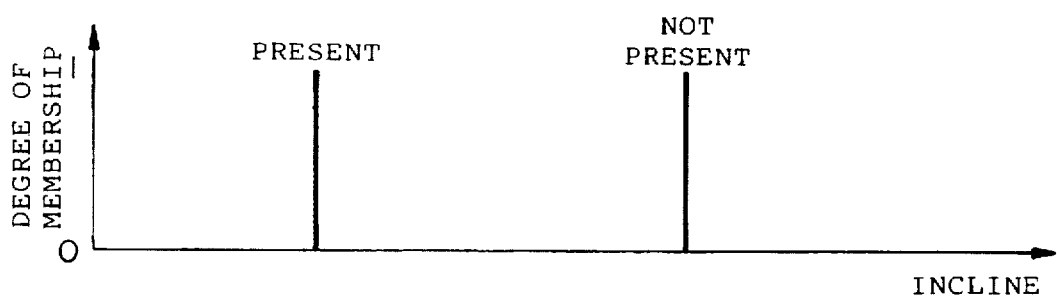

FIG. 102c illustrates examples of two singletons of linguistic information "present" and "not present" with regard to the antecedent variable "incline" of the tool-diameter modification coefficient decision rules.

Figure 102D:
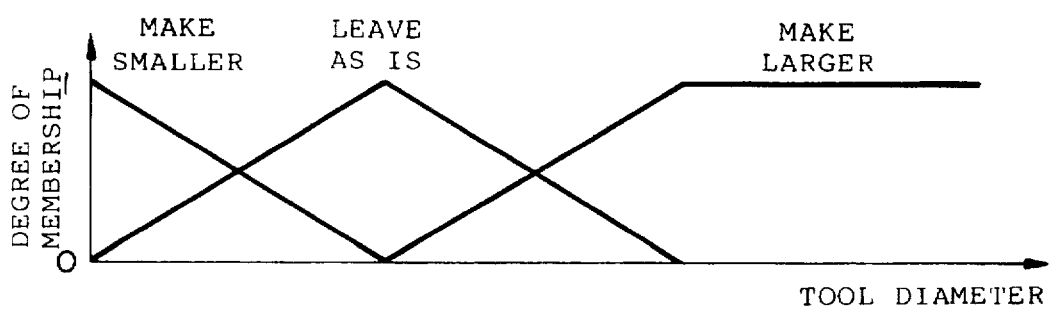

FIG. 102d illustrates examples of three membership functions of linguistic information "small", "medium" and "large" with regard to the consequent variable "tool diameter" of the tool-diameter modification coefficient decision rules.

For example, when the machining condition determination unit 74 decides the tool-diameter modification coefficient of a machining tool in accordance with the tool-diameter modification coefficient decision rules and membership functions, the result is "0.9".

The machining condition determination unit 74 further decides tool-length modification coefficient information, which modifies the tool length of a machining tool, in accordance with tool-length modification coefficient decision rules and membership functions established in advance (FIG. 101; step 473).

Tool-length modification coefficient decision rules are as follows. by way of example:

IF the machining tool is an end mill and there is an interference portion

THEN enlarge the tool length

IF the machining tool is an end mill and a cutting position in deep

THEN enlarge the tool length

:
:

FIGS. 103a-103d illustrate examples of membership functions and singletons of antecedent variables and consequent variables of tool-length modification coefficient decision rules.

Figure 103A:
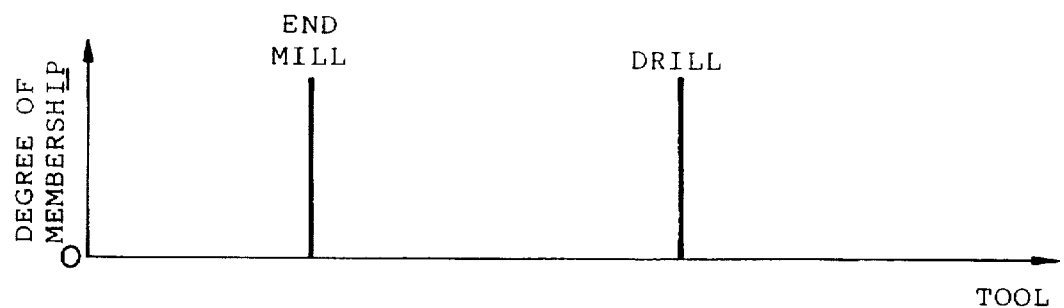
FIGS. 103a, 103b, 103c, and 103d illustrate examples of membership functions and singletons of antecedent variables and consequent variables of tool-length modification coefficient decision rules.

FIG. 103a illustrates examples of two singletons of linguistic information "end mill" and "drill" with regard to the antecedent variable "machining tool" of the tool-length modification coefficient decision rules.

Figure 103B:
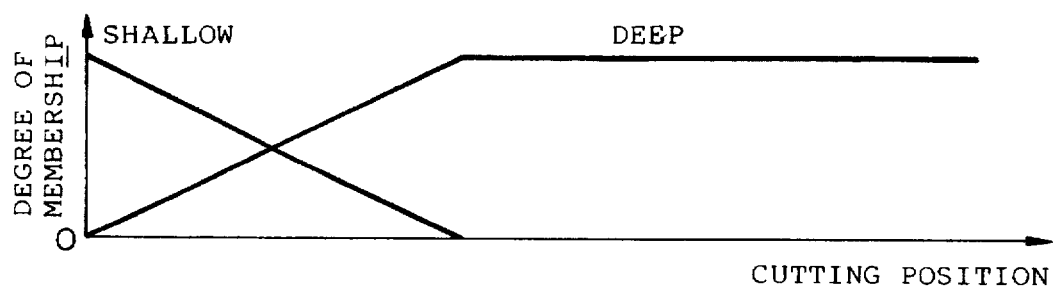
Figure 103C:
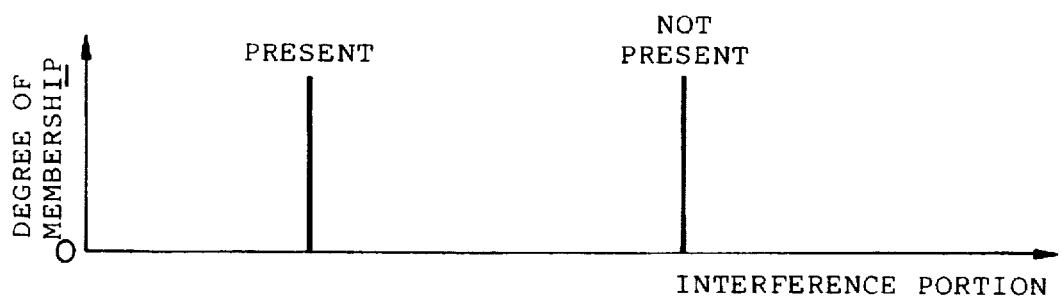

FIG. 103c illustrates examples of two membership functions of linguistic information "present"and "not present" with regard to the antecedent variable "interference portion" of the tool-length modification coefficient decision rules.

FIG. 103b illustrates examples of two singletons of linguistic information "shallow" and "deep" with regard to the antecedent variable "cutting position" of the tool-length modification coefficient decision rules.

Figure 103D:
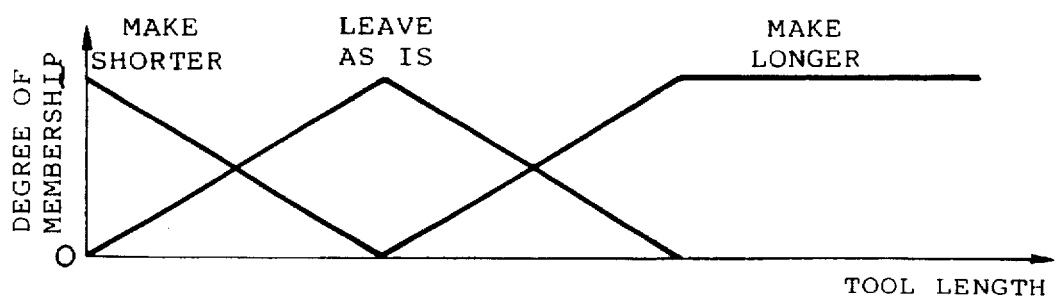

FIG. 103d illustrates examples of three membership functions of linguistic information "make shorter", "leave as is"

and "make longer" with regard to the consequent variable "tool length" of the tool-length modification coefficient decision rules.

For example, when the machining condition determination unit 74 decides the tool-length modification coefficient of a machining tool in accordance with the tool-length modification coefficient decision rules and membership functions, the result is "1.4".

An example of machining condition information obtained in the manner described above is as illustrated in FIG. 104.

The machining condition information containing the tool-diameter modification information and tool-length modification information decided by the machining condition determination unit 74 is applied to the CAM apparatus 63 and machine tool 64.

4.5 CAM apparatus

The CAM apparatus 63 creates NC information on the basis of the machining process information and machining condition information decided by the machining-process information determination apparatus 70. The CAM apparatus 63 is implemented by a computer system and software which operates in the system, by way of example.

4.6 Machine tool

The machine tool 64 creates NC data on the basis of the product drawing information and standard machining information entered from the CAD apparatus 61, as well as the process design information and machining condition information decided by the machining-process information determination apparatus 70, and machines a workpiece on the basis of the NC data created. The NC data is created by automatic programming with which the machine tool 64 is provided in advance.

Industrial Applicability

The machining information determination system according to the present invention finds use in the design of manufacturing processes in the manufacturing industry.

What is claimed is:

1. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece;

a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered; and a control-data creation unit which, on the basis of the optimum machining information decided by said machining information determination apparatus, said before-machining shape model and said after-machining shape model, generates control data according to which a machine tool applies machining to said workpiece;

said machining information determination apparatus having at least:

machine-tool determination means which, on the basis of the before-machining shape information and after-machining shape information created by said CAD apparatus and the material information and machining-stage information entered from said input unit, and in accordance with machine-tool knowledge data established in advance, decides an optimum machine tool for machining said workpiece.

2. A machining information determination system according to claim 1, wherein said CAD apparatus has:

before-machining shape model creating means for creating the before-machining shape model representing the shape of said workpiece before machining is applied thereto;

after-machining shape model creating means for creating the after-machining shape model representing the shape of said workpiece after machining is applied thereto;

CAD input means for entering surface precision, which represents surface smoothness of said workpiece after machining, and corner radius, which represents corner shape of said workpiece after machining;

cutting zone creating means which, on the basis of the before-machining shape model created by said before-machining shape model creating means and the after-machining shape model created by said after-machining shape model creating means, creates data representing a cutting zone in which said workpiece is to be cut; and before-machining/after-machining shape information creating means for creating said before-machining shape information on the basis of the cutting zone data created by said cutting zone creating means, creating part of the information of said after-machining shape information, and creating said after-machining shape information by combining the created information with the surface precision and corner radius entered from said CAD input means.

3. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece;

a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered; and a control-data creation unit which, on the basis of the optimum machining information decided by said machining information decided by said machining information determination apparatus, said before-machining shape model and said after-machining shape model, generates control data according to which a machine tool applies machining to said workpiece;

said machining information determination apparatus having:

a data base in which machine-tool tool-use data relating to plural types of tools prepared in advance is registered with regard to a machine tool which applies machining to a workpiece using a plurality of interchangeable tools;

tool-use determination means which, on the basis of the before-machining shape information and after-machining shape information created by said CAD apparatus as well as the material information and machining-stage information entered from said input unit, and in accordance with tool-use knowledge data established in advance, decides upon an optimum machine tool for machining said workpiece and decides upon a tool used by the machine tool decided upon;

optimum-tool determination means which, in a case where the machine tool decided upon by the tool-use determination means is a machine tool that uses tools registered in said data base, refers to said data base to decide, with regard to the tool used decided upon by said tool-use determination means, an optimum tool used employed by said machine tool from among the tools registered in said data base;

tool-path mode determination means which, in a case where the machine tool decided upon by said tool-use determination means is a machine tool that uses tools registered in said data base and said tool used employed by said machine tool is a specific tool used, decides a path mode of said specific tool used on the basis of the before-machining shape information and after-machining shape information created by said CAD apparatus as well as the material information and machining-stage information entered from said input unit, and in accordance with tool-path mode knowledge data established in advance; and machining condition determination means which, on the basis of the before-machining shape information and after-machining shape information created by said CAD apparatus, the material information and machining-stage information entered from said input unit and said tool used, and in accordance with machining-condition knowledge data established in advance, decides machining conditions relating to said tool used;

wherein said tool used, said tool path mode and said machining conditions are adopted as optimum machining information.

4. A machining information determination system according to claim 3, wherein said machining information determination apparatus has:

teaching information input means for entering parameters, which relate to a machine tool, as teaching information; and membership function learning means for calculating a correction coefficient, which is for correcting the membership functions established in advance in said machining condition determination means, on the basis of the parameters of the machine tool entered from said teaching information input means and parameters of the machine tool that have been set in advance, and correcting said membership functions on the basis of the correction coefficient calculated.

5. A machining information determination system according to claim 3, wherein said machining information determination apparatus has:

teaching information input means for allowing entry of machining conditions, which relate to said tool used, as teaching information a plurality of times; and membership function learning means for calculating deviations between the respective machining conditions entered from said teaching information input means and the machining conditions decided by said machining condition determination means, and correcting the membership functions, which have been established in advance in said machining condition determination means, on the basis of an average of the deviations calculated.

6. A machining information determination system according to claim 3, wherein said machining information determination apparatus has:

selection information input means which enters selection information for selecting data relating to a desired tool; and reconstruction means which, in accordance with input information entered from said selection-information input means, reconstructs a data base which comprises solely data of tools selected from the machine-tool tool-use data registered in said above-mentioned data base.

7. A machining information determination system according to claim 3, wherein said machining information determination apparatus has:

teaching information input means for entering machining conditions, which relate to said tool used, as teaching information; and membership function learning means for calculating a correction coefficient, which is for correcting the membership functions established in advance in said machining condition determination means, on the basis of the machining conditions entered from said teaching information input means and the machining conditions decided by said machining condition determination means, and correcting said membership functions on the basis of the correction coefficient calculated.

8. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece;

a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered; and a control-data creation unit which, on the basis of the optimum machining information decided by said machining information determination apparatus, said before-machining shape model and said after-machining shape model, generates control data according to which a machine tool applies machining to said workpiece;

said machining information determination apparatus having:

a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to said specific tool; and a machining-condition data file relating to machining conditions, this with regard to a tool;

tool-use determination means which, on the basis of the before-machining shape information and after-machining shape information created by said CAD apparatus as well as the material information and machining-stage information entered from said input unit, decides upon an optimum machine tool for machining said workpiece and, by referring to the tool-use data file registered in said data base, decides upon a tool used employed by said machine tool decided upon;

optimum-tool determination means which, in a case where the machine tool decided upon by said tool-use determination means is a machine tool that uses tools registered in said data base, refers to the machine-tool tool-use data file registered in said data base to decide, with regard to the tool used decided upon by said tool-use determination means, an optimum tool used employed by said machine tool from among the tools registered in said machine-tool tool-use data file;

tool-path mode determination means which, in a case where the machine tool decided upon by said tool-use determination means is a machine tool that uses tools registered in said data base and said tool used employed by said machine tool is a specific tool used, decides a path mode of said specific tool used by referring to the tool-path mode data file, registered in said data base, on the basis of the before-machining shape information and after-machining shape information created by said CAD apparatus as well as the material information and machining-stage information entered from said input unit; and machining condition determination means which, on the basis of the before-machining shape information and after-machining shape information created by said CAD apparatus, the material information and machining-stage information entered from said input unit and said tool used, refers to the machining-condition data file, registered in said data base, to decide machining conditions relating to said tool used;

wherein said tool used, said tool path mode and said machining conditions are adopted as optimum machining information.

9. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece;

on the basis of the created before-machining shape information and after-machining shape information and the entered material information and machining-stage information, deciding optimum machining information for machining the workpiece, before machining has been applied thereto, to the shape after machining and up to the machining stage entered;

generating control data, in accordance with which a machine tool applies machining to said workpiece, on the basis of the optimum machining information decided, said before-machining shape model and said after-machining shape model; and on the basis of the created before-machining shape information and after-machining shape information as well as the entered material information and machining-stage information, and in accordance with machine-tool knowledge data established in advance, deciding an optimum machine tool for machining said workpiece.

10. A machining information determination method according to claim 9, further having the steps of:

creating the before-machining shape model representing the shape of said workpiece before machining is applied thereto;

creating the after-machining shape model representing the shape of said workpiece after machining is applied thereto;

accepting entered surface precision, which represents surface smoothness of said workpiece after machining, and entered corner radius, which represents corner shape of said workpiece after machining;

on the basis of the created before-machining shape model and the created after-machining shape model, creating data representing a cutting zone in which said workpiece is to be cut; and creating said before-machining shape information on the basis of the created cutting zone data, creating part of the information of said after-machining shape information, and creating said after-machining shape information by combining the created information with the entered surface precision and corner radius.

11. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece; and a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered;

said machining information determination apparatus having at least:

machine-tool determination means which, on the basis of the before-machining shape information and after-machining shape information created by said CAD apparatus and the material information and machining-stage information entered from said input unit, and in accordance with machine-tool knowledge data established in advance, decides an optimum machine tool for machining said workpiece.

12. A machining information determination system according to claim 11 wherein said CAD apparatus has:

before-machining shape model creating means for creating the before-machining shape model representing the shape of said workpiece before machining is applied thereto;

after-machining shape model creating means for creating the after-machining shape model representing the shape of said workpiece after machining is applied thereto;

CAD input means for entering surface precision, which represents surface smoothness of said workpiece after machining, and corner radius, which represents corner shape of said workpiece after machining;

cutting zone creating means which, on the basis of the before-machining shape model created by said before-machining shape model creating means and the after-machining shape model created by said after-machining shape model creating means, creates data representing a cutting zone in which said workpiece is to be cut; and before-machining/after-machining shape information creating means for creating said before-machining shape information on the basis of the cutting zone data created by said cutting zone creating means, creating part of the information of said after-machining shape information, and creating said after-machining shape information by combining the created information with the surface precision and corner radius entered from said CAD input means.

13. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece; and a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered;

said machining information determination apparatus having:

a data base in which machine-tool tool-use data relating to plural types of tools prepared in advance is registered with regard to a machine tool which applies machining to a workpiece using a plurality of interchangeable tools;

tool-use determination means which, on the basis of the before-machining shape information and after-machining shape information created by said CAD apparatus as well as the material information and machining-stage information entered from said input unit, and in accordance with tool-use decision rules and membership functions established in advance, decides upon an optimum machine tool for machining said workpiece and decides upon a tool used by the machine tool decided upon;

optimum-tool determination means which, in a case where the machine tool decided upon by the tool-use determination means is a machine tool that uses tools registered in said data base, refers to said data base to decide, with regard to the tool used decided upon by said tool-use determination means, an optimum tool used employed by said machine tool from among the tools registered in said data base;

tool-path mode determination means which, in a case where the machine tool decided upon by said tool-use determination means is a machine tool that uses tools registered in said data base and said tool used employed by said machine tool is a specific tool used, decides a path mode of said specific tool used on the basis of the before-machining shape information and after-machining shape information created by said CAD apparatus as well as the material information and machining-stage information entered from said input unit, and in accordance with tool-path mode decision rules and membership functions established in advance; and machining condition determination means which, on the basis of the before-machining shape information and after-machining shape information created by said CAD apparatus, the material information and machining-stage information entered from said input unit and said tool used, and in accordance with machining-condition decision rules and membership functions established in advance, decides machining conditions relating to said tool used;

wherein said tool used, said tool path mode and said machining conditions are adopted as optimum machining information.

14. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece; and a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered;

said machining information determination apparatus having:

a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to said specific tool; and a machining-condition data file relating to machining conditions, this with regard to a tool;

tool-use determination means which, on the basis of the before-machining shape information and after-machining shape information created by said CAD apparatus as well as the material information and machining-stage information entered from said input unit, decides upon an optimum machine tool for machining said workpiece and, by referring to the tool-use data file registered in said data base, decides upon a tool used employed by said machine tool decided upon;

optimum-tool determination means which, in a case where the machine tool decided upon by said tool-use determination means is a machine tool that uses tools registered in said data base, refers to the machine-tool tool-use data file registered in said data base to decide, with regard to the tool used decided upon by said tool-use determination means, an optimum tool used employed by said machine tool from among the tools registered in said machine-tool tool-use data file;

tool-path mode determination means which, in a case where the machine tool decided upon by said tool-use determination means is a machine tool that uses tools registered in said data base and said tool used employed by said machine tool is a specific tool used, decides a path mode of said specific tool used by referring to the tool-path mode data file, registered in said data base, on the basis of the before-machining shape information and after-machining shape information created by said CAD apparatus as well as the material information and machining-stage information entered from said input unit; and machining condition determination means which, on the basis of the before-machining shape information and after-machining shape information created by said CAD apparatus, the material information and machining-stage information entered from said input unit and said tool used, refers to the machining-condition data file, registered in said data base, to decide machining conditions relating to said tool used;

wherein said tool used, said tool path mode and said machining conditions are adopted as optimum machining information.

15. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece;

on the basis of the created before-machining shape information and after-machining shape information and the entered material information and machining-stage information, deciding optimum machining information for machining the workpiece, before machining has been applied thereto, to the shape after machining and up to the machining stage entered; and on the basis of the created before-machining shape information and after-machining shape information as well as the entered material information and machining-stage information, and in accordance with machine-tool decision rules and membership functions established in advance, deciding an optimum machine tool for machining said workpiece.

16. A machining information determination method according to claim 15 further having the steps of:

creating the before-machining shape model representing the shape of said workpiece before machining is applied thereto;

creating the after-machining shape model representing the shape of said workpiece after machining is applied thereto;

accepting entered surface precision, which represents surface smoothness of said workpiece after machining, and entered corner radius, which represents corner shape of said workpiece after machining;

on the basis of the created before-machining shape model and the created after-machining shape model, creating data representing a cutting zone in which said workpiece is to be cut; and creating said before-machining shape information on the basis of the created cutting zone data, creating part of the information of said after-machining shape information, and creating said after-machining shape information by combining the created information with the entered surface precision and corner radius.

17. A machining information determination system according to claim 1, wherein said knowledge data comprises decision rules and membership functions.

18. A machining information determination system comprising:

an input unit for entering before-machining shape information relating to the shape of a workpiece before machining, after-machining shape information relating to the shape of said workpiece after machining, material information representing material of said workpiece and machining-stage information representing stage of machining applied to said workpiece;

a machining information determination apparatus which, on the basis of the before-machining shape information, the after-machining shape information, the material information and the machining-stage information entered from said input unit, decides optimum machining information for machining said workpiece, before machining has been applied thereto, to the shape after machining and up to the machining stage entered; and a control-data creation unit which, on the basis of a given before-machining shape model representing the shape of said workpiece before machining is applied thereto and a given after-machining shape model representing the shape of said workpiece after machining is applied thereto, and the optimum machining information decided by said machining information determination apparatus, generates control data according to which a machine tool applies machining to the workpiece;

said machining information determination apparatus having at least:

machine-tool determination means which, on the basis of the before-machining shape information, after-machining shape information, material information and machining-stage information entered from said input unit, and in accordance with machine-tool knowledge data established in advance, decides an optimum machine tool for machining said workpiece.

19. A machining information determination system comprising:

an input unit for entering before-machining shape information relating to the shape of a workpiece before machining, after-machining shape information relating to the shape of said workpiece after machining, material information representing material of said workpiece and machining-stage information representing stage of machining applied to said workpiece;

a machining information determination apparatus which, on the basis of the before-machining shape information, the after-machining shape information, the material information and the machining-stage information entered from said input unit, decides optimum machining information for machining said workpiece, before machining has been applied thereto, to the shape after machining and up to the machining stage entered; and a control-data creation unit which, on the basis of a given before-machining shape model representing the shape of said workpiece before machining is applied thereto and a given after-machining shape model representing the shape of said workpiece after machining is applied thereto, and the optimum machining information decided by said machining information determination apparatus, generates control data according to which a machine tool applies machining to the workpiece;

said machining information determination apparatus having:

a data base in which machine-tool tool-use data relating to plural types of tools prepared in advance is registered with regard to a machine tool which applies machining to a workpiece using a plurality of interchangeable tools;

tool-use determination means which, on the basis of the before-machining shape information, after-machining shape information, material information and machining-stage information entered from said input unit, and in accordance with tool-use decision rules and membership functions established in advance, decides upon an optimum machine tool for machining the workpiece and decides upon a tool used by said machining tool decided upon;

optimum-tool determination means which, in a case where the machine tool decided upon by said tool-use determination means is a machine tool that uses tools registered in said data base, refers to said data base to decide, with regard to the tool used decided upon by said tool-use determination means, an optimum tool used employed by said machine tool from among the tools registered in said data base;

tool-path mode determination means which, in a case where the machine tool decided upon by said tool-use determination means is a machine tool that uses tools registered in said data base and said tool used employed by said machine tool is a specific tool used, decides a path mode of said specific tool used on the basis of the before-machining shape information, after-machining shape information, material information and machining-stage information entered from said input unit, and in accordance with tool-path mode decision rules and membership functions established in advance; and machining condition determination means which, on the basis of the before-machining shape information, after-machining shape information, material information and machining-stage information entered from said input unit and said tool used, and in accordance with machining-condition decision rules and membership functions established in advance, decides machining conditions relating to said tool used;

wherein said tool used, said tool path mode and said machining conditions are adopted as optimum machining information.

20. A machining information determination system comprising:

an input unit for entering before-machining shape information relating to the shape of a workpiece before machining, after-machining shape information relating to the shape of said workpiece after machining, material information representing material of said workpiece and machining-stage information representing stage of machining applied to said workpiece;

a machining information determination apparatus which, on the basis of the before-machining shape information, the after-machining shape information, the material information and the machining-stage information entered from said input unit, decides optimum machining information for machining said workpiece, before machining has been applied thereto, to the shape after machining and up to the machining stage entered; and a control-data creation unit which, on the basis of a given before-machining shape model representing the shape of said workpiece before machining is applied thereto and a given after-machining shape model representing the shape of said workpiece after machining is applied thereto, and the optimum machining information decided by said machining information determination apparatus, generates control data according to which a machine tool applies machining to the workpiece;

said machining information determination apparatus having:

a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to said specific tool; and a machining-condition data file relating to machining conditions, this with regard to a tool;

tool-use determination means which, on the basis of the before-machining shape information, after-machining shape information, material information and machining-stage information entered from said input unit, decides upon an optimum machine tool for machining said workpiece and, by referring to the tool-use data file registered in said data base, decides upon a tool used employed by said machine tool decided upon;

optimum-tool determination means which, in a case where the machine tool decided upon by said tool-use determination means is a machine tool that uses tools registered in said data base, refers to the machine-tool tool-use data file registered in said data base to decide, with regard to the tool used decided upon by said tool-use determination means, an optimum tool used employed by said machine tool from among the tools registered in said machine-tool tool-use data file;

tool-path mode determination means which, in a case where the machine tool decided upon by said tool-use determination means is a machine tool that uses tools registered in said data base and said tool used employed by said machine tool is a specific tool used, decides a path mode of said specific tool used by referring to the tool-path mode data file, registered in said data base, on the basis of the before-machining shape information, after-machining shape information, material information and machining-stage information entered from said input unit; and machining condition determination means which, on the basis of the before-machining shape information, after-machining shape information, material information and machining-stage information entered from said input unit and said tool used, refers to the machining-condition data file, registered in said data base, to decide machining conditions relating to said tool used;

wherein said tool used, said tool path mode and said machining conditions are adopted as optimum machining information.

21. A machining information determination method comprising the steps of:

accepting entered before-machining shape information relating to the shape of a workpiece before machining, after-machining shape information relating to the shape of said workpiece after machining, material information representing material of said workpiece and machining-stage information representing stage of machining applied to said workpiece;

on the basis of the entered before-machining shape information, after-machining shape information, material information and machining-stage information, deciding optimum machining information for machining said workpiece, before machining has been applied thereto, to the shape after machining and up to the machining stage entered;

generating control data, in accordance with which a machine tool applies machining to the workpiece, on the basis of a given before-machining shape model representing the shape of said workpiece before machining is applied thereto, a given after-machining shape model representing the shape of said workpiece after machining is applied thereto, and the optimum machining information decided; and on the basis of the entered before-machining shape information, after-machining shape information, material said step of deciding optimum machining information further comprising the steps of:

information and machining-stage information, and in accordance with machine-tool decision rules and membership functions established in advance, deciding an optimum machine tool for machining said workpiece.

22. A machining information determination apparatus comprising:

a data base in which machine-tool tool-use data relating to plural types of tools prepared in advance is registered with regard to a machine tool which applies machining to a workpiece using a plurality of interchangeable tools;

input means for entering before-machining shape information relating to the shape of a workpiece before machining, after-machining shape information relating to the shape of said workpiece after machining, material information representing material of said workpiece and machining-stage information representing stage of machining applied to the workpiece;

tool use determination means which, on the basis of the before-machining shape information, after-machining shape information, material information and machining-stage information entered from said input means, and in accordance with tool-use knowledge data established in advance, decides upon an optimum machine tool for machining said workpiece and decides upon tools used by said machine tool decided upon;

optimum-tool determination means which, in a case where the machine tool decided upon by said tool-use determination means is a machine tool that uses tools registered in said data base, refers to said data base to decide, with regard to the tool used decided upon by said tool-use determination means, an optimum tool used employed by said machine tool from among the tools registered in said data base;

tool-path mode determination means which, in a case where the machine tool decided upon by said tool-use determination means is a machine tool that uses tools registered in said data base and said tool used employed by said machine tool is a specific tool used, decides a path mode of said specific tool used on the basis of the before-machining shape information, after-machining shape information, material information and machining-stage information entered from said input means, and in accordance with tool-path mode knowledge data established in advance; and machining condition determination means which, on the basis of the before-machining shape information, after-machining shape information, material information and machining-stage information entered from said input unit and said tool used, and in accordance with machining-condition knowledge data established in advance, decides machining conditions relating to said tool used.

23. A machining information determination method comprising the steps of:

providing a data base in which machine-tool tool-use data relating to plural types of tools prepared in advance is registered with regard to a machine tool which applies machining to the workpiece using a plurality of interchangeable tools;

accepting entered before-machining shape information relating to the shape of said workpiece before machining, after-machining shape information relating to the shape of said workpiece after machining, material information representing material of said workpiece and machining-stage information representing stage of machining applied to said workpiece;

on the basis of the entered before-machining shape information, after-machining shape information, material information and machining-stage information, and in accordance with tool-use knowledge data established in advance, deciding an optimum machine tool for machining said workpiece as well as a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base;

in a case where the machine tool decided upon is a machine tool that uses tools registered in said data base and said tool used employed by said machine tool is a specific tool used, deciding a path mode of said specific tool used on the basis of the entered before-machining shape information, after-machining shape information, material information and machining-stage information, and in accordance with tool-path mode knowledge data established in advance; and deciding machining conditions relating to said tool used on the basis of the entered before-machining shape information, after-machining shape information, material information and machining-stage information, as said tool used, and in accordance with machining-condition knowledge data established in advance.

24. A machining information determination apparatus comprising:

a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to said specific tool; and a machining-condition data file relating to machining conditions, this with regard to a tool;

input means for entering before-machining shape information relating to the shape of said workpiece before machining, after-machining shape information relating to the shape of said workpiece after machining, material information representing material of said workpiece and machining-stage information representing stage of machining applied to the workpiece;

tool-use determination means which, on the basis of the before-machining shape information, after-machining shape information, material information and machining-stage information entered from said input means, decides upon an optimum machine tool for machining said workpiece and, by referring to the tool-use data file registered in said data base, decides upon a tool used employed by said machine tool decided upon;

optimum-tool determination means which, in a case where the machine tool decided upon by said tool-use determination means is a machine tool that uses tools registered in said data base, refers to the machine-tool tool-use data file registered in said data base to decide, with regard to said tool used decided upon by said tool-use determination means, an optimum tool used employed by said machine tool from among the tools registered in said machine-tool tool-use data file;

tool-path mode determination means which, in a case where the machine tool decided upon by said tool-use determination means is a machine tool that uses tools registered in said data base and said tool used employed by said machine tool is a specific tool used, decides a path mode of said specific tool used by referring to the tool-path mode data file, registered in said data base, on the basis of the before-machining shape information, after-machining shape information, material information and machining-stage information entered from said input means; and machining condition determination means which, on the basis of the before-machining shape information, after-machining shape information, material information and machining-stage information entered from said input means and said tool used, refers to the machining-condition data file, registered in said data base, to decide machining conditions relating to said tool used.

25. A machining information determination method comprising the steps of:

providing a data base in which there are registered a tool-use data file relating to a tool used by a machine tool; a machine-tool tool-use data file relating to plural types of tools prepared in advance, this with regard to a machine tool which applies machining to said workpiece using a plurality of interchangeable tools; a tool-path mode data file relating to a path mode of a specific tool, this with regard to said specific tool; and a machining-condition data file relating to machining conditions, this regard to a tool;

accepting entered before-machining shape information relating to the shape of said workpiece before machining, after-machining shape information relating to the shape of said workpiece after machining, material information representing material of said workpiece and machining-stage information representing stage of machining applied to said workpiece;

on the basis of the entered before-machining shape information, after-machining shape information, material information and machining-stage information, deciding an optimum machine tool for machining said workpiece and, by referring to the tool-use data file registered in said data base, deciding upon a tool used employed by said machine tool decided upon;

in a case where the machine tool decided is a machine tool that uses tools registered in said data base, referring to the machine-tool tool-use data file registered in said data base to decide, with regard to the tool used decided upon, an optimum tool used employed by said machine tool from among the tools registered in said machine-tool tool-use data file;

in a case where the machine tool decided upon is a machine tool that uses tools registered in said data base and said tool used employed by said machine tool is a specific tool used, deciding a path mode of said specific tool used by referring to the tool-path mode data file, registered in said data base, on the basis of the entered before-machining shape information, after-machining shape information, material information and machining-stage information; and deciding machining conditions relating to said tool used by referring to the machining-condition data file, registered in said data base, on the basis of the entered before-machining shape information, after-machining shape information, material information and machining-stage information and said tool used.

26. A machining-process information determination apparatus comprising:

a data base in which there is stored standard machining information, in correspondence with standard macro patterns, relating to parameters of the standard macro patterns, machining processes, machining tools and machining method;

difference-information extraction means for extracting difference information between given product drawing information relating to shape of a workpiece after machining is applied thereto and given standard drawing information representing shape of the workpiece before machining is applied thereto;

macro pattern development means which, on the basis of the difference information extracted by said difference-information extraction means, creates a machining macro pattern representing a contour of the shape to be formed on said workpiece by machining and extracts parameters of the machining macro pattern; and sequence determination means for reading a machining method and machining processes of the standard macro pattern, which corresponds to the machining macro pattern created by said macro pattern development means, from the standard machining information stored in said data base, deciding machining processes for machining said workpiece, as well as the sequence of the processes, on the basis of the parameters of the macro pattern extracted by said macro pattern development means and in accordance with the machining method read, rearranging the decided sequence of the machining processes into an optimum sequence in accordance with sequence knowledge data established in advance, and creating the decided machining processes and the rearranged sequence as design process information.

27. A machining-process information determination method comprising the steps of:

providing a data base in which there is stored standard machining information, in correspondence with standard macro patterns, relating to parameters of the standard macro patterns, machining processes, machining tools and machining method;

extracting difference information between given product drawing information relating to shape of a workpiece after machining is applied thereto and given standard drawing information representing shape of the workpiece before machining is applied thereto;

creating, on the basis of the difference information extracted, a machining macro pattern representing a contour of the shape to be formed on said workpiece by machining, and extracting parameters of the machining macro pattern; and reading a machining method and machining processes of the standard macro pattern, which corresponds to the machining macro pattern created, from the standard machining information stored in said data base, deciding machining processes for machining said workpiece, as well as the sequence of the processes, on the basis of the extracted parameters of the macro pattern and in accordance with the machining method read, rearranging the decided sequence of the machining processes into an optimum sequence in accordance with sequence decision rules and membership functions established in advance, and creating the decided machining processes and the rearranged sequence as design process information.

28. A machining-process information determination apparatus comprising:

a data base in which there is stored standard machining information, in correspondence with standard macro patterns, relating to parameters of the standard macro patterns, machining processes, machining tools and machining method;

difference-information extraction means for extracting difference information between given product drawing information relating to shape of a workpiece after machining is applied thereto and given standard drawing information representing shape of the workpiece before machining is applied thereto;

macro pattern development means which, on the basis of the difference information extracted by said difference-information extraction means, creates a machining macro pattern representing a contour of the shape to be formed on said workpiece by machining and extracts parameters of the machining macro pattern; and machining condition determination means for reading a machining tool of the standard macro pattern, which corresponds to the machining macro pattern created by said macro pattern development means, from the standard machining information stored in said data base, and deciding optimum machining condition information relating to the machining tool read in accordance with condition decision rules and membership functions established in advance.

29. A machining-process information determination method comprising the steps of:

providing a data base in which there is stored standard machining information, in correspondence with standard macro patterns, relating to parameters of the standard macro patterns, machining processes, machining tools and machining method;

extracting difference information between given product drawing information relating to shape of a workpiece after machining is applied thereto and given standard drawing information representing shape of the workpiece before machining is applied thereto;

creating, on the basis of the difference information extracted, a machining macro pattern representing a contour of the shape to be formed on said workpiece by machining, and extracting parameters of the machining macro pattern; and reading a machining tool of the standard macro pattern, which corresponds to the machining macro pattern created, from the standard machining information stored in said data base, and deciding optimum machining condition information relating to the machining tool read in accordance with condition decision rules and membership functions established in advance.

30. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece;

a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered; and a control-data creation unit which, on the basis of the optimum machining information decided by said machining information determination apparatus, said before-machining shape model and said after-machining shape model, generates control data according to which a machine tool applies machining to said workpiece;

said machining information determination apparatus having at least:

a data base in which machine-tool tool-use data relating to plural types of tools prepared in advance is registered with regard to a machine tool which applies machining to a workpiece using a plurality of interchangeable tools;

tool-use determination means which, on the basis of the before-machining shape information and after-machining shape information created by said CAD apparatus as well as the material information and machining-stage information entered from said input unit, and in accordance with tool-use decision rules and membership functions established in advance, decides upon an optimum machine tool for machining said workpiece and decides upon a tool used by the machine tool decided upon; and optimum-tool determination means which, in a case where the machine tool decided upon by the tool-use determination means is a machine tool that uses tools registered in said data base, refers to said data base to decide, with regard to the tool used decided upon by said tool-use determination means, an optimum tool used employed by said machine tool from among the tools registered in said data base;

wherein said tool used is adopted as optimum machining information.

31. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece;

a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered; and a control-data creation unit which, on the basis of the optimum machining information decided by said machining information determination apparatus, said before-machining shape model and said after-machining shape model, generates control data according to which a machine tool applies machining to said workpiece;

said machining information determination apparatus having at least:

a data base in which machine-tool tool-use data relating to plural types of tools prepared in advance is registered with regard to a machine tool which applies machining to a workpiece using a plurality of interchangeable tools;

tool-use determination means which, on the basis of the before-machining shape information and after-machining shape information created by said CAD apparatus as well as the material information and machining-stage information entered from said input unit, and in accordance with tool-use decision rules and membership functions established in advance, decides upon an optimum machine tool for machining said workpiece and decides upon a tool used by the machine tool decided upon;

optimum-tool determination means which, in a case where the machine tool decided upon by the tool-use determination means is a machine tool that uses tools registered in said data base, refers to said data base to decide, with regard to the tool used decided upon by said tool-use determination means, an optimum tool used employed by said machine tool from among the tools registered in said data base; and tool-path mode determination means which, in a case where the machine tool decided upon by said tool-use determination means is a machine tool that uses tools registered in said data base and said tool used employed by said machine tool is a specific tool used, decides a path mode of said specific tool used on the basis of the before-machining shape information and after-machining shape information created by said CAD apparatus as well as the material information and machining-stage information entered from said input unit, and in accordance with tool-path mode decision rules and membership functions established in advance;

wherein said tool used and said tool path mode are adopted as optimum machining information.

32. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece; and a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered;

said machining information determination apparatus having at least:

a data base in which machine-tool tool-use data relating to plural types of tools prepared in advance is registered with regard to a machine tool which applies machining to a workpiece using a plurality of interchangeable tools;

tool-use determination means which, on the basis of the before-machining shape information and after-machining shape information created by said CAD apparatus as well as the material information and machining-stage information entered from said input unit, and in accordance with tool-use decision rules and membership functions established in advance, decides upon an optimum machine tool for machining said workpiece and decides upon a tool used by the machine tool decided upon; and optimum-tool determination means which, in a case where the machine tool decided upon by the tool-use determination means is a machine tool that uses tools registered in said data base, refers to said data base to decide, with regard to the tool used decided upon by said tool-use determination means, an optimum tool used employed by said machine tool from among the tools registered in said data base;

wherein said tool used is adopted as optimum machining information.

33. A machining information determination system comprising:

a CAD apparatus which, on the basis of a before-machining shape model representing the shape of a workpiece before machining is applied thereto and an after-machining shape model representing the shape of said workpiece after machining is applied thereto, creates before-machining shape information relating to the shape of said workpiece before machining and after-machining shape information relating to the shape of said workpiece after machining;

an input unit for entering material information representing material of said workpiece and machining-stage information representing stage of machining applied to said workpiece; and a machining information determination apparatus which, on the basis of the before-machining shape information and after-machining shape information created by said CAD apparatus and the material information and machining-stage information entered from said input unit, decides optimum machining information for machining the workpiece, before machining has been applied thereto, to the shape after machining and up to the machining stage entered;

said machining information determination apparatus having at least:

a data base in which machine-tool tool-use data relating to plural types of tools prepared in advance is registered with regard to a machine tool which applies machining to a workpiece using a plurality of interchangeable tools;

tool-use determination means which, on the basis of the before-machining shape information and after-machining shape information created by said CAD apparatus as well as the material information and machining-stage information entered from said input unit, and in accordance with tool-use decision rules and membership functions established in advance, decides upon an optimum machine tool for machining said workpiece and decides upon a tool used by the machine tool decided upon;

optimum-tool determination means which, in a case where the machine tool decided upon by the tool-use determination means is a machine tool that uses tools registered in said data base, refers to said data base to decide, with regard to the tool used decided upon by said tool-use determination means, an optimum tool used employed by said machine tool from among the tools registered in said data base; and tool-path mode determination means which, in a case where the machine tool decided upon by said tool-use determination means is a machine tool that uses tools registered in said data base and said tool used employed by said machine tool is a specific tool used, decides a path mode of said specific tool used on the basis of the before-machining shape information and after-machining shape information created by said CAD apparatus as well as the material information and machining-stage information entered from said input unit, and in accordance with tool-path mode decision rules and membership functions established in advance;

wherein said tool used and said tool path mode are adopted as optimum machining information.

34. A machining information determination system comprising:

an input unit for entering before-machining shape information relating to the shape of a workpiece before machining, after-machining shape information relating to the shape of said workpiece after machining, material information representing material of said workpiece and machining-stage information representing stage of machining applied to said workpiece;

a machining information determination apparatus which, on the basis of the before-machining shape information, the after-machining shape information, the material information and the machining-stage information entered from said input unit, decides optimum machining information for machining said workpiece, before machining has been applied thereto, to the shape after machining and up to the machining stage entered; and a control-data creation unit which, on the basis of a given before-machining shape model representing the shape of said workpiece before machining is applied thereto and a given after-machining shape model representing the shape of said workpiece after machining is applied thereto, and the optimum machining information decided by said machining information determination apparatus, generates control data according to which a machine tool applies machining to the workpiece;

said machining information determination apparatus having at least:
a data base in which machine-tool tool-use data relating to plural types of tools prepared in advance is registered with regard to a machine tool which applies machining to a workpiece using a plurality of interchangeable tools;
tool-use determination means which, on the basis of the before-machining shape information, after-machining shape information, material information and machining-stage information entered from said input unit, and in accordance with tool-use knowledge data established in advance, decides upon an optimum machine tool for machining the workpiece and decides upon a tool used by said machining tool decided upon; and
optimum-tool determination means which, in a case where the machine tool decided upon by said tool-use determination means is a machine tool that uses tools registered in said data base, refers to said data base to decide, with regard to the tool used decided upon by said tool-use determination means, an optimum tool used employed by said machine tool from among the tools registered in said data base;
wherein said tool used is adopted as optimum machining information.

35. A machining information determination system comprising:
an input unit for entering before-machining shape information relating to the shape of a workpiece before machining, after-machining shape information relating to the shape of said workpiece after machining, material information representing material of said workpiece and machining-stage information representing stage of machining applied to said workpiece;
a machining information determination apparatus which, on the basis of the before-machining shape information, the after-machining shape information, the material information and the machining-stage information entered from said input unit, decides optimum machining information for machining said workpiece, before machining has been applied thereto, to the shape after machining and up to the machining stage entered; and
a control-data creation unit which, on the basis of a given before-machining shape model representing the shape of said workpiece before machining is applied thereto and a given after-machining shape model representing the shape of said workpiece after machining is applied thereto, and the optimum machining information decided by said machining information determination apparatus, generates control data according to which a machine tool applies machining to the workpiece;
said machining information determination apparatus having at least:
a data base in which machine-tool tool-use data relating to plural types of tools prepared in advance is registered with regard to a machine tool which applies machining to a workpiece using a plurality of interchangeable tools;
tool-use determination means which, on the basis of the before-machining shape information, after-machining shape information, material information and machining-stage information entered from said input unit, and in accordance with tool-use knowledge data established in advance, decides upon an optimum machine tool for machining the workpiece and decides upon a tool used by said machining tool decided upon;
optimum-tool determination means which, in a case where the machine tool decided upon by said tool-use determination means is a machine tool that uses tools registered in said data base, refers to said data base to decide, with regard to the tool used decided upon by said tool-use determination means, an optimum tool used employed by said machine tool from among the tools registered in said data base; and
tool-path mode determination means which, in a case where the machine tool decided upon by said tool-use determination means is a machine tool that uses tools registered in said data base and said tool used employed by said machine tool is a specific tool used, decides a path mode of said specific tool used on the basis of the before-machining shape information, after-machining shape information, material information and machining-stage information entered from said input unit, and in accordance with tool-path mode knowledge data established in advance;
wherein said tool used and said tool path mode are adopted as optimum machining information.

36. A machining information determination system, comprising:
continuous-use prearranged-time input means for entering continuous-use prearranged time during which the machine tool uses a tool continuously;
wear measurement means for detecting degree of wear of said tool used by said machine tool; and
machining condition determination means which, on the basis of the before-machining shape information and after-machining shape information created by a CAD apparatus, the material information and machining-stage information entered from an input unit, the degree of wear detected by said wear detecting means and the continuous-use prearranged time entered from said continuous-use prearranged-time input means, decides machining conditions relating to said tool in accordance with machining-condition knowledge data established in advance,
wherein said wear measurement means has:
memory means for storing before-use image data representing shape of a tool before use and use-limit image data representing shape of said tool at limit of its usefulness;
photographic means for photographing a tool used by a machine tool and generating image data representing said tool; and
degree-of-wear calculation means for calculating degree of wear of said tool on the basis of the before-use image data and use-limit image data stored in said memory means and the image data generated by said photographic means.

37. A machining information determination system, comprising:
continuous-use prearranged-time input means for entering continuous-use prearranged time during which the machine tool uses a tool continuously;
wear measurement means for detecting degree of wear of said tool used by said machine tool; and
machining condition determination means which, on the basis of the before-machining shape information and after-machining shape information created by a CAD apparatus, the material information and machining-stage information entered from an input unit, the degree of wear detected by said wear detecting means and the continuous-use prearranged time entered from said continuous-use prearranged-time input means, decides machining conditions relating to said tool in accordance with machining-condition knowledge data established in advance, wherein said wear measurement means has:
memory means for storing before-use image data of machining marks obtained when a standard workpiece material is machined by a machine tool employing an unused tool, and use-limit image data of machining marks obtained when said standard workpiece material is machined by said machine tool employing a tool at limit of its usefulness;

photographic means for photographing the machining marks obtained when said standard workpiece material is machined by a tool employed by the machine tool and generating image data representing these machining marks; and degree-of-wear calculation means for calculating degree of wear of said tool on the basis of the before-use image data and use-limit image data stored in said memory means and the image data generated by said photographic means.

38. A machining information determination system, comprising:

continuous-use prearranged-time input means for entering continuous-use prearranged time during which the machine tool uses a tool continuously;

wear measurement means for detecting degree of wear of said tool used by said machine tool; and machining condition determination means which, on the basis of the before-machining shape information and after-machining shape information created by a CAD apparatus, the material information and machining-stage information entered from an input unit, the degree of wear detected by said wear detecting means and the continuous-use prearranged time entered from said continuous-use prearranged-time input means, decides machining conditions relating to said tool in accordance with machining-condition knowledge data established in advance, wherein said wear measurement means has:
memory means for storing before-use image data of an impression of an unused tool taken using a standard templating material, and use-limit image data of an impression of the tool at limit of its usefulness taken using said standard templating material;

photographic means for photographing an impression of a tool in use taken using said standard templating material, and generating image data of this impression; and degree-of-wear calculation means for calculating degree of wear of said tool on the basis of the before-use image data and use-limit image data stored in said memory means and the image data generated by said photographic means.

39. A machining information determination system, comprising:

continuous-use prearranged-time input means for entering continuous-use prearranged time during which the machine tool uses a tool continuously;

wear measurement means for detecting degree of wear of said tool used by said machine tool; and machining condition determination means which, on the basis of the before-machining shape information and after-machining shape information created by a CAD apparatus, the material information and machining-stage information entered from an input unit, the degree of wear detected by said wear detecting means and the continuous-use prearranged time entered from said continuous-use prearranged-time input means, decides machining conditions relating to said tool in accordance with machining-condition knowledge data established in advance, wherein said wear measurement means has:
memory means for storing before-use characteristic data of a machine tool obtained when a standard workpiece material is machined by an unused tool, and use-limit characteristic data of said machine tool obtained when said standard workpiece material is machined by a tool at limit of its usefulness;

measurement means for measuring characteristic data when said standard workpiece material is machined by a tool employed by said machine tool; and degree-of-wear calculation means for calculating degree of wear of said tool on the basis of the before-use characteristic data and use-limit characteristic data stored in said memory means and the characteristic data generated by said measurement means.

40. A machining information determination system comprising:

a data base in which, with regard to a machine tool which applies machining to a workpiece using a plurality of interchangeable tools, there are registered a machine-tool tool-use data file relating to plural types of tools prepared in advance, and standard machining condition information possessing, on a tool-by-tool basis, standard values of machining conditions relating to the tools;

tool-use determination means which, on the basis of a before-machining shape information and after-machining shape information created by a CAD apparatus as well as material information and machining-stage information entered from an input unit, and in accordance with tool-use knowledge data established in advance, decides upon an optimum machine tool for machining said workpiece and decides upon a tool used by the machine tool decided upon;

optimum-tool determination means which, in a case where the machine tool decided upon by said tool-use determination means is a machine tool that uses tools in said machine-tool tool-use data file, refers to said machine-tool tool-use data file to decide, with regard to the tool used decided upon by said tool-use determination means, an optimum tool used employed by said machine tool from among the tools of said machine-tool tool-use data file;

tool-path mode determination means which, in a case where the machine tool decided upon by said tool-use determination means is a machine tool that uses tools in said machine-tool tool-use data file and said tool used employed by said machine tool is a specific tool used, decides a path mode of said specific tool used on the basis of the before-machining shape information and after-machining shape information created by said CAD apparatus as well as the material information and machining-stage information entered from said input unit, and in accordance with tool-path mode knowledge data established in advance; and machining condition determination means which, on the basis of the before-machining shape information and after-machining shape information created by said CAD apparatus as well as the material information and machining-stage information entered from said input unit, and in accordance with machining-condition knowledge data established in advance, decides a relative value of a machining condition relating to said tool used, reads a standard value of the machining condition relating to said tool used from the standard machining condition information registered in said data base, corrects the read standard value of the machining condition using the relative value of said machining condition and adopts the corrected value as a machining condition;

wherein said tool used, said tool path mode and said machining conditions are adopted as optimum machining information.

41. A machining information determination system according to claim 40, wherein said data base stores said standard machining condition information as fuzzy information.

42. A machining information determination system comprising:

a data base in which, with regard to a machine tool which applies machining to a workpiece using a plurality of interchangeable tools, there are registered a machine-tool tool-use data file relating to plural types of tools prepared in advance, and proper machining condition range information possessing, on a tool-by-tool basis, a proper range of machining conditions relating to said tools;

tool-use determination means which, on the basis of the before-machining shape information and after-machining shape information created by a CAD apparatus as well as the material information and machining-stage information entered from an input unit, and in accordance with tool-use knowledge data established in advance, decides upon an optimum machine tool for machining said workpiece and decides upon a tool used by the machine tool decided upon;

optimum-tool determination means which, in a case where the machine tool decided upon by said tool-use determination means is a machine tool that uses tools in said machine-tool tool-use data file, refers to said machine-tool tool-use data file to decide, with regard to the tool used decided upon by said tool-use determination means, an optimum tool used employed by said machine tool from among the tools of said machine-tool tool-use data file;

tool-path mode determination means which, in a case where the machine tool decided upon by said tool-use determination means is a machine tool that uses tools in the machine-tool tool-use data file and said tool used employed by said machine tool is a specific tool used, decides a path mode of said specific tool used on the basis of the before-machining shape information and after-machining shape information created by said CAD apparatus as well as the material information and machining-stage information entered from said input unit, and in accordance with tool-path mode knowledge data established in advance; and machining condition determination means which, on the basis of said tool used, reads the proper range of machining conditions of said tool used from the proper machining condition information registered in said data base, creates membership functions of machining-condition decision rules established in advance based upon the read proper range of machining conditions, and on the basis of the before-machining shape information and after-machining shape information created by said CAD apparatus as well as the material information and machining-stage information entered from said input unit, and in accordance with the machining-condition decision rules and created membership functions, decides machining conditions of said tool used;

wherein said tool used, said tool path mode and said machining conditions are adopted as optimum machining information.

43. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece;

on the basis of the created before-machining shape information and after-machining shape information and the entered material information and machining-stage information, deciding optimum machining information for machining the workpiece before machining has been applied thereto, to the shape after machining and up to the machining stage entered; and generating control data in accordance with which a machine tool applies machining to said workpiece, on the basis of the optimum machining information decided, said before-machining shape model and said after-machining shape model, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the created before-machining shape information and after-machining shape information as well as the entered material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base;

in a case where the machine tool is a machine tool that uses tools registered in said data base and said tool used employed by said machine tool is a specific tool used, deciding a path mode of said specific tool used on the basis of the created before-machining shape information and after-machining shape information as well as the entered material information and machining-stage information, and in accordance with tool-path mode knowledge data established in advance;

deciding machining conditions relating to said tool used on the basis of the created before-machining shape information and after-machining shape information, the entered material information and machining-stage information and said tool use and in accordance with machining-condition knowledge data established in advance; and adopting said tool used, said tool path mode and said machining conditions as optimum machining information.

44. A machining information determination method comprising the steps of:

creating, on the basis of a before-machining shape model representing the shape of a workpiece before machining is applied thereto and after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece;

on the basis of the created before-machining shape information and after-machining shape information and the entered material information and machining-stage information, deciding optimum machining information for machining the workpiece, before machining has been applied thereto, to the shape after machining and up to the machining stage entered; and generating control data, in accordance with which a machine tool applies machining to said workpiece, on the basis of the optimum machining information decided, said before-machining shape model and said after-machining shape model, said step of deciding optimum machining information further comprising the steps of:

providing a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to said specific tool; and a machining-condition data file relating to machining conditions, this with regard to a tool;

on the basis of the created before-machining shape information and after-machining shape information as well as the entered material information and machining-stage information, deciding upon an optimum machine tool for machining said workpiece and, by referring to the tool-use data file registered in said data base, deciding upon a tool used employed by said machine tool decided upon;

in a case where the machine tool decided upon is a machine tool that uses tools registered in said data base, referring to the machine-tool tool-use data file registered in said data base to decide, with regard to the tool used decided upon, an optimum tool used employed by said machine tool from among the tools registered in said machine-tool tool-use data file;

in a case where the machine tool decided upon is a machine tool that uses tools registered in said data base and said tool used employed by said machine tool is a specific tool used, deciding a path mode of said specific tool used by referring to said tool-path mode data file, registered in said data base, on the basis of the created before-machining shape information and after-machining shape information as well as the entered material information and machining-stage information;

on the basis of the created before-machining shape information and after-machining shape information, the entered material information and machining-stage information, and said tool used, referring to the machining-condition data file registered in said data base, to decide machining conditions relating to said tool used; and adopting said tool used, said tool path mode and said machining conditions as optimum machining information.

45. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece; and on the basis of the created before-machining shape information and after-machining shape information and the entered material information and machining-stage information, deciding optimum machining information for machining the workpiece, before machining has been applied thereto, to the shape after machining and up to the machining stage entered, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the created before-machining shape information and after-machining shape information as well as the entered material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base;

in a case where the machine tool decided upon is a machine tool that uses tools registered in said data base and said tool used employed by said machine tool is a specific tool used, deciding a path mode of said specific tool used on the basis of the before-machining shape information and after-machining shape information as well as the material information and machining-stage information, and in accordance with tool-path mode knowledge data established in advance;

deciding machining conditions relating to said tool used on the basis of the created before-machining shape information and after-machining shape information, the entered material information and machining-stage information and said tool used, and in accordance with machining-condition knowledge data established in advance; and adopting said tool used, said tool path mode and said machining conditions as optimum machining information.

46. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece; and on the basis of the created before-machining shape information and after-machining shape information and the entered material information and machining-stage information, deciding optimum machining information for machining the workpiece, before machining has been applied thereto, to the shape after machining and up to the machining stage entered, said step of deciding optimum machining information further comprising the steps of:

providing a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to said specific tool; and a machining-condition data file relating to machining conditions, this with regard to a tool;

on the basis of the created before-machining shape information and after-machining shape information as well as the material information and machining-stage information entered, deciding upon an optimum machine tool for machining said workpiece and, by referring to the tool-use data file registered in said data base, deciding upon a tool used employed by said machine tool decided upon;

in a case where the machine tool decided upon is a machine tool that uses tools registered in said data base, referring to the machine-tool tool-use data file registered in said data base to decide, with regard to the tool used decided upon, an optimum tool used employed by said machine tool from among the tools registered in said machine-tool tool-use data file;

in a case where the machine tool decided upon is a machine tool that uses tools registered in said data base and said tool used employed by said machine tool is a specific tool used, deciding a path mode of said specific tool used by referring to said tool-path mode data file, registered in said data base, on the basis of the created before-machining shape information and after-machining shape information as well as the entered material information and machining-stage information;

on the basis of the created before-machining shape information and after-machining shape information, the entered material information and machining-stage information and said tool used, referring to the machining-condition data file, registered in said data base, to decide machining conditions relating to said tool used; and adopting said tool used, said tool path mode and said machining conditions as optimum machining information.

47. A machining information determination method comprising the steps of:

accepting entered before-machining shape information relating to the shape of a workpiece before machining, after-machining shape information relating to the shape of said workpiece after machining, material information representing material of said workpiece and machining-stage information representing stage of machining applied to said workpiece;

on the basis of the entered before-machining shape information, after-machining shape information, material information and machining-stage information, deciding optimum machining information for machining said workpiece, before machining has been applied thereto, to the shape after machining and up to the machining stage entered; and generating control data, in accordance with which a machine tool applies machining to the workpiece, on the basis of a given before-machining shape model representing the shape of said workpiece before machining is applied thereto, given after-machining shape model representing the shape of said workpiece after machining is applied thereto, and the optimum machining information decided, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the entered before-machining shape information, after-machining shape information, material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base;

in a case where the machine tool is a machine tool that uses tools registered in said data base and said tool used employed by said machine tool is a specific tool used, deciding a path mode of said specific tool used on the basis of the entered before-machining shape information, after-machining shape information, material information and machining-stage information, and in accordance with tool-path mode knowledge data established in advance;

deciding machining conditions relating to said tool used on the basis of the entered before-machining shape information, after-machining shape information, material information and machining-stage information and said tool used, and in accordance with machining-condition knowledge data established in advance; and adopting said tool used, said tool path mode and said machining conditions as optimum machining information.

48. A machining information determination method comprising the steps of:

accepting entered before-machining shape information relating to the shape of a workpiece before machining, after-machining shape information relating to the shape of said workpiece after machining, material information representing material of said workpiece and machining-stage information representing stage of machining applied to said workpiece;

on the basis of the entered before-machining shape information, after-machining shape information, material information and machining-stage information, deciding optimum machining information for machining said workpiece, before machining has been applied thereto, to the shape after machining and up to the machining stage entered; and generating control data, in accordance with which a machine tool applies machining to the workpiece, on the basis of a given before-machining shape model representing the shape of said workpiece before machining is applied thereto, a given after-machining shape model representing the shape of said workpiece after machining is applied thereto, and the optimum machining information decided, said step of deciding optimum machining information further comprising the steps of:

providing a data base in which there are registered a tool-use data file relating to a tool used by a machine tool; a machine-tool tool-use data file relating to plural types of tools prepared in advance, this with regard to a machine tool which applies machining to a workpiece using a plurality of interchangeable tools; a tool-path mode data file relating to a path mode of a specific tool, this with regard to said specific tool; and a machining-condition data file relating to machining conditions, this with regard to a tool;

on the basis of the entered before-machining shape information, after machining shape information, material information and machining-stage information, deciding upon an optimum machine tool for machining said workpiece and, by referring to the tool-use data file registered in said data base, deciding upon a tool used employed by said machine tool decided upon;

in a case where the machine tool decided upon is a machine tool that uses tools registered in said data base, referring to the machine-tool tool-use data file registered in said data base to decide, which regard to the tool used decided upon, an optimum tool used employed by said machine tool from among the tools registered in said machine-tool tool-use data file;

in a case where the machine tool decided upon is a machine tool that uses tools registered in said data base and said tool used employed by said machine tool is a specific tool used, deciding a path mode of said specific tool used by referring to said tool-path mode data file, registered in said data base, on the basis of the entered before-machining shape information, after-machining shape information, material information and machining-stage information;

on the basis of the entered before-machining shape information, after-machining shape information, material information and machining-stage information and said tool used, referring to the machining-condition data file, registered in said data base, to decide machining conditions relating to said tool used; and adopting said tool used, said tool path mode and said machining conditions as optimum machining information.

49. A machining-process information determination system comprising:

a data base in which there are stored standard drawing information representing the shape of a workpiece before machining is applied thereto, and standard machining information, in correspondence with standard macro patterns, relating to parameters of the standard macro patterns, machining processes, machining tools and machining method;

product drawing information creating means for creating product drawing information relating to shape of said workpiece after machining is applied thereto;

difference-information extraction means for extracting difference information between the standard drawing information stored in said data base and the product drawing information created by said product drawing information creating means;

macro pattern development means which, on the basis of the difference information extracted by said difference-information extraction means, creates a machining macro pattern representing a contour of the shape to be formed on said workpiece by machining and extracts parameters of the machining macro pattern;

machining sequence determination means for reading a machining method and machining processes of the standard macro pattern, which corresponds to the machining macro pattern development means, from the standard machining information stored in said data base, deciding machining processes for machining the workpiece, as well as the sequence of the processes, on the basis of the parameters of the macro pattern extracted by said macro pattern development means and in accordance with the machining method read, rearranging the decided sequence of the machining processes into an optimum sequence in accordance with sequence knowledge data established in advance, and creating the decided machining processes and the rearranged sequence as design process information;

machining condition determination means for reading a machining tool of the standard macro pattern, which corresponds to the machining macro pattern created by said macro pattern development means, from the standard machining information stored in said data base, and deciding optimum machining condition information relating to the machining tool read in accordance with condition knowledge data established in advance; and control-data creating means for generating control data, in accordance with which a machine tool applies machining to said workpiece, on the basis of the product drawing information created by said product drawing information creating means, the standard drawing information stored in said data base, the process design information decided by said machining sequence determination means and the machining condition information decided by said machining condition determination means.

50. A machining-process information determination method comprising the steps of:

providing a data base in which there are stored standard drawing information representing the shape of a workpiece before machining is applied thereto, and standard machining information, in correspondence with standard macro patterns, relating to parameters of the standard macro patterns, machining processes, machining tools and machining method;

creating product drawing information relating to shape of said workpiece after machining is applied thereto;

extracting difference information between the standard drawing information stored in said data base and the product drawing information created;

creating, on the basis of the difference information extracted, a machining macro pattern representing a contour of the shape to be formed on said workpiece by machining, and extracting parameters of the machining macro pattern;

reading a machining method and machining processes of the standard macro pattern, which corresponds to the machining macro pattern created, from the standard machining information stored in said data base, deciding machining processes for machining said workpiece, as well as the sequence of the processes, on the basis of the extracted parameters of the macro pattern and in accordance with the machining method read, rearranging the decided sequence of the machining processes into an optimum sequence in accordance with sequence knowledge data established in advance, and creating the decided machining processes and the rearranged sequence as design process information;

reading a machining tool of the standard macro pattern, which corresponds to the machining macro pattern created, from the standard machining information stored in said data base, and deciding optimum machining condition information relating to the machining tool read in accordance with condition knowledge data established in advance; and generating control data, in accordance with which a machine tool applies machining to said workpiece, on the basis of the created product drawing information, the standard drawing information stored in said data base, the process design information decided and the machining condition information decided.

51. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece;

on the basis of the created before-machining shape information and after-machining shape information and the entered material information and machining-stage information, deciding optimum machining information for machining the workpiece, before machining has been applied thereto, to the shape after machining and up to the machining stage entered; and generating control data, in accordance with which a machine tool applies machining to said workpiece, on the basis of the optimum machining information decided, said before-machining shape model and said after-machining shape model, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the created before-machining shape information and after-machining shape information as well as the entered material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base; and adopting said tool used as optimum machining information.

52. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece;

on the basis of the created before-machining shape information and after-machining shape information and the entered material information and machining-stage information, deciding optimum machining information for machining the workpiece, before machining has been applied thereto, to the shape after machining and up to the machining stage entered; and generating control data, in accordance with which a machine tool applies machining to said workpiece, on the basis of the optimum machining information decided, said before-machining shape model and said after-machining shape model, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the created before-machining shape information and after-machining shape information as well as the entered material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base;

in a case where the machine tool is a machine tool that uses tools registered in said data base and said tool used employed by said machine tool is a specific tool used, deciding a path mode of said specific tool used on the basis of the created before-machining shape information and after-machining shape information as well as the entered material information and machining-stage information, and in accordance with tool-path mode knowledge data established in advance; and adopting said tool used and said tool path mode as optimum machining information.

53. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece; and on the basis of the created before-machining shape information and after-machining shape information and the entered material information and machining-stage information, deciding optimum machining information for machining the workpiece before machining has been applied thereto, to the shape after machining and up to the machining stage entered, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the created before-machining shape information and after-machining shape information as well as the entered material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base referring to said data base to decide, with regard to the tool used decided upon, an optimum tool used employed by said machine tool from among the tools registered in said data base; and adopting said tool used as optimum machining information.

54. A machining information determination method comprising the steps of:

creating, on the basis of a before-machining shape model representing the shape of a workpiece before machining is applied thereto and an after-machining shape model representing the shape of said workpiece after machining is applied thereto, before-machining shape information relating to the shape of said workpiece before machining and after-machining shape information relating to the shape of said workpiece after machining;

accepting entered material information representing material of said workpiece and machining-stage information representing stage of machining applied to said workpiece; and on the basis of the created before-machining shape information and after-machining shape information and the entered material information and machining-stage information deciding optimum machining information for machining the workpiece before machining has been applied thereto, to the shape after machining and up to the machining stage entered, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the created before-machining shape information and after-machining shape information as well as the entered material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base;

in a case where the machine tool decided upon is a machine tool that uses tools registered in said data base and said tool used employed by said machine tool is a specific tool used, deciding a path mode of said specific tool used, deciding a path mode of said specific tool used on the basis of the before-machining shape information and after-machining shape information as well as the material information and machining-stage information, and in accordance with tool-path mode knowledge data established in advance; and adopting said tool used and said tool path mode as optimum machining information.

55. A machining information determination method comprising the steps of:

accepting entered before-machining shape information relating to the shape of a workpiece before machining, after-machining shape information relating the shape of said workpiece after machining, material information representing material of said workpiece and machining-stage information representing stage of machining applied to said workpiece;

on the basis of the entered before-machining shape information, after-machining shape information, material information and machining-stage information, deciding optimum machining information for machining said workpiece, before machining has been applied thereto, to the shape after machining and up to the machining stage entered; and generating control data, in accordance with which a machine tool applies machining to the workpiece, on the basis of a given before-machining shape model representing the shape of said workpiece before machining is applied thereto, a given after-machining shape model representing the shape of said workpiece after machining is applied thereto, and the optimum machining information decided, said step of providing optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the entered before-machining shape information, after-machining shape information, material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base; and adopting said tool used as optimum machining information.

56. A machining information determination method comprising the steps of:

accepting entered before-machining shape information relating to the shape of a workpiece before machining, after-machining shape information relating to the shape of said workpiece after machining, material information representing material of said workpiece and machining-stage information representing stage of machining applied to said workpiece;

on the basis of the entered before-machining shape information, after-machining shape information, material information and machining-stage information, deciding optimum machining information for machining said workpiece, before machining has been applied thereto, to the shape after machining and up to the machining stage entered; and generating control data, in accordance with which a machine tool applies machining to the workpiece, on the basis of a given before-machining shape model representing the shape of said workpiece before machining is applied thereto, a given after-machining shape model representing the shape of said workpiece after machining is applied thereto, and the optimum machining information decided, said step of deciding optimum machining information further comprising the steps of:

providing a data base in which machine-tool tool-use data relating to plural types of tools prepared in advance is registered with regard to a machine tool which applies machining to a workpiece using a plurality of interchangeable tools;

on the basis of the entered before-machining shape information, after-machining shape information, material information and machining-stage information, and in accordance with tool-use knowledge data established in advance, deciding upon an optimum machine tool for machining said workpiece and deciding upon a tool used by the machine tool decided upon;

in a case where the machine tool decided upon is a machine tool that uses tools registered in said data base, referring to said data base to decide, with regard to the tool used decided upon, an optimum tool used employed by said machine tool from among the tools registered in said data base;

in a case where the machine tool is a machine tool that uses tools registered in said data base and said tool used employed by said machine tool is a specific tool used, deciding a path mode of said specific tool used on the basis of the entered before-machining shape information, after-machining shape information, material information and machining-stage information, and in accordance with tool-path mode knowledge data established in advance; and adopting said tool used and said tool path mode as optimum machining information.

* * * * *

UNITED STATES PATENT AND TRADEMARK OFFICE
CERTIFICATE OF CORRECTION

| | | |
|---|---|---|
| PATENT NO. | : 5,796,618 | Page 1 of 1 |
| APPLICATION NO. | : 08/416683 | |
| DATED | : August 18, 1998 | |
| INVENTOR(S) | : Maeda et al. | |

It is certified that error appears in the above-identified patent and that said Letters Patent is hereby corrected as shown below:

IN THE TITLE, item 54 and col 1,

Please change the Title of the invention from "CAD system, method and medium for creating and encoding NC data based before and after workpiece models" to --Fuzzy Reasoning Computer--.

Signed and Sealed this

Twenty-seventh Day of May, 2008

JON W. DUDAS
*Director of the United States Patent and Trademark Office*